US012706054B2

(12) United States Patent
Ishii et al.

(10) Patent No.: US 12,706,054 B2
(45) Date of Patent: Aug. 11, 2026

(54) DISPLAY DEVICE

(71) Applicant: Japan Display Inc., Tokyo (JP)

(72) Inventors: Tatsuya Ishii, Tokyo (JP); Kenji Harada, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 19/228,031

(22) Filed: Jun. 4, 2025

(65) Prior Publication Data

US 2025/0372047 A1 Dec. 4, 2025

(30) Foreign Application Priority Data

Jun. 4, 2024 (JP) ................................ 2024-090834

(51) Int. Cl.
*G09G 3/32* (2016.01)
*G09G 3/3266* (2016.01)

(52) U.S. Cl.
CPC ... *G09G 3/3266* (2013.01); *G09G 2300/0426* (2013.01); *G09G 2300/0819* (2013.01); *G09G 2310/0251* (2013.01); *G09G 2310/0286* (2013.01); *G09G 2310/08* (2013.01); *G09G 2330/021* (2013.01)

(58) Field of Classification Search
CPC ... G09G 2300/0426; G09G 2300/0819; G09G 2310/0251; G09G 2310/0286; G09G 2310/08; G09G 2330/021; G09G 3/3233; G09G 3/3266
See application file for complete search history.

(56) References Cited

U.S. PATENT DOCUMENTS

2020/0320937 A1* 10/2020 Yang .................... G09G 3/3258
2023/0206825 A1* 6/2023 Lee ...................... G09G 3/3266
345/55

FOREIGN PATENT DOCUMENTS

JP 2005-037844 A 2/2005

* cited by examiner

*Primary Examiner* — Insa Sadio
(74) *Attorney, Agent, or Firm* — K&L Gates LLP

(57) ABSTRACT

A display device includes a first transistor connected between an image data signal line and a first node, switching of the first transistor controlled by a first control signal, a third transistor connected between the first node and a second node, switching of the third transistor controlled by a second control signal, a second transistor connected to the second node and connected between a power line and the third node, a fourth transistor connected between a reference voltage power line and the second node, switching of the fourth transistor controlled by the second control signal, a fifth transistor connected between an initialization voltage power line and the third node, switching of the fifth transistor controlled by the third control signal, and a sixth transistor electrically connected between a pre-charge voltage power line and the first node, and switching of the sixth transistor controlled by the fourth control signal.

19 Claims, 69 Drawing Sheets

160B(n)

VINI2-Vne=VTH, VTHEL>Vne
⇔
VTHEL>VINI2-VTH
⇔
VINI2<VTHEL+VTH

VINI2-Vnen=VTHP, VTHEL<Vnen
⇔
VTHEL<VINI2-VTHP
⇔
VINI2>VTHEL+VTHP

DISPLAY DEVICE

CROSS-REFERENCE TO RELATED APPLICATIONS

This application claims the benefit of priority to Japanese Patent Application No. 2024-090834 filed on Jun. 4, 2024, the entire contents of which are incorporated herein by reference.

FIELD

An embodiment of the present invention relates to a display device.

BACKGROUND

In recent years, a self-luminous display device has been implemented in a TV, a smart phone, a digital signage (electronic signboard, electronic advertising board, and the like), and has become widespread. For example, the self-luminous display device includes a plurality of pixels and a control circuit for driving the plurality of pixels. For example, each of the plurality of pixels includes a plurality of transistors, a capacitive element, and a light-emitting element. The light-emitting element is an element emitting light in a self-luminous manner, and is, for example, a light-emitting diode (LED), a minute light-emitting diode (micro-LED), or an organic electroluminescence (Electro Luminescence: EL) element. In the self-luminous display device, a control circuit supplies a voltage to each of the plurality of pixels, so that a current corresponding to the supplied voltage flows to the light-emitting element included in each of the plurality of pixels. Each of the light-emitting elements emits light with a luminance corresponding to the current flowing through the light-emitting element, and a pixel including the light-emitting element can display an image with a gradation corresponding to the luminance.

For example, a display device including an organic light-emitting element and capable of suppressing display defects such as display unevenness by a pre-charge voltage generated by a source-driver IC is known.

SUMMARY

A display device includes a first transistor electrically connected between an image data signal line and a first node, the switching of the first transistor is controlled by a first control signal, and a data voltage is supplied to the image data signal line, a third transistor electrically connected between the first node and a second node, the switching of the third transistor is controlled by a second control signal, and the second control signal is different from the first control signal, a second transistor including a gate electrode electrically connected to the second node and electrically connected between a power line and a third node, and a constant voltage is supplied to the power line, a fourth transistor electrically connected between a reference voltage power line and the second node, the switching of the fourth transistor is controlled by the second control signal, and a reference voltage is supplied to the reference voltage power line, a fifth transistor electrically connected between an initialization voltage power line and the third node, the switching of the fifth transistor is controlled by a third control signal, the third control signal is different from the first control signal and the second control signal, and an initialization voltage is supplied to the initialization voltage power line, a sixth transistor electrically connected between a pre-charge voltage power line and the first node, the switching of the sixth transistor is controlled by a fourth control signal, the fourth control signal is different from the first control signal and the second control signal, and a pre-charge voltage is supplied to the pre-charge voltage power line, a light-emitting element electrically connected to the third node, and a capacitive element electrically connected between the first node and the third node.

A display device includes a first transistor electrically connected between an image data signal line and a first node, the switching of the first transistor is controlled by a first control signal, and a data voltage is supplied to the image data signal line, a third transistor electrically connected between the first node and a second node, the switching of the third transistor is controlled using the first control signal, a second transistor including a gate electrode electrically connected to the second node and electrically connected between a power line and a third node, and a constant voltage is supplied to the power line, a fourth transistor electrically connected between the second node and a third control signal line, the switching of the fourth transistor is controlled by a second control signal, the second control signal is different from the first control signal, the third control signal line is supplied with a third control signal, the third control signal includes a pre-charge voltage, a first initialization voltage and a second initialization voltage, the first initialization voltage is different from a pre-charge voltage, and the second initialization voltage is different from a pre-charge voltage and the first initialization voltage, a fifth transistor electrically connected between the third control signal line and the third node, the switching of the fifth transistor is controlled by the second control signal and a fourth control signal, and the fourth control signal is different from the first control signal, a light-emitting element electrically connected to the third node, and a capacitive element electrically connected between the first node and the third node.

A display device includes a first transistor electrically connected between an image data signal and a first node, the switching of the first transistor is controlled by a first control signal, and a data voltage is supplied to the image data signal line, a third transistor electrically connected between the first node and a third node, the switching of the third transistor is controlled by a second control signal, and the second control signal is different from the first control signal, a second transistor including a gate electrode electrically connected to the second node and electrically connected between the third node and a fourth node, a fourth transistor electrically connected between the third node and a third control signal, the switching of the fourth transistor is controlled by the second control signal, a third control signal is supplied to the third control signal line, the third control signal includes a first initialization voltage and a second initialization voltage, the second initialization voltage is different from the first initialization voltage, and the first initialization voltage is supplied to the third control signal line, a fifth transistor electrically connected between the third control signal line and the fourth node, the switching of the fifth transistor is controlled by a fourth control signal, and the fourth control signal is different from the first control signal, the second control signal and the third control signal, a sixth transistor electrically connected between the second node and the fourth node, the switching of the sixth transistor is controlled by using the second control signal, a seventh transistor electrically connected between a voltage line and the fourth node, the switching of the seventh transistor is controlled by the second control signal, and a constant voltage is supplied to the voltage line, an eighth transistor electrically connected between a pre-charge voltage power line and the first node, the switching of the eighth transistor is controlled by a fifth control signal, the fifth control signal is different from the first control signal, the second control signal, the third control signal and the fourth control signal, and a pre-charge voltage is supplied to the pre-charge voltage power line, a light-emitting element electrically connected to the third node, and a capacitive element electrically connected between the first node and the second node.

DESCRIPTION OF EMBODIMENTS

Figure 1:
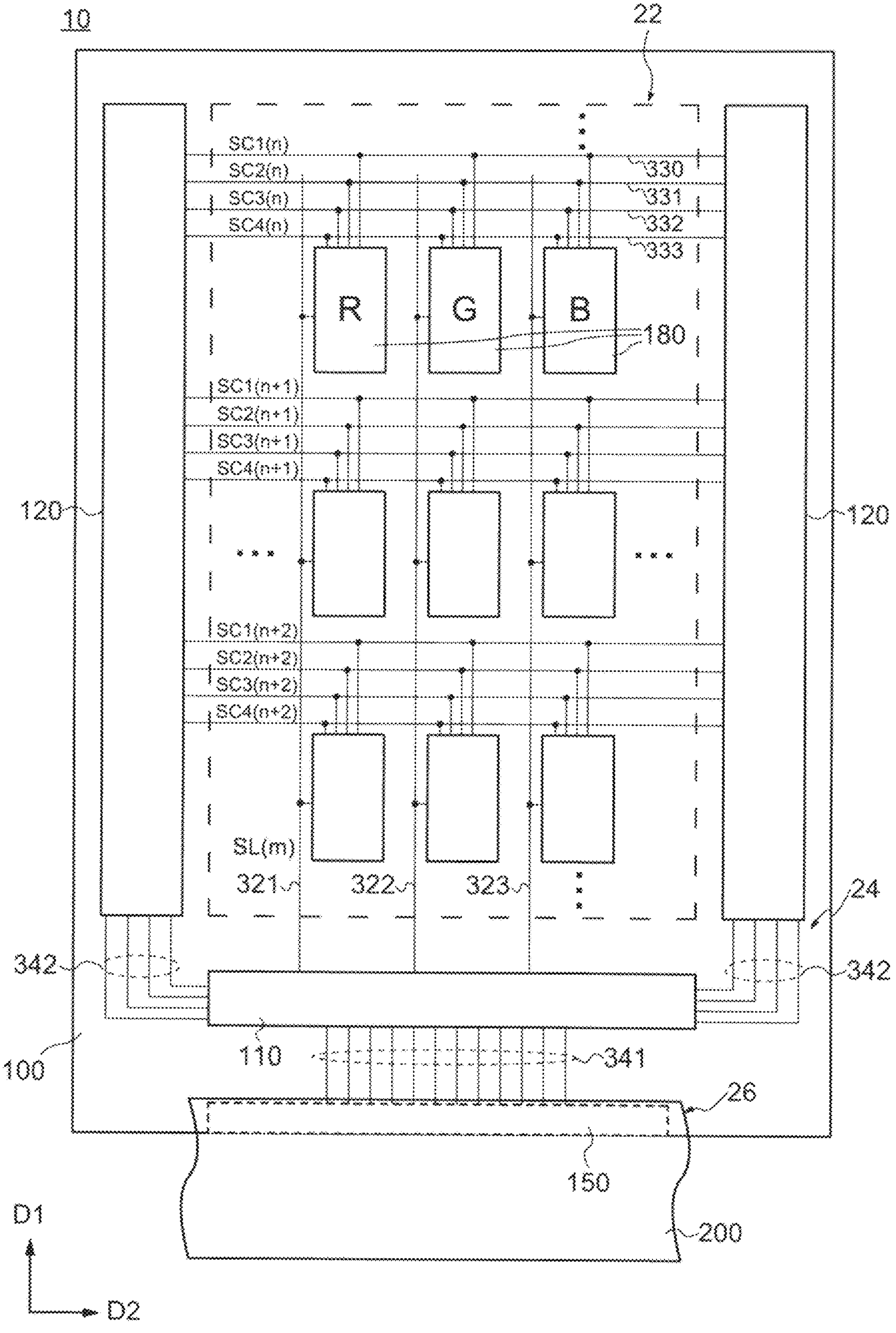
FIG. 1 is a schematic diagram showing a configuration of a display device according to the first embodiment of the present invention.

Hereinafter, embodiments of the present invention will be described with reference to the drawings and the like. However, the present invention can be implemented in many different aspects, and should not be construed as being limited to the description of the embodiments exemplified below. Furthermore, in the drawings, the widths, thicknesses, shapes, configurations, and the like of the respective portions may be schematically represented in comparison with the actual embodiments for clarity of the description, but the drawings are merely examples, and do not limit the interpretation of the present invention. In addition, the terms “first” and “second” appended to each element are convenience signs used to distinguish each element, and do not have any further meaning unless otherwise specified.

In the present specification, the phrase “a includes A, B, or C,” “a includes any of A, B, and C,” “a includes one selected from a group consisting of A, B, and C,” and the like does not exclude cases where a includes a plurality of combinations of A to C unless otherwise indicated. Furthermore, these expressions do not exclude the case where a includes other elements.

For example, a display device according to an embodiment of the present invention is a display device using an EL element as a self-luminous light-emitting element. For example, the display device using the EL element may be referred to as a self-luminous display device, an EL display device, or the like. For example, the display device using the EL element is called the self-luminous display device.

First Embodiment

[1-1. Overview of Self-luminous Display Device 10]

An overview of a self-luminous display device 10 according to the first embodiment will be described with reference to FIG. 1. FIG. 1 is a schematic diagram showing a configuration of the self-luminous display device 10. A configuration of the self-luminous display device 10 shown in FIG. 1 is an example, and the configuration of the self-luminous display device 10 is not limited to the configuration shown in FIG. 1.

The self-luminous display device 10 includes an array substrate 100, a flexible printed circuit board 200 (FPC 200), and an IC chip 110. In addition, the self-luminous display device 10 includes a display region 22 provided on the array substrate 100, a peripheral region 24 surrounding the display region 22, and a terminal region 26.

In the display region 22, a plurality of pixels 180 is arranged in a matrix along a first direction D1 (column direction) and a second direction D2 (row direction) intersecting the first direction D1. The pixel 180 is the smallest unit constituting a part of an image to be displayed on the display region 22. For example, each of the plurality of pixels 180 may correspond to a sub-pixel R, a sub-pixel G, and a sub-pixel B. One pixel may be formed by three sub-pixels. The arrangement of the pixel 180 is not limited, and the arrangement of the plurality of pixels 180 is, for example, a stripe arrangement. The arrangement of the display device 10 may be a delta arrangement, a pentile arrangement, or the like.

The sub-pixel R, the sub-pixel G, and the sub-pixel B are configured to display images of different colors. For example, each of the sub-pixel R, the sub-pixel G, and the sub-pixel B may include the light-emitting element including a light-emitting layer emitting the three primary colors of red, green, and blue. An arbitrary voltage or current is supplied to each of the three sub-pixels, and the display device 10 can display an image.

The IC chip 110 and two control circuits 120 are provided in the peripheral region 24. The two control circuits 120 are provided on the left and right sides of the display region 22. The IC chip 110 is connected to a terminal section 150 using a connection wiring 341. Each of the two control circuits 120 is connected to the IC chip 110 using a connection wiring 342. The peripheral region 24 may be referred to as a frame region. The connection wiring 341 may be referred to alone as the connection wiring 341, and a bundle of a plurality of connection wirings 341 may be referred to as the connection wiring 341. Similar to the connection wiring 341, the connection wiring 342 may be referred to alone as the connection wiring 342, and a bundle of a plurality of connection wirings 342 may be referred to as the connection wiring 342.

The terminal section 150 and the FPC 200 electrically connected to the terminal section 150 are provided in the terminal region 26. The terminal region 26 is a region opposite the region where the display region 22 is provided in the peripheral region 24 in the first direction D1.

The FPC 160 is connected to an external device (not shown) on the outer side of the display device 10. Therefore, the display device 10 is connected to the external device via the FPC 200 and the terminal section 150 connected to the FPC. A control signal and a voltage are transmitted from the external device to the self-luminous display device 10 via the FPC 200 and the terminal section 150 connected to the FPC. The self-luminous display device 10 drives each pixel 180 provided in the self-luminous display device 10 using the control signal and the voltage received from the external device. As a result, the self-luminous display device 10 can display an image in the display region 22.

The IC chip 110 supplies signals, voltages, and the like for driving each pixel 180 to the two control circuits 120 and each pixel 180 (a pixel circuit 181) via the FPC 200, the terminal section 150, and the connection wiring 341.

In the present specification and the drawings, each of the two control circuits 120 and each IC chip 110 may be referred to alone as the control circuit, and a group of circuits including each IC chip 110, the two control circuits 120, and a part or all of the IC chip 110 may be referred to as the control circuit.

[1-2. Configuration of IC Chip 110]

An overview of the IC chip 110 will be described with reference to FIG. 1. The IC chip 110 is provided at a position adjacent to the display region 22 in the first direction D1. Image data signal lines 321, 322, and 323 extend from the IC chip 110 in the first direction D1 and are connected to the plurality of pixels 180 arranged in the first direction D1.

For example, the IC chip 110 includes a plurality of selection circuits (not shown). For example, each of the plurality of selection circuits is a switch controlled based on an ON signal and an OFF signal supplied to a selection signal. The selection circuit is selected by the ON signal provided to the selection signal and provides an image data signal SL(m) to the image data signal line 321 and the pixel 180 electrically connected to the image data signal line 321. The selection signal and the image data signal SL(m) are transmitted from the external device to the IC chip 110 via the FPC 200 and the terminal section 150 connected to the FPC. For example, a signal supplied to the image data signal SL(m) of each embodiment is a data signal VDATA, and the data signal VDATA includes a data voltage equal to or higher than a voltage VSIGL (see FIG. 8) and equal to or lower than a voltage VSIGH (see FIG. 8). Furthermore, in practice, the image data signal SL(m) includes the data signal VDATA corresponding to each horizontal period HRP, but only the data signal VDATA in the horizontal period HRP is illustrated in the image data signal SL(m) in the timing charts shown in each of the embodiments, and the other data signals VDATA are omitted.

For example, the ON signal is a signal including a voltage that conducts the selection circuit (switch), and the OFF signal is a signal including a voltage that cuts off the selection circuit (switch). In the present invention, the ON signal may be a high-level voltage (potential) (high, High, HI), the OFF signal may be a low-level voltage (potential) (low, Low, LO), the ON signal may be a low-level voltage (potential) (low, Low, LO), and the OFF signal may be a high-level voltage (potential) (high, High, HI). The high-level voltage is greater (higher) than the low-level voltage. For example, in the self-luminous display device according to the embodiment of the present specification, the ON signal is the high-level voltage, and the OFF signal is the low-level voltage.

[1-3. Configuration of Control Circuit 120]

Figure 2:
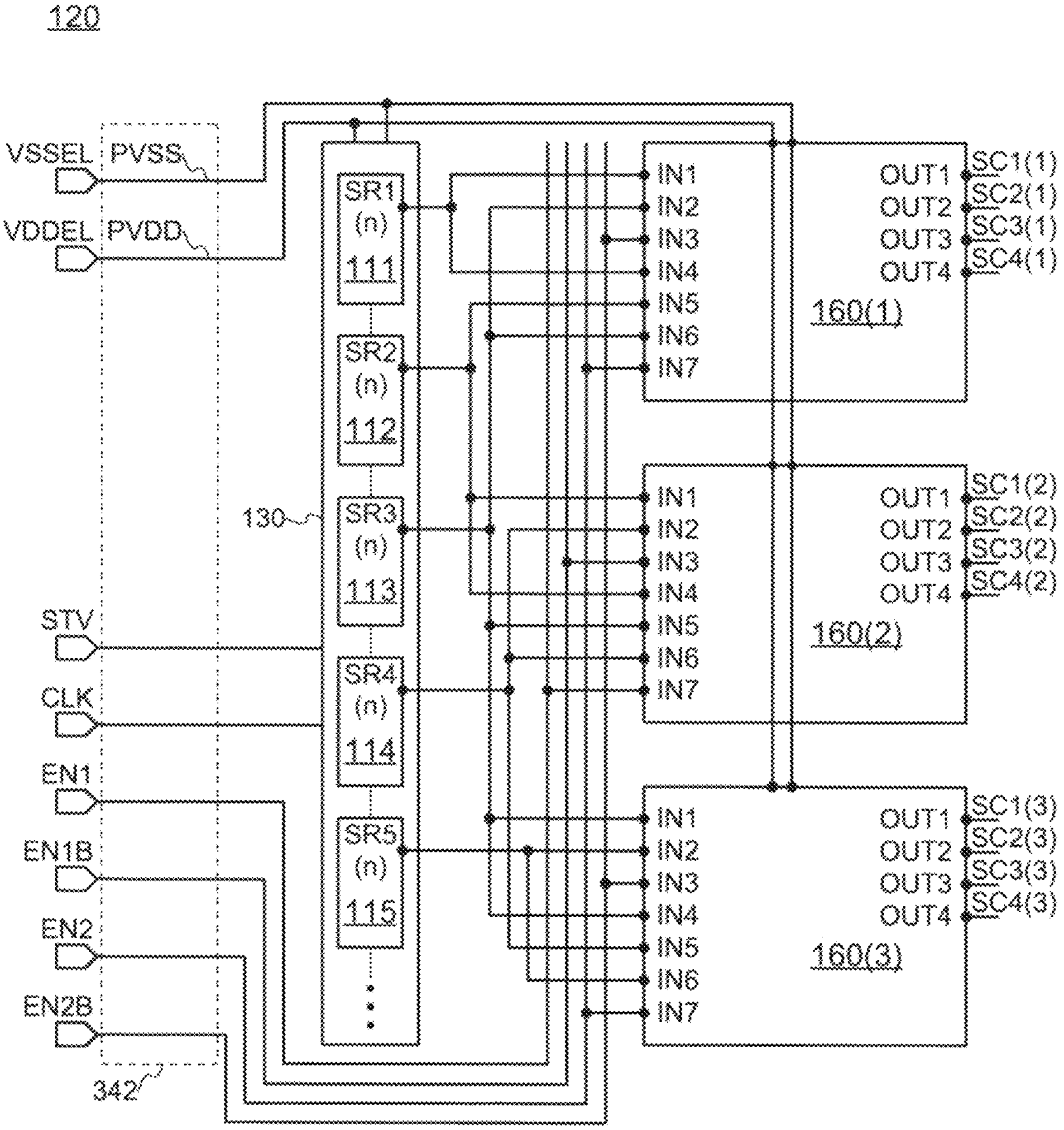
FIG. 2 is a schematic diagram showing a configuration of a control circuit according to the first embodiment of the present invention.
Figure 3:
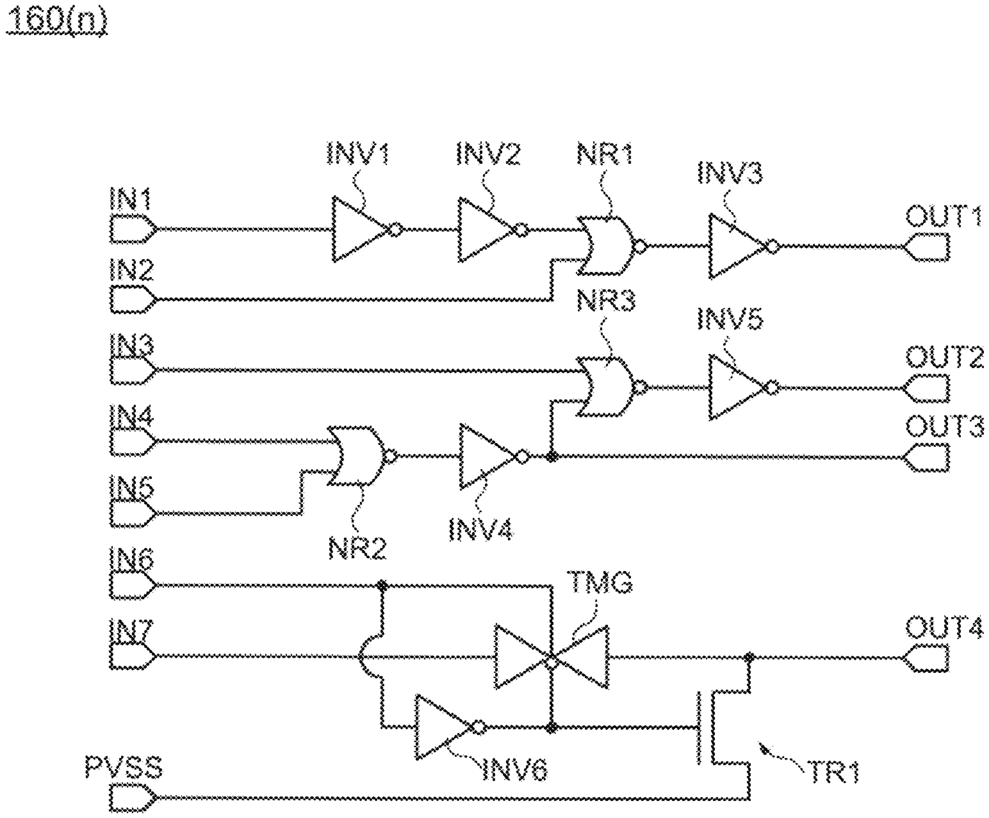
FIG. 3 is a circuit diagram showing a configuration of a control circuit according to the first embodiment of the present invention.

An overview of the control circuit 120 will be described with reference to FIG. 1 to FIG. 3. FIG. 2 is a schematic diagram showing a configuration of the control circuit 120, and FIG. 3 is a circuit diagram showing a circuit configuration of a scan driver 160(*n*). The configurations of the control circuit 120 and the scan driver 160(*n*) shown in FIG. 2 and FIG. 3 are examples, and the configurations of the control circuit 120 and the scan driver 160(*n*) are not limited to the configurations shown in FIG. 2 and FIG. 3. Configurations that are the same as or similar to those in FIG. 1 will be described as necessary.

As shown in FIG. 1, the two control circuits 120 are provided at positions adjacent to both sides of the display region 22 in the second direction D2. A scan signal line 330, a scan signal line 331, a scan signal line 332, and a scan signal line 333 extend from the control circuit 120 in the second direction D2 and are connected to the plurality of pixels 180 arranged in the second direction D2.

As shown in FIG. 2, the control circuit 120 includes a shift register circuit 130 and a plurality of scan drivers 160(*n*). For example, the control circuit 120 is a gate driver. The number n is a positive integer. For example, a clock signal CLK, a start pulse STV, an enable signal EN1, an enable signal EN1B, a control signal such as an enable signal EN2 and an enable signal EN2B, and a voltage such as a drive voltage VDDEL and a reference voltage VSSEL are input to the control circuit 120. The control circuit 120 can sequentially select the scan lines by inputting the control signal and power supply.

The shift register circuit 130 is electrically connected to the plurality of scan drivers 160(*n*). The shift register circuit 130 includes a plurality of shift registers (e.g., shift registers 111, 112, 113, 114, and 115). In addition, the shift register 130 is supplied with the clock signal CLK, the start pulse STV, and the like via the plurality of the connection wirings 342, the drive voltage VDDEL is supplied via a drive power line PVDD, and the reference voltage VSSEL is supplied via a reference voltage line PVSS. The shift register circuit 130 generates a plurality of output signals (an output signal SR1(*n*), an output signal SR2(*n*), an output signal SR3(*n*), an output signal SR4(*n*), an output signal SR5(*n*), . . . ) shifted at different timings based on the control signals such as the clock signal CLK and the start pulse STV, and sequentially outputs the output signals to the plurality of scan drivers (for example, a scan driver 160(1), a scan driver 160(2), a scan driver 160(3), and the like).

For example, the shift register 111 is electrically connected to the shift register 112, the shift register 112 is electrically connected to the shift register 113, the shift register 113 is electrically connected to the shift register 114, and the shift register 114 is electrically connected to the shift register 115. The shift register 111 is electrically connected to the scan driver 160(1) and supplies the output signal SR1(*n*) to input terminals IN1 and IN4 of the scan driver 160(1). The shift register 112 is electrically connected to the scan drivers 160(1) and 160(2), and supplies the output signal SR2(*n*) to an input terminal IN5 of the scan driver 160(1), and the input terminals IN1 and IN4 of the scan driver 160(2). The shift register 113 is electrically connected to the scan drivers 160(1), 160(2), and 160(3), and supplies the output signal SR3(*n*) to input terminals IN2 and IN6 of the scan driver 160(1), the input terminal IN5 of the scan driver 160(2), and the input terminals IN1 and IN4 of the scan driver 160(3). The shift register 114 is electrically connected to the scan drivers 160(2) and 160(3), and supplies the output signal SR4(*n*) to the input terminals IN2 and IN6 of the scan driver 160(2) and the input terminal IN5 of the scan driver 160(3). The shift register 115 is electrically connected to the scan driver 160(3) and supplies the output signal SR5(*n*) to the input terminals IN2 and IN6 of the scan driver 160(3).

The scan driver 160(*n*) has seven input terminals (input terminals IN1 to IN7) and four output terminals (output terminals OUT1 to OUT4). The plurality of scan drivers 160(*n*) is supplied with the enable signal EN1 and the enable signal EN1B, the enable signal EN2, and the enable signal EN2B from the IC chip 110 via the plurality of connection wirings 342, the drive voltage VDDEL is supplied via the drive power line PVDD, and the reference voltage VSSEL is supplied via the reference voltage line PVSS. The scan driver 160(*n*) is configured to drive the pixel 180 (the pixel circuit 181) electrically connected to the respective scan signal lines while sequentially supplying scan signals having different timings (for example, a first scan signal SC1(*n*), a second scan signal SC2(*n*), a third scan signal SC3(*n*), and a fourth scan signal SC4(*n*)) to the respective scan signal lines based on the plurality of output signals, the enable signal EN1B, the enable signal EN2, and the enable signal EN2B. The first scan signal SC1(*n*) may be referred to as a second control signal, the second scan signal SC(2) may be referred to as a third control signal or a fourth control signal, the third scan signal SC3(*n*) may be referred to as a fourth control signal or a fifth control signal, and the fourth scan signal SC4(*n*) may be referred to as a first control signal. For example, the fourth scan signal SC4(*n*) and the scan signal line 333 to which the fourth scan signal SC4(*n*) is supplied are a so-called scan signal and scan signal line.

For example, as shown in FIG. 3, the scan driver 160(*n*) includes inverter circuits INV1 to INV6, NOR circuits NR1 to NR3, a transmission gate TMG, and a transistor TR1. The inverter circuit INV1 is electrically connected to the input terminal IN1 and the inverter circuit INV2. The NOR circuit NR1 is electrically connected to the input terminal IN2 and the inverter circuit INV2, and the NOR circuit INV3 is electrically connected to the output terminal OUT1. The NOR circuit NR2 is electrically connected to the input terminals IN4 and IN5 and the inverter circuit INV4. The NOR circuit NR3 is electrically connected to the input terminal IN3 and the inverter circuits INV4 and INV5. The inverter circuit INV5 is electrically connected to the output terminal OUT2, and the inverter circuit INV4 is electrically connected to the output terminal OUT3. The inverter circuit INV6 is electrically connected to the input terminal IN6, the transmission gate TMG, and the transistor TR1, and the transmission gate TMG is electrically connected to the input terminals IN6 and IN7, and the output terminal OUT4. The transistor TR1 is electrically connected to the reference voltage line PVSS, the transmission gate TMG, and the output terminal OUT4. For example, as shown in FIG. 2, the respective control signals are input to the seven input terminals (the input terminals IN1 to IN7), and as shown in FIG. 1 to FIG. 3, the first scan signal SC1(*n*) is output to the scan signal line 330 electrically connected to the output terminal OUT1, the second scan signal SC2(*n*) is output to the scan signal line 331 electrically connected to the output terminal OUT2, the third scan signal SC3(*n*) is output to the scan signal line 332 electrically connected to the output terminal OUT3, and the fourth scan signal SC4(*n*) is output to the scan signal line 333 electrically connected the output terminal OUT4.

[1-4. Configuration of Pixel 180]

Figure 4:
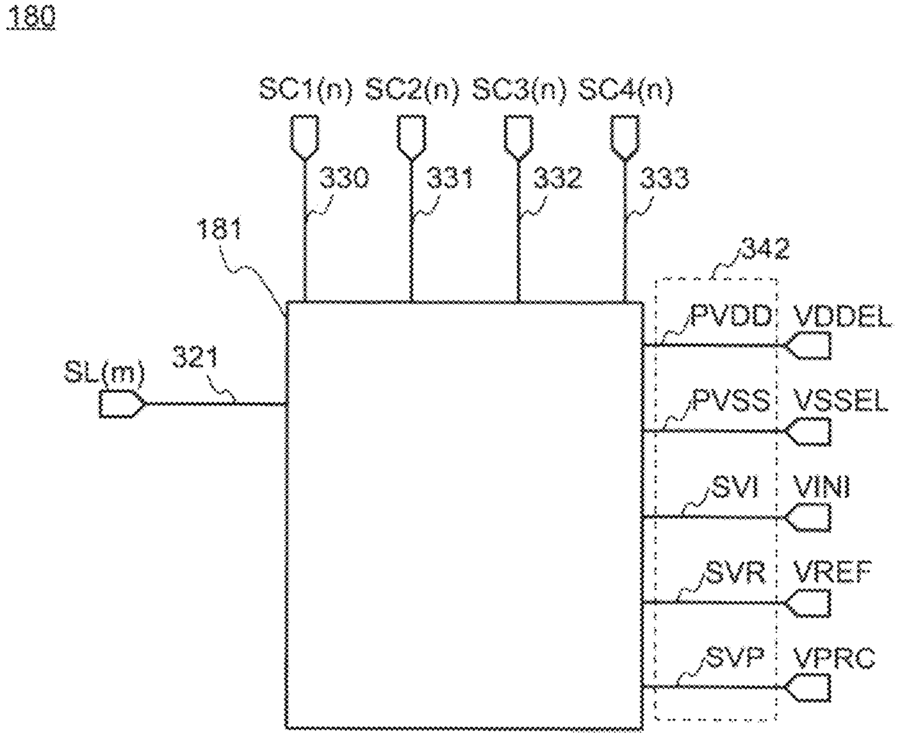
FIG. 4 is a schematic diagram showing an input signal to a pixel circuit according to the first embodiment of the present invention.
Figure 5:
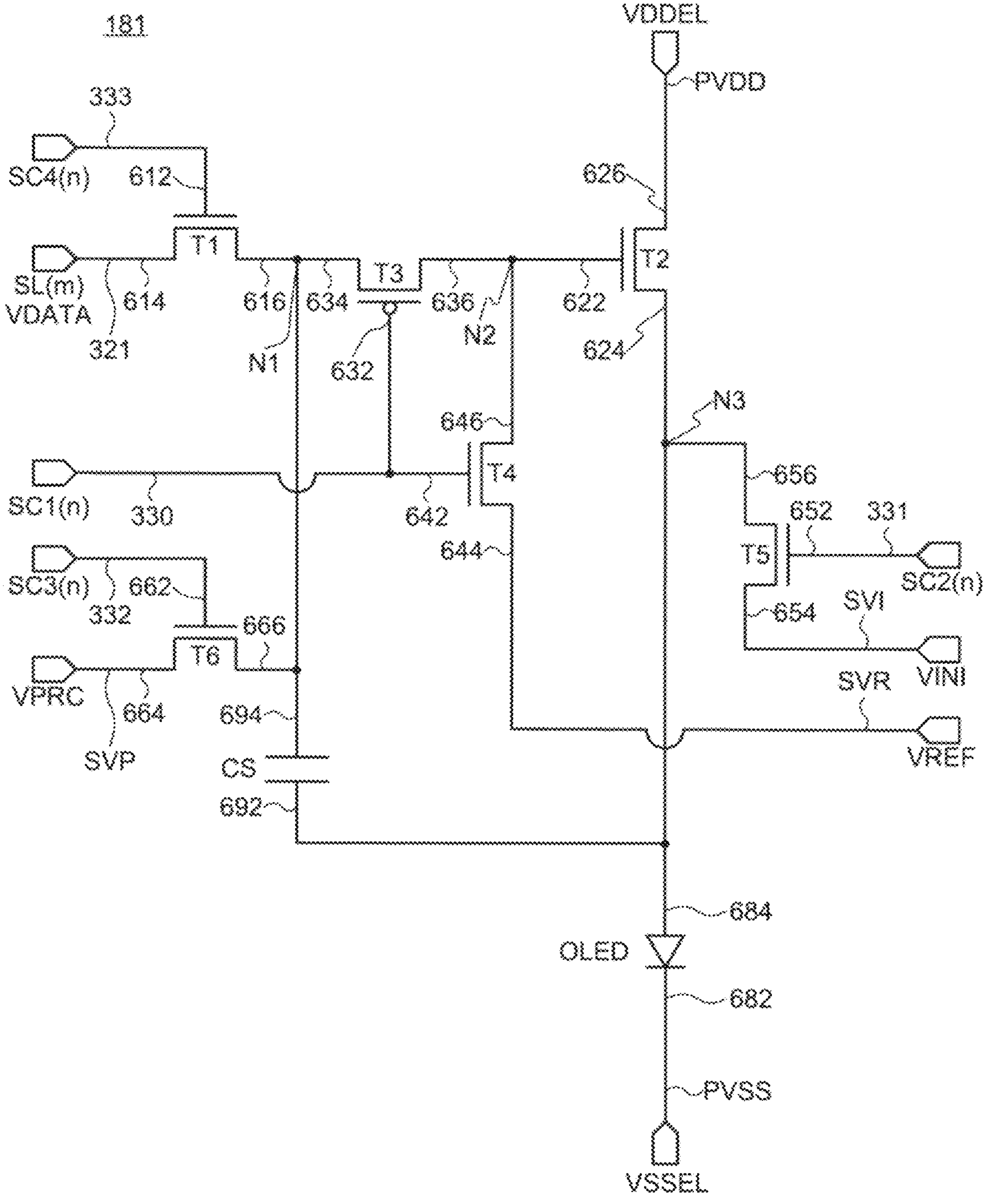
FIG. 5 is a circuit diagram showing a configuration of a pixel circuit according to the first embodiment of the present invention.

An overview of the pixel 180 and the pixel circuit 181 will be described with reference to FIG. 1 to FIG. 5. FIG. 4 is a schematic diagram showing an input signal to the pixel circuit 181 included in the pixel 180. FIG. 5 is a circuit diagram showing a configuration of the pixel circuit 181. As an example, FIG. 4 and FIG. 5 show the configuration of the pixel circuit 181 of the pixel 180 shown in FIG. 1. The configuration of the pixel 180 and the pixel circuit 181 is not limited to the configuration shown in FIG. 1, FIG. 4, and FIG. 5. Configurations that are the same as or similar to those in FIG. 1 to FIG. 3 will be described as necessary.

The pixel circuit 181 is a circuit for driving the pixel 180. The pixel circuits of the sub-pixel R, the sub-pixel G, and the sub-pixel B included in the pixel 180 are similar to those of the pixel circuit 181, but the colors emitted by a light-emitting element OLED are different. In the following explanation, the light-emitting element OLED emitting red light will be described as an example.

As shown in FIG. 4, the image data signal SL(m), the first scan signal SC1(*n*), the second scan signal SC2(*n*), the third scan signal SC3(*n*), the fourth scan signal SC4(*n*), a pre-charge voltage VPRC, a reference voltage VREF, and an initialization voltage VINI are supplied to the pixel circuit 181. In addition, the drive voltage VDDEL and the reference voltage VSSEL are supplied to the pixel circuit 181 as a power source for driving the pixel 180. For example, the pre-charge voltage VPRC, the reference voltage VREF, the initialization voltage VINI, the drive voltage VDDEL, and the reference voltage VSSEL may be constant voltages, and may be variable voltages that fluctuate depending on the timing of each signal.

The pre-charge voltage VPRC is supplied to the pre-charge voltage power line SVP, the reference voltage VREF is supplied to a reference voltage power line SVR, the initialization voltage VINI is supplied to an initialization voltage power line SVI, the drive voltage VDDEL is supplied to the drive power line PVDD, and the reference voltage VSSEL is supplied to the reference voltage line PVSS. For example, each of the pre-charge voltage VPRC, the reference voltage power line SVR, the initialization voltage power line SVI, the drive power line PVDD, and the reference voltage line PVSS is electrically connected to different connection wirings 342. In addition, for example, the pre-charge voltage VPRC, the reference voltage power line SVR, the initialization voltage power line SVI, the drive power line PVDD, and the reference voltage line PVSS may each be different connection wirings 342. For example, the pre-charge voltage VPRC is an intermediate voltage (potential) between the voltage VSIGL and the voltage VSIGH.

For example, the pre-charge voltage VPRC, the reference voltage VREF, the initialization voltage VINI, the drive voltage VDDEL, and the reference voltage VSSEL are supplied from the external device to the IC chip 110 via the FPC 200, the terminal section 150, and the connection wiring 341. In addition, for example, the pre-charge voltage VPRC, the reference voltage VREF, the initialization voltage VINI, the drive voltage VDDEL, and the reference voltage VSSEL are supplied from the IC chip 110 to the plurality of pixels 180 (pixel circuits 181) via the connection wiring 342, the pre-charge voltage power line SVP, the reference voltage power line SVR, the initialization voltage power line SVI, the drive power line PVDD, and the reference voltage line PVSS. Although not shown, the pre-charge voltage VPRC, the reference voltage VREF, the initialization voltage VINI, the drive voltage VDDEL, and the reference voltage VSSEL may be connected from the external device to the pre-charge voltage power line SVP, the reference voltage power line SVR, the initialization voltage SVI, the drive power line PVDD, and the reference voltage line PVSS via the FPC 200, the terminal section 150, and the connection wiring 341, and not via the IC chip 110 and the connection wiring 342, and may be supplied to the plurality of pixels 180 (pixel circuits 181). For example, the pre-charge voltage VPRC, the reference voltage VREF, the initialization voltage VINI, and the reference voltage VSSEL are smaller than the drive voltage VDDEL.

As shown in FIG. 5, the pixel circuit 181 includes a first transistor T1, a second transistor T2, a third transistor T3, a fourth transistor T4, a fifth transistor T5, a sixth transistor T6, a capacitive element CS, and the light-emitting element OLED. Each of these transistors includes a gate electrode and a pair of electrodes (a source electrode and a drain electrode) consisting of a first electrode and a second electrode. Each of the capacitive element CS and the light-emitting element OLED has a pair of electrodes consisting of the first electrode and the second electrode.

For example, the first transistor T1 is a select transistor. The first transistor T1 has a function of supplying the image data signal SL(m) to a first node N1.

For example, the second transistor T2 is a drive transistor. A gate voltage (a voltage between a gate electrode 622 and a first electrode (source) 624) applied to the gate electrode 622 of the second transistor T2 is a voltage in which the variation in a threshold voltage VTH is corrected based on the reference voltage VREF and the initialization voltage VINI. In addition, the second transistor T2 controls connection and disconnection between the drive power line PVDD and the light-emitting element OLED based on the gate voltage (the voltage between the gate electrode 622 and the first electrode (source) 624) with the threshold voltage VTH corrected and the input image data signal SL(m). That is, the second transistor T2 has a function of causing the light-emitting element OLED to emit light by supplying the drive voltage VDDEL to the light-emitting element OLED and supplying a current.

The third transistor T3 has a function of conducting the first node N1 and the second node N2 to supply the image data signal SL(m) to the second node N2.

The fourth transistor T4 has a function of conducting the second node N2 and the reference voltage power line SVR to supply the reference voltage VREF to the second node N2 and initializing the second node N2.

The fifth transistor T5 has a function of conducting the third node N3 and the initialization voltage power line SVI to supply the initialization voltage VINI to the third node N3 and initializing the third node N3.

The sixth transistor T6 has a function of conducting the first node N1 and the pre-charge voltage power line SVP to supply the pre-charge voltage VPRC to the first node N1 and supplying an intermediate potential to the first node N1.

For example, the capacitive element CS has a function of holding a charge (for example, a first charge) equivalent to the initialization voltage VINI supplied to the third node N3, and a function of holding a charge (for example, a second charge) equivalent to a data voltage (a voltage equal to or higher than the voltage VSIGL (see FIG. 9) and equal to or lower than the voltage VSIGH (see FIG. 9)) included in the image data signal SL(m) supplied to the first node N1.

The light-emitting element OLED has diode characteristics and has a function of emitting light based on a current flowing through the light-emitting element OLED (that is, a drain current Ion of the second transistor T2).

The first transistor T1 includes a gate electrode 612, a first electrode 614, and a second electrode 616. The gate electrode 612 is electrically connected to the scan signal line 333. The first electrode 614 is electrically connected to the image data signal line 321. The second electrode 616 is electrically connected to the first node N1, a first electrode 634 of the third transistor T3, a second electrode 666 of the sixth transistor T6, and a second electrode 694 of the capacitive element CS. As described above, the fourth scan signal SC4(*n*) is supplied to the scan signal line 333. The switching of the first transistor T1 is controlled using the fourth scan signal SC4(*n*). In other words, the first transistor T1 is controlled to be in a conductive state (ON state) or a non-conductive state (OFF state) by the fourth scan signal SC4(*n*). When the signal supplied to the fourth scan signal SC4(*n*) is LO, the first transistor T1 is in the non-conductive state. When the signal supplied to the fourth scan signal SC4(*n*) is HI, the first transistor T1 is in the conductive state.

The second transistor T2 includes the gate electrode 622, the first electrode 624, and a second electrode 626. The gate electrode 622 is electrically connected to the second node N2, a second electrode 636 of the third transistor T3, and a second electrode 646 of the fourth transistor T4. The first electrode 624 is electrically connected to the third node N3, a second electrode 656 of the fifth transistor T5, a first electrode 692 of the capacitive element CS, and a second electrode 684 of the light-emitting element OLED. The second electrode 626 is electrically connected to the drive power line PVDD. The threshold voltage of the second transistor T2 is the threshold voltage VTH. The conductive state (ON state) and the non-conductive state (OFF state) of the second transistor T2 are controlled according to the potential difference between the voltage supplied to the second node N2 and the voltage of the first electrode 624, the potential difference between the second electrode 626 and the first electrode 624, and the threshold voltage VTH. For example, when the potential difference between the voltage supplied to the second node N2 and the voltage of the first electrode 624 is smaller than the threshold voltage VTH and the potential difference between the second electrode 626 and the first electrode 624 is equal to or lower than 0 V, the second transistor T2 is in the non-conductive state. For example, when the potential difference between the voltage supplied to the second node N2 and the voltage of the first electrode 624 is equal to or greater than the threshold voltage VTH and the potential difference between the second electrode 626 and the first electrode 624 is higher than 0 V, the second transistor T2 is in the conductive state.

The third transistor T3 includes a gate electrode 632, the first electrode 634, and the second electrode 636. The switching of the third transistor T3 is controlled using the first scan signal SC1(*n*). The conductive state (ON state) and the non-conductive state (OFF state) of the third transistor T3 are controlled by the first scan signal SC1(*n*). When the signal supplied to the first scan signal SC1(*n*) is LO, the third transistor T3 is in the conductive state. When the signal supplied to the first scan signal SC1(*n*) is HI, the third transistor T3 is in the non-conductive state.

The fourth transistor T4 includes a gate electrode 642, a first electrode 644, and the second electrode 646. The first electrode 644 is electrically connected to the reference voltage power line SVR. The reference voltage VREF is supplied to the reference voltage power line SVR. The switching of the fourth transistor T4 is controlled using the scan signal line 330. In other words, the fourth transistor T4 is controlled to be in the conductive state (ON state) or the non-conductive state (OFF state) by the scan signal line 330. When the signal supplied to the scan signal line 330 is LO, the fourth transistor T4 is in the non-conductive state, and when the signal supplied to the scan signal line 330 is HI, the fourth transistor T4 is in the conductive state.

The fifth transistor T5 includes a gate electrode 652, a first electrode 654, and the second electrode 656. The gate electrode 652 is electrically connected to the scan signal line 331. The first electrode 654 is electrically connected to the initialization voltage power line SVI. The second scan signal SC2(*n*) is supplied to the scan signal line 331. The switching of the fifth transistor T5 is controlled using the second scan signal SC2(*n*). In other words, the conductive state (ON state) and the non-conductive state (OFF state) of the fifth transistor T5 are controlled by the second scan signal SC2(*n*). When the signal supplied to the second scan signal SC2(*n*) is LO, the fifth transistor T5 is in the non-conductive state, and when the signal supplied to the second scan signal SC2(*n*) is HI, the fifth transistor T5 is in the conductive state.

The sixth transistor T6 includes a gate electrode 662, a first electrode 664, and the second electrode 666. The gate electrode 662 is electrically connected to the scan signal line 332. The first electrode 664 is electrically connected to the pre-charge voltage power line SVP. The third scan signal SC3(*n*) is supplied to the scan signal line 332. The switching of the sixth transistor T6 is controlled using the third scan signal SC3(*n*). In other words, the conductive state (ON state) and the non-conductive state (OFF state) of the sixth transistor T6 are controlled by the third scan signal SC3(*n*). When the signal supplied to the third scan signal SC3(*n*) is LO, the sixth transistor T6 is in the non-conductive state, and when the signal supplied to the third scan signal SC3(*n*) is HI, the sixth transistor T6 is in the conductive state.

A first electrode 682 of the light-emitting element OLED is electrically connected to the reference voltage line PVSS. As described above, the reference voltage VSSEL is supplied to the reference voltage line PVSS. For example, the first electrode 682 of the light-emitting element OLED is a cathode electrode, and the second electrode 684 of the light-emitting element OLED is an anode electrode.

For example, it is assumed that the conductive state of the transistor in the self-luminous display device 10 indicates a state in which the source electrode and the drain electrode of the transistor are conductive and the transistor is in the ON state (ON), and the non-conductive state of the transistor in the self-luminous display device 10 indicates a state in which the source electrode and the drain electrode of the transistor are non-conductive and the transistor is in the OFF state (OFF). Furthermore, in each transistor, the source electrode and the drain electrode may be interchanged depending on a voltage or a potential supplied to each electrode. In addition, those skilled in the art will readily appreciate that even when the transistor is in the OFF state, a slight current flows, such as a leakage current.

The transistors shown in FIG. 5 can have Group 14 elements, such as silicon or germanium, or an oxide exhibiting semiconductor properties in a channel region. For example, a metal oxide with semiconductor properties can be used as the oxide exhibiting semiconductor properties. For example, an oxide semiconductor containing two or more metals including indium (In) is used as the metal oxide with semiconductor properties. Furthermore, in addition to indium, gallium (Ga), zinc (Zn), aluminum (Al), hafnium (Hf), yttrium (Y), zirconia (Zr), and lanthanoids may be used as the metal oxide with semiconductor properties. In addition, the metal oxide with semiconductor properties may be amorphous, crystalline, or a mixed phase of amorphous and crystalline. Furthermore, in the case where the self-luminous display device 10 includes both a transistor including the Group 14 element in the channel region and a transistor containing the oxide with semiconductor properties in the channel region, a method for manufacturing the self-luminous display device 10 includes forming a semiconductor layer containing the Group 14 element and forming a semiconductor layer (e.g., an oxide semiconductor layer) containing the oxide with semiconductor properties.

For example, the leakage current of a transistor including the metal oxide with semiconductor properties is extremely small. Therefore, using the transistor having the metal oxide with semiconductor properties, it is difficult for the charge equivalent to the voltage (potential) written in the capacitive element to escape from the capacitive element. As a result, by using the transistor having the metal oxide with semiconductor properties, the charge written in the capacitive element can be held for a long time. In addition, under the condition that the gate-source voltage (Vgs) and the source-drain voltage (e.g., the potential difference between the source electrode and the drain electrode (Vds)) are the same, the drain current of the transistor having the metal oxide with semiconductor properties may be greater than the drain current of the transistor having a low-temperature polysilicon (LTPS). As a result, under the same drain current conditions, the gate-source voltage and the source-drain voltage of the transistor having the metal oxide with semiconductor properties can be made smaller than the transistor having the LTPS. Therefore, the power consumption of the self-luminous display device 10 can be suppressed by using the transistor having the metal oxide with semiconductor properties.

For example, the channel region of the first transistor T1 or the channel region of the fourth transistor T4 may be formed using the metal oxide with semiconductor properties. In addition, the channel region of the second transistor T2 or the channel region of the fifth transistor T5 may be formed using the metal oxide with semiconductor properties. For example, when the channel region of the first transistor T1 is formed using the metal oxide, discharging of the charge (e.g., the second charge) equivalent to the voltage included in the data signal VDATA held in the first node N1 and the second electrode 694 of the capacitive element CS is difficult, and the first node N1 and the second electrode 694 of the capacitive element CS can hold the charge for a long time.

For example, the channel region of each transistor contains crystalline silicon. For example, the crystalline silicon may be the low-temperature polysilicon (LTPS) or single-crystal silicon. For example, each transistor in the self-luminous display device 10 is formed using a thin film transistor (TFT). In addition, the channel region of each transistor may be formed using a silicon wafer or single-crystal silicon such as an SOI substrate. Each transistor may have either an n-channel field effect transistor or a p-channel field effect transistor. In the self-luminous display device 10, the configuration of the transistor, the connection of the storage capacitor, power supply voltage, and the like may be appropriately adapted according to the application and specifications.

In the first embodiment, the first transistor T1, the second transistor T2, the fourth transistor T4, the fifth transistor T5, and the sixth transistor T6 are the n-channel field effect transistors, and the third transistor T3 is the p-channel field effect transistor.

[1-5. Driving Method for Self-Luminous Display Device 10]

Figure 6:
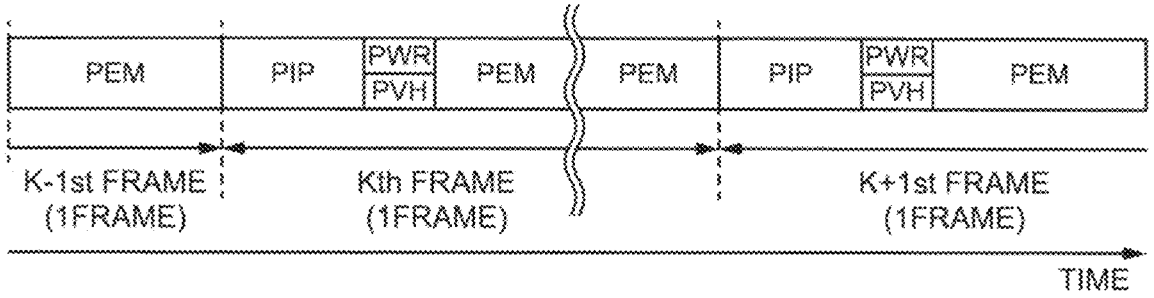
FIG. 6 is a timing chart of a self-luminous display device according to the first embodiment of the present invention.
Figure 7:
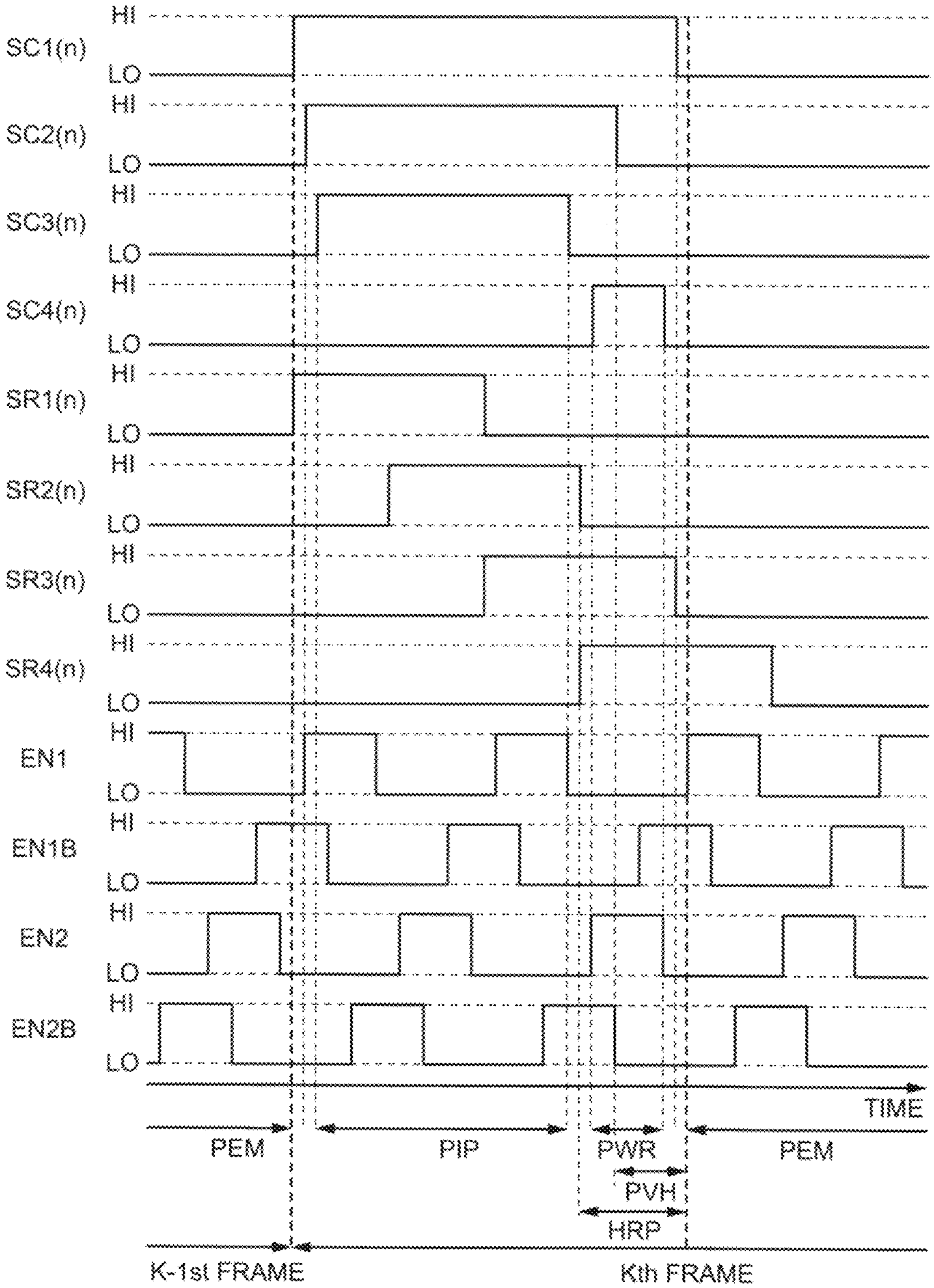
FIG. 7 is a timing chart of a self-luminous display device according to the first embodiment of the present invention.
Figure 8:
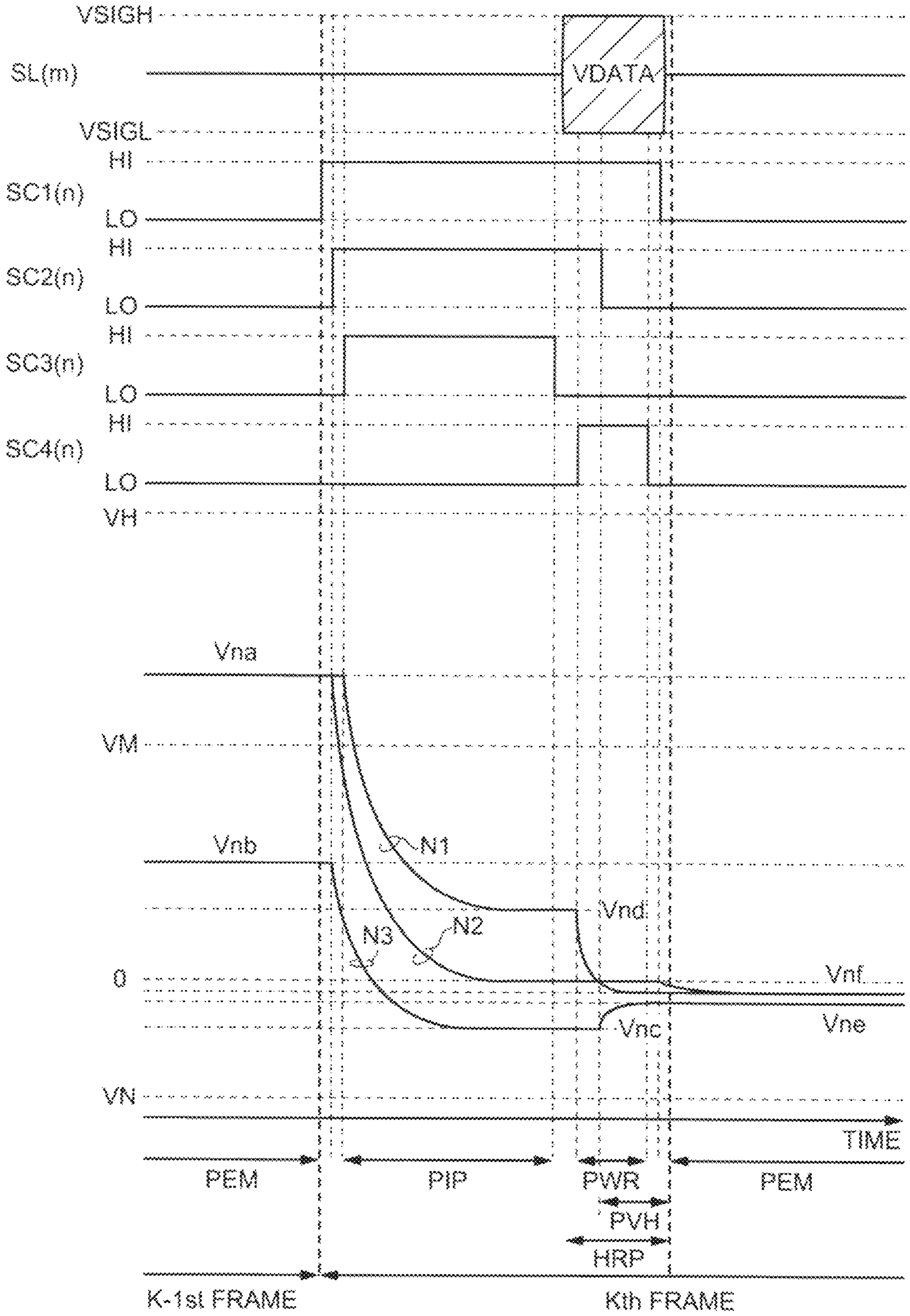
FIG. 8 is a timing chart of a self-luminous display device according to the first embodiment of the present invention.
Figure 9:
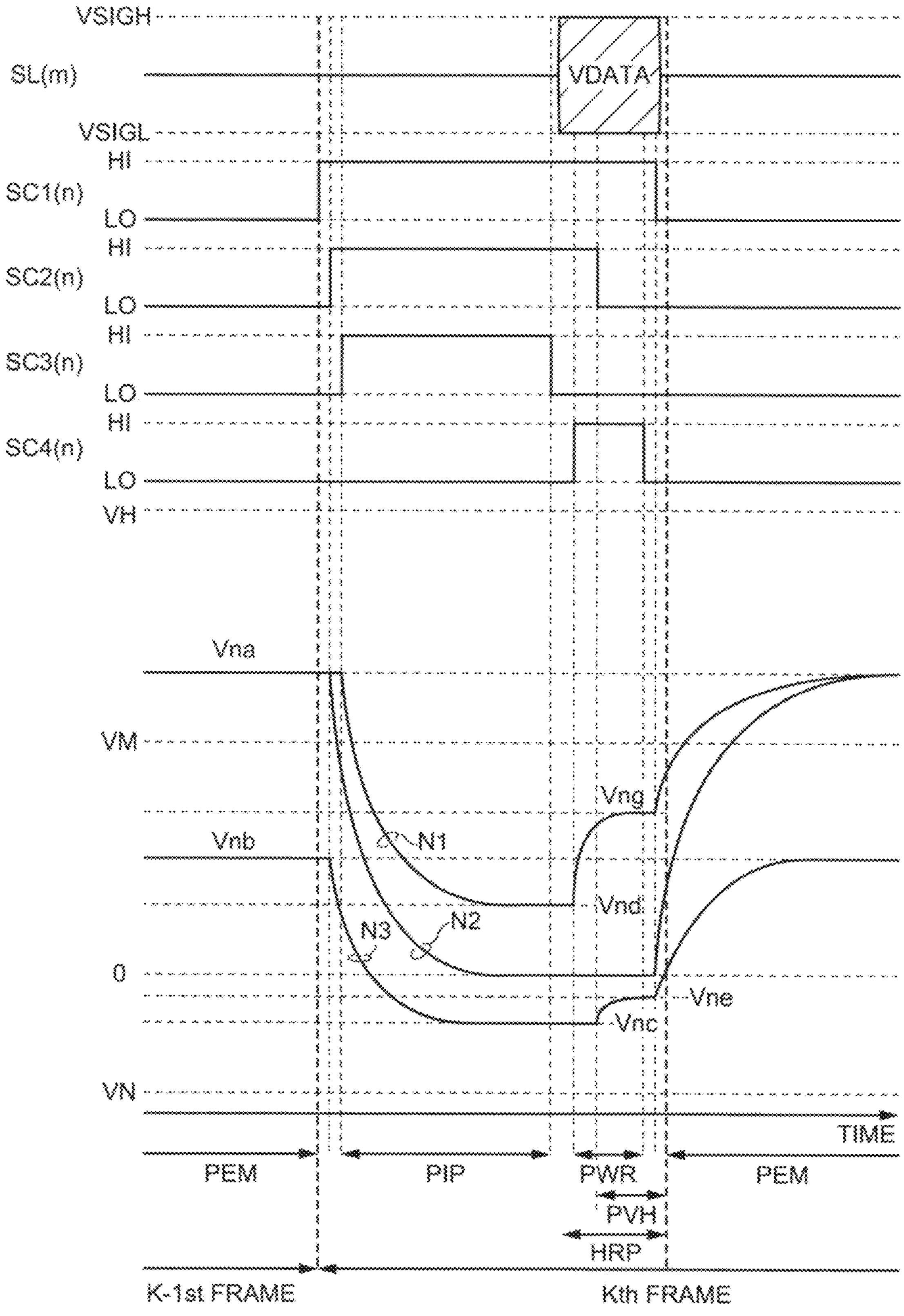
FIG. 9 is a timing chart of a self-luminous display device according to the first embodiment of the present invention.
Figure 10:
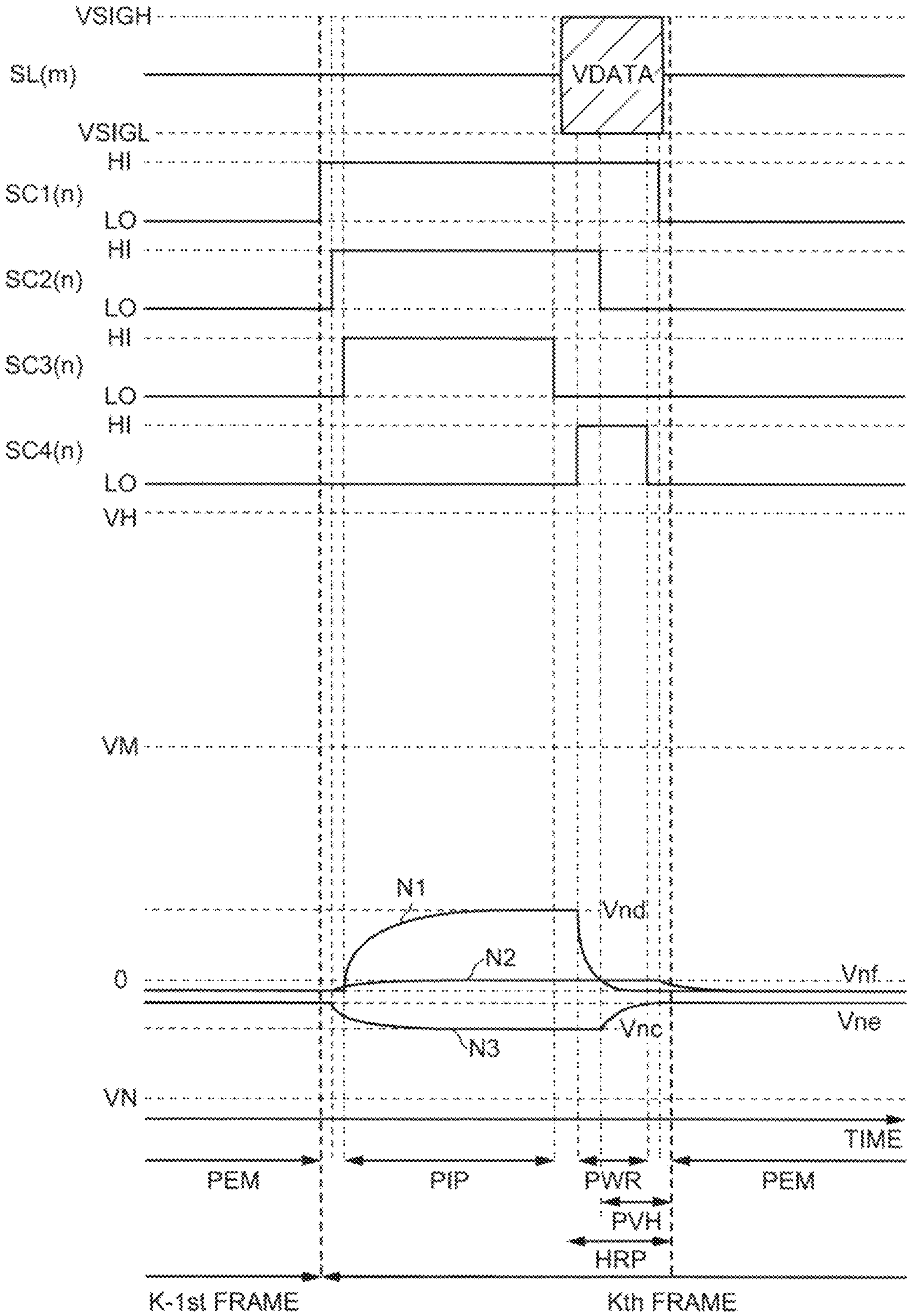
FIG. 10 is a timing chart of a self-luminous display device according to the first embodiment of the present invention.
Figure 11:
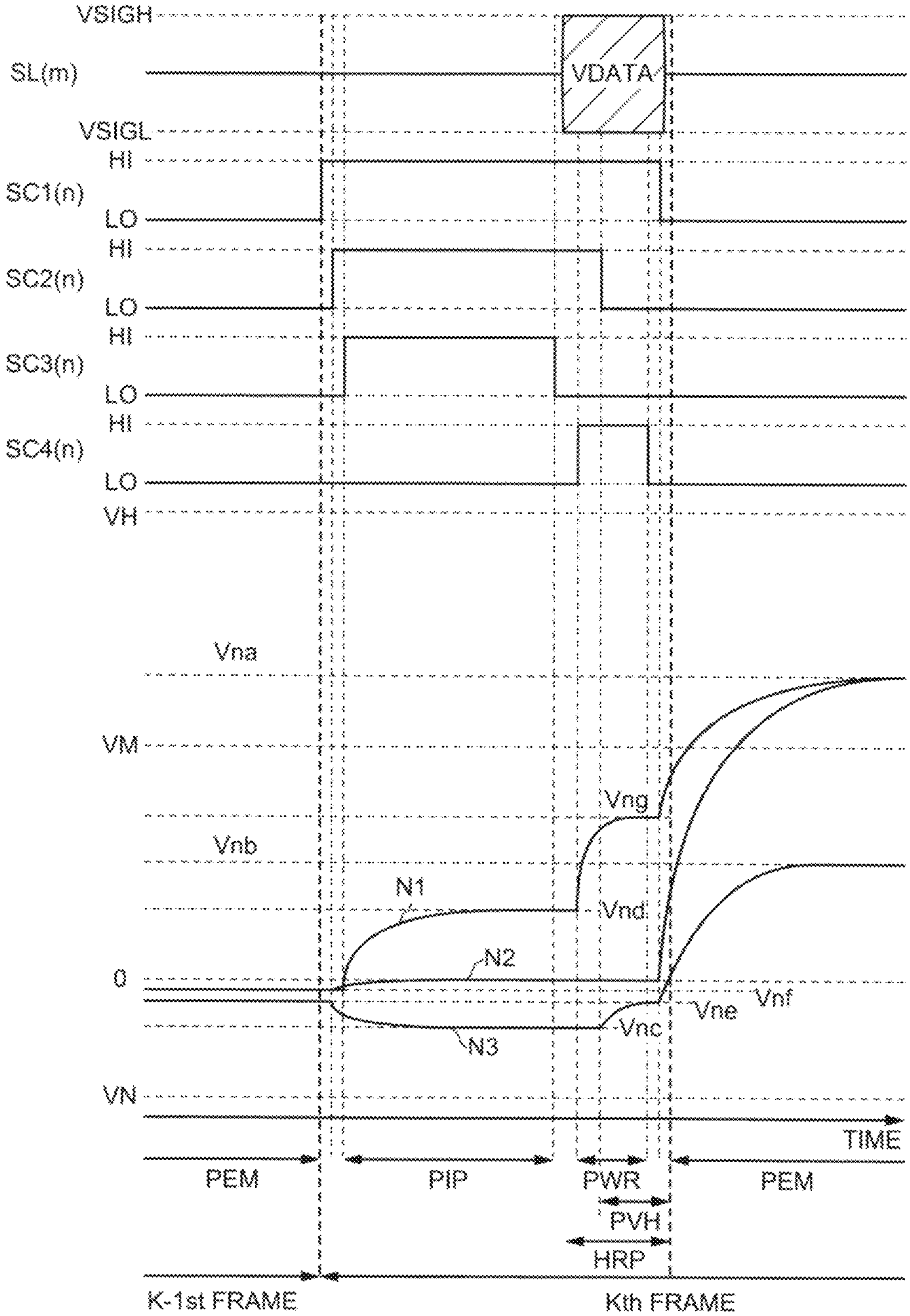
FIG. 11 is a timing chart of a self-luminous display device according to the first embodiment of the present invention.

A driving method for the self-luminous display device 10 will be described with reference to FIG. 6 to FIG. 11. FIG. 6, FIG. 8, and FIG. 11 are schematic diagrams showing timing charts of the self-luminous display device 10. FIG. 7 is a schematic diagram showing timing charts for explaining a driving method for the control circuit 120. The driving method shown in FIG. 6 to FIG. 11 is an example, and the driving method for the self-luminous display device 10 is not limited to the driving method shown in FIG. 6 to FIG. 11. Configurations that are the same as or similar to those in FIG. 1 to FIG. 5 will be described as necessary. In addition, the horizontal axis of the timing charts represents time (TIME).

For example, the frequency at which the self-luminous display device 10 is driven is 60 Hz, and one frame (1FRAME) is driven at 60 Hz. For example, FIG. 6 shows the current frame (KthFRAME), a portion of the previous frame of the current frame (K−1stFRAME), and a portion of the subsequent frame of the current frame (K+1stFRAME). In addition, FIG. 7 to FIG. 11 show a light emission period PEM of the previous frame of the current frame (K−1stFRAME), a period PIP of the current frame (KthFRAME), a period PWR, and a period PVH. Furthermore, FIG. 7 to FIG. 11 show one horizontal period (a horizontal period HRP) for one pixel 180 (pixel circuit 181).

First, an overview of the driving method of the self-luminous display device 10 will be described with reference to FIG. 6. As shown in FIG. 6, the driving method of the self-luminous display device 10 includes at least an initialization and pre-charge period PIP, a writing period PWR, and a threshold acquisition and holding period PVH in one frame. In the pixel 180 (pixel circuit 181) included in the self-luminous display device 10, the period PWR and the period PVH are executed after the period PIP. In addition, after the light emission period PEM of the previous frame of the current frame, the period PIP, the period PWR, and the period PVH of the current frame are executed, and after the light emission period PEM of the current frame, the period PIP, the period PWR, and the period PVH of the subsequent frame of the current frame are executed.

The period PIP is a period during which the pre-charge voltage is supplied to the first node N1, and is a period during which the second node N2 and the third node N3 are initialized. The period PWR is a period during which the data signal VDATA is written to the pixel 180 (pixel circuit 181). The period PVH is a period during which the threshold voltage of the second transistor T2 is obtained by performing an operation to make the potential difference Vgs of the second transistor T2 to be the same as the threshold voltage, and a charge equivalent to the threshold voltage is held in the third node N3 (the first electrode 692 of the capacitive element CS). Further, the light emission period PEM is a period during which the pixel 180 emits light based on the written (supplied) data signal VDATA and the obtained threshold voltage of the second transistor T2 (threshold voltage correction). In FIG. 6, for convenience of explanation, the period PWR overlaps the period PVH, but the actual period PVH starts after the period PWR starts and ends after the period PWR ends. That is, a part of the period PWR overlaps the period PVH.

Next, the driving method for the control circuit 120 will be described with reference to FIG. 7. As described in "1-3. Control Circuit 120", the plurality of output signals is generated based on the control signal such as the clock signal CLK (see FIG. 2), the start pulse STV (see FIG. 2), and the like. As shown in FIG. 7, each of the plurality of output signals is a signal shifted at different timings. Specifically, the output signal SR2(*n*) is a signal in which the output signal SR1(*n*) is shifted, and the output signal SR3(*n*) is a signal in which the output signal SR2(*n*) is shifted. Each of the output signals SR4(*n*) and SR5(*n*) is a signal in which the output signals SR3(*n*) and SR4(*n*) are shifted. In addition, pulse widths of the output signals SR1(*n*) to SR(5) are equivalent.

As described in "1-3. Control Circuit 120", the first scan signal SC1(*n*), the second scan signal SC2(*n*), the third scan signal SC3(*n*), and the fourth scan signal SC4(*n*) are generated based on the output signals SR1(*n*) to SR(5), the enable signal EN1, the enable signal EN1B, and the enable signal EN2B. For example, referring to FIG. 2, FIG. 3 and FIG. 7, the first scan signal SC1(*n*) is generated based on the rising edge of the output signal SR1(*n*) and the falling edge of the output signal SR3(*n*), the second scan signal SC2(*n*) is generated based on the rising edge of the enable signal ENB2 and the falling edge of the output signal SR1(*n*), the third scan signal SC3(*n*) is generated based on the rising edge of the output signal SR1(*n*) and the falling edge of the output signal SR2(*n*), and the fourth scan signal SC4(*n*) is generated based on the rising edge of the output signal SR3(*n*) and the falling edge of the enable signal EN2. Since accuracy is required to control the timing of starting the writing of the data signal VDATA to the first node N1 and the timing until the initialization of the third node N3 is completed, the fourth scan signal SC4(*n*) is generated based on the enable signal EN2 supplied from the IC chip 110, and the second scan signal SC2(*n*) is generated based on the falling edge of the enable signal ENB2 supplied from the IC chip 110.

Next, one horizontal period (horizontal period HRP) of the driving method for the pixel 180 of the self-luminous display device 10 will be described with reference to FIG. 8 to FIG. 11.

The horizontal period HRP in the driving method for the self-luminous display device 10 includes the period PWR and the period PVH. The first scan signal SC1(*n*), the second scan signal SC2(*n*), the third scan signal SC3(*n*), the fourth scan signal SC4(*n*), the image data signal SL(m), the initialization voltage VINI, and the reference voltage VREF are input to the pixel 180 in the horizontal period HRP. For example, the pixel 180 is selected according to the timings of the first scan signal SC1(*n*), the second scan signal SC2(*n*), the third scan signal SC3(*n*), and the fourth scan signal SC4(*n*). The image data signal SL(m), the initialization voltage VINI, and the reference voltage VREF are input to the selected pixel 180 according to the timings of the respective signals. Similar operations are performed on all the pixels 180, and an image of the frame corresponding to 1FRAME is displayed on the display region 22 of the self-luminous display device 10 based on the image data signal SL(m) input to all the pixels 180.

For example, the voltages (potentials) supplied to each signal and each node in each period of each frame in the timing charts shown in FIG. 6 to FIG. 11 are shown in Table 1 and Table 2.

TABLE 1

| | PIP | PWR | PVH | PEM |
|---|---|---|---|---|
| SC1(n) | HI | HI | HI | LO |
| SC2(n) | HI | HI | LO | LO |
| SC3(n) | HI | LO | LO | LO |
| SC4(n) | LO | HI | HI | LO |
| SL(m) | — | −0.5 [V](Black) ~3.5 [V](White) | −0.5 [V](Black) ~3.5 [V](White) | — |
| N1 | 1.5 [V] (Intermediate potential) | −0.5 [V]~3.5 [V] | −0.5 [V]~3.5 [V] | Rise in conjunction with the rise of potential of N3 |
| N2 | 0 [V] | 0 [V] | 0 [V] | In conjunction with potential of N1 |
| N3 | −2 [V] | −2 [V] | −1 [V] (=VREF-VTH) | Rise in conjunction with Ion with VGS |
| Vgs (= V(N2)-V(N3)) | 2 [V] | 2 [V] | 1 [V] | |
| Remarks | Initialize T2 and OLED Apply precharge potential (intermediate potential) to CS | Apply VDATA to CS | Acquiring and retaining VTH Potential of N3 = VREF-VTH Potential of N1-Potential of N3 = VDATA-(VREF-VTH) Non-light emitting below VTHEL | Light emitting VGS = VDATA-(VREF-VTH) |

TABLE 2

| | Setting value [V] |
|---|---|
| VTH | 1 |
| VTHEL | 0.7 |
| VSIGL(Black) | −0.5 |
| VSIGH(White) | 3.5 |
| HI | 10 |
| LO | −4 |
| VINI | −2 |
| VREF | 0 |
| VPRC | 1.5 |
| VDDEL | 8 |
| VSSEL | 0 |

[1-5-1. First Example of Driving Method of Self-Luminous Display Device 10]

A first example of the driving method of the self-luminous display device 10 will be described with reference to FIG. 8. The driving method shown in the first example includes the pixel 180 displaying a white image based on the voltage VSIGH in the previous frame (K−1stFRAME) of the current frame (KthFRAME), and then the pixel 180 displaying a black image based on the voltage VSIGL in the KthFRAME. In other words, the driving method shown in the first example includes displaying images of different colors in consecutive frames.

The data signal VDATA is input to each pixel 180 according to each horizontal period HRP. The data signal VDATA is analog data (a video signal) including a voltage equal to or higher than the voltage VSIGL and equal to or lower than the voltage VSIGH. For example, in each horizontal period HRP, the voltage equal to or higher than the voltage VSIGL and equal to or lower than the voltage VSIGH is selected using the selection signal (not shown), and is supplied to the image data signal SL(m). For example, in a period during which data is not selected using the selection signal, the image data signal SL(m) is maintained at a voltage equal to or higher than the voltage VSIGL and equal to or lower than the voltage VSIGH. As shown in Table 2, for example, the voltage VSIGL is −0.5 V, and the pixel 180 to which the voltage VSIGL is supplied does not emit light and becomes black. In addition, for example, the voltage VSIGH is 3.5 V, and the pixel 180 to which the voltage VSIGH is supplied emits light and emits various colors. Furthermore, in Table 2 or FIG. 8, for example, a voltage VH (HI) is 10 V, a voltage VL (LO) is −4 V, the reference voltage VREF is 0 V, the initialization voltage VINI is −2 V, a voltage VM is 5 V, and a voltage VN is −5 V.

The light emission period PEM of the K−1stFRAME is a period during which the pixel 180 emits light according to the potential difference Vgs (voltage V(N2)−voltage V(N3)= voltage Vna−voltage Vnb) of the second transistor T2. For example, the pixel 180 emits red light, and white light is emitted by three pixels using the pixel 180 emitting red light, the pixel 180 emitting blue light, and the pixel 180 emitting green light.

For example, in the light emission period PEM of the K−1stFRAME, data is not selected using the selection signal, and for example, the pixel 180 is maintained at a voltage equal to or higher than the voltage VSIGL and equal to or lower than the voltage VSIGH based on the data signal VDATA of the previous n−1st row of the n-th row, and LO is supplied to the first scan signal SC1(*n*), the second scan signal SC2(*n*), the third scan signal SC3(*n*), and the fourth scan signal SC4(*n*). The first transistor T1, the fourth transistor T4, the fifth transistor T5, and the sixth transistor T6 are in the OFF state, and the third transistor T3 is in the ON state. In addition, the voltage Vna supplied to the first node N1 and the second node N2 is 7 V, the voltage Vnb supplied to the third node N3 is 2.5 V, and the potential difference Vgs is 4.5 V. Therefore, the second transistor T2 can flow the current Ion based on the potential difference Vgs and the potential difference Vds according to the voltage VSIGH input in the horizontal period HRP of the K−1stFRAME. In addition, the second transistor T2 is in the ON state, the current Ion flows from the drive power line PVDD to the light-emitting element OLED and the reference voltage line PVSS, and the light-emitting element OLED emits light.

In a period between the light emission period PEM and the period PIP of the K−1stFRAME following the light emission period PEM of the K−1stFRAME, the image data signal SL(m) including the data signal VDATA including the voltage VSIGL corresponding to non-light-emitting black is input to the pixel 180. The first scan signal SC1(*n*) changes from a state in which LO is supplied to a state in which HI is supplied. When the first scan signal SC1(*n*) is in the state in which HI is supplied, the second scan signal SC2(*n*) changes from the state in which LO is supplied to the state in which HI is supplied. The third scan signal SC3(*n*) and the fourth scan signal SC4(*n*) are in the state in which LO is supplied. Therefore, the fourth transistor T4 and the fifth transistor T5 are turned from the OFF state to the ON state, the third transistor T3 is turned from the ON state to the OFF state, and the first transistor T1 and the sixth transistor T6 are maintained in the OFF state. As a result, the voltage supplied to the first node N1 maintains the voltage Vna, and the voltage supplied to the second node N2 gradually drops from the voltage Vna toward the reference voltage VREF. Furthermore, the voltage supplied to the third node N3 gradually drops from the voltage Vnb toward a voltage Vnc. Since the second transistor T2 and the fifth transistor T5 are in the ON state and a current flows from the drive power line PVDD to the initialization voltage power line SVI, the light-emitting element OLED does not emit light.

In the period PIP following the period between the light emission period PEM and the period PIP of the K−1stFRAME, for example, the pixel 180 is maintained in a state in which the data signal VDATA based on the image data signal SL(m) of the previous n−1st row of the n-th row is supplied, the first scan signal SC1(*n*) and the second scan signal SC2(*n*) are maintained in the state in which HI is supplied, and the fourth scan signal SC4(*n*) is maintained in the state in which LO is supplied. The third scan signal SC3(*n*) changes from the state in which LO is supplied to the state in which HI is supplied. Therefore, the sixth transistor T6 is turned from the OFF state to the ON state, the second transistor T2, the fifth transistor T5, and the fourth transistor T4 are maintained in the ON state, and the first transistor T1 and the third transistor T3 are maintained in the OFF state.

As a result, the voltage supplied to the first node N1 gradually drops from the voltage Vna toward the pre-charge voltage VPRC (voltage Vnd, 1.5 V) and becomes the voltage Vnd. The voltage supplied to the second node N2 gradually drops from the voltage Vna toward the reference voltage VREF (0 V) and becomes the reference voltage VREF (0 V). The voltage supplied to the third node N3 gradually drops from the voltage Vnb toward the initialization voltage VINI (voltage Vnc, −2 V) and becomes the voltage Vnc. The potential difference Vgs is 2 V (0 V−(−2 V) and the potential difference Vds is 10 V (8 V−(−2 V)). Since the second transistor T2 and the fifth transistor T5 are in the ON state and a current flows from the drive power line PVDD to the initialization voltage power line SVI, the light-emitting element OLED does not emit light.

As described above, in the period PIP, the pre-charge voltage (intermediate potential) is supplied to the first node N1, the second node N2 is initialized by the reference voltage VREF (0 V), and the third node N3 is initialized by the initialization voltage VINI (−2 V).

In the initial period of the horizontal period HRP of the KthFRAME following the period PIP, the image data signal SL(m) is in a state in which the data signal VDATA at the voltage VSIGL of the corresponding row(n) is supplied, the first scan signal SC1(*n*) and the second scan signal SC2(*n*) are maintained in the state in which HI is supplied, and the fourth scan signal SC4(*n*) is maintained in the state in which LO is supplied. The third scan signal SC3(*n*) changes from the state in which HI is supplied to the state in which LO is supplied. Therefore, the sixth transistor T6 is turned from the ON state to the OFF state, the second transistor T2, the fourth transistor T4, and the fifth transistor T5 are maintained in the ON state, and the first transistor T1 and the third transistor T3 are maintained in the OFF state. As a result, the voltage supplied to the first node N1 maintains the voltage Vnd, the voltage supplied to the second node N2 maintains the reference voltage VREF (0 V), and the voltage supplied to the third node N3 maintains the voltage Vnc. In addition, similar to the period PIP, the light-emitting element OLED generally does not emit light.

In the period PWR following the initial period of the horizontal period HRP, the image data signal SL(m) is maintained in the state in which the data signal VDATA of the voltage VSIGL is supplied, the first scan signal SC1(*n*) and the second scan signal SC2(*n*) are maintained in the state in which HI is supplied, and the third scan signal SC3(*n*) is maintained in the state in which LO is supplied. The fourth scan signal SC4(*n*) changes from the state in which LO is supplied to the state in which HI is supplied. Therefore, the first transistor T1 is turned from the OFF state to the ON state, the second transistor T2, the fourth transistor T4, and the fifth transistor T5 are maintained in the ON state, and the third transistor T3 and the sixth transistor T6 are maintained in the OFF state. As a result, the voltage supplied to the first node N1 gradually drops from the voltage Vnd toward the voltage VSIGL (voltage Vnf, −0.5 V), the voltage supplied to the second node N2 maintains the reference voltage VREF, and the voltage supplied to the third node N3 maintains the voltage Vnc. In addition, similar to the period PIP, the light-emitting element OLED generally does not emit light.

In the middle of the period PWR, in the period PVH parallel to (overlapping) the period PWR, the image data signal SL(m) is maintained in the state in which the data signal VDATA of the voltage VSIGL is supplied, the first scan signal SC1(*n*) and the fourth scan signal SC4(*n*) are maintained in the state in which HI is supplied, and the third scan signal SC3(*n*) is maintained in the state in which LO is supplied. The second scan signal SC2(*n*) changes from the state in which HI is supplied to the state in which LO is supplied. Therefore, the fifth transistor T5 is turned from the ON state to the OFF state, the first transistor T1 and the fourth transistor T4 are maintained in the ON state, and the third transistor T3 and the sixth transistor T6 are maintained in the OFF state. As a result, the voltage supplied to the first node N1 gradually drops toward the voltage Vnf and becomes the voltage Vnf, and the voltage supplied to the second node N2 maintains the reference voltage VREF.

Immediately after the start of the period PVH, the potential difference Vgs is 2 V, the potential difference Vds is 10 V, and both the potential difference Vgs and the potential difference Vds are greater than the threshold voltage VTH (1 V), so that the second transistor T2 is in the ON state. Therefore, the drain current Ion flows from the second electrode 626 of the second transistor T2 to the first electrode 624. Since the fifth transistor T5 is in the OFF state but the second transistor T2 is in the ON state, the drain current Ion flows from the drive power line PVDD (the second electrode 626 side) toward the third node N3 (the first electrode 624 side), and the voltage supplied to the third node N3 gradually rises from the voltage Vnc.

When the potential difference Vgs becomes the threshold voltage VTH, the second transistor T2 is turned from the ON state to the OFF state, and the drain current Ion does not flow. In this case, the voltage supplied to the third node N3 rises from the voltage Vnc (−2 V) to a voltage Vne (−1 V), and the potential difference Vgs is the same as the threshold voltage VTH (1 V). Since the second transistor T2 is in the OFF state and no current flows from the drive power line PVDD to the reference voltage line PVSS, the light-emitting element OLED does not emit light.

In addition, in the period at the end of the period PVH, the image data signal SL(m) maintains the state in which the data signal VDATA of the voltage VSIGL is supplied, the first scan signal SC1(*n*) maintains the state in which HI is supplied, and the second scan signal SC2(*n*) and the third scan signal SC3(*n*) maintain the state in which LO is supplied. The fourth scan signal SC4(*n*) changes from the state in which HI is supplied to the state in which LO is supplied. Further, when the fourth scan signal SC4(*n*) is in the state in which LO is supplied, the first scan signal SC1(*n*) changes from the state in which HI is supplied to the state in which LO is supplied. Therefore, the third transistor T3 is turned from the OFF state to the ON state, the first transistor T1 and the fourth transistor T4 are turned from the ON state to the OFF state, and the second transistor T2, the fifth transistor T5, and the sixth transistor T6 are maintained in the OFF state. As a result, the first node N1 and the second node N2 are conductive, the voltage supplied to the second node N2 gradually drops toward the voltage Vnf and becomes the voltage Vnf, the voltage supplied to the first node N1 maintains the voltage Vnf, and the voltage supplied to the third node N3 maintains the voltage Vne. In addition, since the potential difference Vgs is 1 V, the potential difference Vds is 9 V, and the potential difference Vgs is the same as the threshold voltage VTH, no current flows from the drive power line PVDD to the reference voltage line PVSS. Furthermore, the light-emitting element OLED does not emit light.

As described above, in the period PWR, the data signal VDATA is written to the pixel 180. Furthermore, in the period PVH, the threshold voltage VTH of the second transistor T2 is obtained by an operation in which the potential difference Vgs of the second transistor T2 becomes the same as the threshold voltage VTH, and the charge equivalent to the threshold voltage VTH is held in the third node N3 (the first electrode 692 of the capacitive element CS).

The light emission period PEM of the KthFRAME following the horizontal period HRP of the KthFRAME is the period during which the pixel 180 emits light based on the voltage VSIGL supplied to the first node N1 and the potential difference Vgs between the voltage supplied to the second node N2 and the voltage supplied to the third node N3.

For example, in the light emission period PEM of the KthFRAME, data is not selected using the selection signal, and the pixel 180 is held at the voltage equal to or higher than the voltage VSIGL and equal to or lower than the voltage VSIGH based on the data signal VDATA of the subsequent n+1st row of the n-th row. In addition, the first scan signal SC1(*n*), the second scan signal SC2(*n*), the third scan signal SC3(*n*), and the fourth scan signal SC4(*n*) are maintained in the state in which LO is supplied.

Therefore, the first transistor T1, the second transistor T2, the fourth transistor T4, the fifth transistor T5, and the sixth transistor T6 are maintained in the OFF state, and the third transistor T3 is maintained in the ON state. Since the second transistor T2 is in the OFF state and no current flows from the drive power line PVDD to the reference voltage line PVSS, the light-emitting element OLED does not emit light. As a result, for example, the pixel 180 emitting red light becomes black. In addition, similar to the pixel 180 emitting red light, the pixel 180 emitting blue light and the pixel 180 emitting green light do not emit light, so that the three pixels using the pixel 180 emitting red light, the pixel 180 emitting blue light, and the pixel 180 emitting green light become black.

The self-luminous display device 10 includes the sixth transistor T6 for supplying the pre-charge voltage (intermediate potential) to the first node N1, and the first transistor T1 for supplying the data signal VDATA equal to or higher than the voltage VSIGL and equal to or lower than the voltage VSIGH to the first node N1. In addition, the driving of the self-luminous display device 10 includes supplying the pre-charge voltage to the first node N1 by the sixth transistor T6, and supplying the pre-charge voltage to the first node N1 and then supplying the data signal VDATA equal to or higher than the voltage VSIGL and equal to or lower than the voltage VSIGH to the first node N1 by the first transistor T1. That is, the self-luminous display device 10 may supply the intermediate potential to the first node N1 and then supply the data signal VDATA to the first node N1. For example, in the case where a black image is displayed based on the voltage VSIGL in the K−1stFRAME and then a white image is displayed based on the voltage VSIGH in the KthFRAME, the first node N1 is supplied with the voltage VSIGL (−0.5 V) and then supplied with the intermediate potential (1.5 V) and supplied with the voltage VSIGH (3.5 V). In other words, in the case where the data voltage is written, the potential fluctuation of the first node N1 is 2 V (3.5 V—(1.5 V)).

On the other hand, for example, in the display device including a configuration in which the data signal VDATA is supplied without supplying the intermediate potential to the first node N1, in the case where a black image is displayed based on the voltage VSIGL in the K−1stFRAME and then a white image is displayed based on the voltage VSIGH in the KthFRAME, the voltage VSIGL (−0.5 V) is supplied to the pixel (pixel circuit) and then the voltage VSIGH (3.5 V) is supplied. As a result, in the display device including the configuration in which the data signal VDATA is supplied without supplying the intermediate potential to the first node N1, the potential fluctuation in the pixel (pixel circuit) becomes 4 V (3.5 V−(−0.5 V)), and the potential fluctuation becomes larger than that of the self-luminous display device 10.

Therefore, in the case where the data signal VDATA is written to the pixel (pixel circuit), the self-luminous display device 10 can supply the data signal VDATA after supplying the intermediate potential to the first node N1, so that the potential fluctuation of the first node N1 in the self-luminous display device 10 can be made smaller than that of the display device that supplies the data voltage without supplying the intermediate potential to the first node N1.

The decrease in the potential fluctuation of the first node N1 when supplying the data signal VDATA to the pixel (pixel circuit) is equivalent to a decrease in the potential fluctuation of the image data signal line 321 to which the data signal VDATA is supplied. When the potential fluctuation of the image data signal line 321 is large, the unwanted electromagnetic interference EMI caused by the potential fluctuation of the image data signal line 321 becomes large. Since the self-luminous display device 10 can reduce the potential fluctuation of the image data signal line 321, the self-luminous display device 10 can reduce the unwanted electromagnetic interference EMI (Electromagnetic Interference) caused by the potential fluctuation of the image data signal line 321.

In addition, since the self-luminous display device 10 can reduce the potential fluctuation of the first node N1, the time (writing speed) required for writing data to the first node N1 in the self-luminous display device 10 can be reduced compared with the display device in which the data signal VDATA is supplied to the first node N1 without supplying the intermediate potential. In other words, the self-luminous display device 10 can achieve a writing speed faster than the display device that supplies the data signal VDATA to the first node N1 without supplying the intermediate potential.

Further, the self-luminous display device 10 can increase the writing speed of data to the first node N1, so that the time required for the horizontal period HRP can be reduced. As a result, for example, the self-luminous display device 10 can increase the number of pixels that can be written in the reduced period. Therefore, the self-luminous display device 10 can provide a high-resolution display device and a large-screen display device.

Further, since the self-luminous display device 10 can reduce the potential fluctuation of the first node N1, the power consumption when the data is written to the first node N1 in the self-luminous display device 10 can be reduced (suppressed) compared with the display device that supplies the data signal VDATA to the first node N1 without supplying the intermediate potential.

In addition, the driving method for the self-luminous display device 10 includes that the period PVH starts after the period PWR starts, and ends after the period PWR ends. That is, a part of the period PWR overlaps the period PVH, and the period PVH is shifted from the period PWR. On the other hand, for example, in the driving method in which the deviation between the period PWR and the period PVH is small, when the second transistor T2 is in the conductive state, the potential fluctuation of the third node N3 may become large depending on the magnitude of the data voltage (the first node N1). As described above, the driving method of the self-luminous display device 10 includes the configuration in which the period PVH is shifted from the period PWR, so that the potential fluctuation of the third node N3 is small.

[1-5-2. Second Example of Driving Method of Self-Luminous Display Device 10]

A second example of the driving method of the self-luminous display device 10 will be described with reference to FIG. 9. The driving method shown in the second example includes the pixel 180 displaying a white image based on the voltage VSIGH of the data signal VDATA in the previous frame (K−1stFRAME) of the current frame (KthFRAME) and then the pixel 180 displaying a white image based on the voltage VSIGH of the data signal VDATA in the KthFRAME. In other words, the driving method shown in the second example includes displaying images of the same color (white) in consecutive frames. Configurations that are the same as or similar to those in FIG. 1 to FIG. 8 will be described as necessary.

The configurations of the first scan signal SC1(*n*), the second scan signal SC2(*n*), the third scan signal SC3(*n*), the fourth scan signal SC4(*n*), the image data signal SL(m) in the light emission period PEM of the K−1stFRAME, and the image data signal SL(m) in the light emission period PEM of the KthFRAME are similar to the configurations described in "1-5-1. First Example of Driving Method of Self-luminous Display Device 10". In addition, the voltages (potentials) and the like of the first node N1, the second node N2, and the third node N3 in the period excluding the horizontal period HRP of the KthFRAME and the light emission period PEM of the KthFRAME are similar to the configuration described in "1-5-1. First Example of Driving Method of Self-luminous Display Device 10". Furthermore, the operations of each transistor in each period and the like are generally similar to the configuration described in "1-5-1. First Example of Driving Method of Self-luminous Display Device 10". Therefore, configurations and the like similar to those in "1-5-1. First Example of Driving Method of Self-luminous Display Device 10" will be described as necessary. In addition, the data signal VDATA of VSIGH corresponding to white is supplied to the image data signal SL(m) in a period between the light emission period PEM of the K−1stFRAME and the light emission period PEM of the KthFRAME.

In the first period of the horizontal period HRP of the KthFRAME following the period PIP, the image data signal SL(m) including the data signal VDATA of the voltage VSIGH corresponding to white is input to the pixel 180. The configuration excluding the image data signal SL(m) in the initial period of the horizontal period HRP of the KthFRAME is similar to that described in "1-5-1. First Example of Driving Method of Self-luminous Display Device 10".

In the period PIP in the second example, similar to those described in "1-5-1. First Example of Driving Method of Self-luminous Display Device 10", the pre-charge voltage (intermediate potential) is supplied to the first node N1, the second node N2 is initialized by the reference voltage VREF (0 V), and the third node N3 is initialized by the initialization voltage VINI (−2 V).

In the period PWR following the initial period of the horizontal period HRP in the second example, the operations of the transistors and the like are similar to those described in "1-5-1. First Example of Driving Method of Self-luminous Display Device 10". The voltage supplied to the first node N1 gradually rises from the voltage Vnd toward the voltage VSIGH (voltage Vng, 3.5 V), the voltage supplied to the second node N2 maintains the reference voltage VREF, and the voltage supplied to the third node N3 maintains the voltage Vnc. In addition, similar to the period PIP, the light-emitting element OLED does not emit light.

In the middle of the period PWR in the second example, in the period PVH parallel to (overlapping) the period PWR, the operations of the transistors and the like are similar to the configurations described in "1-5-1. First Example of Driving Method of Self-luminous Display Device 10", the voltage supplied to the first node N1 gradually rises toward the voltage Vng (3.5 V) and becomes the voltage Vng, and the voltage supplied to the second node N2 maintains the reference voltage VREF.

Immediately after the start of the period PVH in the second example, the potential difference Vgs is 2 V, the potential difference Vds is 10 V, and both the potential difference Vgs and the potential difference Vds are greater than the threshold voltage VTH (1V), so that the second transistor T2 is in the ON state. Therefore, the drain current Ion flows from the second electrode 626 of the second transistor T2 to the first electrode 624. Since the fifth transistor T5 is in the OFF state but the second transistor T2 is in the ON state, the drain current Ion flows from the drive power line PVDD (the second electrode 626 side) toward the third node N3 (the first electrode 624 side), and the voltage supplied to the third node N3 gradually rises from the voltage Vnc.

When the potential difference Vgs becomes the threshold voltage VTH, the second transistor T2 is turned from the ON state to the OFF state, and the drain current Ion does not flow. In this case, the voltage supplied to the third node N3 rises from the voltage Vnc (−2 V) to the voltage Vne (−1 V), and the potential difference Vgs is the same as the threshold voltage VTH (1 V). Since the second transistor T2 is in the OFF state and no current flows from the drive power line PVDD to the reference voltage line PVSS, the light-emitting element OLED does not emit light.

In the period at the end of the period PVH in the second example, the operations and the like of each transistor is similar to the configurations described in "1-5-1. First Example of Driving Method of Self-luminous Display Device 10", the first node N1 and the second node N2 are conductive, and the voltage of the second node N2 gradually rises. As a result, the second transistor T2 is in the conductive state, and the drain current Ion flows from the drive power line PVDD to the reference voltage line PVSS. Therefore, the voltages of the first node N1 and the third node N3 rise to follow the rise in the voltage of the second node N2. Due to the voltage rise of the third node N3, the voltages of the first node N1 and the second node N2 further rise.

Further, in the light emission period PEM of the KthFRAME following the horizon period HRP of the KthFRAME in the second example, for example, the voltage of the first node N1 and the voltage of the second node N2 rise to the voltage Vna, and the voltage of the third node N3 rises to the voltage Vnb. As a result, the potential difference Vgs is the voltage Vna (7 V)−voltage Vnb (2.5 V). That is, the potential difference Vgs becomes 4.5 V, which is higher than the threshold voltage VTH (1 V). Therefore, the second transistor T2 is in the ON state, and the drain current Ion flows from the drive power line PVDD to the reference voltage line PVSS, so that the light-emitting element OLED emits light. For example, the pixel 180 emits red light, and white light is emitted by three pixels using the pixel 180 emitting red light, the pixel 180 emitting blue light, and the pixel 180 emitting green light.

As described above, in the period PWR in the second example, the data signal VDATA is written to the pixel 180. Further, in the period PVH in the second example, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS). Furthermore, in the light emission period PEM of the KthFRAME in the second example, white light is emitted by three pixels.

The second example of the driving method of the self-luminous display device 10 has similar advantageous effects as those described in "1-5-1. First Example of Driving Method of Self-luminous Display Device 10".

[1-5-3. Third Example of Driving Method of Self-Luminous Display Device 10]

A third example of the driving method of the self-luminous display device 10 will be described with reference to FIG. 10. The driving method shown in the third example includes the pixel 180 displaying a black image based on the voltage VSIGL of the data signal VDATA in the previous frame (K−1stFRAME) of the current frame (KthFRAME) and then the pixel 180 displaying a black image based on the voltage VSIGL of the data signal VDATA in the KthFRAME. In other words, the driving method shown in the third example includes displaying images of the same color (black) in consecutive frames. Configurations that are the same as or similar to those in FIG. 1 to FIG. 9 will be described as necessary.

The configurations of the first scan signal SC1(*n*), the second scan signal SC2(*n*), the third scan signal SC3(*n*), the fourth scan signal SC4(*n*), the image data signal SL(m) in the light emission period PEM of the K−1stFRAME, and the image data signal SL(m) in the light emission period PEM of the KthFRAME are similar to the configurations described in "1-5-1. First Example of Driving Method of Self-luminous Display Device 10". In addition, the voltages (potentials) of the first node N1, the second node N2, the third node N3, in the horizontal period HRP and the light emission period PEM of the KthFRAME, the operations of the transistors, and the like are similar to those in "1-5-1. First Example of Driving Method of Self-luminous Display Device 10". Configurations and the like similar to those of "1-5-1. First Example of Driving Method of Self-luminous Display Device 10" and "1-5-2. Second Example of Driving Method of Self-luminous Display Device 10" will be described as necessary. In addition, the image data signal SL(m) is supplied with the data signal VDATA of the voltage VSIGL corresponding to black in the period between the light emission period PEM of the K−1stFRAME and the light emission period PEM of the KthFRAME.

The light emission period PEM of the K−1stFRAME is a period during which the pixel 180 emits light according to the potential difference Vgs (voltage V(N2)−voltage V(N3) =Vnf (−0.5 V)−voltage Vne (−1 V)). For example, the potential difference Vgs is 0.5 V and is smaller than the threshold voltage VTH of the second transistor T2. Therefore, since the second transistor T2 is in the OFF state and no current flows from the drive power line PVDD to the reference voltage line PVSS, the light-emitting element OLED does not emit light. As a result, for example, the pixel 180 becomes black.

In the period between the light emission period PEM and the period PIP of the K−1stFRAME following the light emission period PEM of the K−1stFRAME, the voltage supplied to the first node N1 maintains the voltage Vnf, and the voltage supplied to the second node N2 gradually rises from the voltage Vnf toward the reference voltage VREF. In addition, the voltage supplied to the third node N3 gradually drops from the voltage Vnb toward the voltage Vnc. Since the second transistor T2 and the fifth transistor T5 are in the ON state and a current flows from the drive power line PVDD to the initialization voltage power line SVI, the light-emitting element OLED does not emit light.

In the period PIP following the period between the light emission period PEM and the period PIP of the K−1stFRAME, the voltage supplied to the first node N1 gradually rises from the voltage Vnf toward the pre-charge voltage VPRC (voltage Vnd, 1.5 V) and becomes the voltage Vnd. The voltage supplied to the second node N2 gradually rises from the voltage Vnf toward the reference voltage VREF (0 V) and becomes the reference voltage VREF (0 V). The voltage supplied to the third node N3 gradually drops from the voltage Vne toward the initialization voltage VINI (voltage Vnc, −2 V) and becomes the voltage Vnc. The potential difference Vgs is 2 V (0 V−(−2 V)) and the potential difference Vds is 10 V (8 V−(−2 V)). Since the second transistor T2 and the fifth transistor T5 are in the ON state and a current flows from the drive power line PVDD to the initialization voltage power line SVI, the light-emitting element OLED does not emit light.

As described above, in the period PIP in the third example, the pre-charge voltage (intermediate potential) is supplied to the first node N1, the second node N2 is initialized by the reference voltage VREF (0 V), and the third node N3 is initialized by the initialization voltage VINI (−2 V).

As described above, the voltages (potentials) of the first node N1, the second node N2, the third node N3 in the horizontal period HRP and the light emission period PEM of the KthFRAME following the period PIP, the operation of the transistors, and the like are similar to those in "1-5-1. First Example of Driving Method of Self-luminous Display Device 10".

Furthermore, in the period PWR in the third example, the data signal VDATA (the voltage VSIGL in the third example) is written to the pixel 180 similar to "1-5-1. First Example of Driving Method of Self-luminous Display Device 10". Further, in the period PVH, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS).

Furthermore, in the light emission period PEM of the KthFRAME, similar to "1-5-1. First Example of Driving Method of Self-luminous Display Device 10", since the pixel 180 emitting red light, the pixel 180 emitting blue light, and the pixel 180 emitting green light do not emit light, three pixels using the pixel 180 emitting red light, the pixel 180 emitting blue light, and the pixel 180 emitting green light become black.

The third example of the driving method for the self-luminous display device 10 has similar advantageous effects as those described in "1-5-1. First Example of Driving Method of Self-luminous Display Device 10".

[1-5-4. Fourth Example of Driving Method of Self-Luminous Display Device 10]

A fourth example of the driving method of the self-luminous display device 10 will be described with reference to FIG. 11. The driving method shown in the fourth example includes the pixel 180 (pixel circuit 181) displaying a black image based on the voltage VSIGL of the data signal VDATA in the previous frame (K−1stFRAME) of the current frame (KthFRAME) and then the pixel 180 displaying a white image based on the voltage VSIGH of the data signal VDATA in the KthFRAME. In other words, the driving method shown in the fourth example includes displaying images of different colors in consecutive frames. Configurations that are the same as or similar to those in FIG. 1 to FIG. 11 will be described as necessary.

The configurations of the first scan signal SC1(*n*), the second scan signal SC2(*n*), the third scan signal SC3(*n*), the fourth scan signal SC4(*n*), the image data signal SL(m) in the light emission period PEM of the K−1stFRAME, and the image data signal SL(m) in the light emission period PEM of the KthFRAME are similar to the configurations described in "1-5-1. First Example of Driving Method of Self-luminous Display Device 10". Furthermore, the voltages (potentials) of the first node N1, the second node N2, the third node N3 in the horizontal period HRP and the light emission period PEM of the KthFRAME, the operations of the transistors, and the like are similar to those in "1-5-2. Second Example of Driving Method of Self-luminous Display Device 10", and the voltages (potentials) of the first node N1, the second node N2, the third node N3 in the period excluding the horizontal period HRP and the light emission period PEM of the KthFRAME, the operations of the transistors, and the like are similar to those in "1-5-3. Third Example of Driving Method of Self-luminous Display Device 10". Configurations and the like similar to those in "1-5-1. First Example of Driving Method of Self-luminous Display Device 10", "1-5-2. Second Example of Driving Method of Self-luminous Display Device 10", and "1-5-3. Third Example of Driving Method of Self-luminous Display Device 10" will be described as necessary. In addition, the image data signal SL(m) is supplied with the data signal VDATA including the voltage VSIGH corresponding to white in the period between the light emission period PEM of the K−1stFRAME and the light emission period PEM of the KthFRAME.

In the light emission period PEM of K−1stFRAME in the fourth example, the pixel 180 is black similar to "1-5-3. Third Example of Driving Method of Self-luminous Display Device 10".

In the period PIP in the fourth example, similar to "1-5-3. Third Example of Driving Method of Self-luminous Display Device 10", the pre-charge voltage (intermediate potential) is supplied to the first node N1, the second node N2 is initialized by the reference voltage VREF (0 V), and the third node N3 is initialized by the initialization voltage VINI (−2 V).

In the period PWR in the fourth example, similar to "1-5-2. Second Example of Driving Method of Self-luminous Display Device 10", the data signal VDATA (in the fourth example, the voltage VSIGH) is written to the pixel 180. Furthermore, in the period PVH, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS).

Further, in the light emission period PEM of the KthFRAME, similar to "1-5-2. Second Example of Driving Method of Self-luminous Display Device 10", the pixel 180 emitting red light, the pixel 180 emitting blue light, and the pixel 180 emitting green light emit light, and white light is emitted by three pixels using the pixel 180 emitting red light, the pixel 180 emitting blue light, and the pixel 180 emitting green light.

The fourth example of the driving method of the self-luminous display device 10 has similar advantageous effects as those described in "1-5-1. First Example of Driving Method of Self-luminous Display Device 10".

[1-6. Cross-Sectional Structure of Pixel 180 Along Line A1-A2]

Figure 12:
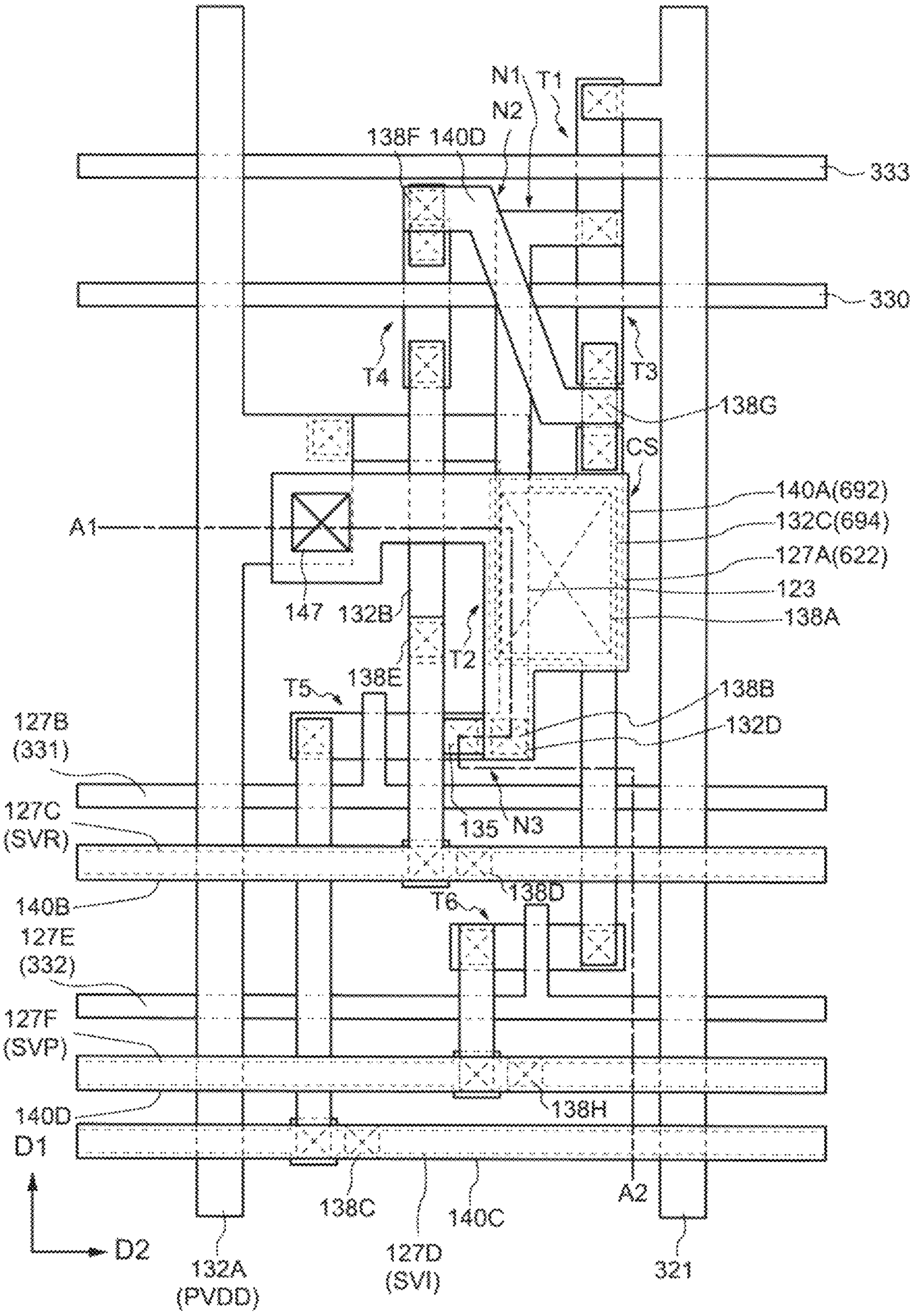
FIG. 12 is a layout diagram of a pixel according to the first embodiment of the present invention.
Figure 13:
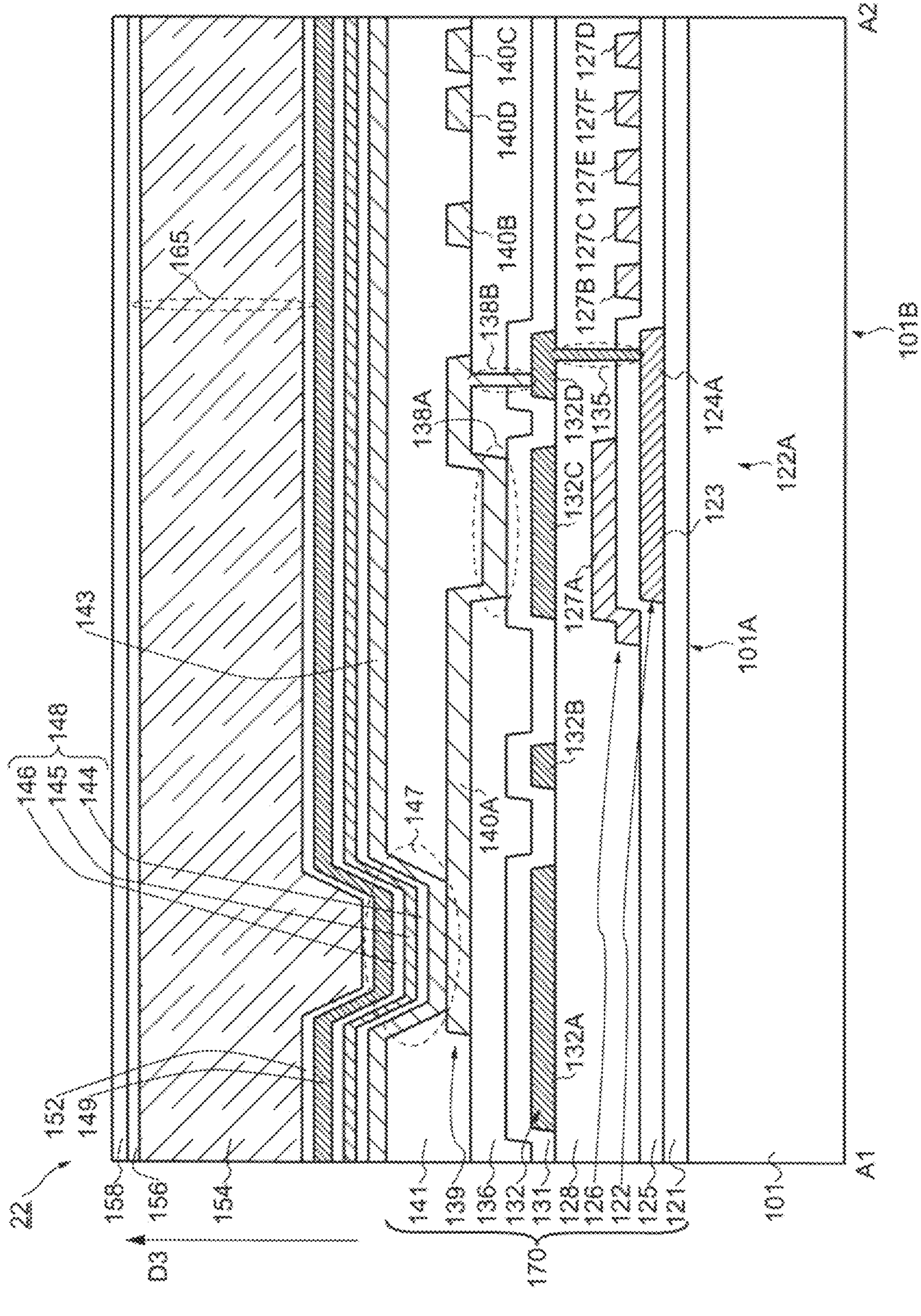
FIG. 13 is a cross-sectional view showing a cross-section cut along a line A1-A2 in the layout shown in FIG. 12.

A cross-sectional configuration of the pixel 180 along a line A1-A2 will be described with reference to FIG. 5, FIG. 12, and FIG. 13. FIG. 12 is a layout diagram of the pixel 180. FIG. 13 is a cross-sectional view showing a cross section cut along a line A1-A2 in the planar layout of the pixel 180 shown in FIG. 12. The layout of the pixel 180 shown in FIG. 12 and the cross section of the pixel 180 shown in FIG. 13 are examples, and the planar layout and the cross section of the pixel 180 are not limited to the examples shown in FIG. 12 and FIG. 13. Configurations that are the same as or similar to those in FIG. 1 to FIG. 11 will be described as necessary.

In addition, as an example of the cross section of the pixel 180, the cross section of the pixel 180 shown in FIG. 13 is a cross section along the drive power line PVDD, a contact hole opening 147 for an anode electrode, a first wiring 132B, the first electrode 692 and the second electrode 694 of the capacitive element CS, the gate electrode 622 of the second transistor T2, a channel region 123 of a semiconductor layer 122, an organic insulating film opening 138A for the capacitive element CS, a second contact hole opening 138B, a first wiring 132D, a first contact hole opening 135, an impurity region 124A, the scan signal line 331, the reference voltage power line SVR, the scan signal line 332, the pre-charge voltage power line SVP, and the initialization voltage power line SVI.

A substrate 101 includes a first surface 101A and a second surface 101B opposite the first surface 101A. The semiconductor layer 122 is provided on the first face 101A of the substrate 101 via an underlayer 121. The semiconductor layer 122 includes a semiconductor layer 122A, and the semiconductor layer 122A includes the channel region 123 and the impurity region 124A. For example, the impurity region is referred to as a source region or a drain region. In addition, for example, the second transistor T2 and the fifth transistor T5 include the semiconductor layer 122A, and the first electrode 624 and the second electrode 656 include the impurity region 124A. In other words, the semiconductor layer 122A includes the channel region of the second transistor T2 and the channel region of the fifth transistor T5.

A gate insulating layer 125, a conductive layer 126, an insulating layer 128, and a conductive layer 132 are provided in this order on the semiconductor layer 122. The conductive layer 126 includes a gate wiring 127A (the gate electrode 622), a gate wiring 127B (the scan signal line 331), a gate wiring 127C (the reference voltage power line SVR), a gate wiring 127E (the scan signal line 332), a gate wiring 127F (the pre-charge voltage power line SVP), and a gate wiring 127D (the initialization voltage power line SVI). The conductive layer 132 includes a first wiring 132A (the drive power line PVDD), the first wiring 132B, a first wiring 132C (the second electrode 694), and the first wiring 132D. In addition, a region where the conductive layer 126 and the semiconductor layer 122 overlap is the channel region. In other words, a region where a gate electrode and a semiconductor layer of each transistor overlap is the channel region.

Each transistor of pixel 180 is formed using the semiconductor layer 122 (the channel region 123 and the impurity region 124A), the gate insulating layer 125, and the conductive layer 126 (e.g., the gate wiring 127A).

The first contact hole opening 135 reaching the semiconductor layer 122 is provided in the gate insulating layer 125 and the insulating layer 128. The first contact hole opening 135 exposes the semiconductor layer 122 (e.g., the impurity region 124A). The conductive layer 132 is electrically connected to the semiconductor layer 122 (e.g., the impurity region 124A) by the first contact hole opening 135. In addition, an opening (not shown) that reaches the conductive layer 126 (e.g., the gate wiring 127A) may be provided in the insulating layer 128.

An insulating layer 131 is provided to cover the conductive layer 132. An insulating layer 136 is provided to cover the insulating layer 131.

The second contact hole opening 138B is provided in the insulating layer 131 and the insulating layer 136. The organic insulating film opening 138A for the capacitive element CS is provided in the insulating layer 136. A conductive layer 139 is provided on the insulating layer 136 and in the organic insulating film opening 138A for the capacitive element CS and the second contact hole opening 138B. The conductive layer 139 includes a second wiring 140A (the first electrode 692), a second wiring 140B, a second wiring 140D, and a second wiring 140C. The second contact hole opening 138B exposes the conductive layer 132 (e.g., the first wiring 132D). For example, the second contact hole opening 138B electrically connects the first electrode 692 and the first wiring 132D. The organic insulating film opening 138A for the capacitive element CS exposes the insulating layer 131. For example, the capacitive element CS is formed using the insulating layer 131 as a dielectric and the first wiring 132C (the second electrode 694) and the second wiring 140A (the first electrode 692). For example, the second wiring 140A also serves as a pixel electrode. Although not shown, for example, the second contact hole opening 138 exposes a part of a plurality of terminals (not shown) included in the terminal section 150. Some of the exposed terminals are electrically connected to the FPC 200 using a conductive film such as an anisotropic conductive film (not shown).

An insulating layer 141 is provided to cover the conductive layer 139.

The underlayer 121, the semiconductor layer 122, the gate insulating layer 125, the conductive layer 126, the insulating layer 128, the conductive layer 132, the insulating layer 131, the insulating layer 136, the conductive layer 139, and the insulating layer 141 are collectively referred to as an array section 170.

Next, the layers above the insulating layer 141 will be described. The contact hole opening 147 for an anode electrode is provided in the insulating layer 141. The contact hole opening 147 for an anode electrode exposes the conductive layer 139 (e.g., the second wiring 140A).

An anode electrode 143 is provided to cover the exposed conductive layer 139, the contact hole opening 147 for an anode electrode, and the insulating layer 141. A functional layer 148 is provided on the anode electrode 143. A common electrode 149 is provided on the functional layer 148 to cover the functional layer 148. The common electrode 149 is a cathode electrode (the first electrode 682 of the light-emitting element OLED). In this case, the light-emitting element OLED is composed of the anode electrode 143, the functional layer 148, and the common electrode 149 (cathode electrode).

The configuration of the functional layer 148 can be selected as appropriate. For example, the functional layer 148 may be configured by combining a carrier injection layer, a carrier transport layer, a light-emitting layer, a carrier blocking layer, and an exciton blocking layer, and the like. For example, the functional layer 148 shown in FIG. 13 includes a first layer 144, a second layer 145, and a third layer 146. For example, the first layer 144 is a carrier (hole) injection and transport layer, the second layer 145 is a light-emitting layer, and the third layer 146 is a carrier (electron) injection and transport layer.

A sealing film 165 is provided on the common electrode 149. For example, the sealing film 165 includes a first inorganic insulating layer 152, an organic insulating layer 154, and a second inorganic insulating layer 156. In addition, the first inorganic insulating layer 152 and the second inorganic insulating layer 156 are formed to cover at least the display region 22. A cover film 158 is arranged on the second inorganic insulating layer 156.

For example, the first layer 144, the second layer 145 (light-emitting layer), the third layer 146, and the common electrode 149 included in the functional layer 148 are not arranged on the IC chip 110 and the control circuit 120. The sealing film 165 and the cover film 158 are arranged on the IC chip 110 and the control circuit 120. The sealing film 165 and the cover film 158 suppress impurities (water, oxygen, etc.) from entering the light-emitting element OLED, the transistors, and the like from the outside of the self-luminous display device 10.

Common metal materials are used as the conductive layer 126, the conductive layer 132, the conductive layer 139, and the common electrode 149. For example, aluminum (Al), titanium (Ti), chromium (Cr), cobalt (Co), nickel (Ni), molybdenum (Mo), hafnium (Hf), tantalum (Ta), tungsten (W), bismuth (Bi), silver (Ag), copper (Cu), and an alloy or compound thereof are used as the common metal materials.

For example, the semiconductor layer 122 may contain the LTPS and may contain a metal oxide.

A common insulating material can be used as a material for forming the underlayer 121, the gate insulating layer 125, the insulating layer 131, the first inorganic insulating layer 152, and the second inorganic insulating layer 156. For example, inorganic insulating layers such as silicon oxide ($SiO_x$), silicon oxynitride ($SiO_xN_y$), silicon nitride ($SiN_x$), and silicon nitride oxide ($SiN_xO_y$) are used as the insulating layers.

For example, an organic compound material having excellent surface-flatness can be used as a material for forming the insulating layer 128, the insulating layer 136, the insulating layer 141, and the organic insulating layer 154. The insulating layer 128, the insulating layer 136, and the insulating layer 141 may be referred to as organic insulating layers.

[1-7. Method for Manufacturing Self-Luminous Display Device 10]

Figure 14:
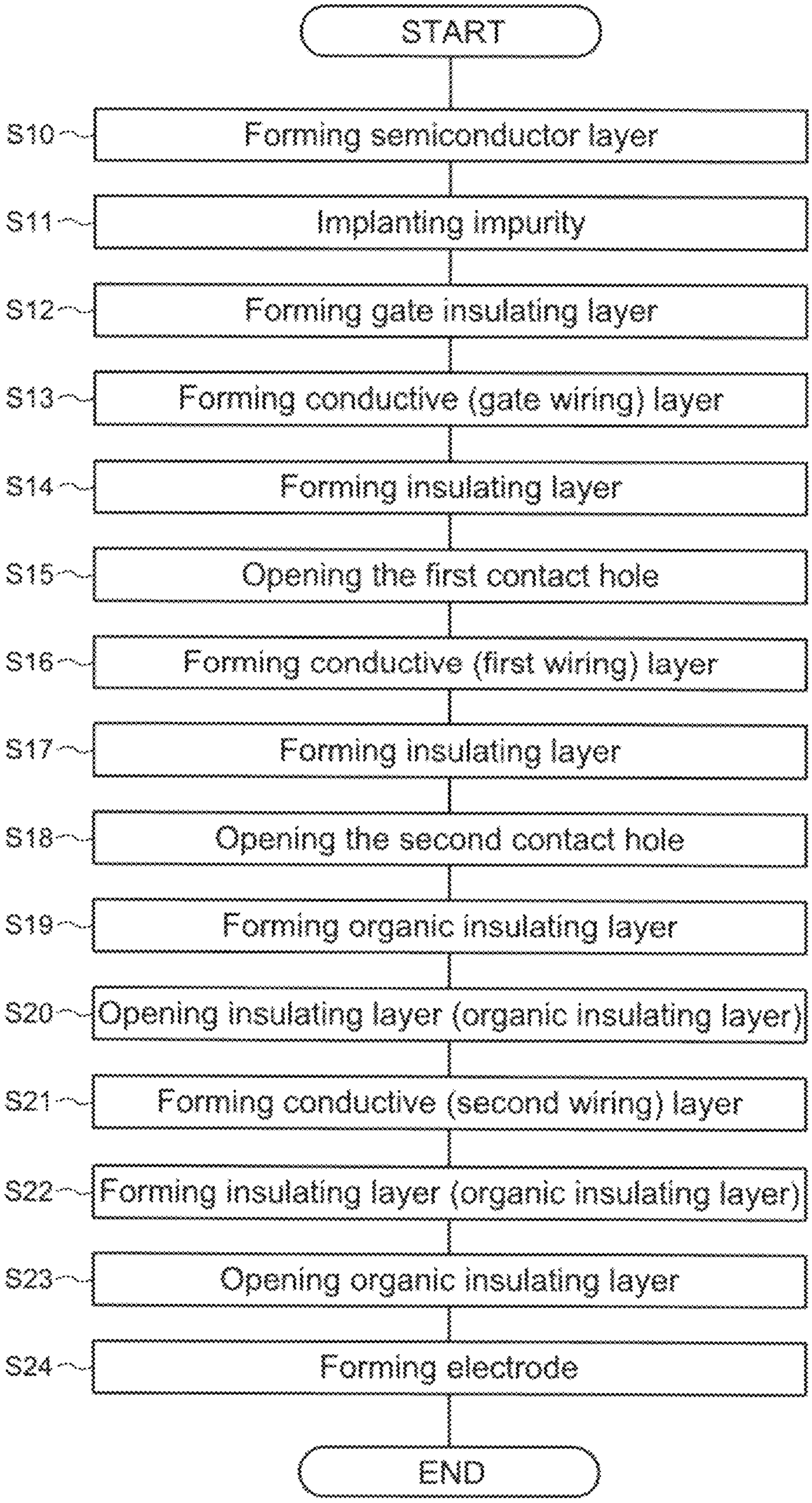
FIG. 14 is a sequence diagram showing a method for manufacturing a self-luminous display device according to the first embodiment of the present invention.
Figure 15:
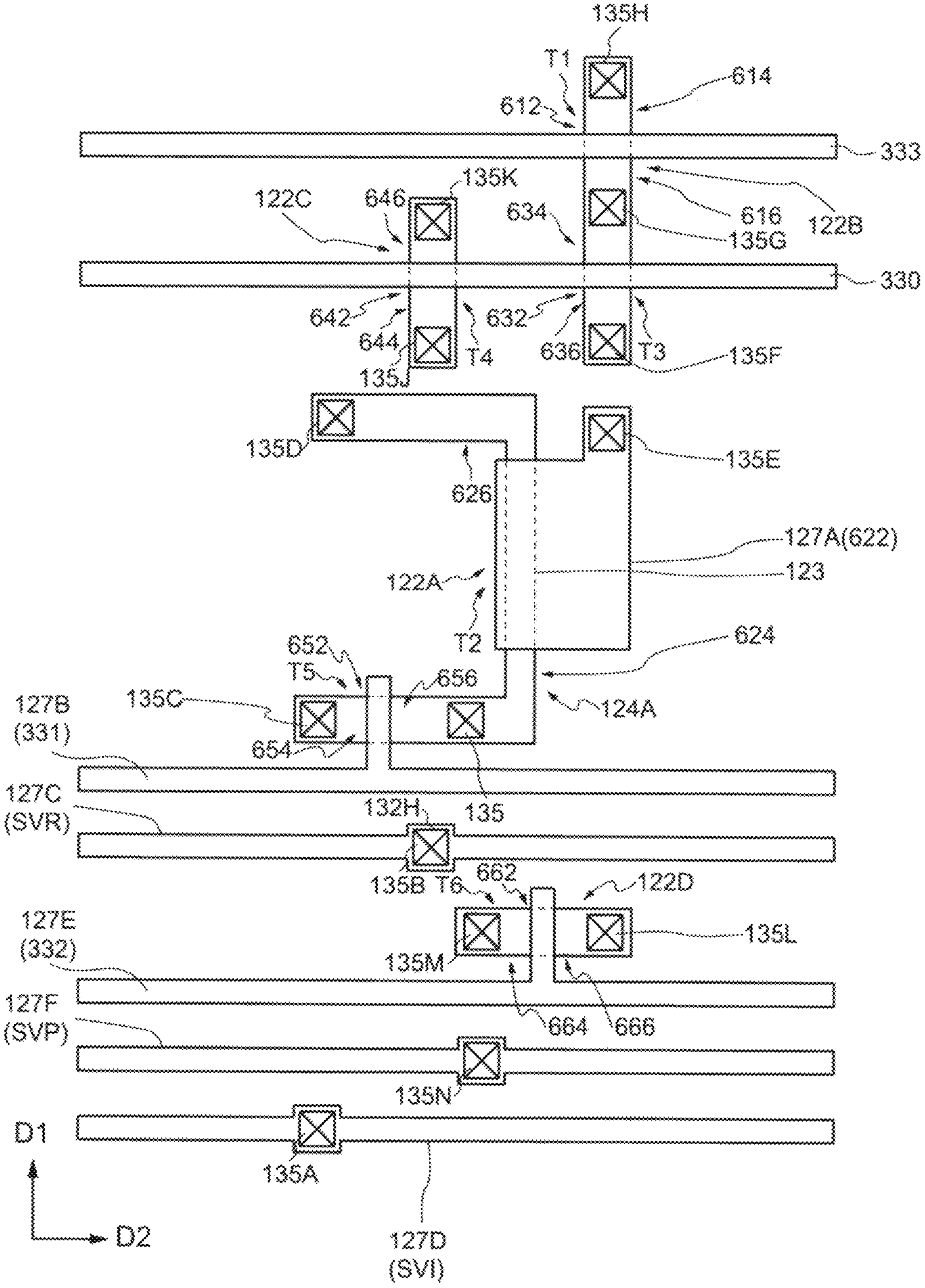
FIG. 15 is a layout diagram of a pixel according to the first embodiment of the present invention.
Figure 16:
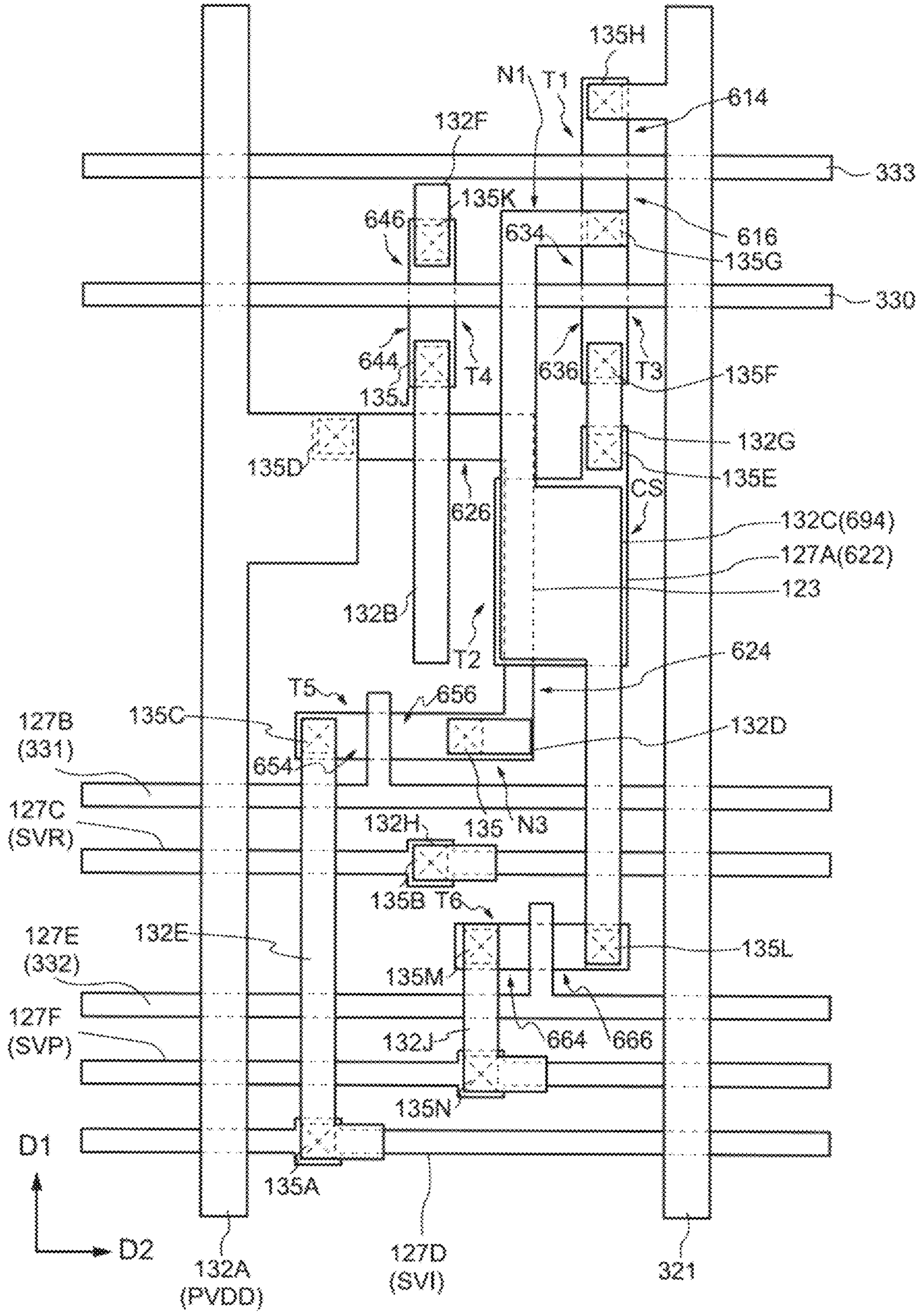
FIG. 16 is a layout diagram of a pixel according to the first embodiment of the present invention.
Figure 17:
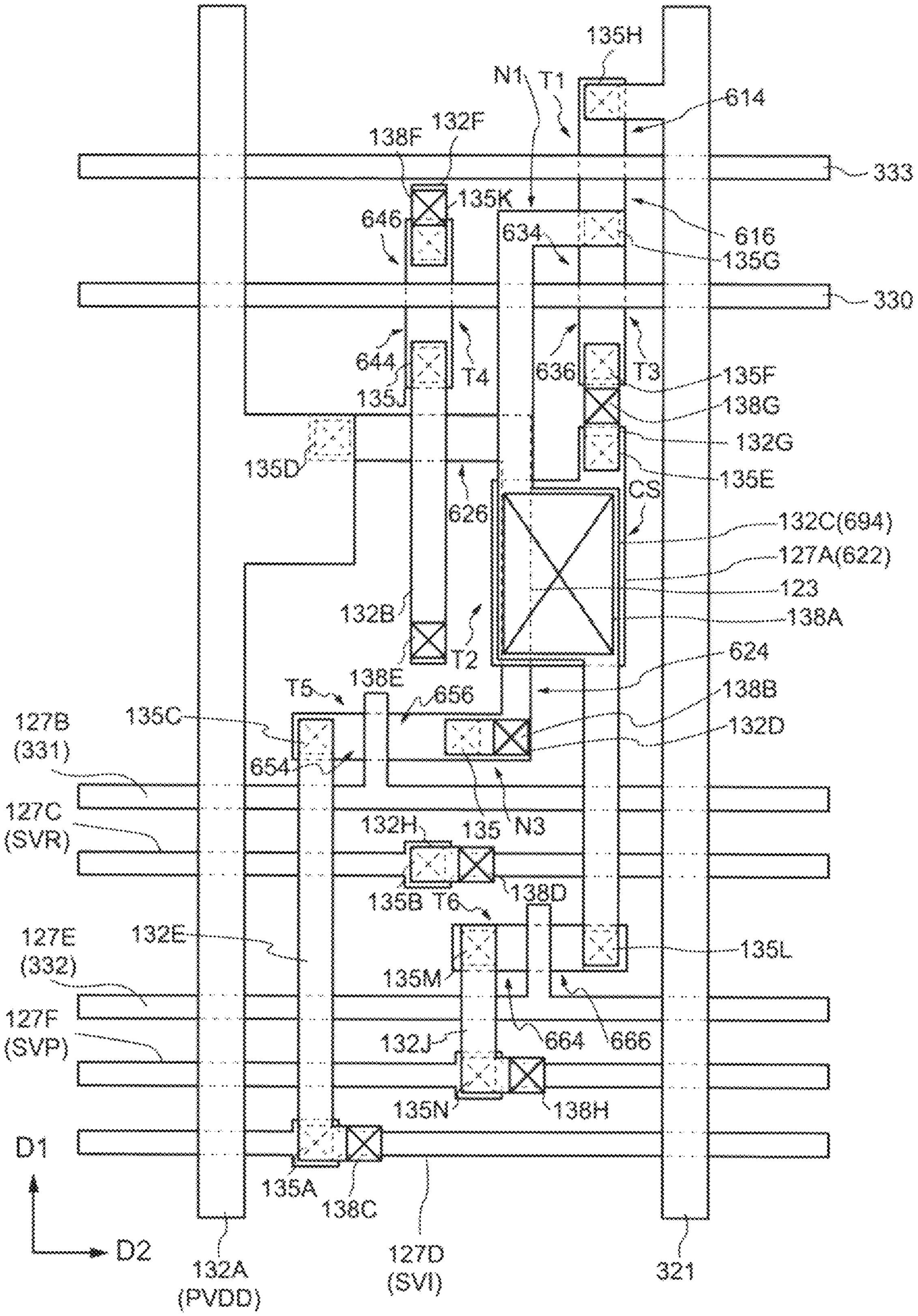
FIG. 17 is a layout diagram of a pixel according to the first embodiment of the present invention.

A method for manufacturing the self-luminous display device 10 (pixel 180) will be described with reference to FIG. 5, FIG. 12, and FIG. 17. FIG. 14 is a sequence diagram showing a method for manufacturing the self-luminous display device 10. FIG. 15 to FIG. 17 are layout diagrams of the pixel 180. Configurations that are the same as or similar to those in FIG. 1 to FIG. 13 will be described as necessary.

As shown in FIG. 13, when manufacturing of the self-luminous display device 10 (pixel 180) is started, the underlayer 121 is formed on the first surface 101A of the substrate 101.

As shown in FIG. 13 or FIG. 15, the semiconductor layer 122 is formed on the underlayer 121 (step 10 (S10) of FIG. 14). The semiconductor layer 122 includes the semiconductor layers 122A, 122B, 122C, and 122D. The semiconductor layer 122A serves as both the semiconductor layer of the second transistor T2 and the semiconductor layer of the fifth transistor T5. The semiconductor layer 122B serves as both the semiconductor layer of the first transistor T1 and the semiconductor layer of the third transistor T3. The semiconductor layer 122C is the semiconductor layer of the fourth transistor T4. The semiconductor layer 122D is the semiconductor layer of the sixth transistor T6. In other words, the semiconductor layer 122B includes the channel region of the first transistor T1 and the channel region of the third transistor T3, the semiconductor layer 122C includes the channel region of the fourth transistor T4, and the semiconductor layer 122D includes the channel region of the sixth transistor T6.

An impurity is implanted into the semiconductor layer 122 (step 11 (S11) of FIG. 14). The impurity region 124A is formed by S11. For example, referring to FIG. 15, the first electrode 614, the second electrode 616, the first electrode 624, the second electrode 626, the first electrode 644, the second electrode 646, the first electrode 654, the second electrode 656, the first electrode 664, and the second electrode 666 include an impurity region into which an impurity such as phosphorus (P) is implanted. For example, referring to FIG. 15, the first electrode 634 and the second electrode 636 include an impurity region into which an impurity such as boron (B) is implanted.

The gate insulating layer 125 (see FIG. 13) is formed on the semiconductor layer 122 and on the underlayer 121 where the semiconductor layer 122 is not formed (step 12 (S12) of FIG. 14).

The conductive layer 126 (see FIG. 13) is formed on the gate insulating layer 125 (step 13 (S13) of FIG. 14). As shown in FIG. 13 or FIG. 15, the conductive layer 126 includes the gate wiring 127A (the gate electrode 622), the gate wiring 127B (the scan signal line 331), the gate wiring 127C (the reference voltage power line SVR), the gate wiring 127E (the scan signal line 332), the gate wiring 127F (the pre-charge voltage power line SVP), the gate wiring 127D (the initialization voltage power line SVI), the scan signal line 330, and the scan signal line 333. The gate wiring 127B (the scan signal line 331) includes the gate electrode 652. The scan signal line 330 includes the gate electrode 632 and the gate electrode 642, and the scan signal line 333 includes the gate electrode 612.

A region where the gate electrode 622 of the second transistor T2 and the semiconductor layer 122A overlap is the channel region 123, and the channel region 123 corresponds to a channel length of the second transistor T2. Similarly, a region where the gate electrode 612 of the first transistor T1 and the semiconductor layer 122B overlap is the channel region of the first transistor T1 and corresponds to the channel length. A region where the third transistor T3 and the semiconductor layer 122B overlap is the channel region of the third transistor T3 and corresponds to the channel length. A region where the fourth transistor T4 and the semiconductor layer 122C overlap is the channel region of the fourth transistor T4 and corresponds to the channel length. A region where the fifth transistor T5 and the semiconductor layer 122A overlap is the channel region of the fifth transistor T5 and corresponds to the channel length. A region where the sixth transistor T6 and the semiconductor layer 122D overlap is the channel region of the sixth transistor T6 and corresponds to the channel length.

As shown in FIG. 15, in a plan view, the channel region 123 of the second transistor T2 is larger (longer) than the channel region of the first transistor T1, the channel region of the third transistor T3, the channel region of the fourth transistor T4, the channel region of the fifth transistor T5, and the channel region of the sixth transistor T6. That is, the channel length of the second transistor T2 is longer than the channel length of the first transistor T1, the channel length of the third transistor T3, the channel length of the fourth transistor T4, the channel length of the fifth transistor T5, and the channel length of the sixth transistor T6. Since the second transistor T2 operates in the saturated region, the resistance of the second transistor T2 to hot carriers needs to be higher than the resistance of the other transistors in the pixel 180 to hot carriers. As a result, the channel length of the second transistor T2 is longer than the channel length of the rest of the transistors in the pixel 180.

The insulating layer 128 (see FIG. 13) is formed on the conductive layer 126 and on the gate insulating layer 125 where the conductive layer 126 is not formed (step 14 (S14) of FIG. 14).

As shown in FIG. 13 or FIG. 15, the first contact hole openings 135, 135A, 135B, 135C, 135D, 135E, 135F, 135G, 135H, 135J, 135K, 135L, 135M, and 135N are opened (step 15 (S15)). Each opening opens the gate insulating layer 125 and the insulating layer 128 to expose wirings, semiconductor layers or electrodes corresponding to each opening. For example, the first contact hole opening 135 exposes the semiconductor layer 122A (e.g., the impurity region 124A) and the first contact hole opening 135A exposes the gate wiring 127D. Other openings also expose the corresponding wirings, semiconductor layers or electrodes.

The conductive layer 132 (see FIG. 13) is formed on the insulating layer 128 (step 16 (S16)). As shown in FIG. 13 or 16, the conductive layer 132 includes the first wiring 132A (the drive power line PVDD), the first wiring 132B, the first wiring 132C (the second electrode 694), the first wiring 132D, a first wiring 132E, a first wiring 132F, a first wiring 132G, a first wiring 132H, a first wiring 132J, and the image data signal line 321.

As shown in FIG. 16, in a plan view, the first wiring 132A is electrically connected to the second electrode 626 via the first contact hole opening 135D, the first wiring 132B is electrically connected to the first electrode 644 via the first contact hole opening 135J, the second electrode 694 is electrically connected to the second electrode 616 and the second electrode 636 via the first contact hole opening 135G and electrically connected to the second electrode 666 via the first contact hole opening 135L, and the first wiring 132D is electrically connected to the second electrode 656 and the first electrode 624 via the first contact hole opening 135. As shown in FIG. 16, in a plan view, the first wiring 132E is electrically connected to the initialization voltage power line SVI via the first contact hole opening 135A and electrically connected to the first electrode 654 via the first contact hole opening 135C, the first wiring 132F is electrically connected to the second electrode 646 via the first contact hole opening 135K, the first wiring 132G is electrically connected to the second electrode 636 via the first contact hole opening 135F, and the first wiring 132H is electrically connected to the reference voltage power line SVR via the first contact hole opening 135B, the first wiring 132J is electrically connected to the first electrode 664 via the first contact hole opening 135M and electrically connected to the pre-charge voltage power line SVP via the first contact hole opening 135N, and the image data signal line 321 is electrically connected to the reference voltage power line SVR via the first contact hole opening 135B.

In addition, as shown in FIG. 16, the second electrode 694, the gate electrode 622, and the semiconductor layer 122A (the channel region 123) overlap. That is, the second transistor T2 (the channel region and the gate electrode 622) overlaps the second electrode 694 of the capacitive element CS.

The insulating layer 131 (see FIG. 13) is formed on the conductive layer 132 and on the insulating layer 128 where the conductive layer 132 is not formed (step 17 (S17) of FIG. 14).

As shown in FIG. 13 or FIG. 17, the second contact hole openings 138B, 138C, 138D, 138E, 138F, 138G, and 138H are opened (step 18 (S18). Each opening opens the insulating layer 131 to expose wirings, semiconductor layers or electrodes corresponding to each opening. For example, the second contact hole opening 138B exposes the first wiring 132D and the second contact hole opening 138G exposes the first wiring 132G. Other openings also expose the corresponding wirings, semiconductor layers or electrodes.

The insulating layer 136 (organic insulating layer) (see FIG. 13) is formed on the insulating layer 131 (step 19 (S19) in FIG. 14).

As shown in FIG. 13 or FIG. 17, the insulating layer 136 (organic insulating layer) is opened (step 20 (S20)). In the opening of S20, the organic insulating film opening 138A for the capacitive element CS is opened. Furthermore, in the opening of S20, the second contact hole openings 138B, 138C, 138D, 138E, 138F, 138G, and 138H are opened similar to the opening of S18. That is, the second contact hole openings 138B, 138C, 138D, 138E, 138F, 138G, and 138H are opened twice. Each opening opens the insulating layer 136 to expose insulating layers, wirings or electrodes corresponding to each opening. For example, the organic insulating film opening 138A for the capacitive element CS removes only the insulating layer 136 on the second electrode 694 and exposes the insulating layer 131. On the other hand, the second contact hole opening 138G only removes the insulating layer 136 on the first wiring 132G and exposes the first wiring 132G. Other openings also expose the corresponding insulating layers, wirings or electrodes.

The conductive layer 139 (see FIG. 13) is formed on the insulating layer 136 and on the insulating layer 131 exposed by the organic insulating film opening 138A for the capacitive element CS (step 21 (S21). As shown in FIG. 12 or 13, the conductive layer 139 includes the second wiring 140A (the first electrode 692), the second wiring 140B, the second wiring 140C, and the second wiring 140D.

As shown in FIG. 12 or 17, in a plan view, the first electrode 692 is electrically connected to the first wiring 132D and the second electrode 656 via the second contact hole opening 138B and the first contact hole opening 135. The second wiring 140B is electrically connected to the first wiring 132H and the reference voltage power line SVR via the second contact hole opening 138D and the first contact hole opening 135B. The second wiring 140C is electrically connected to the first wiring 132E and the initialization voltage power line SVI via the second contact hole opening 138C and the first contact hole opening 135A. The second wiring 140D is electrically connected to the first wiring 132J and the pre-charge voltage power line SVP via the second contact hole opening 138H and the first contact hole opening 135N, and is electrically connected to the first electrode 664 via the second contact hole opening 138H, the first contact hole opening 135N, and the first wiring 132J.

In addition, as shown in FIG. 12 or 17, the second wiring 140B is connected to and overlaps the gate wiring 127C (the reference voltage power line SVR), and extends along the second direction D2. Therefore, since the reference voltage power line SVR is formed using the two-layer metal wiring, the wiring resistance is smaller than the voltage line formed by the one-layer metal wiring. As a result, the reference voltage power line SVR has a high current supply capability and can supply a stable voltage to the transistor. The second wiring 140C is connected to and overlaps the gate wiring 127D (the initialization voltage power line SVI) and extends along the second direction D2. Therefore, the initialization voltage power line SVI is formed using the two-layer metal wiring as the reference voltage power line SVR, so that the initialization voltage power line SVI has similar advantageous effects as the reference voltage power line SVR. The second wiring 140D is connected to and overlaps the gate wiring 127F (the pre-charge voltage power line SVP) and extends along the second direction D2. Therefore, similar to the reference voltage power line SVR, the pre-charge voltage power line SVP is formed using the two-layer metal wiring, so that the pre-charge voltage power line SVP has similar advantageous effects as the reference voltage power line SVR.

In addition, as shown in FIG. 13, the second wiring 140A (the first electrode 692) included in the same conductive layer 139 is in contact with the insulating layer 131 and the conductive layer 132 (the first wiring 132D), and the second wiring 140B included in the same conductive layer 139 is in contact with the insulating layer 136. That is, different wirings included in the same conductive layer 139 are in contact with different layers below the same conductive layer 139.

In addition, as shown in FIG. 12, the first electrode 692, the second electrode 694, the gate electrode 622, and the semiconductor layer 122A (the channel region 123) overlap. That is, the second transistor T2 overlaps the capacitive element CS.

Furthermore, the first wiring 132C (the second electrode 694) is formed on the insulating layer 128 formed on the gate wiring 127A (the gate electrode 622) having an area larger than the area of the surface of the second electrode 694. Since the insulating layer 128 reduces the unevenness of the lower layer, the second electrode 694 is formed on the large-area gate electrode 622 and the flat insulating layer 128. In addition, for example, as shown in FIG. 16, in a plan view, the area of the second electrode 694 is larger than the area of the electrode of the same conductive layer 132. That is, the surface of the second electrode 694 is flat, and the area of the second electrode 694 is large. In addition, the thickness of the insulating layer 131 formed on the second electrode 694 is thinner than the thickness of the insulating layer 136. Therefore, the method for manufacturing the self-luminous display device 10 (the pixel 180) includes forming the first electrode 692 on the large-area gate electrode 622 and on the second electrode 694 with reduced unevenness and the thin insulating layer 131.

In addition, the scan signal line 330 included in the conductive layer 126 is configured to intersect the minimum number of signal lines. As shown in FIG. 12 or 15, the scan signal line 330 intersects the semiconductor layer 122B, the drive power line PVDD, and the image data signal line 321. The scan signal line 330 does not intersect the other scan signal lines, the reference voltage power line SVR, the pre-charge voltage power line SVP, and the initialization voltage power line SVI. As a result, the self-luminous display device 10 can reduce the capacitance added to the scan signal line 330 by the respective wirings and signal lines. Therefore, the self-luminous display device 10 can suppress a decrease in the speed at which the first scan signal SC1(*n*) supplied to the scan signal line 330 propagates through the scan signal line 330.

The insulating layer 141 (organic insulating layer) (see FIG. 13) is formed on the conductive layer 139 and the insulating layer 136 where the conductive layer 139 is not formed (step 22 (S22) of FIG. 14).

As shown in FIG. 12 or FIG. 13, the insulating layer 141 (organic insulating layer) is opened (step 23 (S23)). In the opening of S23, the contact hole opening 147 for an anode electrode is opened. The contact hole opening 147 for an anode electrode removes the insulating layer 141 on the second wiring 140A and exposes the second wiring 140A. The contact hole opening 147 for an anode electrode may be referred to as an organic insulating layer opening. In addition, as shown in FIG. 12, the contact hole opening 147 overlaps the second wiring 140A and the first wiring 132A in a plan view.

The anode electrode 143 is provided on the exposed second wiring 140A, the contact hole opening 147 for an anode electrode, and the insulating layer 141. In addition, the functional layer 148 is provided on the anode electrode 143. The common electrode 149 is provided on the functional layer 148 (step 24 (S24)). For example, the anode electrode 143 and the functional layer 148 are provided for each pixel, and the common electrode 149 is provided to overlap the display region 22.

After S24, the sealing film 165 and the cover film 158 are provided in this order on the common electrode 149.

As shown in FIG. 13, the manufacturing of the self-luminous display device 10 (pixel 180) is completed as described above.

[1-8. Method for Manufacturing Self-Luminous Display Device 10]

A method for manufacturing the self-luminous display device 10 (pixel 180) that is different from the manufacturing method described in "1-7. Method for Manufacturing Self-luminous Display Device 10" will be described with reference to FIG. 5, FIG. 18, and FIG. 24. Specifically, the manufacturing method described in "1-8. Method for Manufacturing Self-luminous Display Device 10" is different from the manufacturing method described in "1-7. Method for Manufacturing Self-luminous Display Device 10" in that the manufacturing method includes the semiconductor layer formed using crystalline silicon and the oxide semiconductor layer formed using a metal oxide. In the description of "1-8. Method for Manufacturing Self-luminous Display Device 10", a configuration that is different from "1-7. Method for Manufacturing Self-luminous Display Device 10" is described, and the same configuration as in "1-7. Method for Manufacturing Self-luminous Display Device 10" will be described as necessary.

Figure 19:
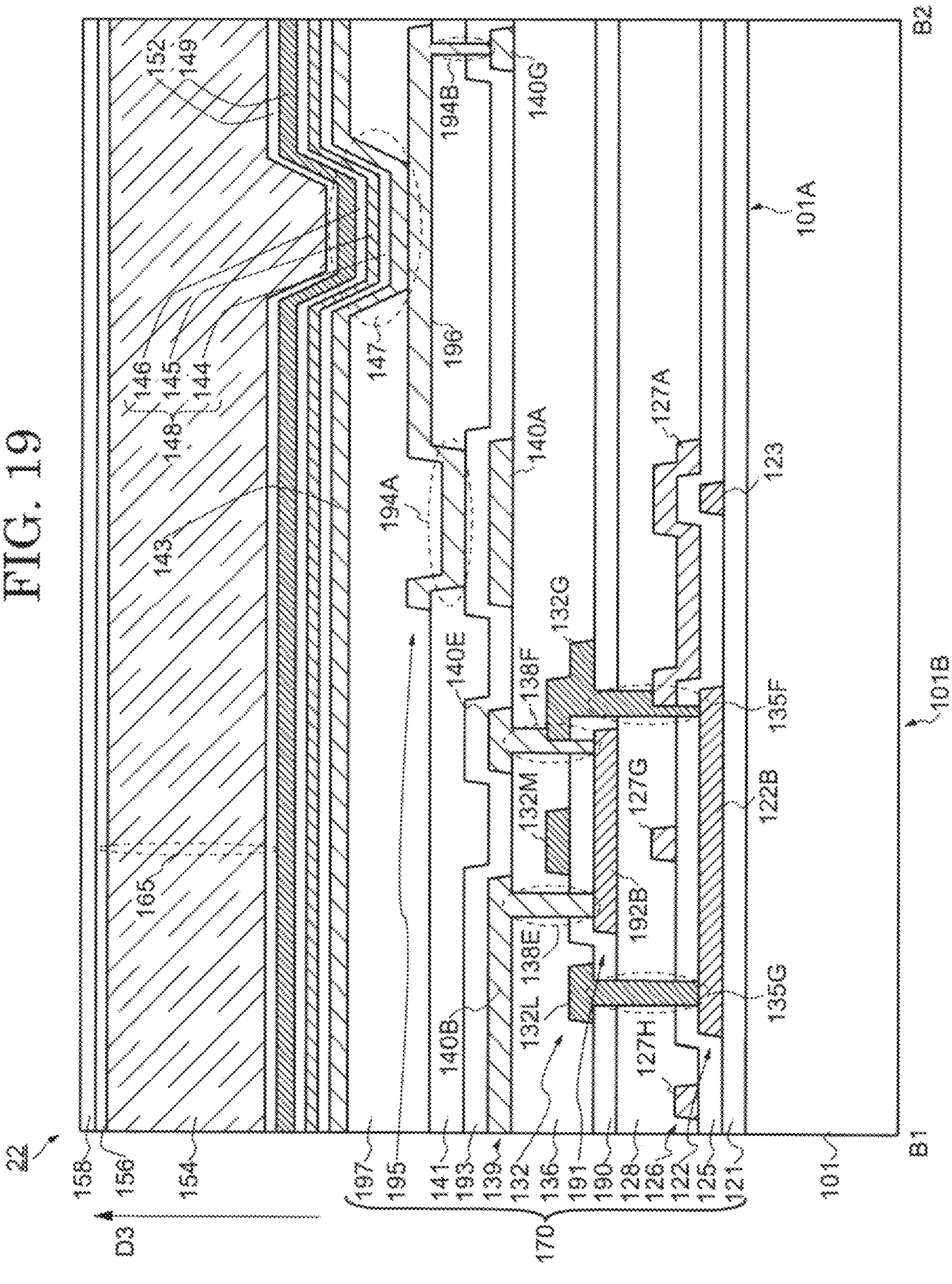
FIG. 19 is a cross-sectional view showing a cross-section cut along a line B1-B2 in the layout shown in FIG. 18.
Figure 20:
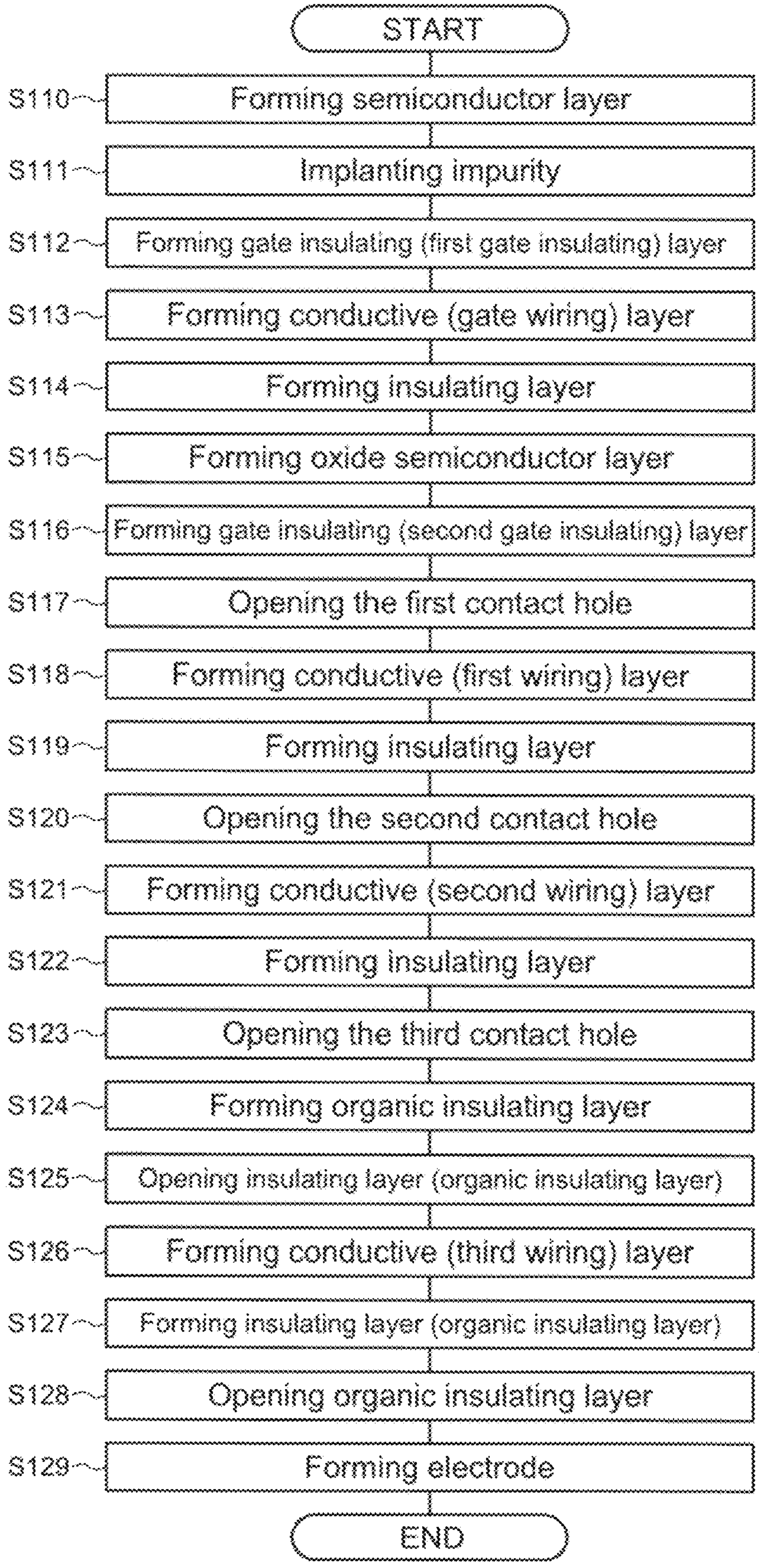
FIG. 20 is a sequence diagram showing a method for manufacturing a self-luminous display device according to the first embodiment of the present invention.

FIG. 18, FIG. 21 to FIG. 24 are layout diagrams of the pixel 180. FIG. 19 is a cross-sectional view showing a cross section cut along a line B1-B2 of the pixel 180 shown in FIG. 18. FIG. 20 is a sequence diagram showing a method for manufacturing the self-luminous display device 10. The method for manufacturing the self-luminous display device 10 (pixel 180) shown in FIG. 18 to FIG. 24 is an example, and the method for manufacturing the self-luminous display device 10 (pixel 180) is not limited to the example shown in FIG. 18 to FIG. 24. Configurations that are the same as or similar to those in FIG. 21 to FIG. 17 in FIG. 23 will be described as necessary.

As an example of the cross-section of the pixel 180, the cross-section of the pixel 180 shown in FIG. 19 is a cross-section cut along the second wiring 140B, the scan signal line 333, a first wiring 132L, the first contact hole opening 135G, the semiconductor layer 122B, an oxide semiconductor layer 192B, a first wiring 132M, the scan signal line 330, the second wiring 140D, the second contact hole opening 138F, the first wiring 132G, the first contact hole opening 135F, the gate wiring 127A, a third wiring 196, an organic insulating film opening 194A for the capacitive element CS, the second wiring 140A, the channel region 123 of the semiconductor layer 122, the contact hole opening 147 for an anode electrode, a third contact hole opening 194B, and a second wiring 140G. In addition, the organic insulating film opening 194A for the capacitive element CS includes a portion that simultaneously opens the third contact hole opening 194B, and may be referred to as the third contact hole opening.

As shown in FIG. 19, when manufacturing of the self-luminous display device 10 (pixel 180) is started, the underlayer 121 is formed on the first surface 101A of the substrate 101.

Figure 21:
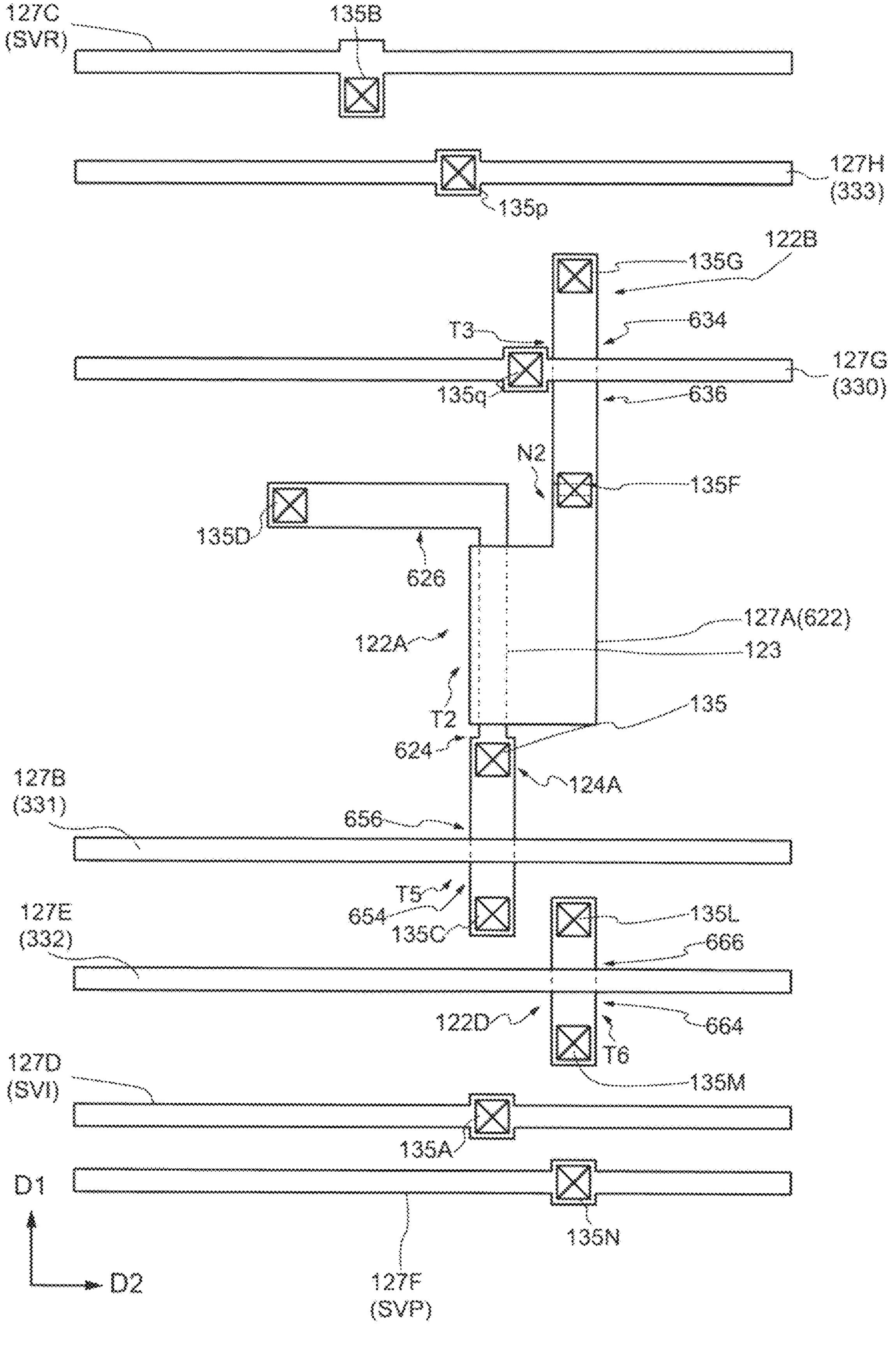
FIG. 21 is a layout diagram of a pixel according to the first embodiment of the present invention.

As shown in FIG. 19 or FIG. 21, the semiconductor layer 122 is formed on the underlayer 121 (step 110 (S110) of FIG. 20). The semiconductor layer 122 is formed using crystalline oxide. The semiconductor layer 122 includes the semiconductor layers 122A, 122B, and 122D. The semiconductor layer 122A serves as both the semiconductor layer of the second transistor T2 and the semiconductor layer of the fifth transistor T5. The semiconductor layer 122B is the semiconductor layer of the third transistor T3. The semiconductor layer 122D is the semiconductor layer of the sixth transistor T6. In other words, the semiconductor layer 122A includes the channel region of the second transistor T2 and the channel region of the fifth transistor T5, the semiconductor layer 122B includes the channel region of the third transistor T3, and the semiconductor layer 122D includes the channel region of the sixth transistor T6.

An impurity is implanted into the semiconductor layer 122 (step 111 (S111) in FIG. 20). The impurity region 124A is formed by S11. For example, referring to FIG. 21, the first electrode 624, the second electrode 626, the first electrode 654, the second electrode 656, the first electrode 664, and the second electrode 666 include an impurity region into which an impurity such as phosphorus (P) is implanted. For example, referring to FIG. 21, the first electrode 634 and the second electrode 636 include an impurity region into which an impurity such as boron (B) is implanted.

The gate insulating layer 125 (see FIG. 19) is formed on the semiconductor layer 122 and on the underlayer 121 where the semiconductor layer 122 is not formed (step 112 (S112) of FIG. 20). The gate insulating layer 125 is the gate insulating layer of the transistor having the semiconductor layer 122 as the channel region, and may be referred to as a first gate insulating layer.

The conductive layer 126 (see FIG. 19) is formed on the gate insulating layer 125 (step 113 (S113) of FIG. 20). As shown in FIG. 19 or 21, the conductive layer 126 includes the gate wiring 127C (the reference voltage power line SVR), a gate wiring 127G (the scan signal line 330), a gate wiring 127H (the scan signal line 333), the gate wiring 127A (the scan the gate electrode 622), the gate wiring 127B (the scan signal line 331), the gate wiring 127E (the scan signal line 332), the gate wiring 127D (the initialization voltage power line SVI), and the gate wiring 127F (the pre-charge voltage power line SVP). The gate wiring 127B (the scan signal line 331) includes the gate electrode 652 (see FIG. 5), the gate wiring 127H (the scan signal line 333) includes the gate electrode 612 (see FIG. 5), the gate wiring 127G (the scan signal line 330) includes the gate electrode 632 (see FIG. 5) and the gate electrode 642, and the gate wiring 127E (the scan signal line 332) includes the gate electrode 662 (see FIG. 5). The wiring included in the conductive layer 126 may be referred to as a first gate wiring.

The region where the gate electrode 622 of the second transistor T2 and the semiconductor layer 122A overlap is the channel region 123, and the channel region 123 corresponds to the channel length of the second transistor T2. The region where the third transistor T3 and the semiconductor layer 122B overlap is the channel region of the third transistor T3 and corresponds to the channel length. The region where the fifth transistor T5 and the semiconductor layer 122A overlap is the channel region of the fifth transistor T5 and corresponds to the channel length. The region where the sixth transistor T6 and the semiconductor layer 122D overlap is the channel length of the sixth transistor T6 and corresponds to the channel length.

The insulating layer 128 (see FIG. 19) is formed on the conductive layer 126 and on the gate insulating layer 125 where the conductive layer 126 is not formed (step 114 (S114) of FIG. 20).

Figure 22:
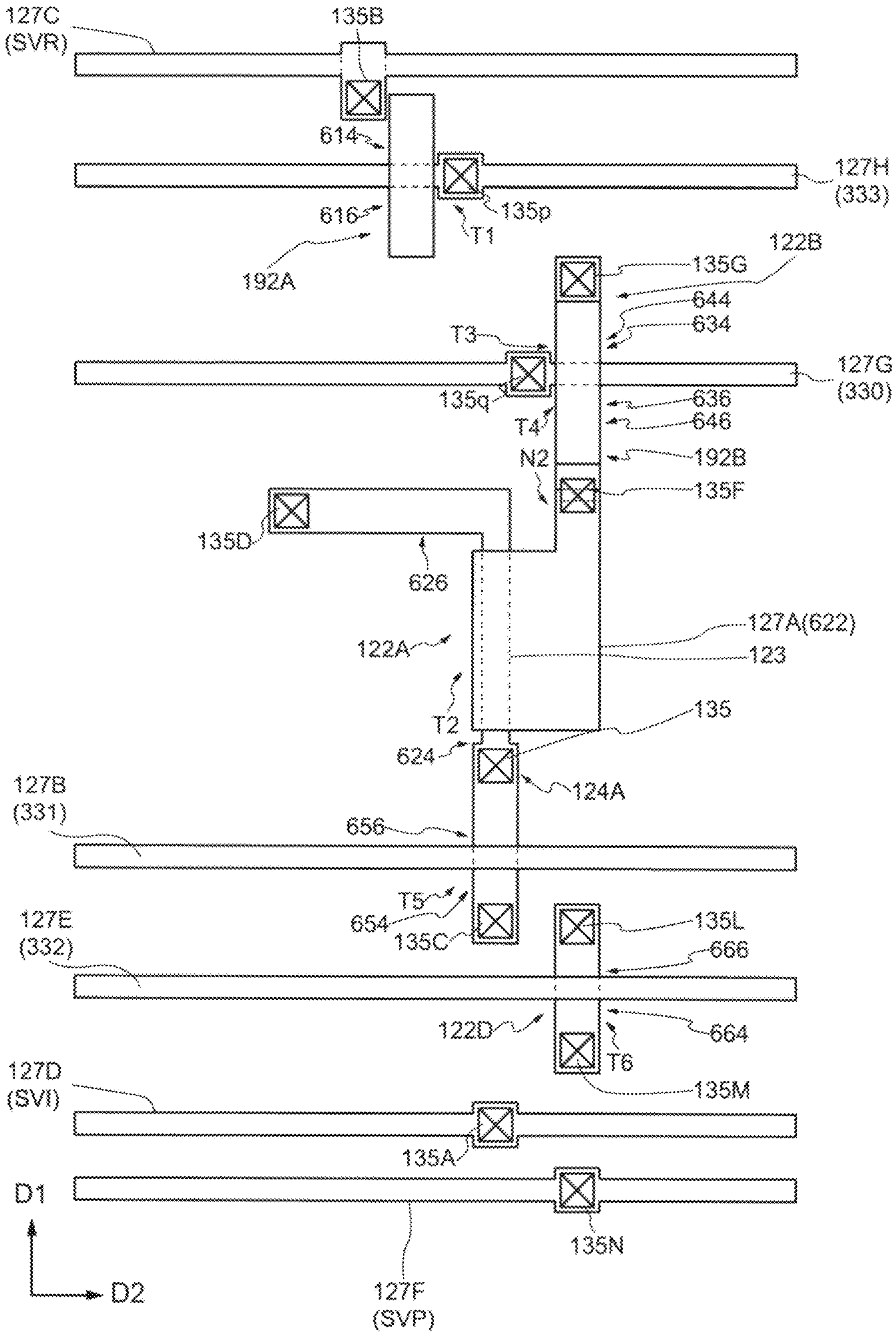
FIG. 22 is a layout diagram of a pixel according to the first embodiment of the present invention.

An oxide semiconductor layer 191 (see FIG. 19) is formed on the insulating layer 128 (step 115 (S115) of FIG. 20). As shown in FIG. 19 or FIG. 22, the oxide semiconductor layer 191 includes the oxide semiconductor layers 192A and 192B. The oxide semiconductor layer 192A is the semiconductor layer of the first transistor T1. The oxide semiconductor layer 192B is the semiconductor layer of the fourth transistor T4. In other words, the oxide semiconductor layer 192A includes the channel region of the first transistor T1, and the oxide semiconductor layer 192B includes the channel region of the fourth transistor T4. The oxide semiconductor layer 192B overlaps the semiconductor layer 122B. In addition, the length of the oxide semiconductor layer 192B parallel to the first direction D1 is shorter than the length of the semiconductor layer 122B. Furthermore, the semiconductor layer 122D may be an oxide semiconductor layer, and the region where the sixth transistor T6 and the oxide semiconductor layer overlap may be the channel region of the sixth transistor T6 and may correspond to the channel length.

A gate insulating layer 190 (see FIG. 19) is formed on the oxide semiconductor layer 192 and on the insulating layer 128 where the oxide semiconductor layer 192 is not formed (step 116 (S116) of FIG. 20). The gate insulating layer 190 is the gate insulating layer of the transistor having the oxide semiconductor layer 192 as the channel region, and may be referred to as a second gate insulating layer.

As shown in FIG. 19, FIG. 21, or FIG. 22, the first contact hole openings 135, 135A, 135B, 135C, 135D, 135F, 135G, 135L, 135M, 135N, 135*p*, and 135*q* are opened (step 117 (S117)). Each opening opens the gate insulating layer 190, the insulating layer 128, and the gate insulating layer 125 to expose wirings, semiconductor layers, or electrodes corresponding to each opening. For example, as shown in FIG. 19, the first contact hole opening 135G exposes the semiconductor layer 122B, and the first contact hole opening 135F exposes the side surfaces of the gate wiring 127A and the gate insulating layer 125, and the semiconductor layer 122B. Other openings also expose the corresponding wirings, semiconductor layers or electrodes.

Figure 23:
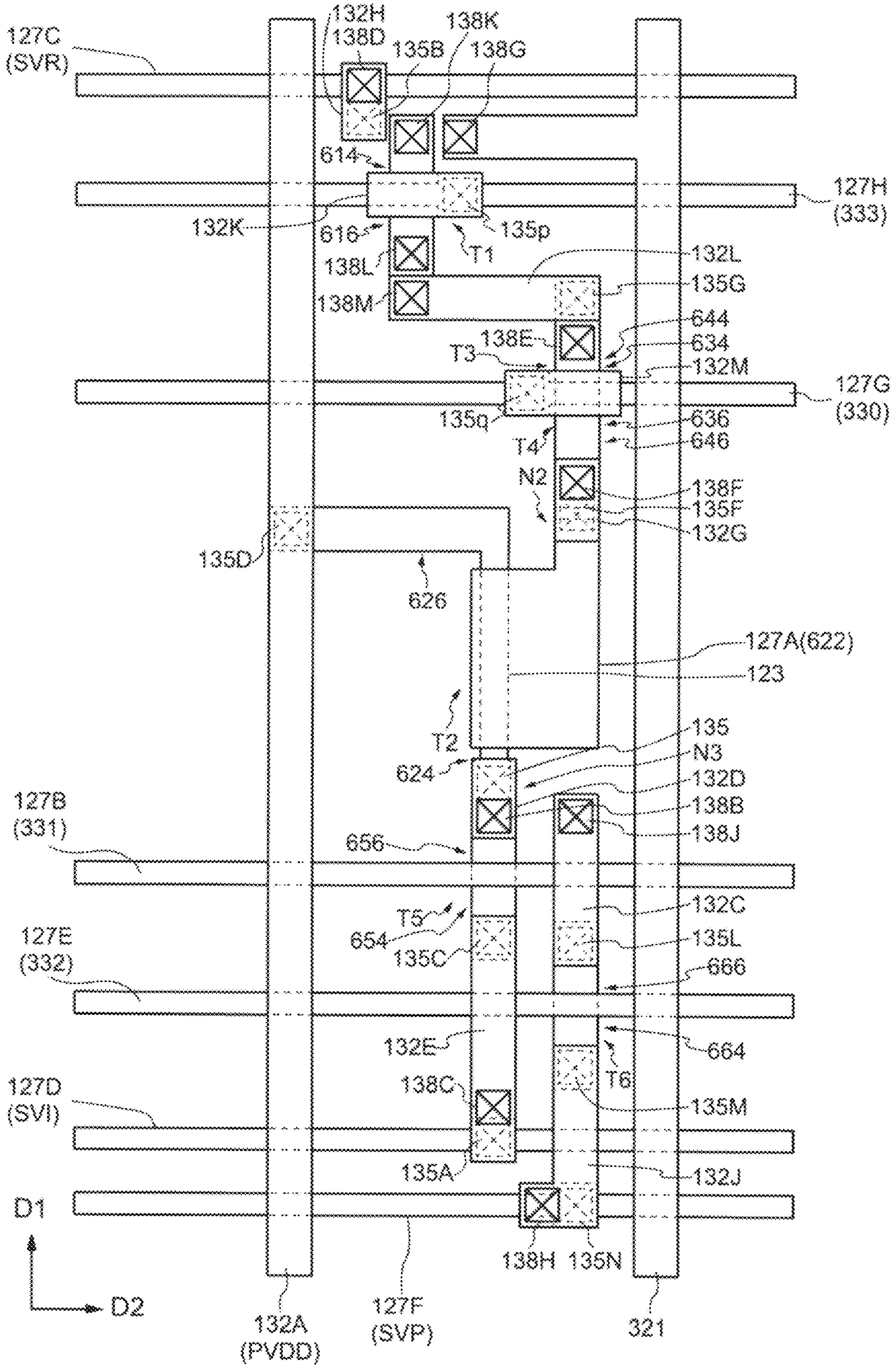
FIG. 23 is a layout diagram of a pixel according to the first embodiment of the present invention.

The conductive layer 132 (see FIG. 19) is formed on the insulating layer 131 (step 118 (S118)). As shown in FIG. 19 or FIG. 23, the conductive layer 132 includes the first wiring 132A (the drive power line PVDD), the first wiring 132C, the first wiring 132D, the first wiring 132E, the first wiring 132G, the first wiring 132H, the first wiring 132J, a first wiring 132K, the first wiring 132L, the first wiring 132M, and the image data signal line 321. The wiring included in the conductive layer 132 may be referred to as a second gate wiring.

As shown in FIG. 23, in a plan view, the first wiring 132A is electrically connected to the second electrode 626 via the first contact hole opening 135D, the first wiring 132C is electrically connected to the second electrode 666 via the first contact hole opening 135L, the first wiring 132D is electrically connected to the first electrode 624 via the first contact hole opening 135C, and the first wiring 132E is electrically connected to the first electrode 654 via the first contact hole opening 135A and electrically connected to the gate wiring 127D (the initialization voltage power line SVI) via the first contact hole opening 135A, the first wiring 132H is electrically connected to the gate wiring 127C (the reference voltage power line SVR) via the first contact hole opening 135B, the first wiring 132K is electrically connected to the gate wiring 127G (the scan signal line 333) via the first contact hole opening 135*p*, the first wiring 132M is electrically connected to the gate wiring 127G (the scan signal line 330) via the first contact hole opening 135*q*, and the first wiring 132J is electrically connected to the gate wiring 127F (the pre-charge voltage power line SVP) via the first contact hole opening 135N and electrically connected to the first electrode 664 via the first contact hole opening 135M.

In addition, as shown in FIG. 19 or FIG. 23, the first wiring 132L is electrically connected to the first electrode 634 via the first contact hole opening 135G. The first wiring 132G is electrically connected to the gate wiring 127A (the gate electrode 622) via the first contact hole opening 135F and is electrically connected to the second electrode 636. Since the first contact hole opening 135F is provided at the end portion of the gate wiring 127A, the first wiring 132G can be connected to both the gate wiring 127A and the second electrode 636.

In addition, as shown in FIG. 19 or FIG. 23, the first wiring 132L is electrically connected to the first electrode 634 via the first contact hole opening 135G. The first wiring 132G is electrically connected to the gate wiring 127A (the gate electrode 622) via the first contact hole opening 135F and is electrically connected to the second electrode 636. Since the first contact hole opening 135F is provided at the end portion of the gate wiring 127A, the first wiring 132G can be connected to both the gate wiring 127A and the second electrode 636.

The first wiring 132K includes the gate electrode 612 (see FIG. 5), the first wiring 132M includes the gate electrode 642 (see FIG. 5), and the gate wiring 127E (the scan signal line 332) includes the gate electrode 612.

The first transistor T1 has the gate wiring 127H and the gate electrode 612 included in the first wiring 132K. A region where the gate electrode 612 of the first transistor T1 and the oxide semiconductor layer 192A overlap is the channel region and corresponds to the channel length. Specifically, the gate wiring 127H and the first wiring 132K are provided above and below the oxide semiconductor layer 192A included in the first transistor T1, and the oxide semiconductor layer 192A is sandwiched between the gate wiring 127H and the first wiring 132K. Therefore, since the first transistor T1 has the channel region above and below the oxide semiconductor layers 192A, the first transistor T1 can flow a larger current than the transistor having the channel region on either the upper or lower side. As a result, a switching speed of the first transistor T1 is faster than the transistor having the channel region on either the upper or lower side. That is, the writing speed of the data voltage of the first transistor T1 and the switching speed from the conductive state to the non-conductive state of the first transistor T1 are faster than the transistor having the channel region on either the upper or lower side. Further, as described in "1-4. Configuration of Pixel 180", since the leakage current of the first transistor T1 is extremely small, the charge equivalent to the voltage included in the data signal VDATA held in the first node N1 and the second electrode 694 of the capacitive element CS is held for a long time.

The fourth transistor T4 has the gate wiring 127G and the gate electrode 642 included in the first wiring 132M. A region where the gate electrode 642 and the oxide semiconductor layer 192B of the fourth transistor T4 overlap is the channel region and corresponds to the channel length. The fourth transistor T4 has a configuration similar to that of the first transistor T1, and can have similar advantageous effects as those of the first transistor T1.

The insulating layer 136 (organic insulating layer) (see FIG. 19) is formed on the conductive layer 132 and on the insulating layer 131 where the conductive layer 132 is not formed (step 119 (S119) of FIG. 20).

As shown in FIG. 19 or FIG. 23, the second contact hole openings 138B, 138C, 138D, 138E, 138F, 138G, 138H, 138J, 138K, 138L, and 138M are opened (step 120 (S120)). Each opening opens the insulating layer 136 or the insulating layer 131 to expose wirings, oxide semiconductor layers or electrodes corresponding to each opening. For example, as shown in FIG. 19, the second contact hole opening 138E exposes the oxide semiconductor layer 192B, and the second contact hole opening 138F exposes the side surfaces of the first wiring 132G and the insulating layer 131, and the oxide semiconductor layer 192B. Other openings expose the corresponding wirings, oxide semiconductor layers or electrodes. In addition, the second contact hole opening may open the insulating layer 136 to expose the first wiring included in the conductive layer 132.

Figure 24:
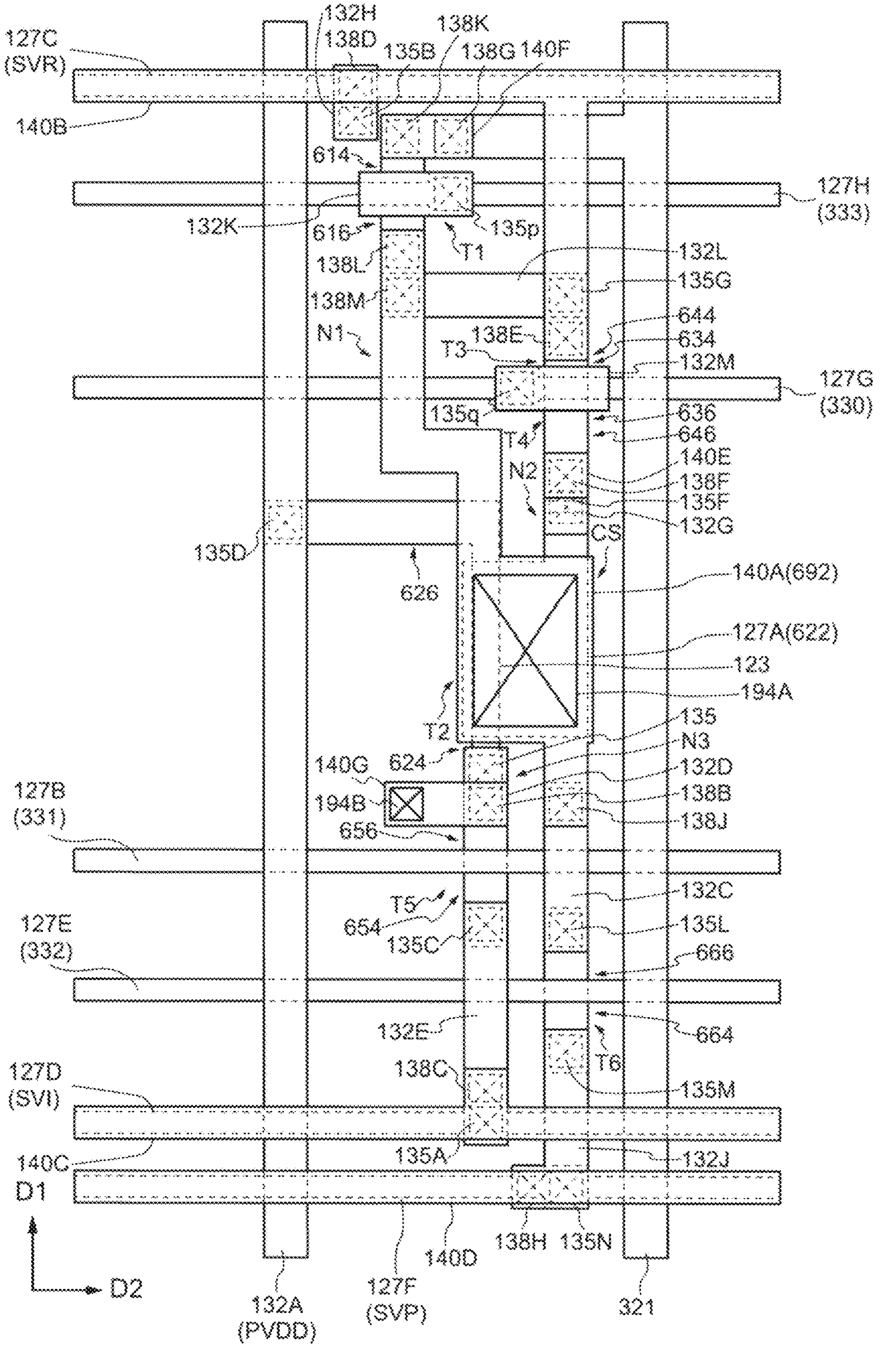
FIG. 24 is a layout diagram of a pixel according to the first embodiment of the present invention.

The conductive layer 139 (see FIG. 19) is formed on the insulating layer 136 and is formed on the insulating layer 136, the insulating layer 131, and the oxide semiconductor layer 191 exposed by the second contact hole opening (step 121 (S121)). As shown in FIG. 19 or FIG. 24, the conductive layer 139 includes the second wiring 140A (the first electrode 692), the second wiring 140B, the second wiring 140C, the second wiring 140D, a second wiring 140E, a second wiring 140F, and the second wiring 140G.

As shown in FIG. 19 or FIG. 24, the first electrode 692 is electrically connected to the first wiring 132C and the second electrode 666 via the second contact hole opening 138J and the first contact hole opening 135L, and is electrically connected to the second electrode 616 via the second contact hole openings 138M and 138L. In addition, the first electrode 692 is electrically connected to the first wiring 132L, the second wiring 140B, the second electrode 636 (the oxide semiconductor layer 192B), and the second electrode 646 (the semiconductor layer 122B) via the second contact hole opening 138M, the first contact hole opening 135G, and the second contact hole opening 138E.

Further, as shown in FIG. 19 or FIG. 24, the second wiring 140C is electrically connected to the first wiring 132E, the initialization voltage power line SVI, and the first electrode 654 via the second contact hole opening 138C, and the first contact hole openings 135A and 135C. The second wiring 140D is electrically connected to the first wiring 132J and the pre-charge voltage power line SVP via the second contact hole opening 138H and the first contact hole opening 135N, and electrically connected to the first wiring 132J, the first electrode 664, and the gate wiring 127F (the pre-charge voltage power line SVP) via the second contact hole opening 138H, the first contact hole openings 135N and 135M.

Further, as shown in FIG. 19 or FIG. 24, the second wiring 140E is electrically connected to the first wiring 132G via the second contact hole opening 138F and is electrically connected to the second electrode 646 (the oxide semiconductor layer 192B). Since the second contact hole opening 138F is provided at the end portion of the first wiring 132G, the second wiring 140E can be connected to both the first wiring 132G and the second electrode 646. In addition, since the first wiring 132G is connected to both the gate wiring 127A and the second electrode 636 (the semiconductor layer 122B), the second wiring 140E can be connected to the first wiring 132G, the second electrode 646 (the oxide semiconductor layer 192B), the gate wiring 127A, and the second electrode 636 (the semiconductor layer 122B). That is, the second wiring 140E can electrically connect the oxide semiconductor layer 192B and the semiconductor layer 122B provided in different layers via the two contact hole openings provided in the different layers.

Further, as shown in FIG. 19 or FIG. 24, the second wiring 140F is electrically connected to the second electrode 616 (the oxide semiconductor layer 192A) via the second contact hole openings 138G and 138K. In addition, the second wiring 140F is electrically connected to the image data signal line 321 via the second contact hole opening 138G.

In addition, as shown in FIG. 19 or FIG. 24, the second wiring 140G is electrically connected to the first electrode 624 (the semiconductor layer 122A) and the second electrode 656 (the semiconductor layer 122A) via the second contact hole opening 138B and the first contact hole opening 135.

Figure 18:
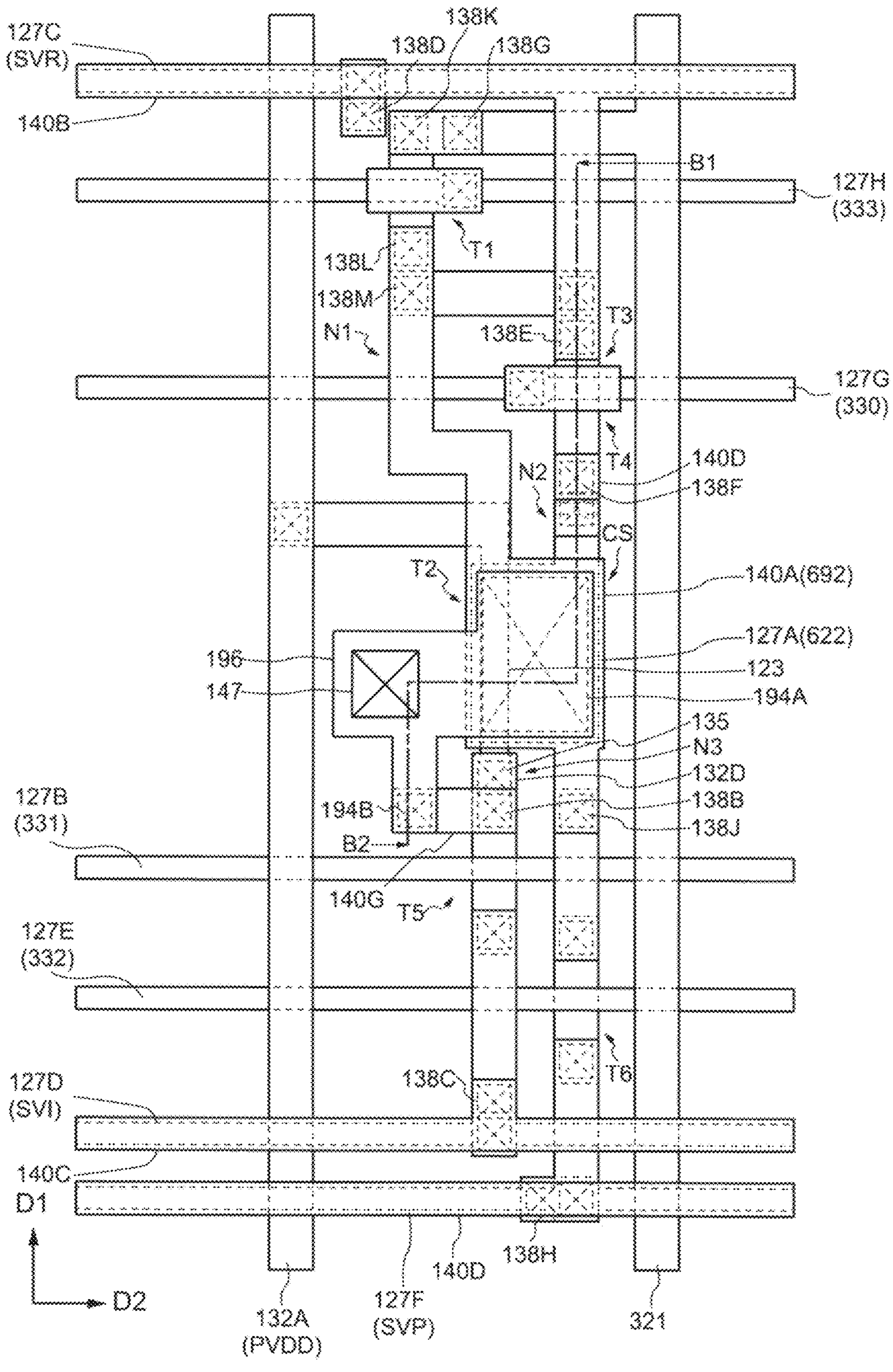
FIG. 18 is a layout diagram of a pixel according to the first embodiment of the present invention.

Further, as shown in FIG. 18 or FIG. 24, the second wiring 140B, the second wiring 140C, and the second wiring 140D have a configuration similar to that described in "1-7. Method for Manufacturing Self-luminous Display Device 10". Therefore, the second wiring 140B, the second wiring 140C, and the second wiring 140D formed by "1-8. Method for Manufacturing Self-luminous Display Device 10" have similar advantageous effects as those of the configuration described in "1-7. Method for Manufacturing Self-luminous Display Device 10".

An insulating layer 193 (see FIG. 19) is formed on the conductive layer 139 and on the insulating layer 136 where the conductive layer 139 is not formed (step 122 (S122) of FIG. 20).

As shown in FIG. 18, FIG. 19 or FIG. 24, the insulating layer 193 is opened (step 123 (S123)). In the opening of S123, the third contact hole opening 194B is opened.

The insulating layer 141 (organic insulating layer) (see FIG. 19) is formed on the insulating layer 193, on the side surface of the insulating layer 193 opened by the third contact hole opening 194B, and on the conductive layer 139 (e.g., the second wiring 140G) exposed by the third contact hole opening 194B (step 124 (S124) of FIG. 20).

As shown in FIG. 18, FIG. 19 or FIG. 24, the insulating layer 141 (organic insulating layer) is opened (step 125 (S125)). In the opening of S125, the organic insulating film opening 194A for the capacitive element CS is opened. In addition, similar to the opening of S123, the third contact hole opening 194B is opened. That is, the third contact hole opening 194B is opened twice. Each opening opens the insulating layer 141 or the insulating layer 193 to expose insulating layers, wirings or electrodes corresponding to each opening. For example, the organic insulating film opening 194A for the capacitive element CS removes only the insulating layer 141 on the second wiring 140A (the second electrode 694) and exposes the insulating layer 193. On the other hand, the third contact hole opening 194B removes the insulating layer 141 and the insulating layer 193 on the second wiring 140G to expose the second wiring 140G. Other openings also expose the corresponding insulating layers, wirings or electrodes.

A conductive layer 195 (see FIG. 19) is formed on the insulating layer 141, on the side surface of the insulating layer 141 and the insulating layer 193 exposed by the third contact hole opening, and on the conductive layer 139 exposed by the third contact hole opening (step 126 (S126)). As shown in FIG. 18, FIG. 19, or FIG. 24, the conductive layer 195 includes the third wiring 196.

As shown in FIG. 18, FIG. 19, or FIG. 24, the third wiring 196 is electrically connected to the second wiring 140G via the third contact hole opening 194B. In addition, as shown in FIG. 18, the first electrode 692, the gate electrode 622, and the semiconductor layer 122A (the channel region 123) overlap. That is, the second transistor T2 overlaps the capacitive element CS.

An insulating layer 197 (organic insulating layer) (see FIG. 19) is formed on the conductive layer 195, and on the insulating layer 141 where the conductive layer 195 is not formed (step 127 (S127) in FIG. 20).

As shown in FIG. 19, the insulating layer 197 (organic insulating layer) is opened (step 128 (S128)). In the opening of S128, the contact hole opening 147 for an anode electrode is opened. The contact hole opening 147 for an anode electrode removes the insulating layer 197 on the conductive layer 195 (e.g., the third wiring 196) to expose the conductive layer 195. The contact hole opening 147 for an anode electrode may be referred to as the organic insulating layer opening.

The anode electrode 143 is provided on the exposed conductive layer 195, the contact hole opening 147 for an anode electrode, and the insulating layer 197. In addition, the functional layer 148 is provided on the anode electrode 143. The common electrode 149 is provided on the functional layer 148 (step 129 (S129)). For example, the anode electrode 143 and the functional layer 148 are provided for each pixel, and the common electrode 149 is provided to overlap the display region 22.

After S129, the sealing film 165 and the cover film 158 are provided in this order on the common electrode 149.

As shown in FIG. 19, the manufacturing of the self-luminous display device 10 (pixel 180) is completed as described above.

As described above, the self-luminous display device 10 includes a configuration in which the transistors in the pixel can be overlapped in a plan view. Therefore, the self-luminous display device 10 can reduce the length of the pixel in the first direction D1 or the second direction D2 corresponding to the overlapped transistor. As a result, for example, the self-luminous display device 10 can increase the number of pixels according to the sum of the reduced lengths. Therefore, the self-luminous display device 10 can provide a high-resolution display device and a large-screen display device.

2. Second Embodiment

Figure 25:
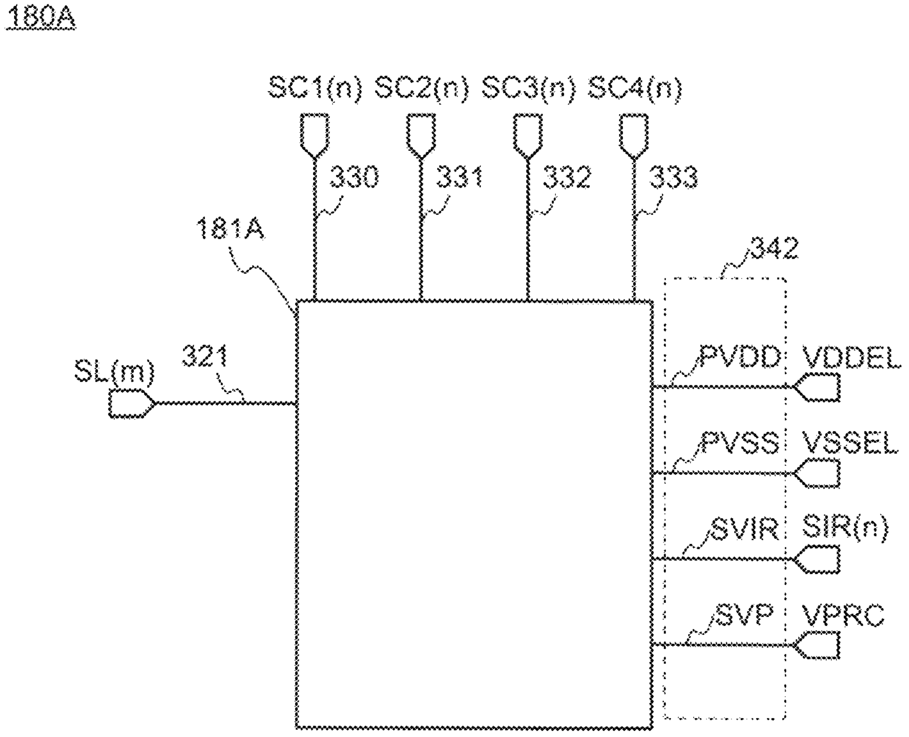
FIG. 25 is a schematic diagram showing an input signal to a pixel circuit according to the second embodiment of the present invention.
Figure 26:
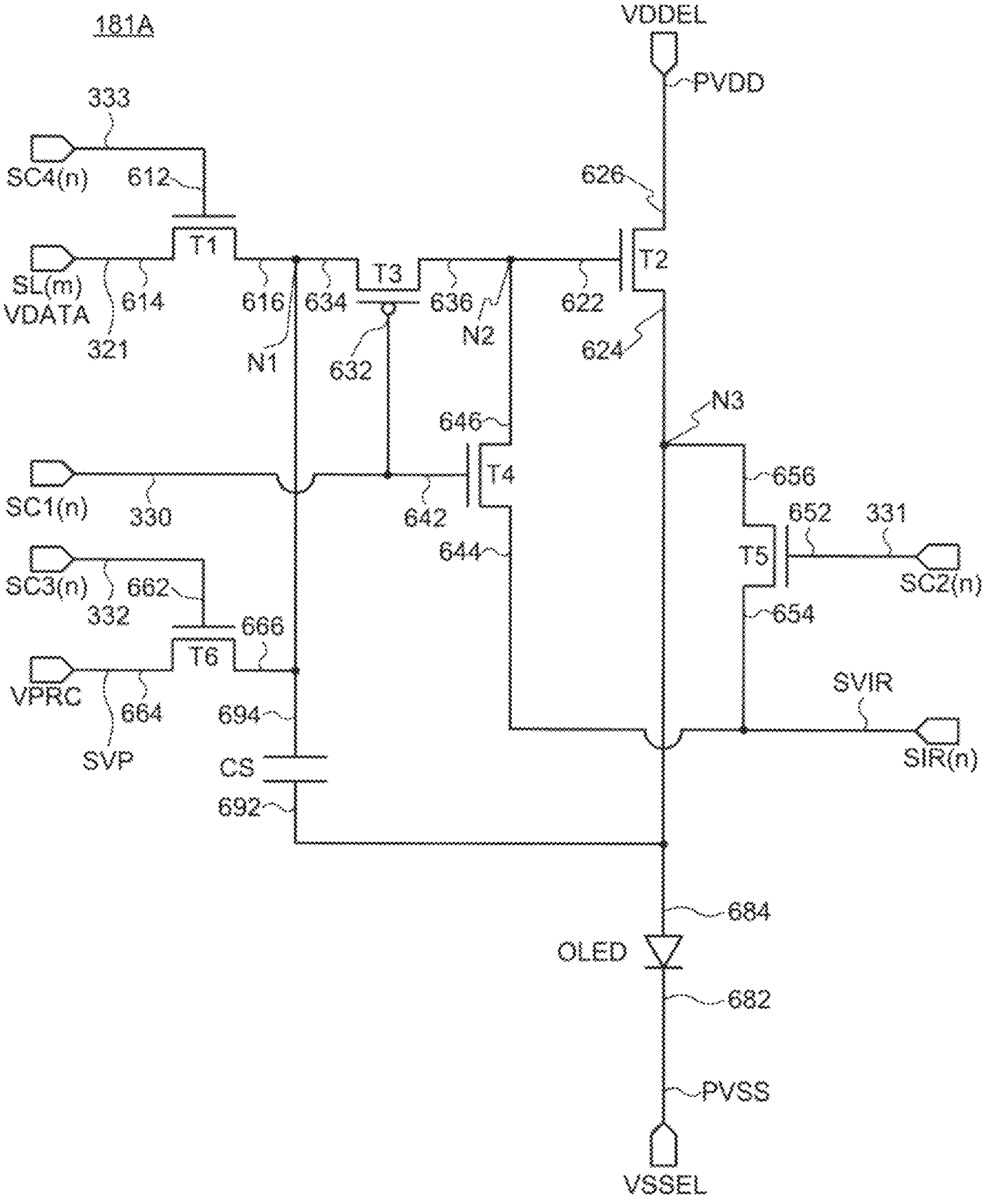
FIG. 26 is a circuit diagram showing a configuration of a pixel circuit according to the second embodiment of the present invention.
Figure 29:
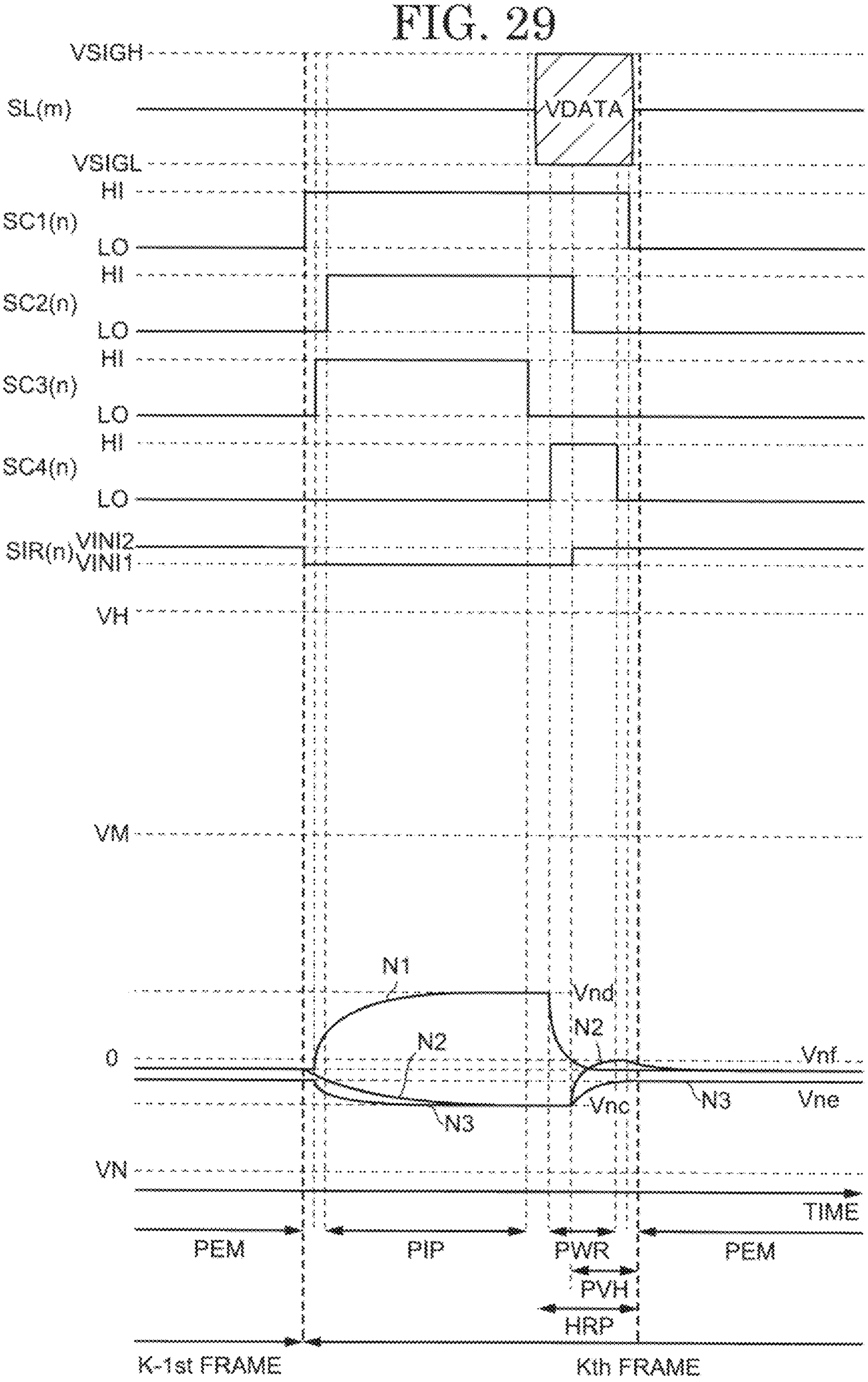
FIG. 29 is a timing chart of a self-luminous display device according to the second embodiment of the present invention.
Figure 30:
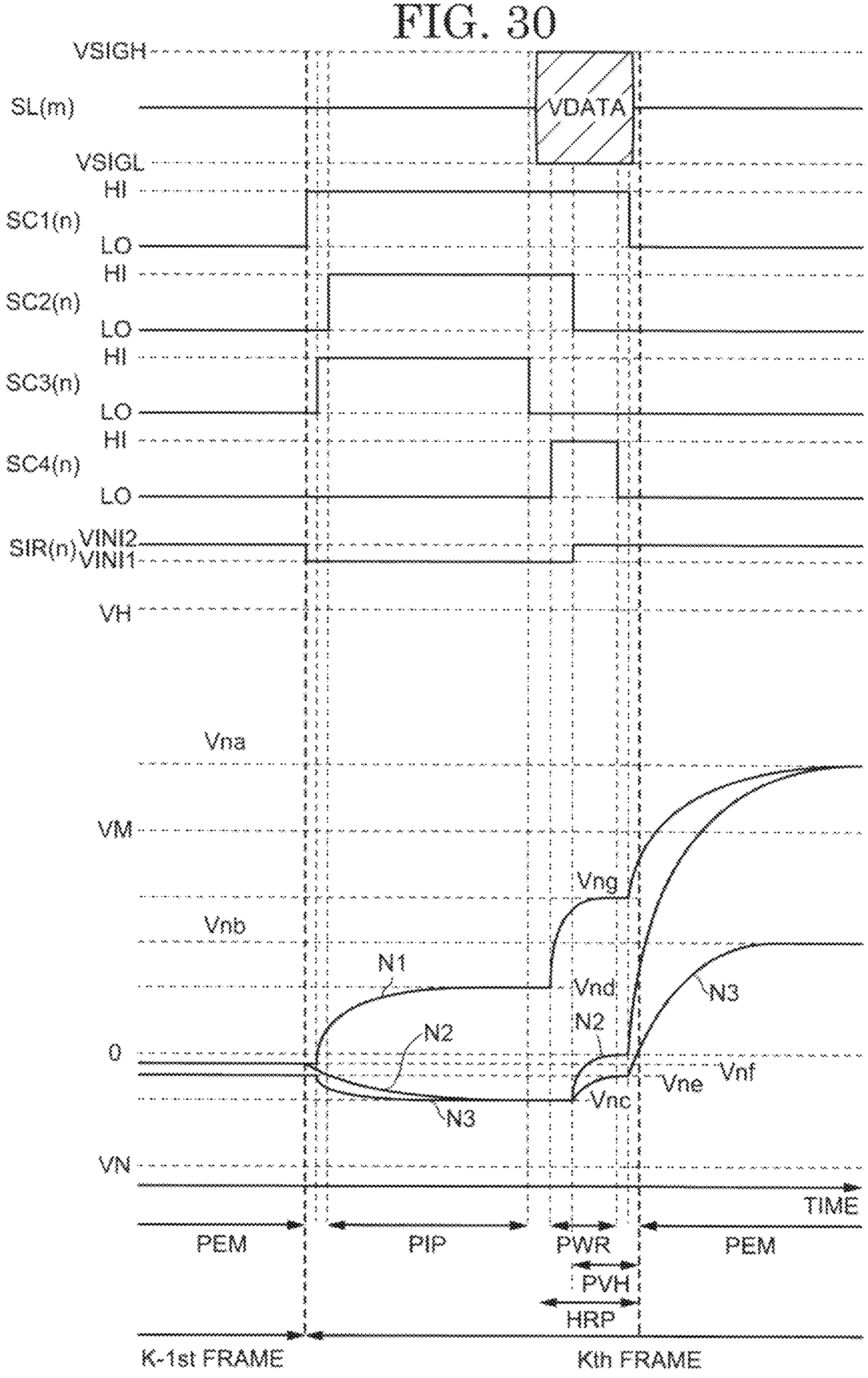
FIG. 30 is a timing chart of a self-luminous display device according to the second embodiment of the present invention.
Figure 31:
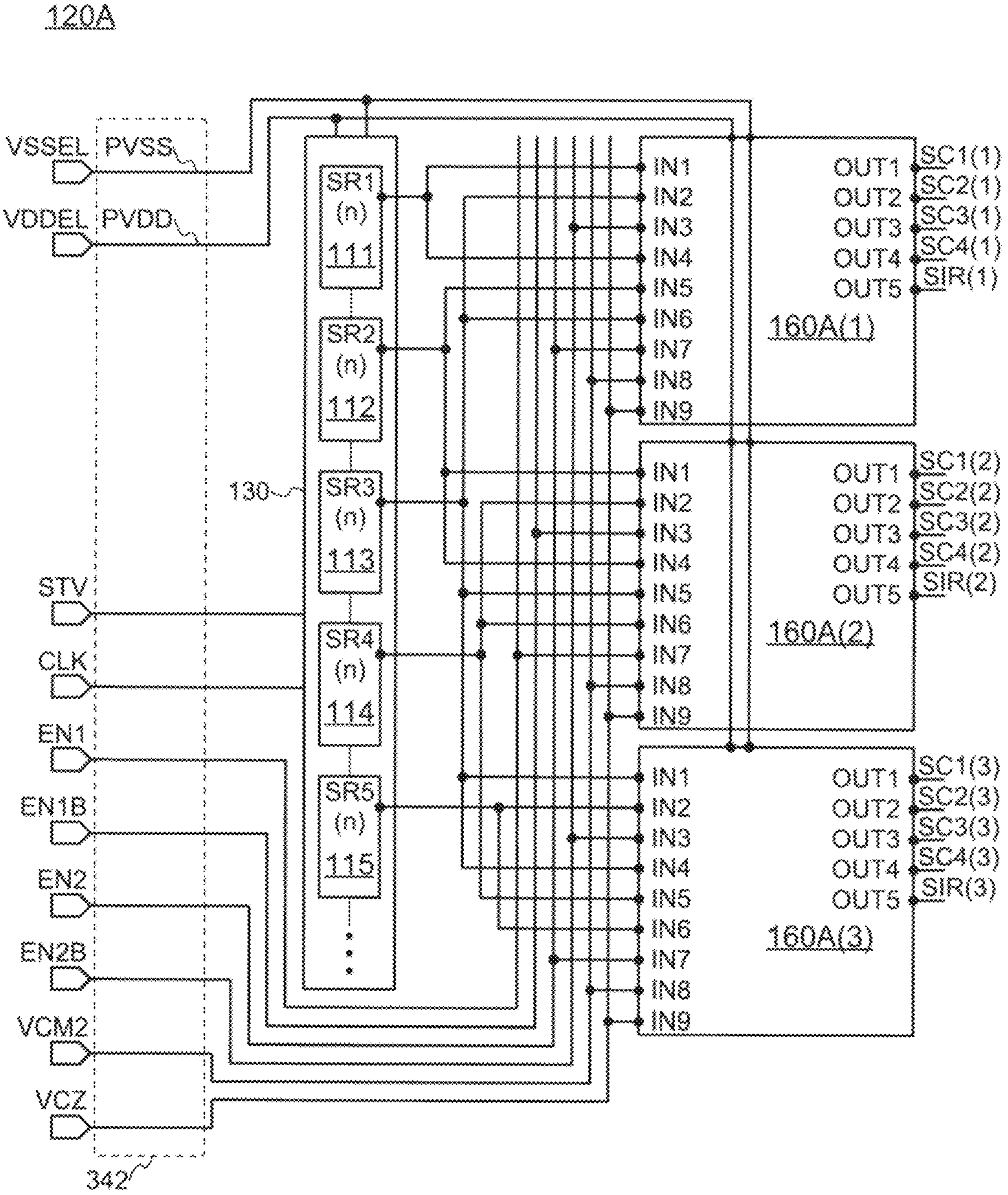
FIG. 31 is a schematic diagram showing a configuration of a control circuit according to the second embodiment of the present invention.
Figure 32:
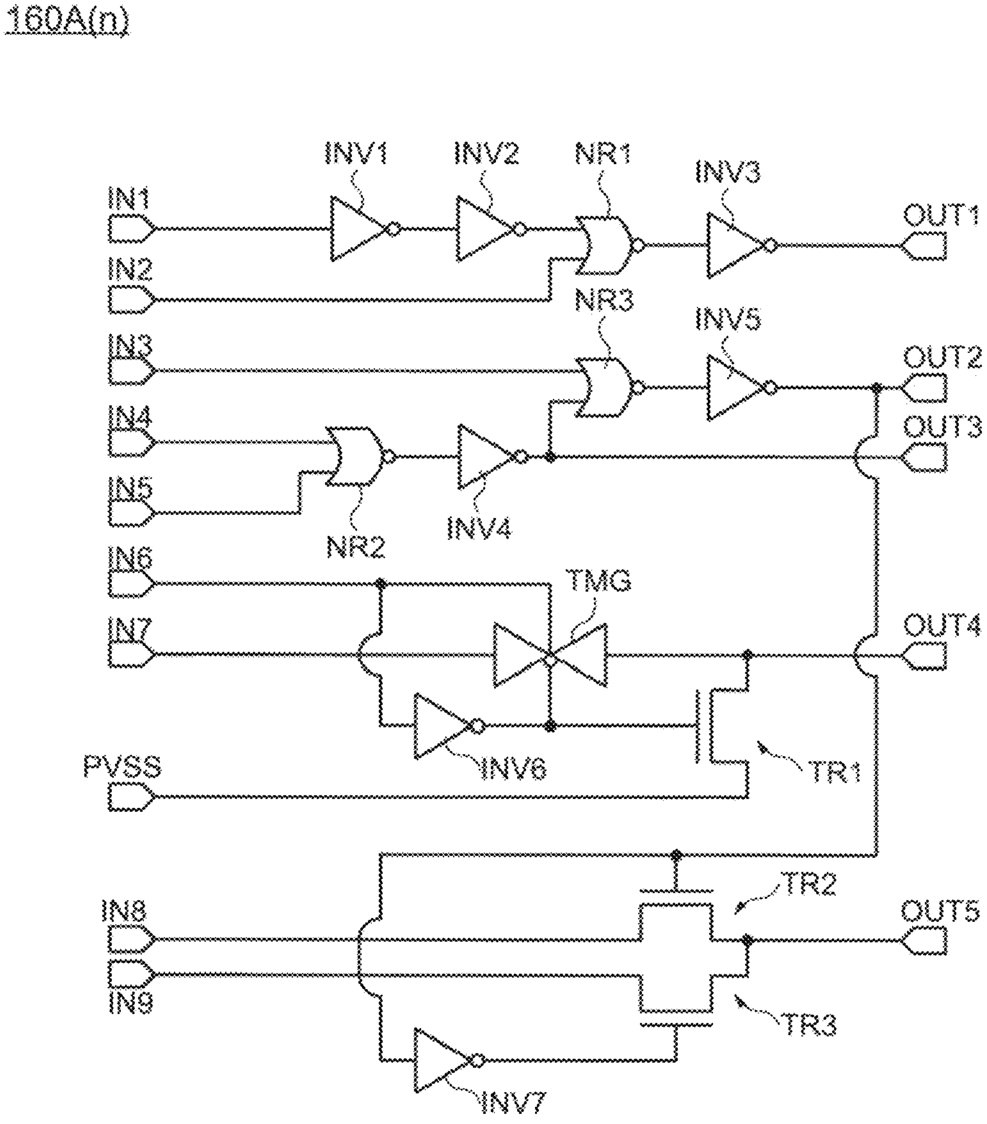
FIG. 32 is a circuit diagram showing a configuration of a control circuit according to the second embodiment of the present invention.
Figure 33:
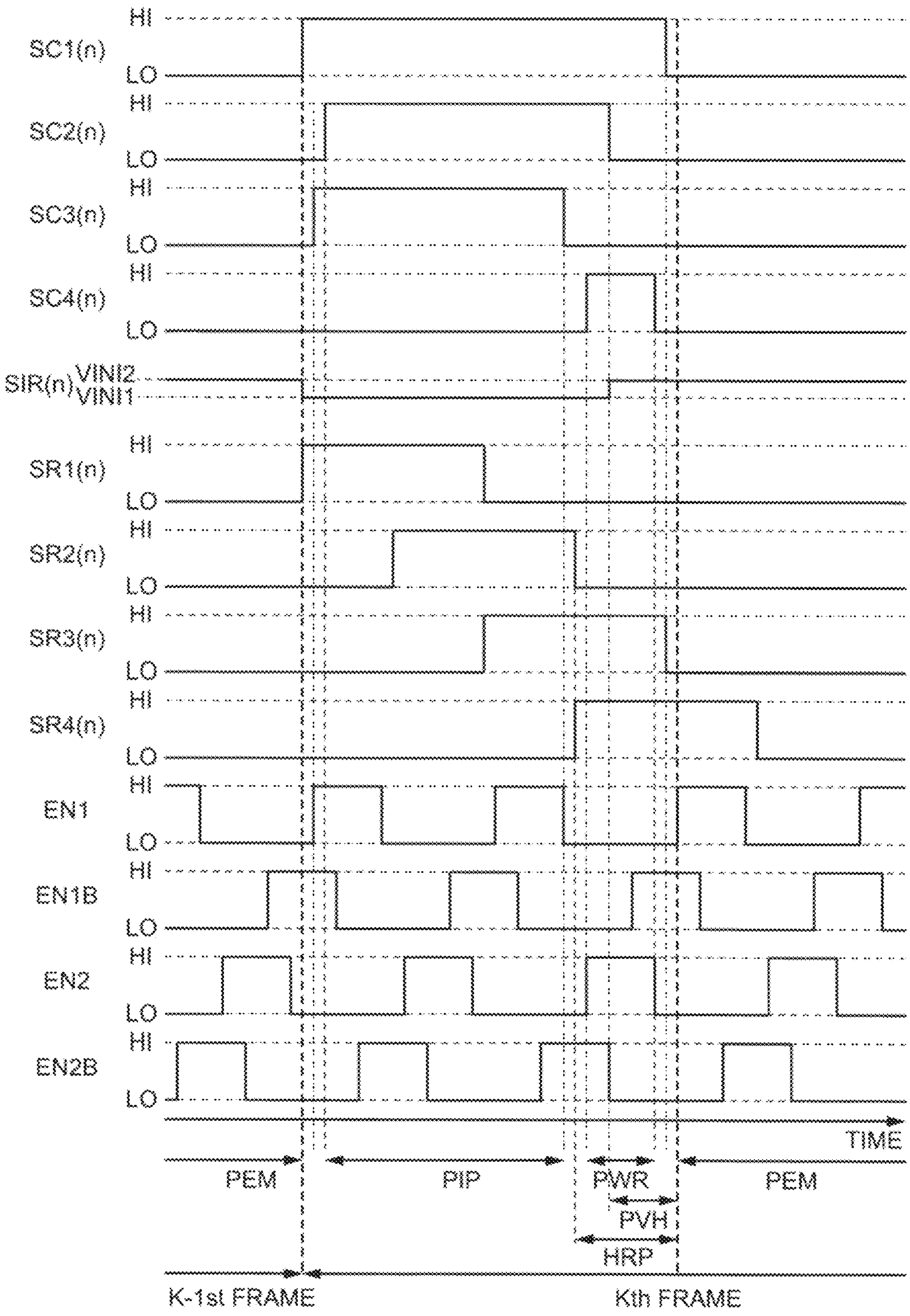
FIG. 33 is a timing chart of a control circuit according to the second embodiment of the present invention.

An overview of the self-luminous display device according to a second embodiment will be described with reference to FIG. 1, FIG. 6, and FIG. 25 to FIG. 33. FIG. 25 is a schematic diagram showing an input signal to the pixel 180A (pixel circuit 181A) according to the second embodiment, FIG. 26 is a circuit diagram showing the configuration of the pixel circuit 181A, and FIG. 27 to FIG. 30 are timing charts of the self-luminous display device according to the second embodiment. FIG. 31 is a schematic diagram showing a configuration of the control circuit 120A according to the second embodiment, FIG. 32 is a circuit diagram showing a configuration of a scan driver 160A(n) according to the second embodiment, and FIG. 33 is a timing chart of the control circuit 120A.

The self-luminous display device according to the second embodiment includes a pixel 180A, the pixel circuit 181A, and the control circuit 120A. The configuration of the pixel 180A and the pixel circuit 181A and the configuration of the control circuit 120A are different from the configuration of the pixel 180 and the pixel circuit 181 and the configuration of the control circuit 120 of the self-luminous display device 10 according to the first embodiment. Specifically, the self-luminous display device according to the second embodiment has a configuration and function in which the reference voltage power supply VREF and the initialization voltage VINI supplied to the pixel circuit 181 are replaced with a scan voltage power supply SIR(n). The scan voltage power supply SIR(n) is a power supply in which an initialization voltage VINI1 and an initialization voltage VINI2 corresponding to the reference voltage power supply VREF and the initialization voltage VINI change with time. Further, the self-luminous display device according to the second embodiment has a configuration and function in which the control circuit 120 is replaced with the control circuit 120A. Other configurations and functions are similar to those of the self-luminous display device 10 according to the first embodiment. In describing the configuration and function of the second embodiment, similar configurations and functions as those of the self-luminous display device 10 according to the first embodiment will be described as necessary. Configurations that are the same as or similar to those in FIG. 1 to FIG. 24 will be described as necessary.

[2-1. Configuration of Pixel 180A]

An overview of the pixel 180A and the pixel circuit 181A will be described with reference to FIG. 25 and FIG. 26.

The pixel circuit 181A is connected to a scan voltage power line SVIR. The scan voltage power line SVIR is a signal line serving as both the reference voltage power line SVR and the initialization voltage power line SVI supplied to the pixel circuit 181. In other words, the scan voltage power line SVIR is a common signal line that combines the reference voltage power line SVR and the initialization voltage power line SVI supplied to the pixel circuit 181. That is, the pixel circuit 181A has a configuration and function in which the reference voltage power line SVR and the initialization voltage power line SVI connected to the pixel circuit 181 are replaced with the scan voltage power line SVIR that combines the reference voltage power line SVR and the initialization voltage power line SVI. The scan voltage power line SVIR may be referred to as a fifth control signal line. The scan voltage power supply SIR(n) may be referred to as a fifth control signal. In addition, the scan voltage power line SVIR is a wiring that functions as a power supply, but is handled as a signal line because the voltage (potential) is changed and used.

The scan voltage power supply SIR(n) is supplied to the scan voltage power line SVIR. In the pixel circuit 181A, the first electrode 644 of the fourth transistor T4 and the first electrode 654 of the fifth transistor T5 are electrically connected to the scan voltage power line SVIR.

For example, the scan voltage power line SVIR is electrically connected to the connection wiring 342 of the connection wiring 342 (see FIG. 1 and FIG. 25) that differs from the drive power line PVDD and the reference voltage line PVSS. In addition, for example, the scan voltage power line SVIR may be one of the connection wiring 342.

For example, similar to the initialization voltage VINI, the scan voltage power supply SIR(n) may be supplied from an external device to the IC chip 110 (see FIG. 1), and may be supplied from the IC chip 110 to a plurality of pixels 180A (pixel circuit 181A) via the connection wiring 342 and the scan voltage power line SVIR. Although not shown, similar to the initialization voltage VINI, the scan voltage power supply SIR(n) may be supplied from an external device through the FPC 200, the terminal section 150, and the connection wiring 341 to the plurality of pixels 180A (pixel circuits 181A) without passing through the IC chip 110 and the connection wiring 342, and connected to the scan voltage power line SVIR.

The fourth transistor T4 has a function of conducting the second node N2 and the scan voltage power line SVIR to supply the initialization voltage VINI1 or VINI2 to the second node N2 and initializing the second node N2. For example, the initialization voltages VINI1 and VINI2 are constant voltages.

The fifth transistor T5 has a function of conducting the third node N3 and the scan voltage power line SVIR to supply the initialization voltage VINI1 to the third node N3 and initializing the third node N3.

Configurations and functions of the pixel circuit 181A other than the configurations and functions described in "2-1. Configuration of Pixel 180A" are similar to those of the pixel circuit 181.

[2-2. Driving Method of Pixel Circuit 181A]

A driving method of the self-luminous display device 10 according to the second embodiment will be described with reference to FIG. 27 to FIG. 30. Configurations that are the same as or similar to those in FIG. 1 to FIG. 26 will be described as necessary. In addition, similar to the first embodiment, the horizontal axis of the timing charts represents time (TIME).

The driving method of the self-luminous display device according to the second embodiment has a configuration and function in which the operation related to the reference voltage power line SVR and the initialization voltage power line SVI (the reference voltage VREF and the initialization voltage VINI) in the driving method of the self-luminous display device 10 according to the first embodiment is replaced with the operation related to the scan voltage power supply SIR(n). Configurations and functions other than the operation related to the scan voltage power supply SIR(n) are similar to those of the driving method of the self-luminous display device 10 according to the first embodiment.

The driving method of the self-luminous display device according to the second embodiment includes periods similar to those of the driving method of the self-luminous display device 10 according to the first embodiment shown in FIG. 6.

In one horizontal period (horizontal period HRP) in the driving method of the self-luminous display device 10 according to the second embodiment, the first scan signal SC1(*n*), the second scan signal SC2(*n*), the third scan signal SC3(*n*), the fourth scan signal SC4(*n*), the image data signal VDATA including the data signal SL(m), and the scan voltage power supply SIR(n) are input to the pixel 180A (pixel circuit 181A). For example, the pixel 180A is selected according to the timings of the first scan signal SC1(*n*), the second scan signal SC2(*n*), the third scan signal SC3(*n*), and the fourth scan signal SC4(*n*). The image data signal SL(m) and the scan voltage power supply SIR(n) are input to the selected pixel 180A according to the timings of the respective signals. Similar operations are performed on all the pixels 180A, and an image of the frame corresponding to 1FRAME is displayed on the display region 22 of the self-luminous display device 10 based on the image data signal SL(m) input to all the pixels 180A.

For example, the voltages (potentials) supplied to each signal and each node of each frame in the timing charts shown in FIG. 27 to FIG. 30 and FIG. 33 are shown in Table 3 and Table 4.

TABLE 3

| | PIP | PWR | PVH | PEM |
|---|---|---|---|---|
| SC1(n) | HI | HI | HI | LO |
| SC2(n) | HI | HI | LO | LO |
| SC3(n) | HI | LO | LO | LO |
| SC4(n) | LO | HI | HI | LO |

TABLE 3-continued

| | PIP | PWR | PVH | PEM |
|---|---|---|---|---|
| SIR(n) | −1.5 [V] | −1.5 [V] | 0 [V] | 0 [V] |
| SL(m) | — | −0.5 [V](Black) ~3.5 [V](White) | −0.5 [V](Black) ~3.5 [V](White) | — |
| N1 | 1.5 [V] (Intermediate potential) | −0.5 [V]~3.5 [V] | −0.5 [V]~3.5 [V] | Rise in conjunction with the rise of potential of N3 |
| N2 | −2 [V] | −2 [V] | 0 [V] | In conjunction with N1 |
| N3 | −2 [V] | −2 [V] | −1 [V] (= VREF-VTH) | Rise in conjunction with Ion with VGS |
| Vgs (= V(N2)-V(N3)) | 0 [V] | 0 [V] | 1 [V] | |
| Remarks | Initialize T2 and OLED Apply precharge potential (intermediate potential) to CS | Apply VDATA to CS | Acquiring and retaining VTH Potential of N3 = VREF-VTH Potential of N1-Potential of N3 = VDATA-(VREF-VTH) Non-light emitting below VTHEL | Light emitting VGS = VDATA-(VREF-VTH) |

TABLE 4

| | Setting value [V] |
|---|---|
| VTH | 1 |
| VTHEL | 0.7 |
| VSIGL(Black) | −0.5 |
| VSIGH (White) | 3.5 |
| HI | 10 |
| LO | −4 |
| VINI1 | −2 |
| VINI2 | 0 |
| VPRC | 1.5 |
| VDDEL | 8 |
| VSSEL | 0 |

[2-2-1. First Example of Driving Method of Pixel Circuit 181A]

Figure 27:
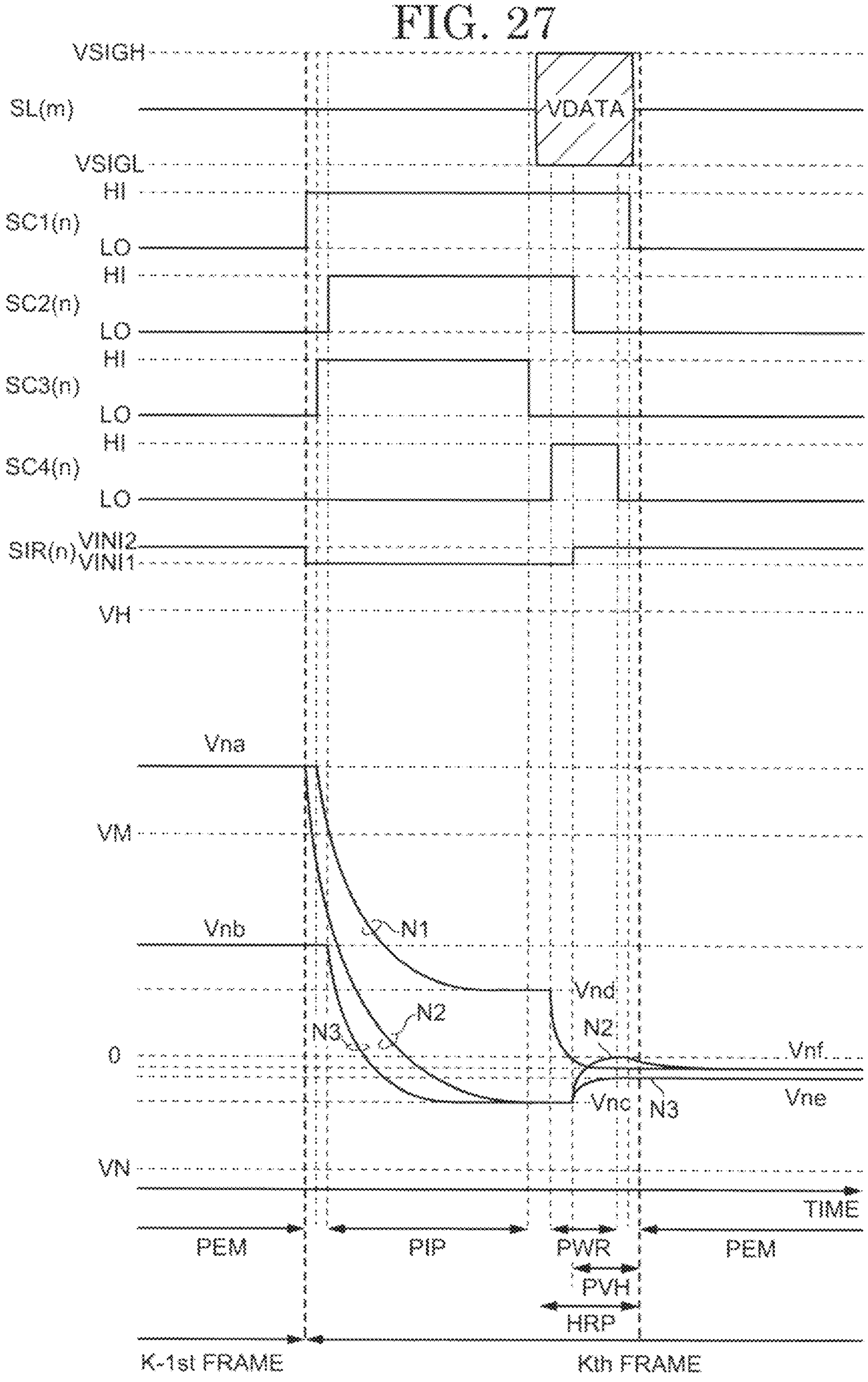
FIG. 27 is a timing chart of a self-luminous display device according to the second embodiment of the present invention.

A first example of a driving method of the pixel circuit 181A will be described with reference to FIG. 27. Similar to the first example of the driving method of the self-luminous display device 10 according to the first embodiment, the first example of the driving method of the pixel circuit 181A includes displaying images of different colors in consecutive frames.

The scan voltage power supply SIR(n) is supplied with the initialization voltage VINI2 in the light emission period PEM of the K−1stFRAME, the initialization voltage VINI1 in the period PIP of the KthFRAME, and the initialization voltage VINI2 in the period PVH and the emission period PEM of the KthFRAME.

For example, as shown in Table 4, the initialization voltage VINI2 is 0 V and the initialization voltage VINI1 is −1.5 V. The initialization voltage VINI2 is the same as the reference voltage VREF, and the initialization voltage VINI1 is the same as the initialization voltage VINI. The setting values of other voltages are the setting values shown in Table 2 described in "1-5. Driving Method of Self-luminous Display Device 10".

The configurations of the image data signal SL(m), the first scan signal SC1(*n*), the second scan signal SC2(*n*), the third scan signal SC3(*n*), and the fourth scan signal SC4(*n*) in the light emission period PEM of the K−1stFRAME and in the light emission period PEM of the KthFRAME are similar to the configurations described in "1-5-1. First Example of Driving Method of Self-luminous Display Device 10". Further, the voltages (potentials) of the first node N1, the second node N2, the third node N3 in the light emission period PEM of the K−1stFRAME and the light emission period PEM of the KthFRAME, the operation of the transistors, and the like are similar to the configurations described in "1-5-1. First Example of Driving Method of Self-luminous Display Device 10". In addition, the initialization voltage VINI2 is supplied to the scan voltage power supply SIR(n) in the light emission period PEM of the K−1stFRAME and the light emission period PEM of the KthFRAME. The configurations and the like similar to those described in "1-5-1. First Example of Driving Method of Self-luminous Display Device 10" will be described as necessary.

In the light emission period PEM of the K−1stFRAME, the light-emitting element OLED emits light similar to the configuration described in "1-5-1. First Example of Driving Method of Self-luminous Display Device 10".

In the period between the light emission period PEM and the period PIP of the K−1stFRAME following the light emission period PEM of the K−1stFRAME, the image data signal SL(m) of the data signal VDATA of the voltage VSIGL corresponding to the non-light-emitting black is input to the pixel 180A. The scan voltage power supply SIR(n) changes from a state in which the initialization voltage VINI2 (0 V) is supplied to a state in which the initialization voltage VINI1 (voltage Vnc, −2 V) is supplied. The first scan signal SC1(*n*) changes from the state in which LO is supplied to the state in which HI is supplied. When the first scan signal SC1(*n*) is supplied with HI, the third scan signal SC3(*n*) changes from the state in which LO is supplied to the state in which HI is supplied. The second scan signal SC2(*n*) and the fourth scan signal SC4(*n*) are in the state in which LO is supplied. Therefore, the fourth transistor T4 and the sixth transistor T6 are turned from the OFF state to the ON state, the third transistor T3 is turned from the ON state to the OFF state, and the first transistor T1 and the fifth transistor T5 are maintained in the OFF state. As a result, the voltage supplied to the second node N2 gradually drops from the voltage Vna toward the voltage Vnc, the voltage supplied to the first node N1 gradually drops from the voltage Vna toward the pre-charge voltage VPRC (voltage Vnd, 1.5 V), and the voltage supplied to the third node N3 maintains the voltage Vnb.

In the period PIP following the period between the light emission period PEM and the period PIP of the K−1stFRAME, for example, the pixel 180A maintains a state in which the first scan signal VDATA based on the image data signal SL(m) is supplied, the first scan signal SC1(*n*) and the third scan signal SC3(*n*) maintain a state in which HI is supplied, and the fourth scan signal SC4(*n*) maintains a state in which LO is supplied. The second scan signal SC2(*n*) changes from the state in which LO is supplied to the state in which HI is supplied. Therefore, the fifth transistor T5 is turned from the OFF state to the ON state, the second transistor T2 is turned to the OFF state, the sixth transistor T6 and the fourth transistor T4 are maintained in the ON state, and the first transistor T1 and the third transistor T3 are maintained in the OFF state.

As a result, the voltage supplied to the first node N1 gradually drops from the voltage Vna toward the pre-charge voltage VPRC (voltage Vnd, 1.5 V) and becomes the voltage Vnd. The voltage supplied to the second node N2 gradually drops from the voltage Vna toward the initialization voltage VINI1 (voltage Vnc, −2 V) and becomes the voltage Vnc. The voltage supplied to the third node N3 gradually drops from the voltage Vnb toward the initialization voltage VINI1 and becomes the voltage Vnc. The potential difference Vgs is 0 V (−2 V−(−2 V)) and the potential difference Vds is 10 V (8 V−(−2 V)). Since the potential difference Vgs is smaller than the threshold voltage VTH, the second transistor T2 is in the OFF state, and the drain current Ion does not flow from the drive power line PVDD to the initialization voltage power line SVI or the reference voltage line PVSS, so that the light-emitting element OLED does not emit light.

As described above, in the period PIP, the pre-charge voltage (intermediate potential) is supplied to the first node N1, and the second node N2 and the third node N3 are initialized by the initialization voltage VINI1 (−2 V).

In the initial period of the horizontal period HRP of the KthFRAME following the period PIP, the configurations of the image data signal SL(m), the first scan signal SC1(*n*), the second scan signal SC2(*n*), the third scan signal SC3(*n*), and the fourth scan signal SC4(*n*), and the operations of the transistors are similar to those described in "1-5-1. First Example of Driving Method of Self-luminous Display Device 10." In addition, the scan voltage power supply SIR(n) maintains the state in which the initialization voltage VINI1 is supplied. As a result, the voltage supplied to the first node N1 maintains the voltage Vnd, the voltage supplied to the second node N2 maintains the initialization voltage VINI1, and the voltage supplied to the third node N3 maintains the voltage Vnc (initialization voltage VINI1). Furthermore, similar to the period PIP, the light-emitting element OLED does not emit light.

In the period PWR following the initial period of the horizontal period HRP, the configurations of the image data signal SL(m), the first scan signal SC1(*n*), the second scan signal SC2(*n*), the third scan signal SC3(*n*), and the fourth scan signal SC4(*n*), and the operations of the transistors are similar to those described in "1-5-1. First Example of Driving Method of Self-luminous Display Device 10". In addition, the scan voltage power supply SIR(n) maintains the state in which the initialization voltage VINI1 is supplied. As a result, the voltage supplied to the first node N1 gradually drops from the voltage Vnd toward the voltage VSIGL (voltage Vnf, −0.5 V), the voltage supplied to the second node N2 maintains the voltage Vnc, and the voltage supplied to the third node N3 maintains the voltage Vnc. Furthermore, similar to the period PIP, the light-emitting element OLED does not emit light.

In the middle of the period PWR, in the period PVH that is parallel to (overlapping) the period PWR, the configurations of the image data signal SL(m), the first scan signal SC1(*n*), the second scan signal SC2(*n*), the third scan signal SC3(*n*), and the fourth scan signal SC4(*n*), and the operations of the transistors are similar to those described in "1-5-1. First Example of Driving Method of Self-luminous Display Device 10". In addition, the scan voltage power supply SIR(n) changes from the state in which the initializing voltage VINI1 is supplied to the state in which the initializing voltage VINI2 (0 V) is supplied. As a result, the voltage supplied to the second node N2 gradually rises from the voltage Vnc toward the initialization voltage VINI2 (0 V), and becomes the initialization voltage VINI2 (0 V).

Immediately after the start of the period PVH, the potential difference Vgs is 0 V, the potential difference Vds is 10 V, and the second transistor T2 is in the OFF state. In addition, the fifth transistor T5 is also in the OFF state. On the other hand, the fourth transistor T4 is in the ON state, and the voltage supplied to the second node N2 rises from the voltage Vnc toward the initialization voltage VINI2 (0 V). Since the voltage supplied to the second node N2 is directed to 0 V, the potential difference Vgs exceeds the threshold voltage VTH. As a result, the second transistor T2 is turned on, charging of the third node N3 begins, and the voltage supplied to the third node N3 gradually rises.

When the potential difference Vgs between the voltage supplied to the second node N2 and the voltage supplied to the third node N3 becomes the threshold voltage VTH, the voltage supplied to the second node N2 and the voltage supplied to the third node N3 maintain the respective voltages at that time. For example, as shown in FIG. 27, the voltage supplied to the second node N2 is the initialization voltage VINI2 (0 V), and the voltage supplied to the third node N3 is the voltage Vne (−1 V). Since the second transistor T2 is in the OFF state and no current flows from the drive power line PVDD to the reference voltage line PVSS, the light-emitting element OLED does not emit light.

In the period at the end of the period PVH, the configurations of the image data signal SL(m), the first scan signal SC1(*n*), the second scan signal SC2(*n*), the third scan signal SC3(*n*), and the fourth scan signal SC4(*n*), and the operations of the transistors are similar to those described in "1-5-1. First Example of Driving Method of Self-luminous Display Device 10". In addition, the scan voltage power supply SIR(n) maintains the state in which the initialization voltage VINI2 is supplied. As a result, the first node N1 and the second node N2 are conductive, the voltage supplied to the first node N1 gradually drops toward the voltage Vnf to become the voltage Vnf, the voltage supplied to the second node N2 gradually drops toward the voltage Vnf to become the voltage Vnf, and the voltage supplied to the third node N3 maintains the voltage Vne. In addition, since the potential difference Vgs is 1 V, the potential difference Vds is 9 V, and the potential difference Vgs is the same as the threshold voltage VTH, no current flows from the drive power line PVDD to the reference voltage line PVSS. Furthermore, the light-emitting element OLED does not emit light.

As described above, in the period PWR, the data signal VDATA is written to the pixel 180. Further, in the period PVH, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS).

In the light emission period PEM of the KthFRAME following the horizontal period HRP of the KthFRAME, similar to the configuration described in "1-5-1. First Example of Driving Method of Self-luminous Display Device 10", three pixels using the pixel 180A emitting red light, the pixel 180A emitting blue light, and the pixel 180A emitting green light become black.

The first example of the driving method of the pixel circuit 181A including the above-described configurations has similar advantageous effects as those of the method for driving the self-luminous display device 10 according to the first embodiment.

In addition, the pixel circuit 181A is connected to the scan voltage power line SVIR serving as both the reference voltage power line SVR supplied to the pixel circuit 181 and the initialization voltage power line SVI. Therefore, since the pixel circuit 181A has a configuration capable of reducing the number of signal lines, the self-luminous display device including the pixel circuit 181A can reduce the size of the pixel. As a result, the self-luminous display device including the pixel circuit 181A can increase the number of pixels and achieve high definition and large screen.

[2-2-2. Second Example of Driving Method of Pixel Circuit 181A]

Figure 28:
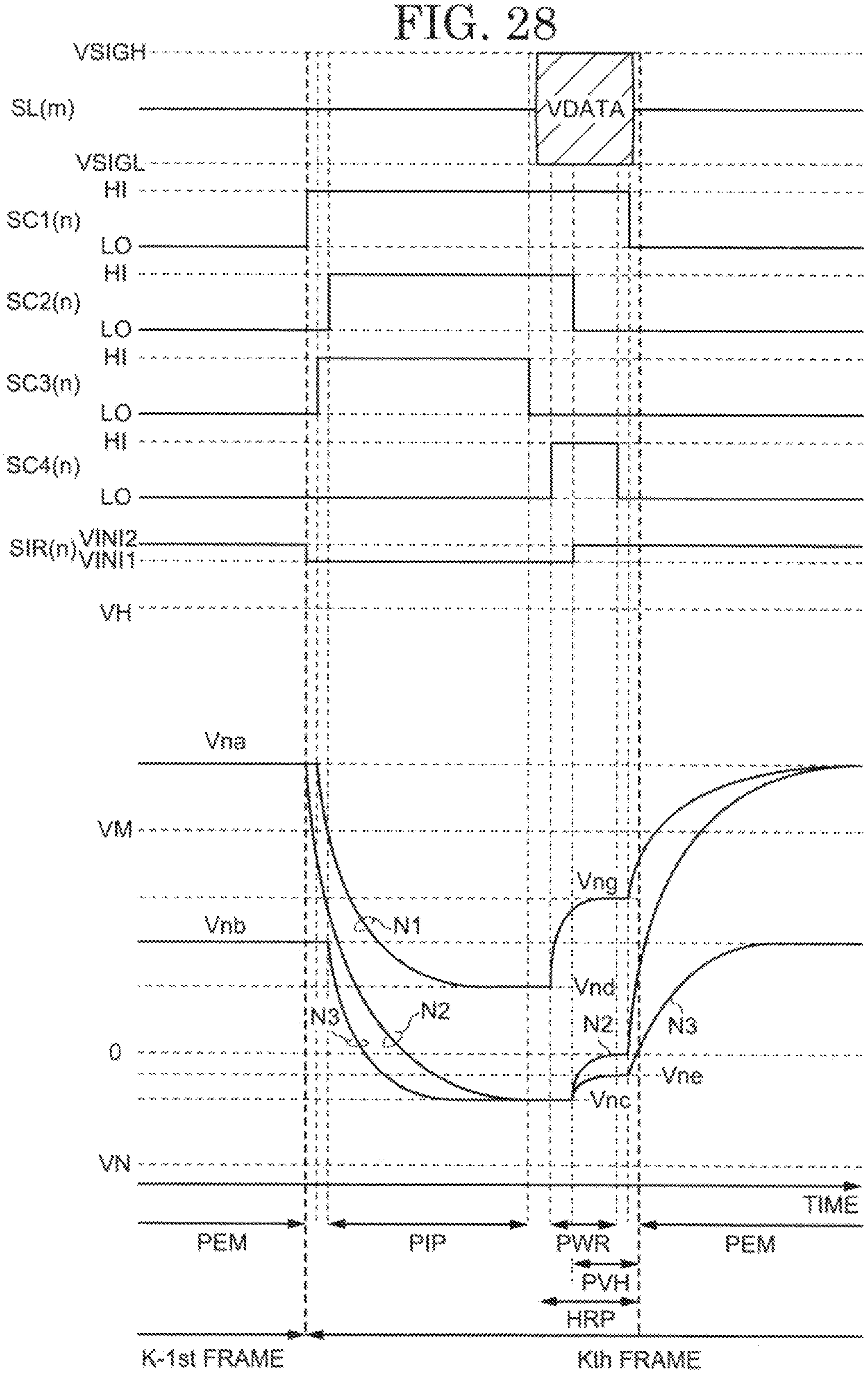
FIG. 28 is a timing chart of a self-luminous display device according to the second embodiment of the present invention.

A second example of the driving method of the pixel circuit 181A will be described with reference to FIG. 28. Similar to the second example of the driving method of the self-luminous display device 10 according to the first embodiment, the driving method shown in the second example of the pixel circuit 181A includes displaying images of the same color (white) in consecutive frames. Configurations that are the same as or similar to those in FIG. 1 to FIG. 27 will be described as necessary.

The configurations of the image data signal SL(m), the first scan signal SC1(*n*), the second scan signal SC2(*n*), the third scan signal SC3(*n*), the fourth scan signal SC4(*n*), and the scan voltage power supply SIR(n) in the light emission period PEM of the K−1stFRAME to the light emission period PEM of the KthFRAME is similar to the configurations described in "2-2-1. First Example of Driving Method of Pixel Circuit 181A". Further, the voltages (potentials) of the first node N1, the second node N2, the third node N3 in the initial period of the horizontal period HRP of the light emission period PEM of the K−1stFRAME to the KthFRAME, the operations of the transistors, and the like are similar to the configurations and operations described in "2-2-1. First Example of Driving Method of Pixel Circuit 181A". Further, the voltages (potentials) of the first node N1, the second node N2, the third node N3 in the period at the end of the period PVH to the light emission period PEM of the KthFRAME, the operations of the transistors, and the like are similar to the configurations and operations described in "1-5-2. Second Example of Driving Method of Pixel Circuit 181A". Configurations and the like similar to those described in "2-2-1. First Example of Driving Method of Pixel Circuit 181A" and "1-5-2. Second Example of Driving Method of Self-luminous Display Device 10" will be described as necessary. In addition, the data signal VDATA of VSIGH corresponding to white is supplied to the image data signal SL(m) in the period between the light emission period PEM of the K−1stFRAME and the light emission period PEM of the KthFRAME.

In the light emission period PEM of the K−1stFRAME, the light-emitting element OLED emits light similar to the configuration described in "2-2-1. First Example of Driving Method of Pixel Circuit 181A".

In the period between the emission period PEM and the period PIP of the K−1stFRAME following the light emission period PEM of the K−1stFRAME, similar to the configuration described in "2-2-1. First Example of Driving Method of Pixel Circuit 181A", the voltage supplied to the second node N2 gradually drops from the voltage Vna toward the voltage Vnc, the voltage supplied to the first node N1 gradually drops from the voltage Vna toward the pre-charge voltage VPRC (voltage Vnd, 1.5 V), and the voltage supplied to the third node N3 maintains the voltage Vnb.

In the period PIP following the period between the light emission period PEM and the period PIP of the K−1stFRAME, similar to the configuration described in "2-2-1. First Example of Driving Method of Pixel Circuit 181A", the voltage supplied to the first node N1 becomes the voltage Vnd, the voltage supplied to the second node N2 and the voltage supplied to the third node N3 become the voltage Vnc, the potential difference Vgs becomes 0 V, and the potential difference Vds becomes 10 V. In addition, the light-emitting element OLED does not emit light.

As described above, in the period PIP, the pre-charge voltage (intermediate potential) is supplied to the first node N1, and the second node N2 and the third node N3 are initialized by the initialization voltage VINI1 (−2 V).

In the initial first period of the horizon period HRP of the KthFRAME following the period PIP, similar to the configuration described in "2-2-1. First Example of Driving Method of Pixel Circuit 181A", the voltage supplied to the first node N1 maintains the voltage Vnd, the voltage supplied to the second node N2 maintains the initialization voltage VINI1, the voltage supplied to the third node N3 maintains the voltage Vnc, and the light-emitting element OLED does not emit light.

In the period PWR following the initial period of the horizontal period HRP, each transistor operates similar to the configuration described in "2-2-1. First Example of Driving Method of Pixel Circuit 181A", the voltage supplied to the first node N1 gradually rises from the voltage Vnd toward the voltage VSIGH (voltage Vng, 3.5 V), the voltage supplied to the second node N2 maintains the voltage Vnc, the voltage supplied to the third node N3 maintains the voltage Vnc, and the light-emitting element OLED does not emit light.

In the middle of the period PWR, in the period PVH parallel to (overlapping) the period PWR, each transistor operates similar to the configuration described in "2-2-1. First Example of Driving Method of Pixel Circuit 181A", the voltage supplied to the first node N1 gradually rises from the voltage Vnd toward the voltage VSIGH (voltage Vng, 3.5 V) and becomes the voltage Vng, and the voltage supplied to the second node N2 gradually rises from the voltage Vnc toward the initialization voltage VINI2 (0 V) and becomes the initialization voltage VINI2 (0 V).

Immediately after the start of the period PVH, the potential difference Vgs is 0 V, the potential difference Vds is 10 V, and the second transistor T2 is in the OFF state. In addition, the fifth transistor T5 is also in the OFF state. On the other hand, the fourth transistor T4 is in the ON state, and the voltage supplied to the second node N2 rises from the voltage Vnc toward the initialization voltage VINI2 (0 V). Since the voltage supplied to the second node N2 is directed to 0 V, the potential difference Vgs exceeds the threshold voltage VTH. As a result, the second transistor T2 is turned on, charging of the third node N3 begins, and the voltage supplied to the third node N3 gradually rises.

When the potential difference Vgs between the voltage supplied to the second node N2 and the voltage supplied to the third node N3 becomes the threshold voltage VTH, the voltage supplied to the second node N2 and the voltage supplied to the third node N3 maintain the respective voltages at that time. For example, as shown in FIG. 28, the voltage supplied to the second node N2 is the initialization voltage VINI2 (0 V), and the voltage supplied to the third node N3 is the voltage Vne (−1 V). Since the second transistor T2 is in the OFF state and no current flows from the drive power line PVDD to the reference voltage line PVSS, the light-emitting element OLED does not emit light.

In the period at the end of the period PVH, each transistor operates similar to the configuration described in "1-5-2. Second Example of Driving Method of Self-luminous Display Device 10". As a result, in the period at the end of the period PVH, the first node N1 and the second node N2 are conductive and the voltage of the second node N2 gradually rises similar to the configuration described in "1-5-2. Second Example of Driving Method of Self-luminous Display Device 10". As a result, the second transistor T2 is in the conductive state, and the drain current Ion flows from the drive power line PVDD to the reference voltage line PVSS. Therefore, the voltages of the first node N1 and the third node N3 rise to follow the rise in the voltage of the second node N2. Due to the rise in the voltage of the third node N3, the voltages of the first node N1 and the second node N2 further rise.

In addition, in the light emission period PEM of the KthFRAME following the horizontal period HRP of the KthFRAME, each light-emitting element OLED emits light similar to the configuration described in "1-5-2. Second Example of Driving Method of Self-luminous Display Device 10". For example, white light is emitted by three pixels using the pixel 180A emitting red light, the pixel 180A emitting blue light, and the pixel 180A emitting green light.

As described above, in the period PWR, the data signal VDATA is written to the pixel 180A. Further, in the period PVH, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS). Furthermore, in the light emission period PEM of the KthFRAME, white light is emitted by three pixels.

The second example of the driving method of the pixel circuit 181A including the configuration described above has similar advantageous effects as those described in "2-2-1. First Example of Driving Method of Pixel Circuit 181A".

[2-2-3. Third Example of Driving Method of Pixel Circuit 181A]

A third example of the driving method of the pixel circuit 181A will be described with reference to FIG. 29. The driving method shown in the third example of the driving method of the pixel circuit 181A includes displaying images of the same color (black) in consecutive frames as in the Third Example of Driving Method of Self-luminous Display Device 10 according to the first embodiment. Configurations that are the same as or similar to those in FIG. 1 to FIG. 28 will be described as necessary.

The configurations of the image data signal SL(m), the first scan signal SC1(*n*), the second scan signal SC2(*n*), the third scan signal SC3(*n*), the fourth scan signal SC4(*n*), and the scan voltage power supply SIR(n) in the light emission period PEM of the K−1stFRAME to the light emission period PEM of the KthFRAME are similar to the configurations described in "2-2-1. First Example of Driving Method of Pixel Circuit 181A". Further, the voltages (potentials) of the first node N1, the second node N2, the third node N3 in the light emission period of the K−1stFRAME, the operations of the transistors, and the like are similar to the configurations and the operations described in "1-5-3. Third Example of Driving Method of Self-luminous Display Device 10". Further, the voltages (potentials) of the first node N1, the second node N2, the third node N3 in the initial period of the horizontal period HRP of the KthFRAME to the light emission period PEM of the KthFRAME, the operations of the transistors, and the like are similar to the configurations and operations described in "2-2-1. First Example of Driving Method of Pixel Circuit 181A". The configurations and the like described in "2-2-1. First Example of Driving Method of Pixel Circuit 181A" and "1-5-3. Third Example of Driving Method of Self-luminous Display Device 10" will be described as necessary. In addition, the data signal VDATA of the voltage VSIGL corresponding to black is supplied to the image data signal SL(m) in the period between the light emission period PEM of the K−1stFRAME and the light emission period PEM of the KthFRAME.

In the light emission period PEM of the K−1stFRAME, similar to the configuration described in "1-5-3. Third Example of Driving Method of Self-luminous Display Device 10", the light-emitting element OLED does not emit light and the pixel 180A is black.

In the period between the light emission period PEM and the period PIP of the K−1stFRAME following the light emission period PEM of the K−1stFRAME, similar to the configuration described in "1-5-3. Third Example of Driving Method of Self-luminous Display Device 10", the voltage supplied to the first node N1 is maintained at the voltage Vnf, the voltage supplied to the second node N2 gradually drops from the voltage Vnf toward the initialization voltage VINI1 (Vnc, −2 V). In addition, the voltage supplied to the third node N3 gradually drops from the voltage Vne toward the initialization voltage VINI1 (Vnc, −2 V). Further, the light-emitting element OLED does not emit light.

In the period PIP following the period between the light emission period PEM and the period PIP of the K−1stFRAME, the voltage supplied to the first node N1 gradually rises from the voltage Vnf toward the pre-charge voltage VPRC (voltage Vnd, 1.5 V) and becomes the voltage Vnd. The voltage supplied to the second node N2 gradually drops from the voltage Vnf toward the voltage Vnc and becomes the voltage Vnc. The voltage supplied to the third node N3 gradually drops from the voltage Vne toward the voltage Vnc and becomes the voltage Vnc. The potential difference Vgs is 0 V and the potential difference Vds is 10 V. The light-emitting element OLED does not emit light.

As described above, in the period PIP, the pre-charge voltage (intermediate potential) is supplied to the first node N1, and the second node N2 and the third node N3 are initialized by the initialization voltage VINI1 (−2 V).

As described above, the voltages (potentials) of the first node N1, the second node N2, the third node N3 in the initial period of the horizon period HRP of the KthFRAME to the light emission period PEM of the KthFRAME following the period PIP, the operations of the transistors, and the like are similar to the configurations and operations described in "2-2-1. First Example of Driving Method of Pixel Circuit 181".

Further, in the period PWR, the data signal VDATA (in the third example, the voltage VSIGL) is written to the pixel 180A similar to the configuration described in "2-2-1. First Example of Driving Method of Pixel Circuit 181A". Further, in the period PVH, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS).

Furthermore, in the light emission period PEM of the KthFRAME, similar to the configuration described in "2-2-1. First Example of Driving Method of Pixel Circuit 181A", three pixels using the pixel 180A emitting red light, the pixel 180A emitting blue light, and the pixel 180A emitting green light become black.

The third example of the driving method of the pixel circuit 181A including the configuration described above has similar advantageous effects as those described in "2-2-1. First Example of Driving Method of Pixel Circuit 181A".

[2-2-4. Fourth Example of Driving Method of Pixel Circuit 181A]

A fourth example of the driving method of the pixel circuit 181A will be described with reference to FIG. 30. The driving method shown in the fourth example of the driving method of the pixel circuit 181A includes displaying images of different colors in consecutive frames similar to the fourth example of the driving method of the self-luminous display device 10 according to the first embodiment. Configurations that are the same as or similar to those in FIG. 1 to FIG. 29 will be described as necessary.

The configurations of the image data signal SL(m), the first scan signal SC1($n$), the second scan signal SC2($n$), the third scan signal SC3($n$), the fourth scan signal SC4($n$), and the scan voltage power supply SIR(n) in the light emission period PEM of the K−1stFRAME to the light emission period PEM of the KthFRAME are similar to the configurations described in "2-2-1. First Example of Driving Method of Pixel Circuit 181A". Further, the voltages (potentials) of the first node N1, the second node N2, the third node N3 in the light emission period to the period PIP of the K−1stFRAME, the operations of the transistors, and the like are similar to the configurations and operations described in "2-2-3. Third Example of Driving Method of Pixel Circuit 181A". Further, the voltages (potentials) of the first node N1, the second node N2, the third node N3 in the initial period of the horizontal period HRP of the KthFRAME to the light emission period PEM of the KthFRAME, the operations of the transistors, and the like are similar to the configurations and operations described in "2-2-2. Second Example of Driving Method of Pixel Circuit 181A". The configurations and the like described in "2-2-1. First Example of Driving Method of Pixel Circuit 181A", "2-2-2. Second Example of Driving Method of Pixel Circuit 181A", and "2-2-3. Third Example of Driving Method of Pixel Circuit 181A" will be described as necessary. In addition, the data signal VDATA including the voltage VSIGH corresponding to white is supplied to the image data signal SL(m) in the period between the light emission period PEM of the K−1stFRAME and the light emission period PEM of the KthFRAME.

In the light emission period PEM of the K−1stFRAME, the pixel 180 (pixel circuit 181) is black similar to "2-2-3. Third Example of Driving Method of Pixel Circuit 181A".

In the period PIP, similar to "2-2-3. Third Example of Driving Method of Pixel Circuit 181A", the pre-charge voltage (intermediate potential) is supplied to the first node N1, and the second node N2 and the third node N3 are initialized by the initialization voltage VINI2 (−2 V).

In the period PWR, similar to "2-2-2. Second Example of Driving Method of Pixel Circuit 181A", the data signal VDATA (in the fourth example, the voltage VSIGH) is written to the pixel 180A. Further, in the period PVH, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS).

Further, in the light emission period PEM of the KthFRAME, similar to "2-2-2. Second Example of Driving Method of Pixel Circuit 181A", the pixel 180 emitting red light emits light, the pixel 180 emitting blue light emits light, and the pixel 180 emitting green light emits light, and white light is emitted by three pixels using the pixel 180 emitting red light, the pixel 180 emitting blue light, and the pixel 180 emitting green light.

The fourth example of the driving method of the pixel circuit 181A including the configuration described above has similar advantageous effects as those described in "2-2-1. First Example of Driving Method of Pixel Circuit 181A".

[2-3. Configuration of Control Circuit 120A]

An overview of the control circuit 120A will be described with reference to FIG. 2, FIG. 31 to FIG. 33. FIG. 31 is a schematic diagram showing a configuration of the control circuit 120A, FIG. 32 is a circuit diagram showing a circuit configuration of the scan driver 160A(n), and FIG. 33 is a timing chart of the control circuit 120A. The configurations of the control circuit 120A and the scan driver 160A(n) and the timing charts shown in FIG. 31 to FIG. 33 are examples, and the configurations of the control circuit 120A and the scan driver 160A(n) and the timing charts are not limited to the configurations shown in FIG. 31 to FIG. 33. Configurations similar to those of the control circuit 120 will be described as necessary. Configurations that are the same as or similar to those in FIG. 1 to FIG. 30 will be described as necessary.

The self-luminous display device according to the second embodiment includes two control circuits 120A. The self-luminous display device according to the second embodiment includes a configuration in which the two control circuits 120 shown in FIG. 2 are replaced with the two control circuits 120A.

As shown in FIG. 31, the control circuit 120A includes the shift register circuit 130 and a plurality of scan drivers 160A(n). For example, the clock signal CLK, the start pulse STV, the enable signal EN1, the enable signal EN1B, the control signal such as the enable signal EN2 and the enable signal EN2B, a voltage VCM2 and a voltage VCZ, and a voltage such as the drive voltage VDDEL and the reference voltage VSSEL are input to the control circuit 120A. The control circuit 120A can sequentially select the scan lines by inputting the control signal and power supply.

The shift register 130 is electrically connected to the plurality of scan drivers 160A(n). The shift register circuit 130 includes a configuration similar to that of the control circuit 120. In addition, the shift register circuit 130 generates a plurality of output signals (the output signal SR1($n$), the output signal SR2($n$), the output signal SR3($n$), the output signal SR4($n$), the output signal SR5($n$), . . . ) shifted at different timings, and sequentially outputs the output signals to the plurality of scan drivers (for example, a scan driver 160A(1), a scan driver 160A(2), a scan driver 160A(3), and the like).

The shift register 111 is electrically connected to the scan driver 160A(1) and supplies the output signal SR1(*n*) to the input terminals IN1 and IN4 of the scan driver 160A(1). The shift register 112 is electrically connected to the scan drivers 160A(1) and 160A(2) and supplies the output signal SR2(*n*) to the input terminal IN5 of the scan driver 160A(1), and the input terminals IN1 and IN4 of the scan driver 160A(2). The shift register 113 is electrically connected to the scan drivers 160A(1), 160A(2), and 160A(3), and supplies the output signal SR3(*n*) to the input terminals IN2 and IN6 of the scan driver 160A(1), the input terminal IN5 of the scan driver 160A(2), and the input terminals IN1 and IN4 of the scan driver 160A(3). The shift register 114 is electrically connected to the scan drivers 160A(2) and 160A(3), and supplies the output signal SR4(*n*) to the input terminals IN2 and IN6 of the scan driver 160A(2) and the input terminal IN5 of the scan driver 160A(3). The shift register 115 is electrically connected to the scan driver 160A(3) and supplies the output signal SR5(*n*) to the input terminals IN2 and IN6 of the scan driver 160A(3).

The scan driver 160A(n) has nine input terminals (input terminals IN1 to IN9) and five output terminals (output terminals OUT1 to OUT5). The enable signal EN1B, the enable signal EN2, and the enable signal EN2B are supplied from the IC chip 110 to the scan driver 160A(n) via the plurality of connection wirings 342, the voltage VCM2 and the voltage VCZ are supplied via the plurality of connection wirings 342 from the IC chip 110, the drive voltage VDDEL is supplied via the drive power line PVDD, and the reference voltage VSSEL is supplied via the reference voltage line PVSS. The scan driver 160A(n) sequentially supplies the scan signals having different timings (e.g., the first scan signal SC1(*n*), the second scan signal SC2(*n*), the third scan signal SC3(*n*), the fourth scan signal SC4(*n*), and the scan voltage power supply SIR(n)) to each scan signal line or the connection wiring 342 based on the above-described output signals, the enable signal EN1, the enable signal EN1B, the enable signal EN2, the enable signal EN2B, the voltage VCM2, and the voltage VCZ, and drives the pixel 180A electrically connected to each scan signal line or the connection wiring 342. The connection wiring 342 to which the voltage VCM2 is supplied is electrically connected to the respective input terminals IN8 of the scan driver 160A(1), the scan driver 160A(2), and the scan driver 160A(3), and the connection wiring 342 to which the voltage VCZ is supplied is electrically connected to the respective input terminals IN9 of the scan driver 160A(1), the scan driver 160A(2), and the scan driver 160A(3). The voltage VCM2 is −2 V, the same as the initialization voltage VINI1, and the voltage VCZ is 0 V, the same as the initialization voltage VINI2.

For example, as shown in FIG. 32, the scan driver 160A(n) includes a configuration in which the input terminals IN8 and IN9, the output terminal OUT5, an inverter circuit INV7, and transistors TR2 and TR3 are added to the configuration of the scan driver 160(*n*). The transistor TR2 is electrically connected to the input terminal IN8, the output terminals OUT2 and OUT5, and the inverter circuit INV7. The transistor TR3 is electrically connected to the input terminal IN9, the inverter circuit INV7, and the output terminal OUT2. For example, as shown in FIG. 31, the control signals are input to the nine input terminals (input terminals IN1 to IN9). Further, as shown in FIG. 31, the first scan signal SC1(*n*) is output to the scan signal line 330 electrically connected to the output terminal OUT1, the second scan signal SC2(*n*) is output to the scan signal line 331 electrically connected to the output terminal OUT2, the third scan signal SC3(*n*) is output to the scan signal line 332 electrically connected to the output terminal OUT3, the fourth scan signal SC4(*n*) is output to the scan signal line 333 electrically connected to the output terminal OUT4, and the scan voltage power supply SIR(n) is output to the scan voltage power line SVIR electrically connected to the output terminal OUT5.

Next, a driving method of the control circuit 120A will be described with reference to FIG. 33. The configuration of the control circuit 120A is different from the configuration of the control circuit 120 described in "1-3. Control Circuit 120" in the rising edge of the second scan signal SC2(*n*), the rising edge of the third scan signal SC3(*n*), and the scan voltage power supply SIR(n). Therefore, the rising edge of the second scan signal SC2(*n*), the rising edge of the third scan signal SC3(*n*), and the scan voltage power supply SIR(n) will be described here.

For example, referring to FIG. 31 to FIG. 33, the second scan signal SC2(*n*) is generated based on the rising edge of the enable signal ENB2 and the falling edge of the output signal SR1(*n*), and the third scan signal SC3(*n*) is generated based on the rising edge of the output signal SR1(*n*) and the falling edge of the output signal SR2(*n*). Further, the scan voltage power supply SIR(n) is supplied with a voltage SC2 based on a timing at which LO of the second scan signal SC2(*n*) is input, and the voltage VCM2 (−2 V) based on a timing at which HI of the second scan signal HI(n) is input. That is, as described in "2-1. Configuration of Pixel 180A", the scan voltage power supply SIR(n) is a signal line used by changing the voltage (potential).

3. Third Embodiment

Figure 34:
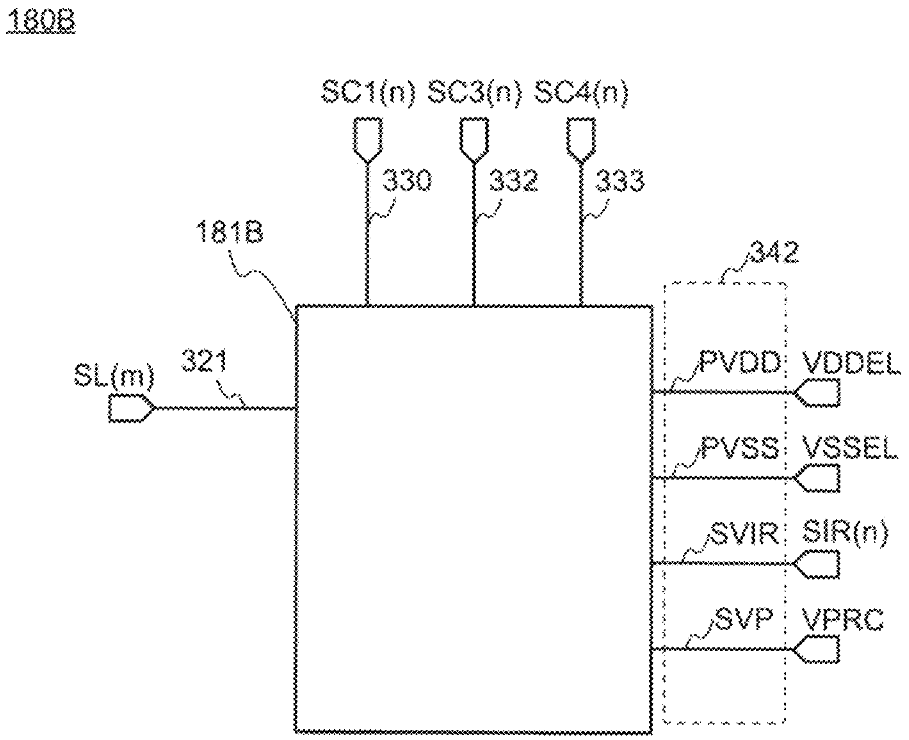
FIG. 34 is a schematic diagram showing an input signal to a pixel circuit according to the third embodiment of the present invention.
Figure 35:
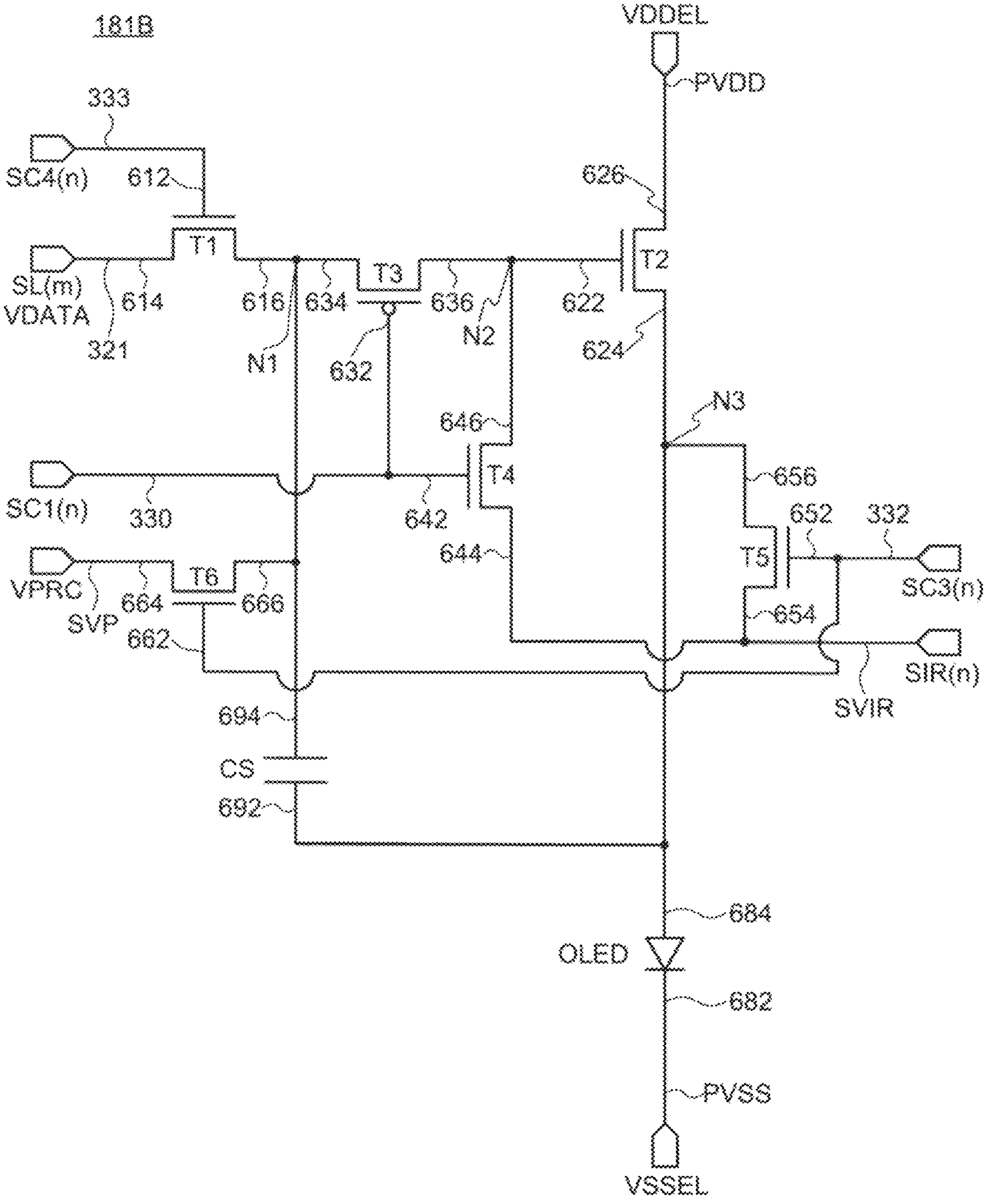
FIG. 35 is a circuit diagram showing a configuration of a pixel circuit according to the third embodiment of the present invention.
Figure 38:
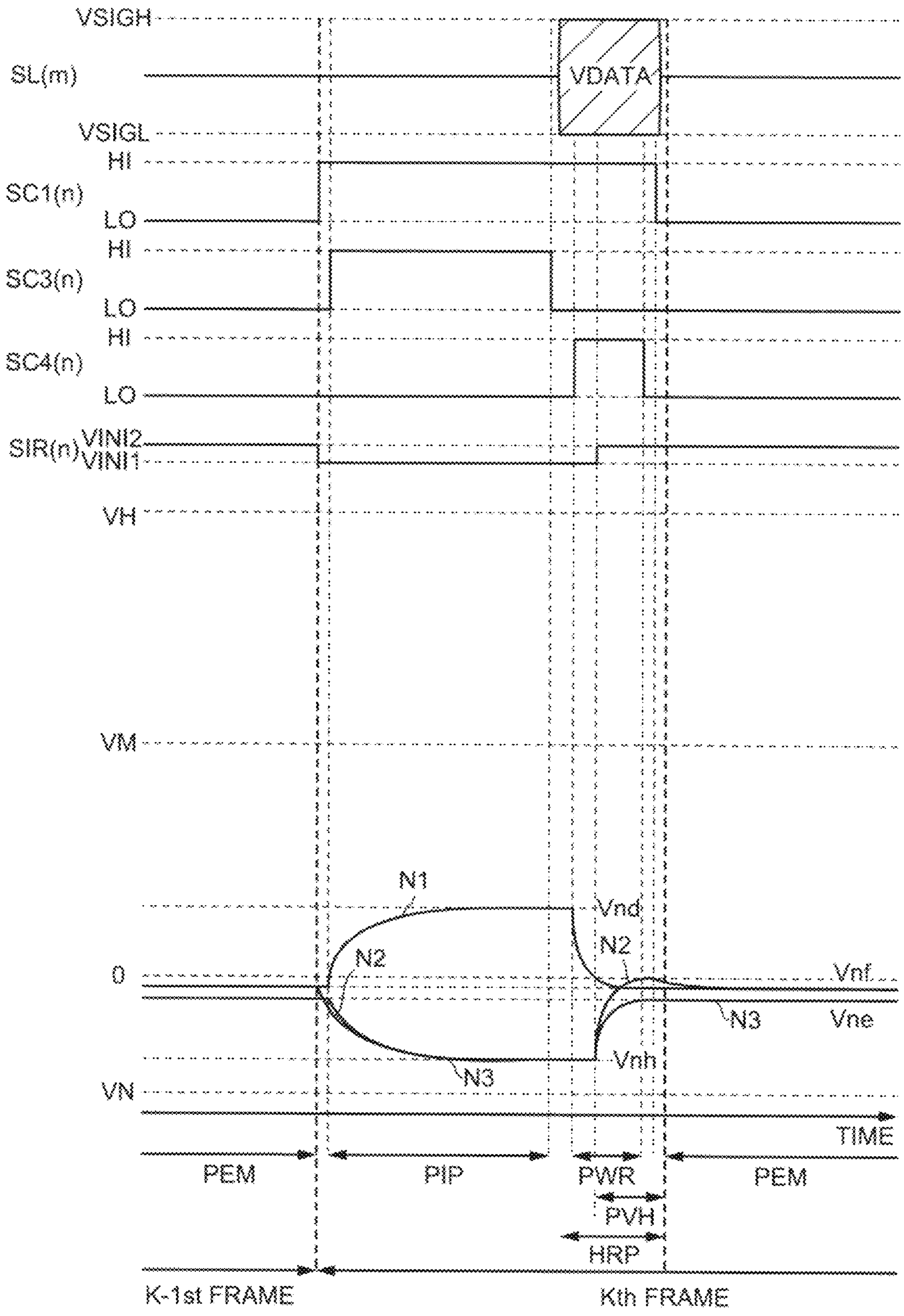
FIG. 38 is a timing chart of a self-luminous display device according to the third embodiment of the present invention.
Figure 39:
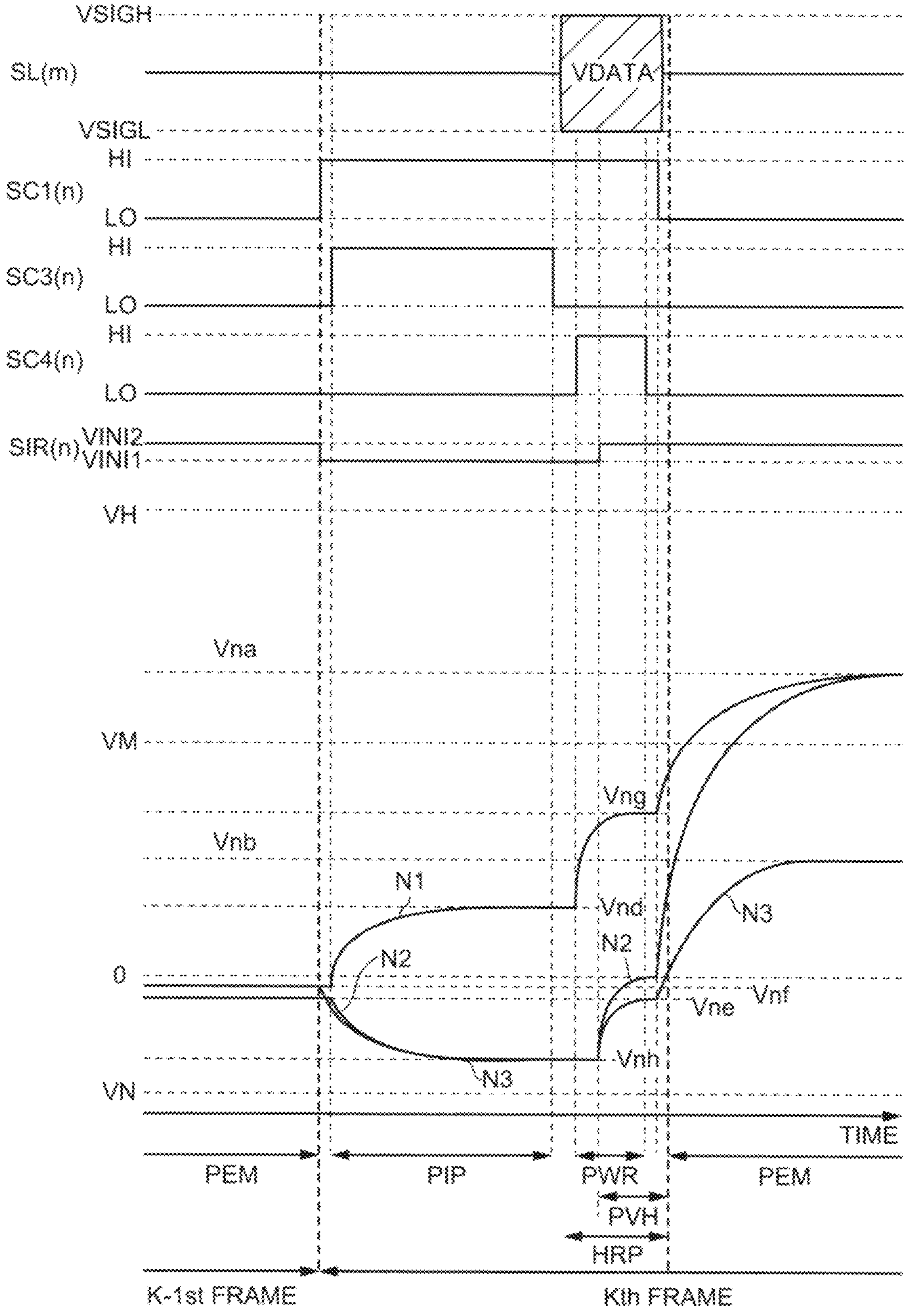
FIG. 39 is a timing chart of a self-luminous display device according to the third embodiment of the present invention.
Figure 40:
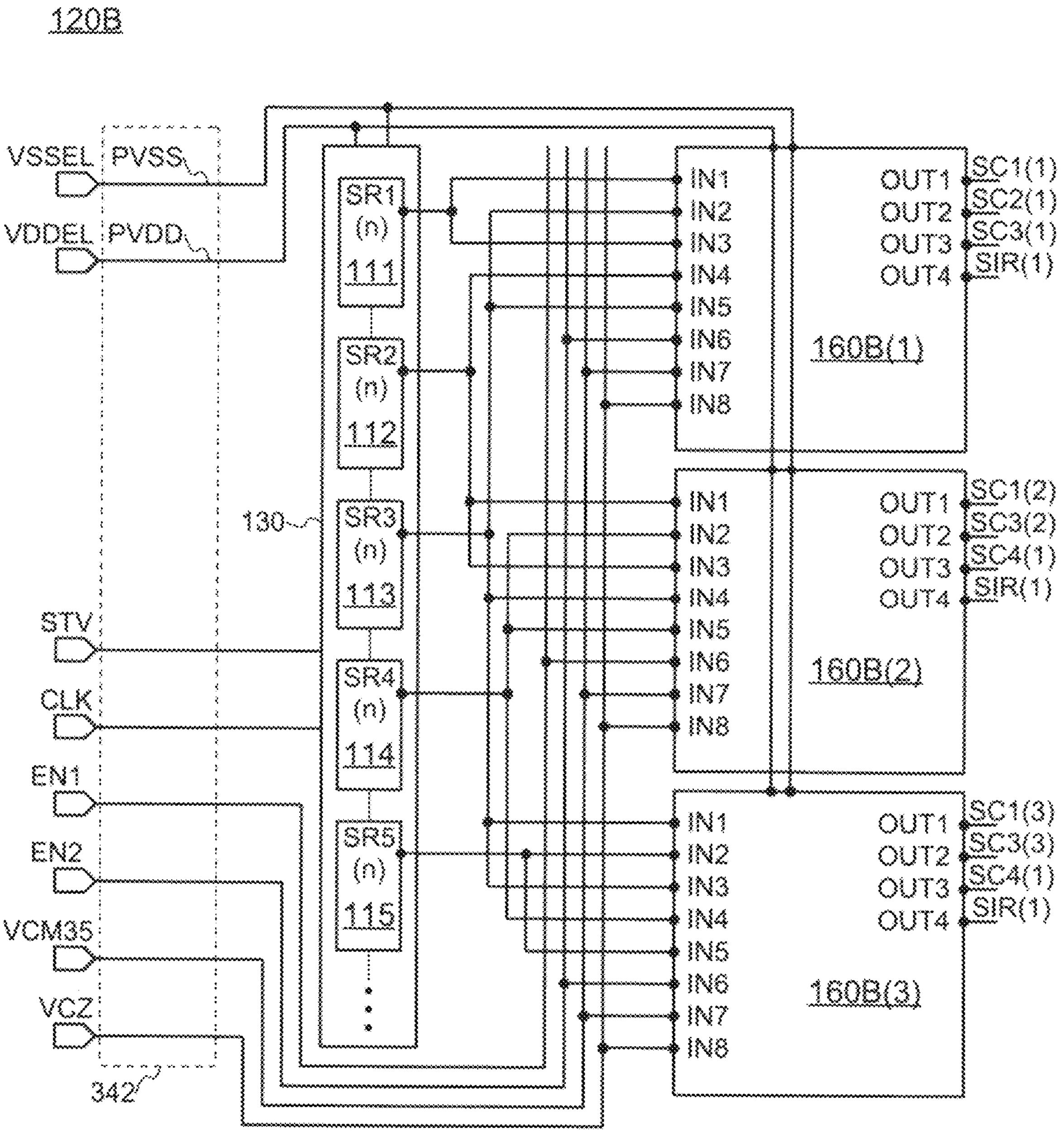
FIG. 40 is a schematic diagram showing a configuration of a control circuit according to the third embodiment of the present invention.
Figure 41:
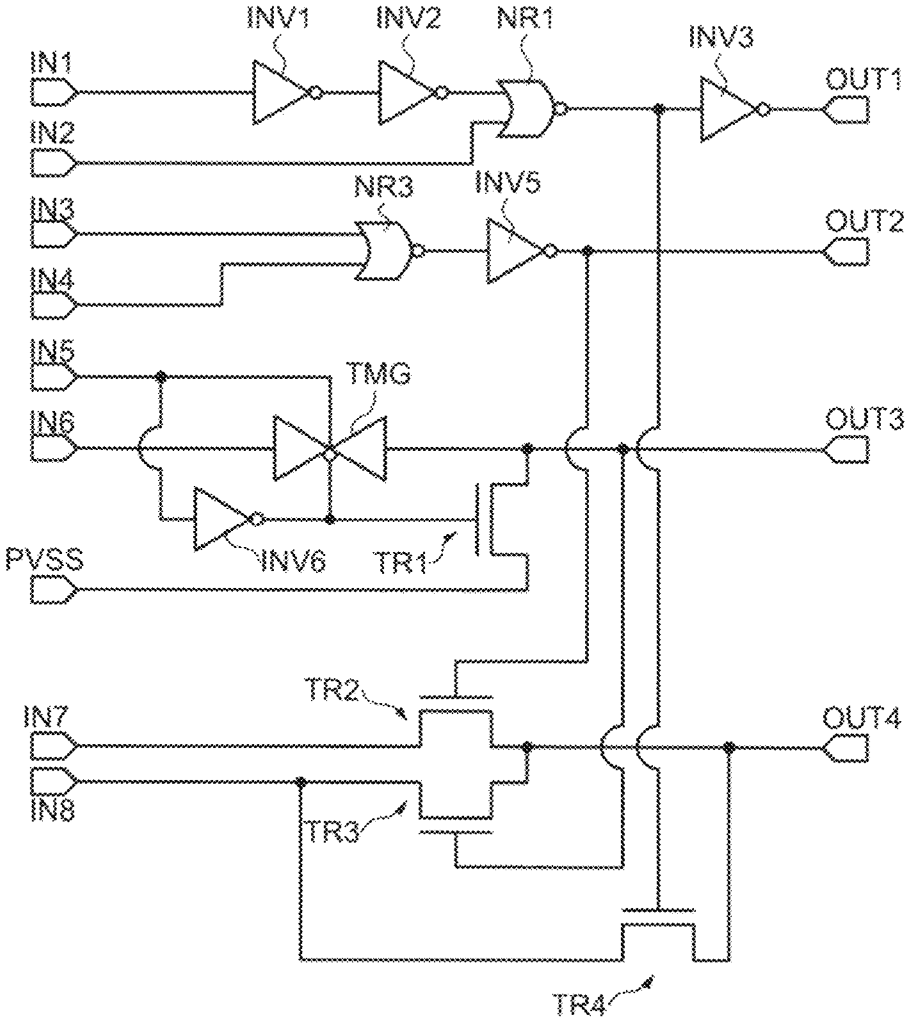
FIG. 41 is a circuit diagram showing a configuration of a control circuit according to the third embodiment of the present invention.
Figure 42:
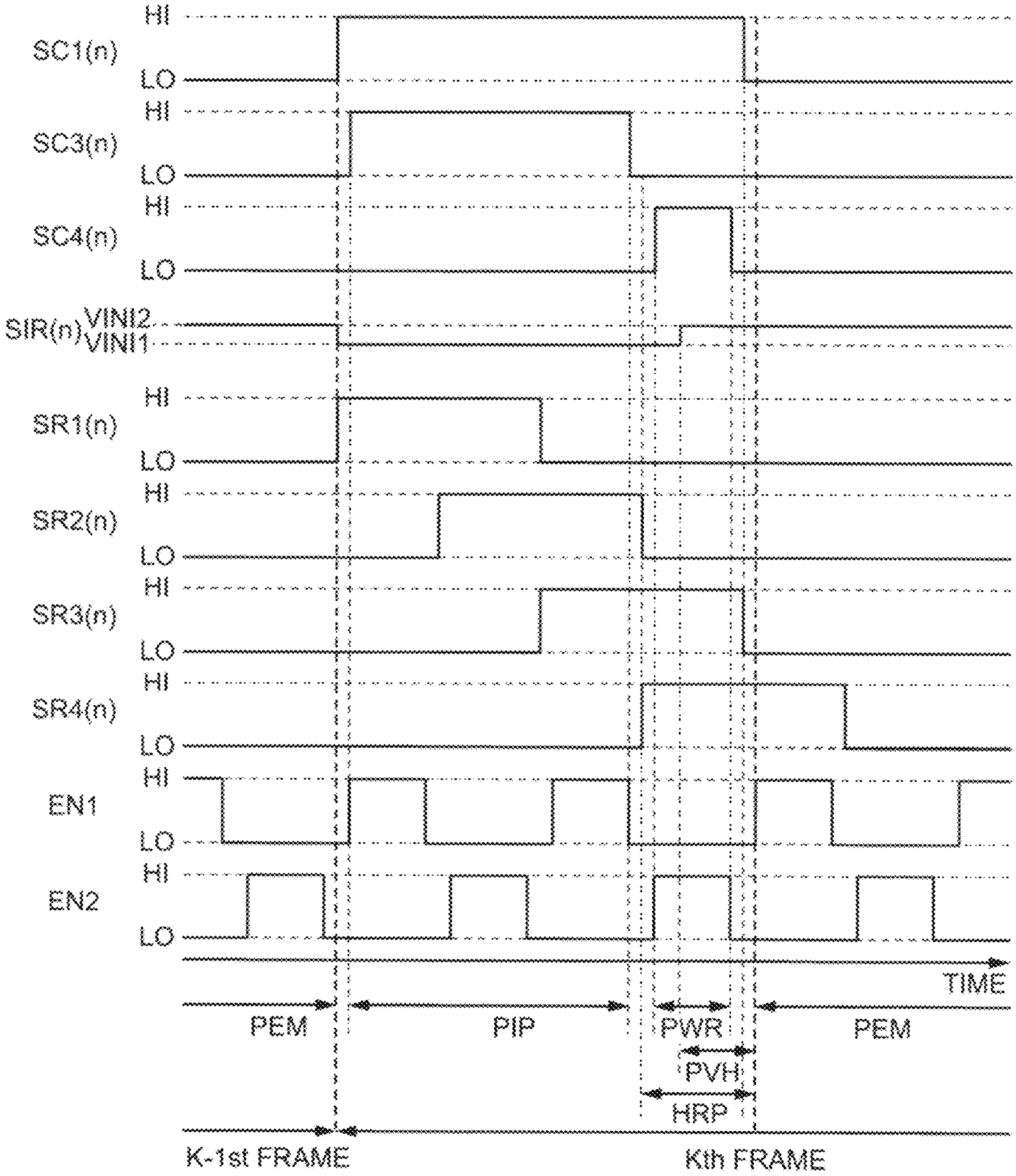
FIG. 42 is a timing chart of a control circuit according to the third embodiment of the present invention.

An overview of the self-luminous display device according to the third embodiment will be described with reference to FIG. 1, FIG. 6, and FIG. 34 to FIG. 42. FIG. 34 is a schematic diagram showing an input signal to a pixel 180B (pixel circuit 181B) according to the third embodiment, FIG. 35 is a circuit diagram showing a configuration of the pixel circuit 181B, and FIG. 36 to FIG. 39 are timing charts of the self-luminous display device according to the third embodiment. FIG. 40 is a schematic diagram showing a configuration of the control circuit 120B according to the third embodiment, FIG. 41 is a circuit diagram showing a configuration of a scan driver 160B(n) according to the third embodiment, and FIG. 42 is a timing chart of the control circuit 120B.

The self-luminous display device according to the third embodiment includes the pixel 180B, the pixel circuit 181B, and the control circuit 120B. The configurations of the pixel 180B and the pixel circuit 181B, and the configuration of the control circuit 120B are different from the configurations of the pixel 180A and the pixel circuit 181A of the self-luminous display device according to the second embodiment, and the configuration of the control circuit 120A. Specifically, the self-luminous display device according to the third embodiment has a configuration and function in which the third scan signal SC3(*n*) supplied to the pixel circuit 181B serves as both the second scan signal SC2(*n*) and the third scan signal SC3(*n*) supplied to the pixel 180A. That is, the self-luminous display device according to the third embodiment does not include the second scan signal SC2(*n*). Further, the self-luminous display device according to the third embodiment has a configuration and function in which the control circuit 120A is replaced with the control circuit 120B. Other configurations and functions are similar to those of the self-luminous display device according to the second embodiment. In describing the configuration and function of the third embodiment, configurations and functions similar to those of the self-luminous display device 10 according to the first embodiment or the self-luminous display device according to the second embodiment will be described as necessary. In addition, configurations that are the same as or similar to those in FIG. 1 to FIG. 33 will be described as necessary.

[3-1. Configuration of Pixel 180B]

An overview of the pixel 180B and the pixel circuit 181B will be described with reference to FIG. 34 and FIG. 35.

The pixel circuit 181B is connected to the scan signal line 332. The scan signal line 332 connected to the pixel circuit 181B is a signal line serving as both the scan signal line 331 and the scan signal line 332 connected to the pixel circuit 181A. In other words, the scan signal line 332 connected to the pixel circuit 181B is a signal line that combines the scan signal line 331 and the scan signal line 332 connected to the pixel circuit 181A. Therefore, the pixel circuit 181B does not include the scan signal line 331. The scan signal line 332 according to the third embodiment may be referred to as a sixth control signal line. The third scan signal SC3(*n*) according to the third embodiment may be referred to as a sixth control signal.

The scan signal line 332 according to the third embodiment is supplied with the third scan signal SC3(*n*) serving as both the second scan signal SC2(*n*) and the third scan signal SC3(*n*) supplied to the pixel circuit 181A. In the pixel circuit 181B, the gate electrode 652 of the fifth transistor T5 and the gate electrode 662 of the sixth transistor T6 are electrically connected to the scan signal line 332.

The switching of the fifth transistor T5 is controlled using the third scan signal SC3(*n*). In other words, the conductive state (ON state) and the non-conductive state (OFF state) of the fifth transistor T5 are controlled by the third scan signal SC3(*n*). When the signal supplied to the fifth scan signal SC5(*n*) is LO, the fifth transistor T5 is in the non-conductive state, and when the signal supplied to the third scan signal SC3(*n*) is HI, the fifth transistor T5 is in the conductive state. Other configurations and functions of the fifth transistor T5 are similar to the configurations and functions of the fifth transistor T5 according to the second embodiment.

Configurations and functions of the pixel circuit 181B other than the configurations and functions described in "3-1. Configuration of Pixel 180B" are similar to those of the pixel circuit 181A.

[3-2. Driving Method of Pixel Circuit 181B]

The driving method of the self-luminous display device 10 according to the third embodiment will be described with reference to FIG. 36 to FIG. 39. Configurations that are the same as or similar to those in FIG. 1 to FIG. 35 will be described as necessary. In addition, similar to the first embodiment, the horizontal axis of the timing charts represents time (TIME).

The driving method of the self-luminous display device according to the third embodiment has a configuration and function in which the operation related to the second scan signal SC2(*n*) and the third scan signal SC3(*n*) in the driving method of the self-luminous display device according to the second embodiment is replaced with an operation in which the third scan signal SC3(*n*) also serves as the second scan signal SC2(*n*). The configuration and functions other than the operation in which the third scan signal SC3(*n*) also serves as the second scan signal SC2(*n*) are similar to those of the driving method of the self-luminous display device according to the second embodiment.

The driving method of the self-luminous display device according to the third embodiment includes periods similar to those of the driving method of the self-luminous display device 10 according to the first embodiment shown in FIG. 6.

In one horizontal period (horizontal period HRP) in the driving method for the self-luminous display device 10 according to the third embodiment, the first scan signal SC1(*n*), the third scan signal SC3(*n*), the fourth scan signal SC4(*n*), the image data signal SL(m) including the data signal VDATA, and the scan voltage power supply SIR(n) are input to the pixel 180B (pixel circuit 181B). For example, the pixel 180B is selected according to the timings of the first scan signal SC1(*n*), the third scan signal SC3(*n*), and the fourth scan signal SC4(*n*). The image data signal SL(m) and the scan voltage power supply SIR(n) are input to the selected pixel 180B according to the timings of the respective signals. Similar operations are performed on all the pixels 180B, and an image of the frame corresponding to 1FRAME is displayed on the display region 22 of the self-luminous display device 10 based on the image data signal SL(m) input to all the pixels 180B.

For example, the voltages (potentials) supplied to each signal and each node of each frame in the timing charts shown in FIG. 36 to FIG. 39 and FIG. 42 are shown in Table 5 and Table 6.

TABLE 5

| | PIP | PWR<br>PVH | PEM |
|---|---|---|---|
| SC1(n) | HI | HI | LO |
| SC2(n) | HI | LO | LO |
| SC4(n) | LO | HI | LO |
| SIR(n) | −1.5 [V] | 0 [V] | 0 [V] |
| SL(m) | — | −0.5 [V](Black)<br>~3.5 [V](White) | — |
| N1 | 1.5 [V]<br>(Intermediate potential) | −0.5 [V]~3.5 [V] | Rise in conjunction with the rise of potential of N3 |
| N2 | −3.5 [V] | 0 [V] | In conjunction with Potential of N1 |
| N3 | −3.5 [V] | −1 [V]<br>(=VREF-VTH) | Rise in conjunction with Ion with VGS |
| Vgs<br>(= V(N2)-V(N3)) | 0 [V] | 1 [V] | |
| Remarks | Initialize T2 and OLED<br>Apply precharge | Apply VDATA to CS<br>Acquiring and | Light emitting<br>VGS = VDATA-(VREF-VTH) |

TABLE 5-continued

| PIP | PWR PVH | PEM |
|---|---|---|
| potential (intermediate potential) to CS | retaining VTH Potential of N3 = VREF-VTH Potential of N1-Potential of N3 = VDATA-(VREF-VTH) Non-light emitting below VTHEL | |

TABLE 6

| | Setting value [V] |
|---|---|
| VTH | 1 |
| VTHEL | 0.7 |
| VSIGL(Black) | −0.5 |
| VSIGH(White) | 3.5 |
| HI | 10 |
| LO | −5.5 |
| VINI1 | −3.5 |
| VINI2 | 0 |
| VPRC | 1.5 |
| VDDEL | 8 |
| VSSEL | 0 |

For example, as shown in Table 6, the initialization voltage VINI1 is −3.5 V and the voltage VL (LO) is −5.5 V. The setting values of other voltages are the same as the setting values shown in Table 4 described in "2-2. Driving Method of Pixel Circuit 181A".

Further, in order to smoothly obtain the threshold voltage VTH, a threshold voltage VTHEL of the light-emitting element OLED is greater than (initialization voltage VINI2−threshold voltage VTH), and (initialization voltage VINI2−threshold voltage VTH) is set to (the voltage supplied to the first node N1 (voltage VSIGH)−(the voltage supplied to the first node N1 (intermediate potential)−initialization voltage VINI1)).

[3-2-1. First Example of Driving Method of Pixel Circuit 181B]

Figure 36:
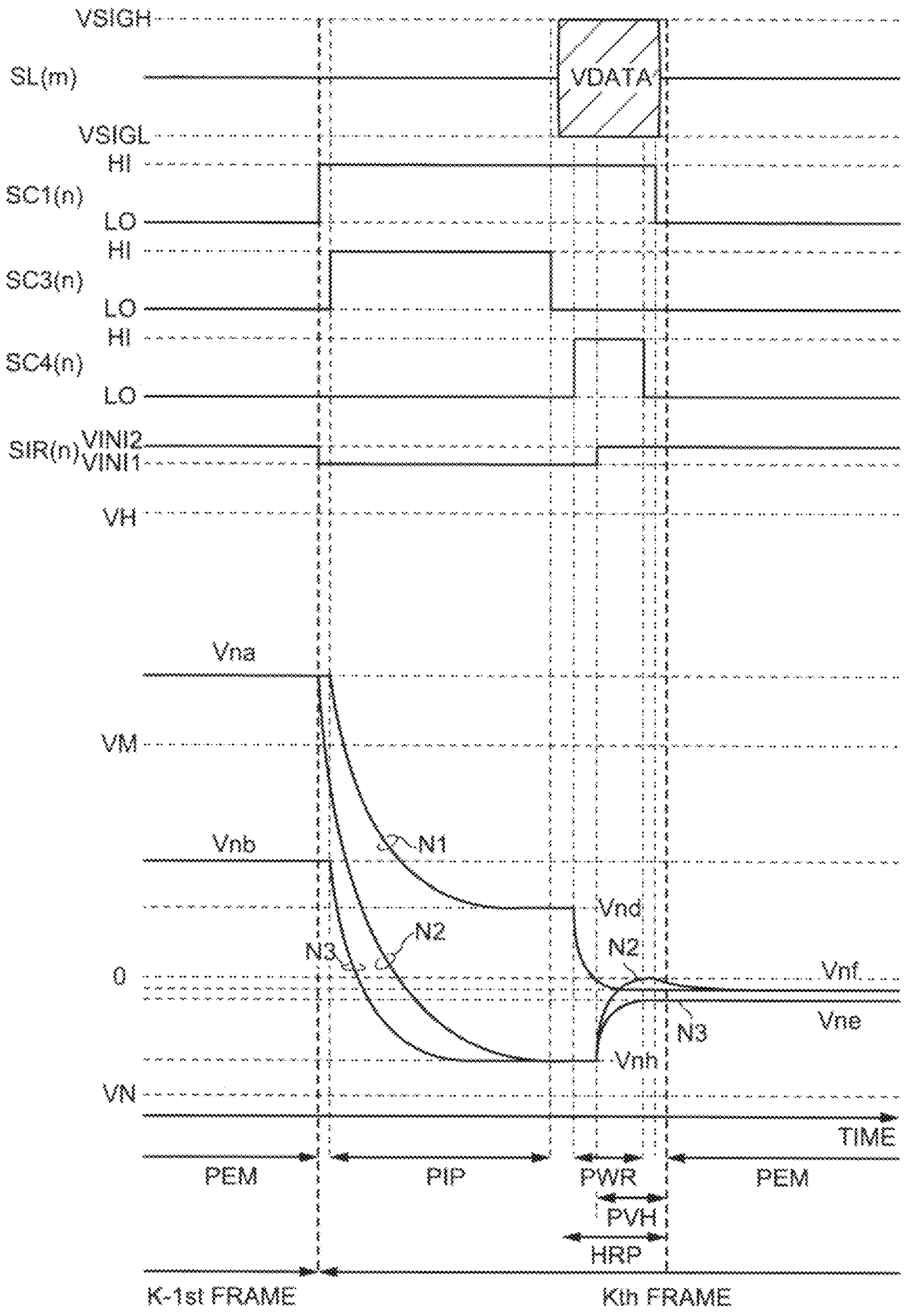
FIG. 36 is a timing chart of a self-luminous display device according to the third embodiment of the present invention.

A first example of the driving method of the pixel circuit 181B will be described with reference to FIG. 36. The first example of the driving method of the pixel circuit 181B includes displaying images of different colors in consecutive frames, similar to the first example of the driving method of the self-luminous display device according to the second embodiment.

Configurations of the image data signal SL(m), the first scan signal SC1(*n*), the third scan signal SC3(*n*), the fourth scan signal SC4(*n*), and the scan voltage power supply SIR(n) in the light emission period PEM of the K−1stFRAME and the light emission period PEM of the KthFRAME are similar to the configurations described in "2-2-1. First Example of Driving Method of Pixel Circuit 181A". Further, the voltages (potentials) of the first node N1, the second node N2, the third node N3 in the light emission period PEM of the K−1stFRAME and the light emission period PEM of the KthFRAME, the operation of the transistors, and the like are similar to the configurations described in "2-2-1. First Example of Driving Method of Pixel Circuit 181A".

In the light emission period PEM of the K−1stFRAME, the light-emitting element OLED emits light similar to the configuration described in "2-2-1. First Example of Driving Method of Pixel Circuit 181A".

In the period between the light emission period PEM and the period PIP of the K−1stFRAME following the light emission period PEM of the K−1stFRAME, the pixel 180B holds the data signal VDATA of the voltage VSIGL corresponding to the non-light-emitting black color. The scan voltage power supply SIR(n) changes from the state in which the initialization voltage VINI2 (0 V) is supplied to the state in which the initialization voltage VINI1 (voltage Vnh, −3.5 V) is supplied. The first scan signal SC1(*n*) changes from the state in which LO is supplied to the state in which HI is supplied. When the first scan signal SC1(*n*) is supplied with HI, the third scan signal SC3(*n*) changes from the state in which LO is supplied to the state in which HI is supplied. The fourth scan signal SC4(*n*) is in the state in which LO is supplied. Therefore, the fourth transistor T4, the fifth transistor T5, and the sixth transistor T6 are turned from the OFF state to the ON state, the third transistor T3 is turned from the ON state to the OFF state, and the first transistor T1 is maintained in the OFF state. As a result, the voltage supplied to the second node N2 gradually drops from the voltage Vna toward the initialization voltage VINI1 (voltage Vnh, −3.5 V), the voltage supplied to the first node N1 gradually drops from the voltage Vna toward the pre-charge voltage VPRC (voltage Vnd, 1.5 V), and the voltage supplied to the third node N3 gradually drops from the voltage Vnb toward the initialization voltage VINI1 (voltage Vnh, −3.5 V).

In the period PIP following the period between the light emission period PEM and the period PIP of the K−1stFRAME, the image data signal SL(m) maintains the state in which the data signal VDATA of the voltage VSIGL is supplied, the first scan signal SC1(*n*) and the third scan signal SC3(*n*) are maintained in the state in which HI is supplied, and the fourth scan signal SC4(*n*) is maintained in the state in which LO is supplied. Therefore, the second transistor T2, the fifth transistor T5, the sixth transistor T6, and the fourth transistor T4 are maintained in the ON state, and the first transistor T1 and the third transistor T3 are maintained in the OFF state.

As a result, the voltage supplied to the first node N1 gradually drops from the voltage Vna toward the voltage Vnd and becomes the voltage Vnd. The voltage supplied to the second node N2 gradually drops from the voltage Vna toward the voltage Vnh and becomes the voltage Vnh. The voltage supplied to the third node N3 gradually drops from the voltage Vnb toward the voltage Vnh and becomes the voltage Vnh. The potential difference Vgs is 0 V and the potential difference Vds is 11.5 V. Since the potential difference Vgs is smaller than the threshold voltage VTH, the second transistor T2 is in the OFF state, and the drain current Ion does not flow from the drive power line PVDD to the initialization voltage power line SVI or the reference voltage line PVSS, so that the light-emitting element OLED does not emit light.

As described above, in the period PIP, the pre-charge voltage (intermediate potential) is supplied to the first node N1, and the second node N2 and the third node N3 are initialized by the initialization voltage VINI1 (−3.5 V).

In the initial period of the horizontal period HRP of the KthFRAME following the period PIP, the configurations of the image data signal SL(m), the first scan signal SC1(*n*), the third scan signal SC3(*n*), the fourth scan signal SC4(*n*), and the scan voltage power supply SIR(n), and the operations of the transistors are similar to those described in "2-2-1. First Example of Driving Method of Pixel Circuit 181A". As a result, the voltage supplied to the first node N1 maintains the voltage Vnd, and the voltage supplied to the second node N2 and the third node N3 maintain the voltage Vnh. In addition, similar to the period PIP, the light-emitting element OLED does not emit light.

In the period PWR following the initial period of the horizontal period HRP, the configurations of the image data signal SL(m), the first scan signal SC1(*n*), the third scan signal SC3(*n*), the fourth scan signal SC4(*n*), and the scan voltage power supply SIR(n), and the operations of the transistors are similar to those described in "2-2-1. First Example of Driving Method of Pixel Circuit 181A." As a result, the voltage supplied to the first node N1 gradually drops from the voltage Vnd toward the voltage VSIGL (voltage Vnf, −0.5 V), and the voltage supplied to the second node N2 and the voltage supplied to the third node N3 maintain the voltage Vnh. In addition, similar to the period PIP, the light-emitting element OLED does not emit light.

In the middle of the period PWR, in the period PVH parallel to (overlapping) the period PWR, the configurations of the image data signal SL(m), the first scan signal SC1(*n*), the third scan signal SC3(*n*), the fourth scan signal SC4(*n*), and the scan voltage power supply SIR(n), and the operations of the transistors are similar to those described in "2-2-1. First Example of Driving Method of Pixel Circuit 181A". As a result, the voltage supplied to the first node N1 gradually drops toward the voltage Vnf and becomes the voltage Vnf, and the voltage supplied to the second node N2 gradually rises from the voltage Vnh toward the initialization voltage VINI2 (0 V) and becomes the initialization voltage VINI2 (0 V).

Immediately after the start of the period PVH, the potential difference Vgs is 0 V, the potential difference Vds is 11.5 V, and the second transistor T2 is in the OFF state. In addition, the fifth transistor T5 is also in the OFF state. On the other hand, the fourth transistor T4 is in the ON state, and the voltage supplied to the second node N2 rises from the voltage Vnh toward the initialization voltage VINI2 (0 V). Since the voltage supplied to the second node N2 is directed to 0 V, the potential difference Vgs exceeds the threshold voltage VTH. As a result, the second transistor T2 is turned on, charging of the third node N3 begins, and the voltage supplied to the third node N3 gradually rises.

When the potential difference Vgs becomes the threshold voltage VTH, the voltage supplied to the second node N2 and the voltage supplied to the third node N3 maintain the respective voltages at that time. For example, as shown in FIG. 36, the voltage supplied to the second node N2 is the initialization voltage VINI2 (0 V), and the voltage supplied to the third node N3 is the voltage Vne (−1 V). Since the second transistor T2 is in the OFF state and no current flows from the drive power line PVDD to the reference voltage line PVSS, the light-emitting element OLED does not emit light.

In the period at the end of the period PVH, the configurations of the image data signal SL(m), the first scan signal SC1(*n*), the third scan signal SC3(*n*), the fourth scan signal SC4(*n*), and the scan voltage power supply SIR(n), and the operations of the transistors are similar to those described in "2-2-1. First Example of Driving Method of Pixel Circuit 181A." Therefore, the voltage supplied to the first node N1 and the voltage supplied to the second node N2 become Vnf, and the voltage supplied to the third node N3 maintains the voltage Vne. Since the potential difference Vgs is 1V, the potential difference Vds is 9 V, and the potential difference Vgs is the same as the threshold voltage VTH, no current flows from the drive power line PVDD to the reference voltage line PVSS. In addition, the light-emitting element OLED does not emit light.

As described above, in the period PWR, the data signal VDATA is written to the pixel 180 (pixel circuit 181). Further, in the period PVH, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS).

In the light emission period PEM of the KthFRAME following the horizontal period HRP of the KthFRAME, similar to the configuration described in "2-2-1. First Example of Driving Method of Pixel Circuit 181A", three pixels using the pixel 180B emitting red light, the pixel 180B emitting blue light, and the pixel 180B emitting green light become black.

The first example of the driving method of the pixel circuit 181B including the configuration described above can supply the intermediate potential to the first node N1 and then supply the data signal VDATA similar to "2-2-1. First Example of Driving Method of Pixel Circuit 181A".

In addition, the first example of the driving method of the pixel circuit 181B includes that the method is executed at the same timing as the period PWR and the period PVH. As a result, similar to "2-2-1. First Example of Driving Method of Pixel Circuit 181A", in the first example of the driving method of the pixel circuit 181B, the writing speed can be increased, and the number of pixels that can be written in the period during which the writing speed is reduced can be increased. Therefore, the self-luminous display device including the pixel circuit 181B can provide a high-resolution display device and a large-screen display device. Further, the self-luminous display device including the pixel circuit 181B can reduce (suppress) power consumption.

In addition, the scan signal line 332 connected to the pixel circuit 181B is a signal line serving as both the scan signal line 331 and the scan signal line 332 connected to the pixel circuit 181A. Therefore, since the pixel circuit 181B has a configuration capable of reducing the number of signal lines, the self-luminous display device including the pixel circuit 181B can reduce the size of the pixel. As a result, the self-luminous display device including the pixel circuit 181B can increase the number of pixels and achieve high definition and a large screen.

[3-2-2. Second Example of Driving Method of Pixel Circuit 181B]

Figure 37:
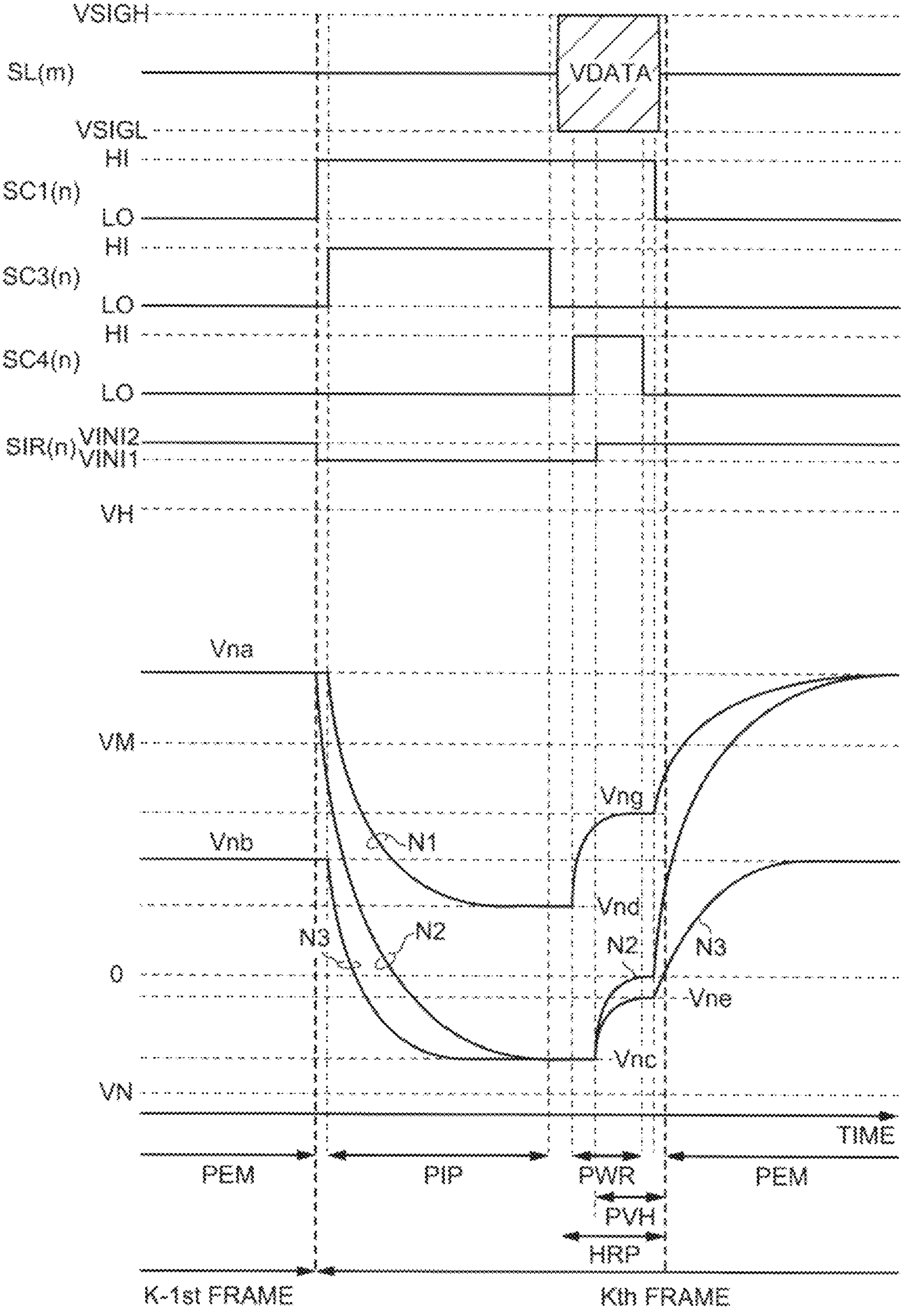
FIG. 37 is a timing chart of a self-luminous display device according to the third embodiment of the present invention.

A second example the driving method of the pixel circuit 181B will be described with reference to FIG. 37. The driving method shown in the second example of the pixel circuit 181B includes displaying images of the same color (white) in consecutive frames similar to the second example of the driving method of the self-luminous display device 10 according to the first embodiment. Configurations that are the same as or similar to those in FIG. 1 to FIG. 36 will be described as necessary.

The configurations of the image data signal SL(m), the first scan signal SC1(*n*), the third scan signal SC3(*n*), the fourth scan signal SC4(*n*), and the scan voltage power supply SIR(n) in the light emission period PEM of the K−1stFRAME to the light emission period PEM of the KthFRAME are similar to those described in "3-2-1. First Example of Driving Method of Pixel Circuit 181B". Further, the voltages (potentials) of the first node N1, the second node N2, the third node N3 in the light emission period PEM of the K−1stFRAME to the first period of the horizontal period HRP of the KthFRAME, the operations of the transistors, and the like are similar to the configurations and operations described in "3-2-1. First Example of Driving Method of Pixel Circuit 181B". Further, the voltages (potentials) of the first node N1, the second node N2, the third node N3 in the period at the end of the period PVH to the light emission period PEM of the KthFRAME, the operations of the transistors, and the like are similar to the configurations and operations described in "2-2-2. Second Example of Driving Method of Pixel Circuit 181A". The configurations and the like described in "3-2-1. First Example of Driving Method of Pixel Circuit 181B" and "2-2-2. Second Example of Driving Method of Pixel Circuit 181A" will be described as necessary. In addition, the data signal VDATA including the VSIGH corresponding to white is supplied to the image data signal SL(m) in the period between the light emission period PEM of the K−1stFRAME and the light emission period PEM of the KthFRAME.

In the light emission period PEM of the K−1stFRAME, the light-emitting element OLED emits light similar to the configuration described in "3-2-1. First Example of Driving Method of Pixel Circuit 181B".

In the period between the light emission period PEM and the period PIP of the K−1stFRAME following the light emission period PEM of the K−1stFRAME, similar to the configuration described in "3-2-1. First Example of Driving Method of Pixel circuit 181B", the voltage supplied to the second node N2 gradually drops from the voltage Vna toward the voltage Vnc, the voltage supplied to the first node N1 gradually drops from the voltage Vna toward the pre-charge voltage VPRC (voltage Vnd, 1.5 V), and the voltage supplied to the third node N3 gradually drops from the voltage Vnb toward the voltage Vnc.

In the period PIP following the period between the light emission period PEM and the period PIP of the K−1stFRAME, similar to the configuration described in "3-2-1. First Example of Driving Method of Pixel Circuit 181B", the voltage supplied to the first node N1 becomes the voltage Vnd, the voltage supplied to the second node N2 and the voltage supplied to the third node N3 become the voltage Vnc (initialization voltage VINI1), the potential difference Vgs becomes 0 V, and the potential difference Vds becomes 11.5 V. In addition, the light-emitting element OLED does not emit light.

As described above, in the period PIP, the pre-charge voltage (intermediate potential) is supplied to the first node N1, and the second node N2 and the third node N3 are initialized by the initialization voltage VINI1 (−3.5 V).

In the initial period of the horizontal period HRP of the KthFRAME following the period PIP, similar to the configuration described in "3-2-1. First Example of Driving Method of Pixel Circuit 181B", the voltage supplied to the first node N1 maintains the voltage Vnd, the voltage supplied to the second node N2 and the voltage supplied to the third node N3 maintain the voltage Vnc (initialization voltage VINI1), and the light-emitting element OLED does not emit light.

In the period PWR following the initial period of the horizontal period HRP, each transistor operates similar to the configuration described in "3-2-1. First Example of Driving Method of Pixel Circuit 181B", the voltage supplied to the first node N1 gradually rises from the voltage Vnd toward the voltage VSIGH (voltage Vng, 3.5 V), the voltage supplied to the second node N2 and the voltage supplied to the third node N3 maintain the voltage Vnc, and the light-emitting element OLED does not emit light.

In the middle of the period PWR, in the period PWR parallel to (overlapping) the period PVH, each transistor operates similar to the configuration described in "3-2-1. First Example of Driving Method of Pixel Circuit 181B", and the voltage supplied to the first node N1 gradually rises from the voltage Vnd toward the voltage VSIGH (voltage Vng, 3.5 V) and becomes the voltage Vng, and the voltage supplied to the second node N2 gradually rises from the voltage Vnc toward the initialization voltage VINI2 (0 V) and becomes the initialization voltage VINI2 (0V).

Immediately after the start of the period PVH, the potential difference Vgs is 0 V, the potential difference Vds is 11.5 V, and the second transistor T2 is in the OFF state. In addition, the fifth transistor T5 is also in the OFF state. On the other hand, the fourth transistor T4 is in the ON state, and the voltage supplied to the second node N2 rises from the voltage Vnc toward the initialization voltage VINI2 (0 V). Since the voltage supplied to the second node N2 is directed to 0 V, the potential difference Vgs exceeds the threshold voltage VTH. As a result, the second transistor T2 is turned on, charging of the third node N3 begins, and the voltage supplied to the third node N3 gradually rises.

When the potential difference Vgs between the voltage supplied to the second node N2 and the voltage supplied to the third node N3 becomes the threshold voltage VTH, the voltage supplied to the second node N2 and the voltage supplied to the third node N3 maintain the respective voltages at that time. For example, as shown in FIG. 37, the voltage supplied to the second node N2 is the initialization voltage VINI2 (0 V), and the voltage supplied to the third node N3 is the voltage Vne (−1 V). Since the second transistor T2 is in the OFF state and no current flows from the drive power line PVDD to the reference voltage line PVSS, the light-emitting element OLED does not emit light.

In the period at the end of the period PVH, each transistor operates similar to the configuration described in "2-2-2. Second Example of Driving Method of Pixel Circuit 181A". As a result, in the period at the end of the period PVH, the second transistor T2 is in the conductive state and the drain current Ion flows from the drive power line PVDD to the reference voltage line PVSS similar to the configuration described in "2-2-2. Second Example of Driving Method of Pixel Circuit 181A". Therefore, the voltage of the first node N1 and the voltage of the second node N2 rise to follow the rise in the voltage of the third node N3.

Further, in the light emission period PEM of the KthFRAME following the horizontal period HRP of the KthFRAME, the light-emitting element OLED emits light similar to the configuration described in "2-2-2. Second Example of Driving Method of Pixel Circuit 181A". For example, white light is emitted by three pixels using the pixel 180B emitting red light, the pixel 180B emitting blue light, and the pixel 180B emitting green light.

As described above, in the period PWR, the data signal VDATA is written to the pixel 180B. Further, in the period PVH, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS). Further, in the light emission period PEM of the KthFRAME, white light is emitted by three pixels.

The second example of the driving method of the pixel circuit 181B including the configuration described above has similar advantageous effects as those described in "3-2-1. First Example of Driving Method of Pixel Circuit 181B".

[3-2-3. Third Example of Driving Method of Pixel Circuit 181B]

A third example of the driving method of the pixel circuit 181B will be described with reference to FIG. 38. The driving method shown in the third example of the driving method of the pixel circuit 181B includes displaying images of the same color (black) in consecutive frames similar to the third example of the driving method for the self-luminous display device 10 according to the first embodiment. Configurations that are the same as or similar to those in FIG. 1 to FIG. 37 will be described as necessary.

The configurations of the image data signal SL(m), the first scan signal SC1(*n*), the third scan signal SC3(*n*), the fourth scan signal SC4(*n*), and the scan voltage power supply SIR(n) in the light emission period PEM of the K−1stFRAME to the light emission period PEM of the KthFRAME are similar to those described in "3-2-1. First Example of Driving Method of Pixel Circuit 181B". Further, the voltages (potentials) of the first node N1, the second node N2, the third node N3 in the light emission period of the K−1stFRAME, the operations of the transistors, and the like are similar to the configurations and operations described in "2-2-3. Third Example of Driving Method of Pixel Circuit 181A". Further, the voltages (potentials) of the first node N1, the second node N2, the third node N3 in the initial period of the horizontal period HRP of the KthFRAME to the light emission period PEM of the KthFRAME, the operations of the transistors, and the like are similar to the configurations and operations described in "3-2-1. First Example of Driving Method of Pixel Circuit 181B". Configurations and the like similar to those described in "3-2-1. First Example of Driving Method of Pixel Circuit 181B" and "2-2-3. Third Example of Driving Method of Pixel Circuit 181A" will be described as necessary. Further, in the period PWR and the period PVH, the data signal VDATA of the voltage VSIGL corresponding to black is supplied to the image data signal SL(m).

In the light emission period PEM of the K−1stFRAME, the light-emitting element OLED does not emit light and the pixel 180B is black similar to the configuration described in "2-2-3. Third Example of Driving Method of Pixel Circuit 181A".

In the period between the light emission period PEM and the period PIP of the K−1stFRAME following the light emission period PEM of the K−1stFRAME, similar to the configuration described in "3-2-3. Third Example of Driving Method of Self-luminous Display Device 10", the voltage supplied to the first node N1 is maintained at the voltage Vnf, and the voltage supplied to the second node N2 gradually drops from the voltage Vnf toward the initialization voltage VINI1 (Vnh, −3.5 V). In addition, the voltage supplied to the third node N3 gradually drops from the voltage Vne toward the initialization voltage VINI1 (Vnh, −3.5 V). In addition, the light-emitting element OLED does not emit light.

In the period PIP following the period between the light emission period PEM and the period PIP of the K−1stFRAME, the voltage supplied to the first node N1 gradually rises from the voltage Vnf toward the pre-charge voltage VPRC (voltage Vnd, 1.5 V) and becomes the voltage Vnd. The voltage supplied to the second node N2 gradually drops from the voltage Vnf toward the voltage Vnh and becomes the voltage Vnh. The voltage supplied to the third node N3 gradually drops from the voltage Vne toward the voltage Vnh and becomes the voltage Vnh. The potential difference Vgs is 0 V and the potential difference Vds is 11.5 V. The light-emitting element OLED does not emit light.

As described above, in the period PIP, the pre-charge voltage (intermediate potential) is supplied to the first node N1, and the second node N2 and the third node N3 are initialized by the initialization voltage VINI1 (−3.5 V).

As described above, the voltages (potentials) of the first node N1, the second node N2, the third node N3 in the first period of the horizontal period HRP of the KthFRAME to the light emission period PEM of the KthFRAME following the period PIP, the operation of the transistors, and the like are similar to the configurations and operations described in "3-2-1. First Example of Driving Method of Pixel Circuit 181".

Further, in the period PWR, the data signal VDATA (the voltage VSIGL in the third example) is written to the pixel 180B similar to the configuration described in "3-2-1. First Example of Driving Method of Pixel Circuit 181B". Further, in the period PVH, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS).

Furthermore, in the light emission period PEM of the KthFRAME, similar to the configuration described in "3-2-1. First Example of Driving Method of Pixel Circuit 181B", three pixels using the pixel 180B emitting red light, the pixel 180B emitting blue light, and the pixel 180B emitting green light become black.

The third example of the driving method of the pixel circuit 181B including the configuration described above has similar advantageous effects as those described in "3-2-1. First Example of Driving Method of Pixel Circuit 181B".

[3-2-4. Fourth Example of Driving Method of Pixel Circuit 181B]

A fourth example of the driving method of the pixel circuit 181B will be described with reference to FIG. 39. The driving method shown in the fourth example of the driving method of the pixel circuit 181B includes displaying images of different colors in consecutive frames similar to the fourth example of the driving method of the self-luminous display device 10 according to the first embodiment. Configurations that are the same as or similar to those in FIG. 1 to FIG. 38 will be described as necessary.

The configurations of the image data signal SL(m), the first scan signal SC1(*n*), the third scan signal SC3(*n*), the fourth scan signal SC4(*n*), and the scan voltage power supply SIR(n) in the light emission period PEM of the K−1stFRAME to the light emission period PEM of the KthFRAME are similar to those described in "3-2-1. First Example of Driving Method of Pixel Circuit 181B". Further, the voltages (potentials) of the first node N1, the second node N2, the third node N3 in the light emission period to the period PIP of the K−1stFRAME, the operations of the transistors, and the like are similar to the configurations and operations described in "3-2-3. Third Example of Driving Method of Pixel Circuit 181B". Further, the voltages (potentials) of the first node N1, the second node N2, and the third node N3 in the initial period of the horizontal period HRP of the KthFRAME to the light emission period PEM of the KthFRAME, the operations of the transistors, and the like are similar to the configurations and operations described in "3-2-2. Second Example of Driving Method of Pixel Circuit 181B". Configurations and the like described in "3-2-1. First Example of Driving Method of Pixel Circuit 181B", "3-2-2. Second Example of Driving Method of Pixel Circuit 181B", and "3-2-3. Third Example of Driving Method of Pixel Circuit 181B" will be described as necessary. In addition, the data signal VDATA of the voltage VSIGH corresponding to white is supplied to the image data signal SL(m) in the period PWR and the period PVH.

In the light emission period PEM of the K−1stFRAME, the pixel 180 (pixel circuit 181) is black similar to "3-2-3. Third Example of Driving Method of Pixel Circuit 181B".

In the period PIP, similar to "3-2-3. Third Example of Driving Method of Pixel Circuit 181B", the pre-charge voltage (intermediate potential) is supplied to the first node N1, and the second node N2 and the third node N3 are initialized by the initialization voltage VINI1 (−3.5 V).

In the period PWR, the data signal VDATA (in the fourth example, the voltage VSIGH) is written to the pixel 180B similar to "3-2-2. Second Example of Driving Method of Pixel Circuit 181B". Further, in the period PVH, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS).

Furthermore, in the light emission period PEM of the KthFRAME, similar to "3-2-2. Second Example of Driving Method of Pixel Circuit 181B", white light is emitted by three pixels using the pixel 180B emitting red light, the pixel 180B emitting blue light, and the pixel 180B emitting green light.

The fourth example of the driving method of the pixel circuit 181B including the configuration described above has similar advantageous effects as those described in "3-2-1. First Example of Driving Method of Pixel Circuit 181B".

[3-3. Configuration of Control Circuit 120B]

An overview of the control circuit 120B will be described with reference to FIG. 2, FIG. 40 to FIG. 42. FIG. 40 is a schematic diagram showing the configuration of the control circuit 120B, FIG. 41 is a circuit diagram showing the circuit configuration of the scan driver 160B(n), and FIG. 42 is a timing chart of the control circuit 120B. The configurations of the control circuit 120B and the scan driver 160B(n) and the timing chart shown in FIG. 40 to FIG. 42 are examples, and the configurations of the control circuit 120B and the scan driver 160B(n) and the timing chart are not limited to the configurations shown in FIG. 40 to FIG. 42. Configurations similar to those of the control circuit 120 will be described as necessary. Configurations that are the same as or similar to those in FIG. 1 to FIG. 39 will be described as necessary.

The self-luminous display device according to the third embodiment includes two control circuits 120B. The self-luminous display device according to the third embodiment includes a configuration in which the two control circuits 120 shown in FIG. 2 are replaced with the two control circuits 120B.

As shown in FIG. 40, the control circuit 120B includes the shift register circuit 130 and a plurality of scan drivers 160B(n). For example, control signals such as the clock signal CLK, the start pulse STV, the enable signal EN1, and the enable signal EN2, voltages such as the voltage VCM2 and the voltage VCZ, and voltages such as the drive voltage VDDEL and the reference voltage VSSEL are input to the control circuit 120B. The control circuit 120B can sequentially select the scan lines by inputting the control signal and power supply.

The shift register 130 is electrically connected to the plurality of scan drivers 160B(n). The shift register circuit 130 includes a configuration similar to that of the control circuit 120. In addition, the shift register circuit 130 generates a plurality of output signals (the output signal SR1(*n*), the output signal SR2(*n*), the output signal SR3(*n*), the output signal SR4(*n*), the output signal SR5(*n*), . . . ) shifted at different timings, and sequentially outputs the output signals to the plurality of scan drivers (for example, a scan driver 160B(1), a scan driver 160B(2), a scan driver 160B(3), and the like).

The shift register 111 is electrically connected to the scan driver 160B(1) and supplies the output signal SR1(*n*) to the input terminals IN1 and IN3 of the scan driver 160B(1). The shift register 112 is electrically connected to the scan drivers 160B(1) and 160A(2), and supplies the output signal SR2(*n*) to the input terminal IN4 of the scan driver 160B(1), and the input terminals IN1 and IN3 of the scan driver 160B(2). The shift register 113 is electrically connected to the scan drivers 160B(1), 160A(2), and 160A(23), and supplies the output signal SR3(*n*) to the input terminals IN2 and IN5 of the scan driver 160B(1), the input terminal IN4 of the scan driver 160B(2), and the input terminals IN1 and IN3 of the scan driver 160B(3). The shift register 114 is electrically connected to the scan drivers 160B(2) and 160A(23), and supplies the output signal SR4(*n*) to the input terminals IN2 and IN5 of the scan driver 160B(2) and the input terminal IN4 of the scan driver 160B(3). The shift register 115 is electrically connected to the scan driver 160B(3) and supplies the output signal SR5(*n*) to the input terminals IN2 and IN5 of the scan driver 160B(3).

The scan driver 160B(n) has eight input terminals (input terminals IN1 to IN8) and four output terminals (output terminals OUT1 to OUT4). The enable signal EN1 and the enable signal EN2 are supplied from the IC chip 110 via the plurality of connection wirings 342 to the plurality of scan drivers 160B(n), the voltage VCM2 and the voltage VCZ are supplied from the IC chip 110 via the plurality of the connection wirings 342, the drive voltage VDDEL is supplied via the drive power line PVDD, and the reference voltage VSSEL is supplied via the reference voltage line PVSS. The scan driver 160B(n) sequentially supplies the scan signals having different timings (e.g., the first scan signal SC1(*n*), the third scan signal SC3(*n*), the fourth scan signal SC4(*n*), and the scan voltage power supply SIR(n)) to each scan signal line or the connection wiring 342 and drives the pixel 180B electrically connected to each scan signal line or the connection wiring 342 based on the plurality of output signals, the enable signal EN1, the enable signal EN2, the voltage VCM2, and the voltage VCZ. The connection wiring 342 to which the voltage VCM2 is supplied is electrically connected to the respective input terminals IN7 of the scan driver 160B(1), the scan driver 160B(2), and the scan driver 160B(3), and the connection wiring 342 to which the voltage VCZ is supplied is electrically connected to the respective input terminals IN8 of the scan driver 160B(1), the scan driver 160B(2), and the scan driver 160B(3). The voltage VCM2 is −3.5 V, the same as the initialization voltage VINI1, and the voltage VCZ is 0 V, the same as the initialization voltage VINI2.

For example, as shown in FIG. 41, the scan driver 160B(n) includes a configuration in which the NOR circuit NR2 and the inverter circuit INV4 are removed from the configuration of the scan driver 160(*n*). Further, in the scan driver 160B(n), the input terminal IN5, the input terminal IN6, the input terminal IN7, and the connection of the output terminal OUT3 and the output terminal OUT4 are changed from the configuration of the scan driver 160(*n*). In addition, the scan driver 160B(n) includes a configuration in which the input terminal IN8, the transistors TR2, TR3, and TR4 are added to the configuration of the scan driver 160(*n*). The inverter circuit INV6 is electrically connected to the input terminal IN5, the transmission gate TMG, and the transistor TR1, and the transmission gate TMG is electrically connected to the input terminals IN5 and IN6 and the output terminal OUT3. The transistor TR1 is electrically connected to the reference voltage line PVSS, the transmission gate TMG, and the output terminal OUT3. The transistor TR2 is electrically connected to the input terminal IN7, the output terminal OUT4, and the inverter circuit INV5. The transistor TR3 is electrically connected to the input terminal IN8, the transistor TR4, the transmission gate TMG, the transistor TR1, and the output terminal OUT4. The transistor TR4 is electrically connected to the NOR circuit NR1 and the output terminal OUT4. For example, as shown in FIG. 40, each control signal is input to the eight input terminals (input terminals IN1 to IN8). Further, as shown in FIG. 40, the first scan signal SC1(*n*) is output to the scan signal line 330 electrically connected to the output terminal OUT1, the third scan signal SC3(*n*) is output to the scan signal line 332 electrically connected to the output terminal OUT2, the fourth scan signal SC4(*n*) is output to the scan signal line 333 electrically connected to the output terminal OUT3, and the scan voltage power supply SIR(n) is output to the scan voltage power line SVIR electrically connected to the output terminal OUT4.

Next, the driving method of the control circuit 120B will be described with reference to FIG. 41 to FIG. 43. As shown in FIG. 42, the configuration of the control circuit 120B includes the configuration of the control circuit 120A described in "2-3. Control Circuit 120A" without using the second scan-signal SC2(*n*) and the enable signal lines EN1B and EN2B. Other configurations of the control circuit 120B are similar to those of the control circuit 120A described in "2-3. Control Circuit 120A".

Figure 43:
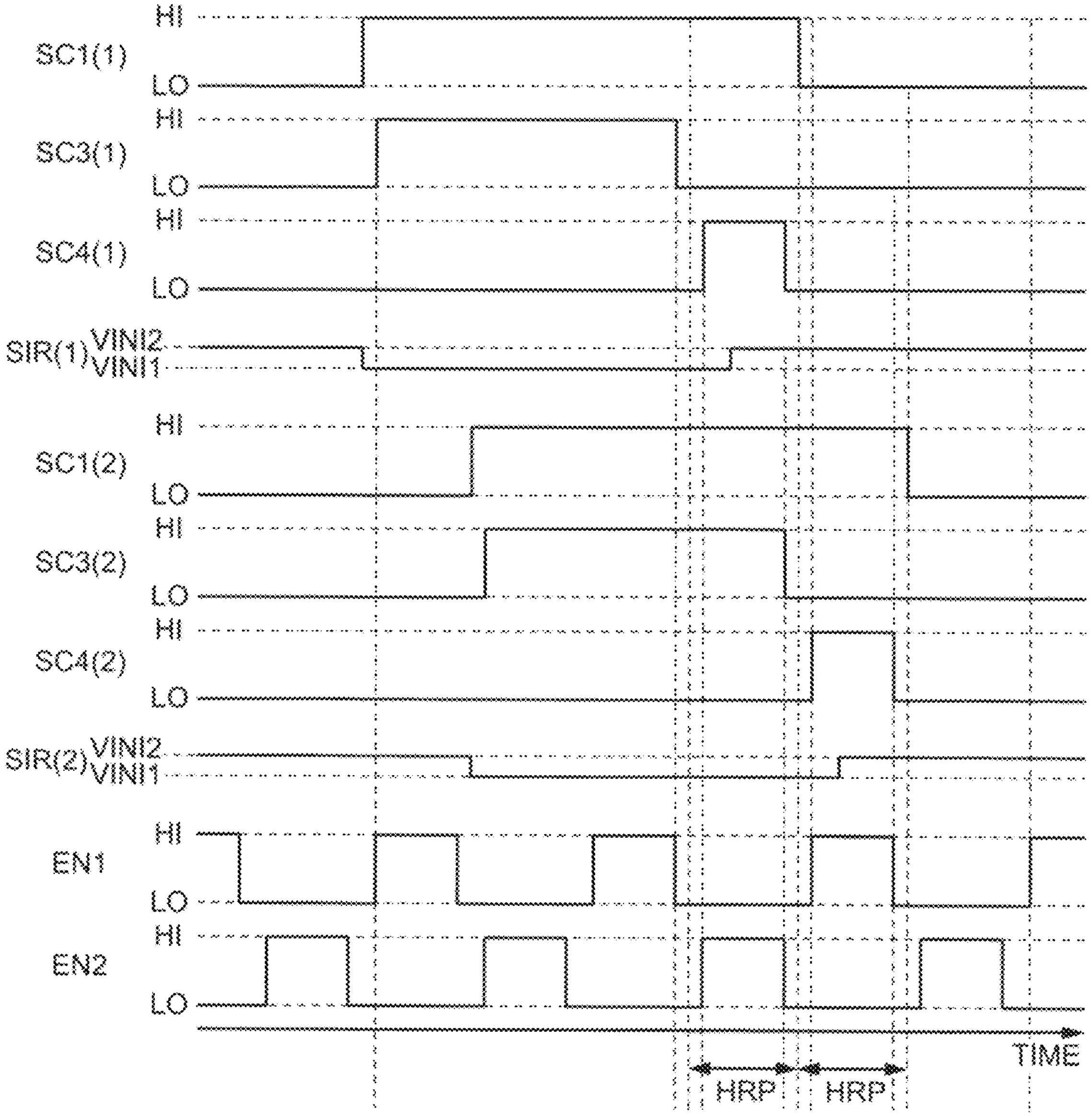
FIG. 43 is a timing chart of a control circuit according to the third embodiment of the present invention.

Further, as shown in FIG. 41 to FIG. 43, each of the first scan signal SC1(2), the third scan signal SC3(2), the fourth scan signal SC4(2), and the scan voltage signal SIR(2) are signals obtained by shifting each of the first scan signal SC1(1), the third scan signal SC3(1), the fourth scan signal SC4(1), and the scan voltage signal SIR(1) based on the output signals SR1(1) to SR4(1) and the enable signal lines EN1 and EN2.

4. Fourth Embodiment

Figure 44:
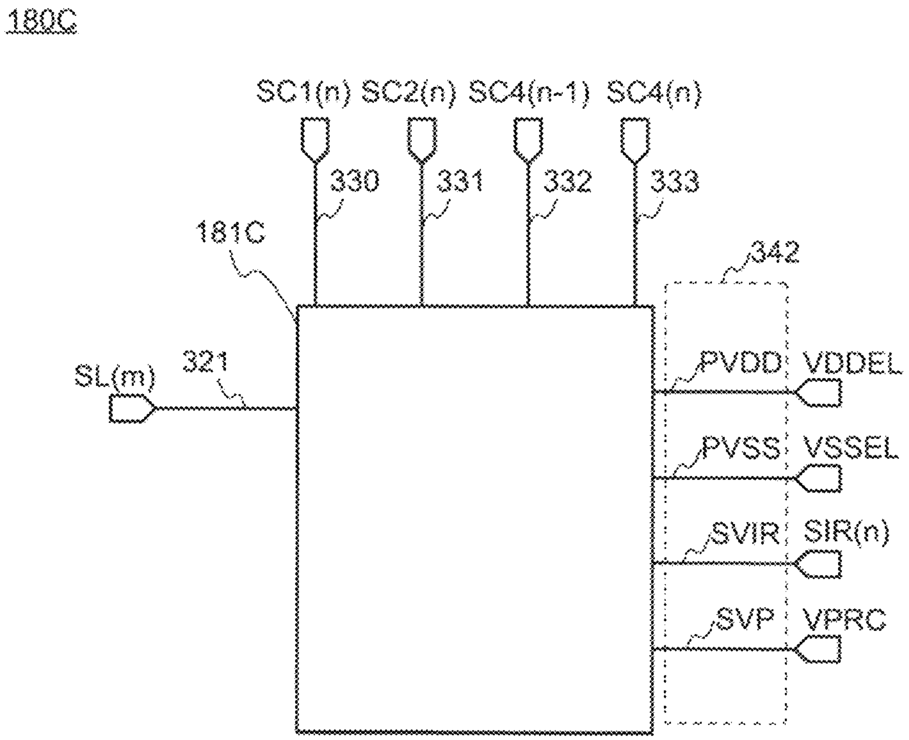
FIG. 44 is a schematic diagram showing an input signal to a pixel circuit according to the fourth embodiment of the present invention.
Figure 45:
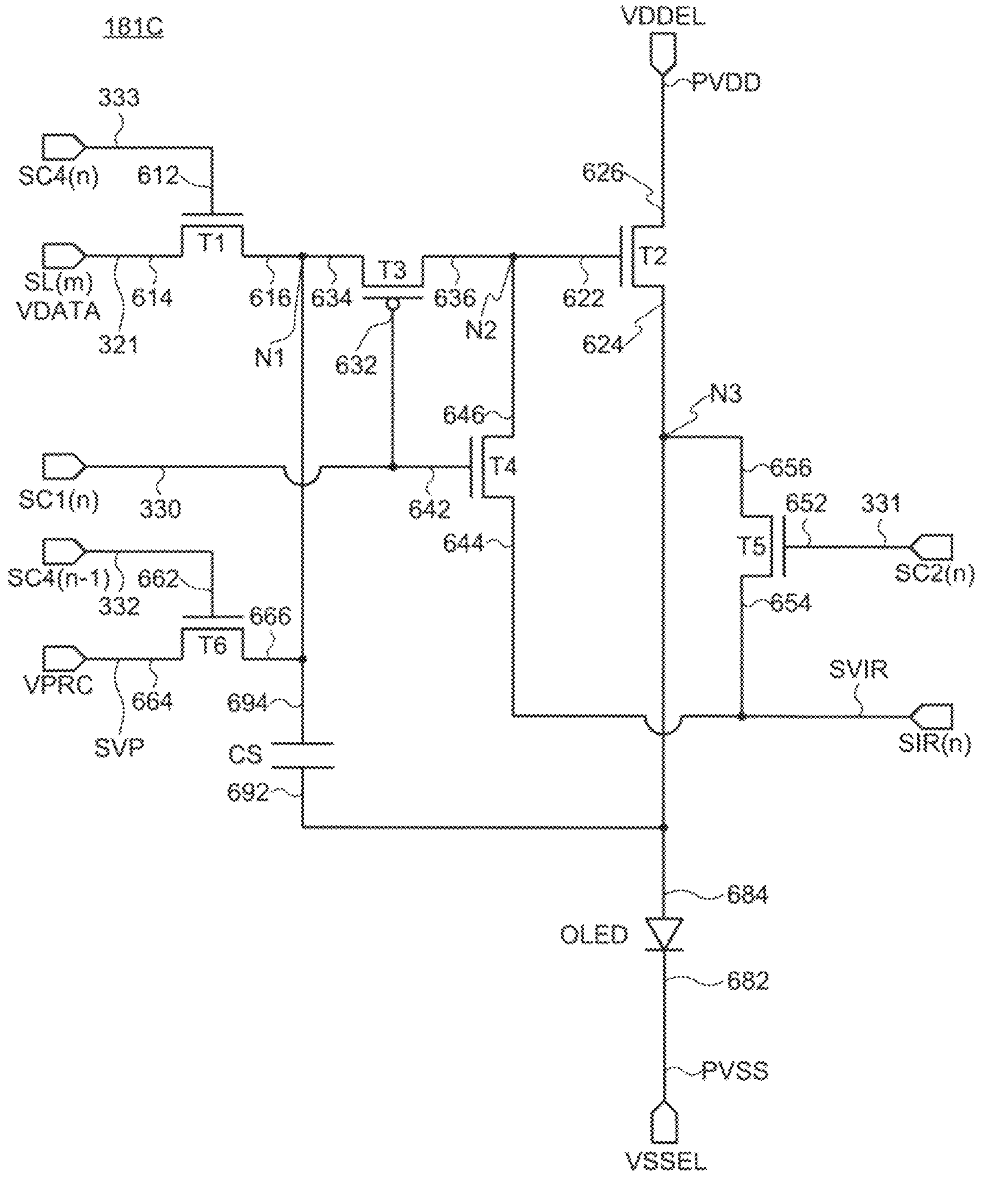
FIG. 45 is a circuit diagram showing a configuration of a pixel circuit according to the fourth embodiment of the present invention.
Figure 48:
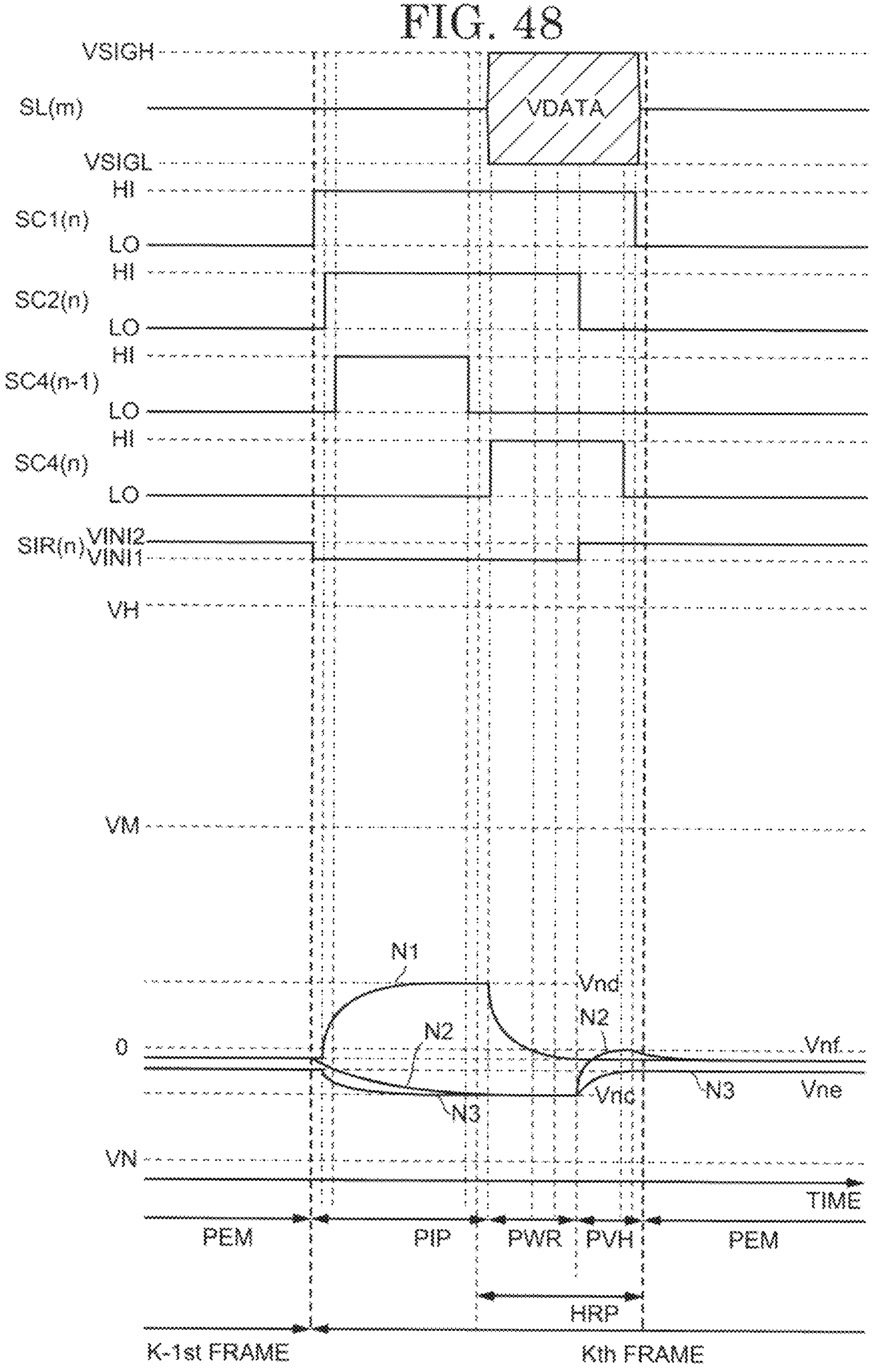
FIG. 48 is a timing chart of a self-luminous display device according to the fourth embodiment of the present invention.
Figure 49:
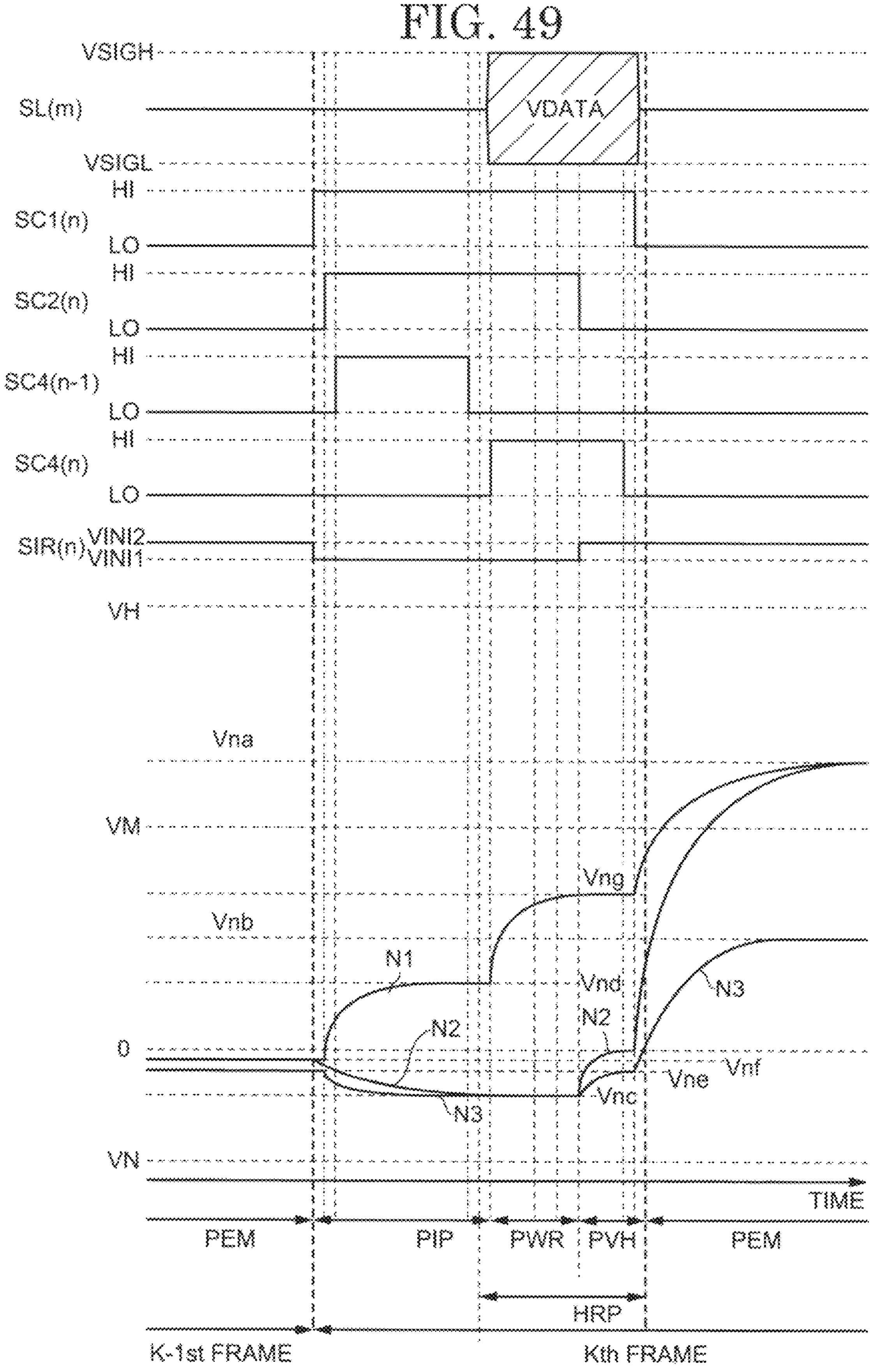
FIG. 49 is a timing chart of a self-luminous display device according to the fourth embodiment of the present invention.
Figure 50:
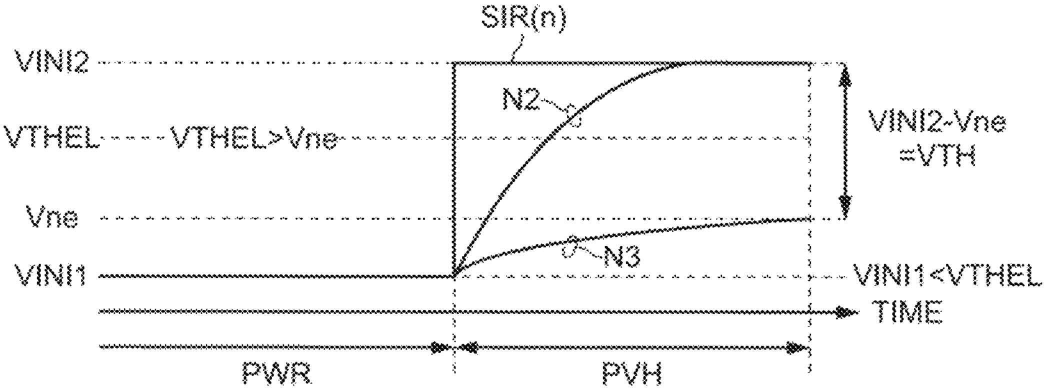
FIG. 50 is a diagram for explaining the setting of an input signal according to the fourth embodiment of the present invention.

An overview of the self-luminous display device according to the fourth embodiment will be described with reference to FIG. 1, FIG. 6, and FIG. 44 to FIG. 50. FIG. 44 is a schematic diagram showing an input signal to a pixel 180C (pixel circuit 181C) according to the fourth embodiment, FIG. 45 is a circuit diagram showing the configuration of the pixel circuit 181C, FIG. 46 to FIG. 49 are timing charts of the self-luminous display device according to the fourth embodiment, and FIG. 50 is a diagram for explaining the setting of the input signal according to the fourth embodiment.

The self-luminous display device according to the fourth embodiment includes the pixel 180C and a pixel circuit 181C. The configurations of the pixel 180C and the pixel circuit 181C are different from the configurations of the pixel 180A and the pixel circuit 181A of the self-luminous display device according to the second embodiment. Specifically, the pixel 180C and the pixel circuit 181C have configurations in which the third scan signal SC3(*n*) supplied to the pixel circuit 181A is replaced with a third scan signal SC4(*n*−1). In addition, the self-luminous display device according to the fourth embodiment has a configuration in which the third scan signal SC3(*n*) generated by the control circuit 120A is replaced with a third scan signal SC4(*n*−1). For example, the fourth scan signal SC4(*n*) according to the self-luminous display device of the fourth embodiment is a signal in which the third scan signal SC4(*n*−1) is shifted based on the output signals SR1(*n*) to SR4(*n*), the enable signal line EN1, EN1B, EN2, and EN2B, and the voltage VCM2 and the voltage VCZ. Further, timings of the third scan signal SC4(*n*−1) and the fourth scan signal SC4(*n*) according to the self-luminous display device according to the fourth embodiment are different from the timings of the third scan signal SC3(*n*) and the fourth scan signal SC4(*n*) of the self-luminous display device according to the second embodiment. As a result, the self-luminous display device according to the fourth embodiment includes executing the period PVH after the period PWR. Other configurations and functions of the fourth embodiment are similar to those of the self-luminous display device according to the second embodiment. In describing the configuration and function of the fourth embodiment, configurations and functions similar to those of the self-luminous display device 10 according to the first embodiment, the self-luminous display device according to the second embodiment, or the self-luminous display device according to the third embodiment will be described as necessary. In addition, configurations that are the same as or similar to those in FIG. 1 to FIG. 43 will be described as necessary.

[4-1. Configuration of Pixel 180C]

An overview of the pixel 180C and the pixel circuit 181C will be described with reference to FIG. 44 and FIG. 45.

As described above, the pixel 180C and the pixel circuit 181C has a configuration in which the third scan signal SC3(*n*) supplied to the pixel circuit 181A is replaced with the third scan signal SC4(*n*−1). Configurations and functions of the pixel circuit 181C other than the configuration and the function described in "4-1. Configuration of Pixel 180C" are similar to those of the pixel circuit 181A.

[4-2. Driving Method of Pixel Circuit 181C]

A driving method of the Self-luminous Display Device according to the fourth embodiment will be described with reference to FIG. 46 to FIG. 49. Configurations that are the same as or similar to those in FIG. 1 to FIG. 45 will be described as necessary. In addition, similar to the first embodiment, the horizontal axis of the timing charts represents time (TIME).

As described above, the timings of the third scan signal SC4(*n*−1) and the fourth scan signal SC4(*n*) of the self-luminous display device according to the fourth embodiment are different from the timings of the third scan signal SC3(*n*) and the fourth scan signal SC4(*n*) of the self-luminous display device according to the second embodiment. Configurations and functions other than the timings of the third scan signal SC4(*n*−1) and the fourth scan signal SC4(*n*) according to the fourth embodiment are similar to those of the driving method of the self-luminous display device according to the second embodiment.

The driving method of the self-luminous display device according to the fourth embodiment is different from the driving method of the self-luminous display device according to the first embodiment shown in FIG. 6 in that the period PVH is executed after the period PWR.

In one horizontal period (horizontal period HRP) in the driving method of the self-luminous display device according to the fourth embodiment, the first scan signal SC1(*n*), the third scan signal SC4(*n*−1), the fourth scan signal SC4(*n*), the image data signal SL(m) including the data signal VDATA, and the scan voltage power supply SIR(n) are supplied to the pixel 180C. For example, the pixel 180C is selected according to the timings of the first scan signal SC1(*n*), the third scan signal SC4(*n*−1), and the fourth scan signal SC4(*n*). The image data signal SL(m) and the scan voltage power supply SIR(n) are input to the selected pixel 180C according to the timings of the respective signals. Similar operations are performed on all the pixels 180C, and an image of the frame corresponding to 1FRAME is displayed on the display region 22 of the self-luminous display device 10 based on the image data signal SL(m) input to all the pixels 180C.

For example, the voltages (potentials) supplied to each signal and each node of each frame in the timing charts shown in FIG. 46 to FIG. 49 are shown in Table 7 and Table 8.

TABLE 7

| | PIP | PWR | PVH | PEM |
|---|---|---|---|---|
| SC1(n) | HI | HI | HI | LO |
| SC2(n) | HI | HI | LO | LO |
| SC4(n-1) | HI | LO | LO | LO |
| SC4(n) | LO | HI | HI | LO |
| SIR(n) | −1.5 [V] | −1.5 [V] | 0 [V] | 0 [V] |
| SL(m) | — | −0.5 [V](Black) ~3.5 [V](White) | −0.5 [V](Black) ~3.5 [V](White) | — |
| N1 | 1.5 [V] (Intermediate potential) | −0.5 [V]~3.5 [V] | −0.5 [V]~3.5 [V] | Ries in conjunction with the rise of potential of N3 |
| N2 | −1.5 [V] | −1.5 [V] | 0 [V] | In conjunction with potential of N1 |
| N3 | −1.5 [V] | −1.5 [V] | −1 [V] (=VREF-VTH) | Rise in conjunction with Ion with VGS |
| Vgs (= V(N2)-V(N3)) | 0 [V] | 0 [V] | 1 [V] | |
| Remarks | Initialize T2 and OLED Apply precharge potential (intermediate potential) to CS | Apply VDATA to CS | Acquiring and retaining VTH Potential of N3 = VREF-VTH Potential of N1-Potential of N3 = VDATA-(VREF-VTH) Non-light emitting below VTHEL | Light emitting VGS = VDATA-(VREF-VTH) |

TABLE 8

| | Setting value [V] |
|---|---|
| VTH | 1 |
| VTHEL | 0.7 |
| VSIGL(Black) | −0.5 |
| VSIGH(White) | 3.5 |
| HI | 10 |
| LO | −3.5 |
| VINI1 | −1.5 |
| VINI2 | 0 |
| VPRC | 1.5 |
| VDDEL | 8 |
| VSSEL | 0 |

For example, as shown in Table 8, the initialization voltage VINI1 is −1.5 V and the voltage VL (LO) is −3.5 V. Other setting values are the same as the setting values shown in Table 4 described in "2-2. Driving Method of Pixel Circuit 181A".

[4-2-1. First Example of Driving Method of Pixel Circuit 181C]

Figure 46:
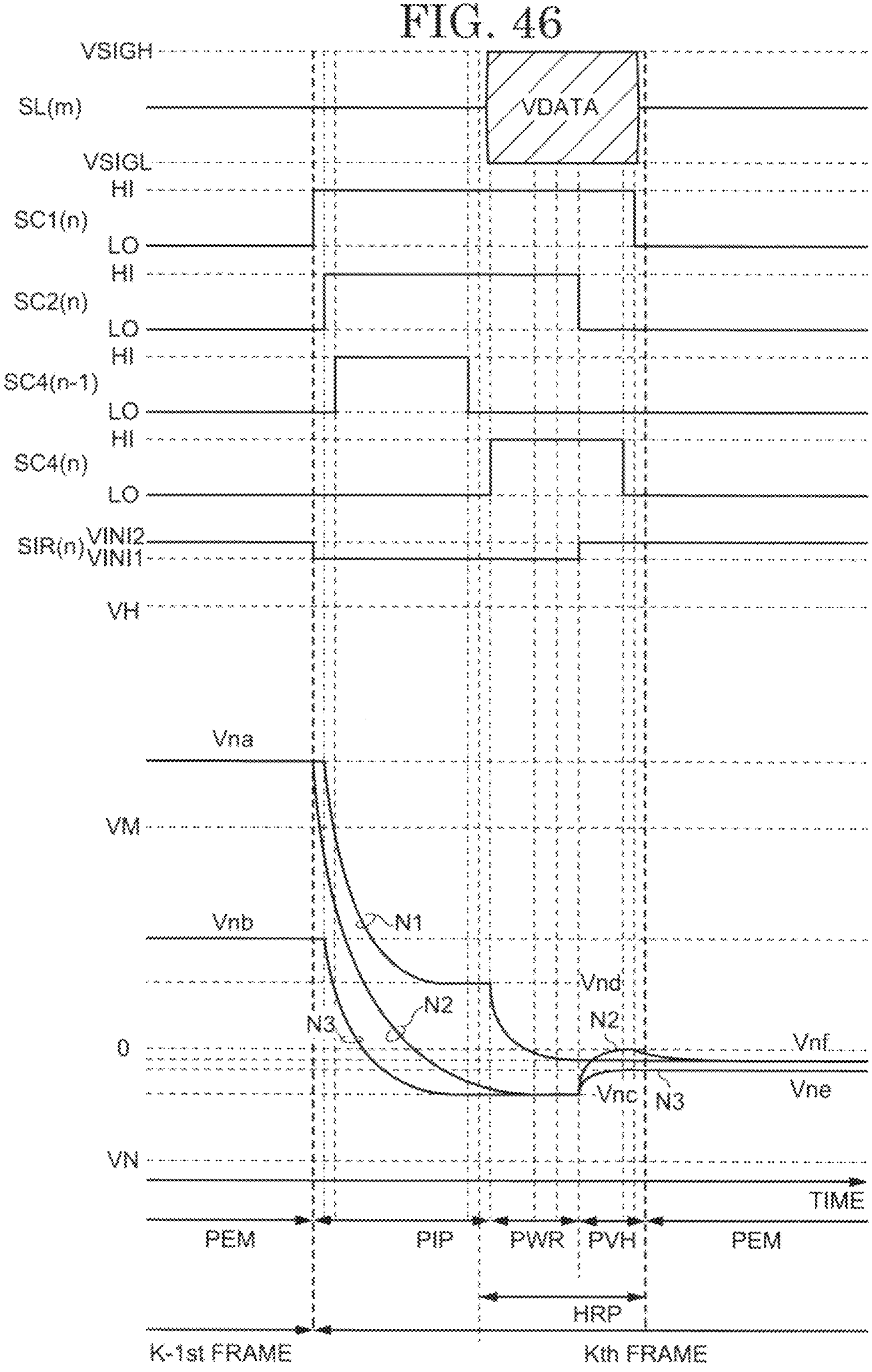
FIG. 46 is a timing chart of a self-luminous display device according to the fourth embodiment of the present invention.

A first example of the driving method of the pixel circuit 181C will be described with reference to FIG. 46. The first example of the driving method of the pixel circuit 181C includes displaying images of different colors in consecutive frames, similar to the first example of the driving method of the self-luminous display device according to the second embodiment.

The configurations of the image data signal SL(m), the first scan signal SC1(*n*), the fourth scan signal SC4(*n*), and the scan voltage power supply SIR(n) in the light emission period PEM of the K−1stFRAME and the light emission period PEM of the KthFRAME are similar to those described in "2-2-1. First Example of Driving Method of Pixel Circuit 181A". Further, the voltages (potentials) of the first node N1, the second node N2, and the third node N3 in the light emission period PEM of the K−1stFRAME and the light emission period PEM of the KthFRAME, the operations of the transistors, and the like are similar to the configurations described in "2-2-1. First Example of Driving Method of Pixel Circuit 181A". Further, as described above, the third scan signal SC4(n−1) is replaced with the third scan signal SC3(n), and the voltage VL (LO) is −3.5 V.

In the light emission period PEM of the K−1stFRAME, the light-emitting element OLED emits light similar to the configuration described in "2-2-1. First Example of Driving Method of Pixel Circuit 181A".

In the period PIP of the KthFRAME following the light emission period PEM of the K−1stFRAME, for example, the pixel 180C maintains the state in which the data signal VDATA based on the image data signal SL(m) of the previous n−1st row of the n-th row is supplied, and the image data signal SL(m) of the data signal VDATA of the voltage VSIGL corresponding to the non-light-emitting black is input to the pixel 180C in the period PWR and the period PVH. The first scan signal SC1(n) changes from the state in which LO is supplied to the state in which HI is supplied. When the first scan signal SC1(n) is supplied with HI, the second scan signal SC2(n) changes from the state in which LO is supplied to the state in which HI is supplied. When the second scan signal SC2(n) changes from the state in which LO is supplied to the state in which HI is supplied, the third scan signal SC3(n−1) changes from the state in which LO is supplied to the state in which HI is supplied. The fourth scan signal SC4(n) is in the state in which LO is supplied. Therefore, the fourth transistor T4, the fifth transistor T5, and the sixth transistor T6 are turned from the OFF state to the ON state, the third transistor T3 is turned from the ON state to the OFF state, and the first transistor T1 is maintained in the OFF state. As a result, the voltage supplied to the first node N1 gradually drops from the voltage Vna toward the pre-charge voltage VPRC (voltage Vnd, 1.5 V) and becomes the voltage Vnd. The voltage supplied to the second node N2 gradually drops from the voltage Vna toward the initialization voltage VINI1 (voltage Vnc, −1.5 V). The voltage supplied to the third node N3 gradually drops from the voltage Vnb toward the initialization voltage VINI1 (voltage Vnc, −1.5 V) and becomes the voltage Vnc. The voltage supplied to the second node N2 has not dropped to the voltage Vnc, but the potential difference Vgs is generally less than 1 V and the potential difference Vds is less than 9.5 V. The second transistor T2 is in the OFF state and the light-emitting element OLED does not emit light.

As described above, in the period PIP, the pre-charge voltage (intermediate potential) is supplied to the first node N1, the second node N2 is roughly initialized by the initialization voltage VINI1 (−1.5 V), and the third node N3 is initialized by the initialization voltage VINI1 (−1.5 V).

In the initial period of the horizontal period HRP of the KthFRAME following the period PIP, the image data signal SL(m) is in the state in which the data signal VSIGL is supplied, the first scan signal SC1(n) and the second scan signal SC2(n) are maintained in the state in which HI is supplied, the fourth scan signal SC4(n) is maintained in the state in which LO is supplied, and the scan voltage power supply SIR(n) is maintained in the state in which the initialization voltage VINI1 is supplied. The third scan signal SC3(n−1) changes from the state in which HI is supplied to the state in which LO is supplied. Therefore, the sixth transistor T6 is turned from the ON state to the OFF state, the fourth transistor T4 and the fifth transistor T5 are maintained in the ON state, and the first transistor T1 and the third transistor T3 are maintained in the OFF state. As a result, the voltage supplied to the first node N1 maintains the voltage Vnd, the voltage supplied to the second node N2 drops to near the voltage Vnc, and the voltage supplied to the third node N3 maintains the voltage Vnc. In addition, similar to the period PIP, the light-emitting element OLED does not emit light.

In the period PWR following the initial period of the horizontal period HRP, the image data signal SL(m) is maintained in the state in which the data signal VDATA of the voltage VSIGL is supplied, the first scan signal SC1(n) and the second scan signal SC2(n) are maintained in the state in which HI is supplied, the third scan signal SC4(n−1) is maintained in the state in which LO is supplied, and the scan voltage power supply SIR(n) is maintained in the state in which the initialization voltage VINI1 is supplied. The fourth scan signal SC4(n) changes from the state in which LO is supplied to the state in which HI is supplied. Therefore, the first transistor T1 is turned from the OFF state to the ON state, the fourth transistor T4 and the fifth transistor T5 are maintained in the ON state, and the third transistor T3 and the sixth transistor T6 are maintained in the OFF state. As a result, the voltage supplied to the first node N1 gradually drops from the voltage Vnd toward the voltage VSIGL (the voltage Vnf, −0.5 V) and becomes the voltage VSIGL (the voltage Vnf, −0.5 V), the voltage supplied to the second node N2 becomes the voltage Vnc, and the voltage supplied to the third node N3 maintains the voltage Vnc. In addition, similar to the period PIP, the light-emitting element OLED does not emit light.

As described above, in the period PWR, the data signal VDATA (in this case, the voltage VSIGL) is written to the pixel 180C. In addition, the second node N2 and the third node N3 are initialized by the initialization voltage VINI1 (−1.5 V).

In the period PVH following the period PWR, the image data signal SL(m) is maintained in the state in which the data signal VDATA including the voltage VSIGL is supplied, the first scan signal SC1(n) and the fourth scan signal SC4(n) are maintained in the state in which HI is supplied, and the third scan signal SC4(n−1) is maintained in the state in which LO is supplied. The second scan signal SC2(n) changes from the state in which HI is supplied to the state in which LO is supplied, and the scan voltage power supply SIR(n) changes from the state in which the initialization voltage VINI1 is supplied to the state in which the initialization voltage VINI2 (0 V) is supplied. Therefore, the fifth transistor T5 is turned from the ON state to the OFF state, the first transistor T1 and the fourth transistor T4 are maintained in the ON state, and the third transistor T3 and the sixth transistor T6 are maintained in the OFF state. As a result, the voltage supplied to the first node N1 maintains the voltage Vnf.

Immediately after the start of the period PVH, the potential difference Vgs is 0 V, the potential difference Vds is 9.5 V, and the second transistor T2 is in the OFF state. In addition, the fifth transistor T5 is also in the OFF state. On the other hand, since the fourth transistor T4 is in the ON state, the voltage supplied to the second node N2 gradually rises from the voltage Vnc toward the initialization voltage VINI2 (0 V). As a result, since the voltage supplied to the second node N2 is directed to 0 V, the potential difference Vgs exceeds the threshold voltage VTH. As a result, the second transistor T2 is turned on, charging of the third node N3 begins, and the voltage supplied to the third node N3 gradually rises from the voltage Vnc.

When the potential difference Vgs becomes the threshold voltage VTH, the voltage supplied to the second node N2 and the voltage supplied to the third node N3 maintain the respective voltages at that time. For example, as shown in FIG. 46, the voltage supplied to the second node N2 is the initialization voltage VINI2 (0 V), and the voltage supplied to the third node N3 is the voltage Vne (−1 V). Since the second transistor T2 is in the OFF state and no current flows from the drive power line PVDD to the reference voltage line PVSS, the light-emitting element OLED does not emit light.

When the potential difference Vgs becomes the threshold voltage VTH, the second transistor T2 is turned from the ON state to the OFF state, and the drain current Ion does not flow. In this case, the voltage supplied to the third node N3 rises from the voltage Vnc (−1.5 V) to the voltage Vne (−1 V), and the potential difference Vgs is the same as the threshold voltage VTH (1 V). Since the second transistor T2 is in the OFF state and no current flows from the drive power line PVDD to the reference voltage line PVSS, the light-emitting element OLED does not emit light.

As described above, in the period PVH, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS).

In the light emission period PEM of the KthFRAME following the horizontal period HRP of the KthFRAME, similar to the configuration described in "2-2-1. First Example of Driving Method of Pixel Circuit 181A", the three pixels using the pixel 180C emitting red light, the pixel 180C emitting blue light, and the pixel 180C emitting green light become black.

The first example of the driving method of the pixel circuit 181C including the configuration described above can supply the intermediate potential to the first node N1 and then supply the data signal VDATA similar to "2-2-1. First Example of Driving Method of Pixel Circuit 181A".

In addition, the first example of the driving method of the pixel circuit 181C also includes executing the period PVH after the period PWR. As a result, the first example of the driving method of the pixel circuit 181C includes a configuration in which the period PVH is shifted from the period PWR, so that the potential fluctuation of the first node N1 is small. Therefore, the driving method of the pixel circuit 181C can reduce the unwanted electromagnetic interference EMI caused by the potential fluctuation of the image data signal line 321 similar to "2-2-1. First Example of Driving Method of Pixel Circuit 181A".

In addition, the driving method of the pixel circuit 181C can increase the writing speed, and the number of pixels that can be written in the period during which the writing speed is reduced can be increased similar to "2-2-1. First Example of Driving Method of Pixel Circuit 181A". As a result, the self-luminous display device including the pixel circuit 181C can provide a high-resolution display device and a large-screen display device. Further, the self-luminous display device including the pixel circuit 181C can reduce (suppress) power consumption.

In addition, the third scan signal SC4(*n*−1) in the self-luminous display device including the pixel circuit 181C is a signal before the fourth scan signal SC4(*n*) is shifted. That is, the third scan signal SC4(*n*−1) is a signal supplied to the pixel circuit 181C electrically connected to the previous row in the row direction. Therefore, the self-luminous display device including the pixel circuit 181C can share the row-direction control signal with the adjacent pixel. Therefore, for example, the configuration of the control circuit for generating the third scan signal SC4(*n*−1) and the fourth scan signal SC4(*n*) can be simplified.

[4-2-2. Second Example of Driving Method of Pixel Circuit 181C]

Figure 47:
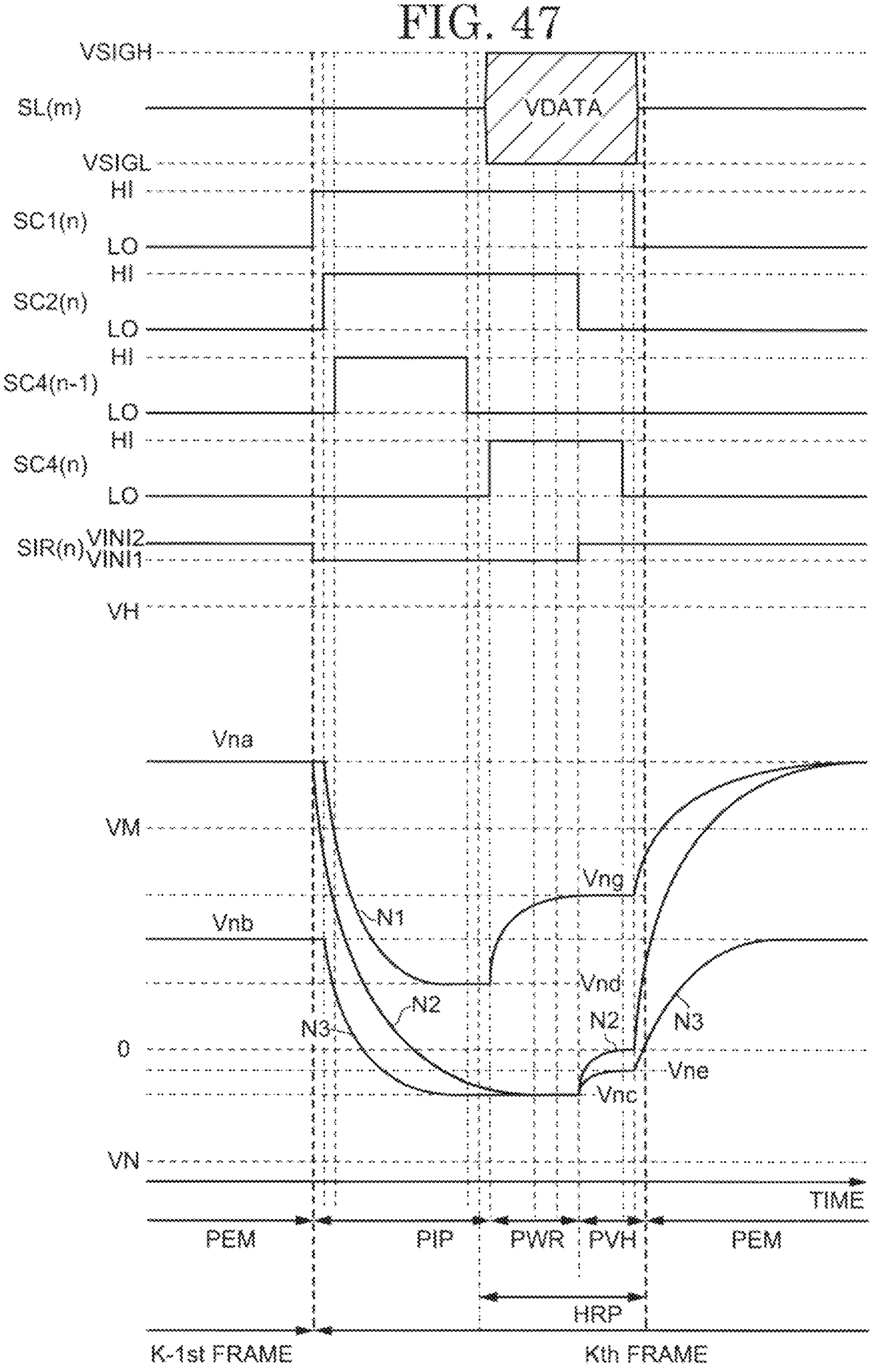
FIG. 47 is a timing chart of a self-luminous display device according to the fourth embodiment of the present invention.

A second example of the driving method of the pixel circuit 181C will be described with reference to FIG. 47. The driving method shown in the second example of the pixel circuit 181C includes displaying images of the same color (white) in consecutive frames similar to the second example of the driving method of the self-luminous display device 10 according to the first embodiment. Configurations that are the same as or similar to those in FIG. 1 to FIG. 46 will be described as necessary.

The configurations of the image data signal SL(m), the first scan signal SC1(*n*), the third scan signal SC3(*n*), the fourth scan signal SC4(*n*), and the scan voltage power supply SIR(n) in the light emission period PEM of the K−1stFRAME to the light emission period PEM of the KthFRAME are similar to those described in "4-2-1. First Example of Driving Method of Pixel Circuit 181C". Further, the voltages (potentials) of the first node N1, the second node N2, and the third node N3 in the light emission period PEM of the K−1stFRAME and the period PIP of the KthFRAME, the operations of the transistors, and the like are similar to the configurations and operations described in "4-2-1. First Example of Driving Method of Pixel Circuit 181C". Further, the voltages (potentials) of the second node N2 and the third node N3 in the period PWR and the period PVH of KthFRAME, the operations of the transistors, and the like are similar to the configurations and operations described in "4-2-1. First Example of Driving Method of Pixel Circuit 181C". Configurations and the like described in "4-2-1. First Example of Driving Method of Pixel Circuit 181C" and "2-2-2. Second Example of Driving Method of Pixel Circuit 181A" will be described as necessary. In addition, the data signal VDATA of VSIGH corresponding to white is supplied to the image data signal SL(m) in the period PWR and the period PVH.

In the light emission period PEM of the K−1stFRAME, the light-emitting element OLED emits light similar to the configuration described in "4-2-1. First Example of Driving Method of Pixel Circuit 181C".

In the period PIP of the KthFRAME following the light emission period PEM of the K−1stFRAME, similar to the configuration described in "4-2-1. First Example of Driving Method of Pixel Circuit 181C", the voltage supplied to the first node N1 becomes the voltage Vnd, the voltage supplied to the second node N2 gradually drops from the voltage Vna toward the initialization voltage VINI1 (voltage Vnc, −1.5 V), the voltage supplied to the third node N3 becomes the voltage Vnc. The potential difference Vgs is less than 1 V, and the potential difference Vds is less than 9.5 V. As a result, the light-emitting element OLED does not emit light.

As described above, in the period PIP, the pre-charge voltage (intermediate potential) is supplied to the first node N1, the second node N2 is roughly initialized by the initialization voltage VINI1 (−1.5 V), and the third node N3 is initialized by the initialization voltage VINI1 (−1.5 V).

In the initial period of the horizontal period HRP of the KthFRAME following the period PIP, similar to the configuration described in "4-2-1. First Example of Driving Method of Pixel Circuit 181C", the voltage supplied to the first node N1 maintains the voltage Vnd, the voltage supplied to the second node N2 drops to near the voltage Vnc, the voltage supplied to the third node N3 maintains the voltage Vnc (initialization voltage VINI1), and the light-emitting element OLED does not emit light.

In the period PWR following the initial period of the horizontal period HRP, the respective signals are driven and the respective transistors are operated similar to the configuration described in "4-2-1. First Example of Driving Method of Pixel Circuit 181C", the voltage supplied to the first node N1 gradually rises from the voltage Vnd toward the voltage VSIGH (voltage Vng, 3.5 V), the voltage supplied to the second node N2 drops to the voltage Vnc and maintains the voltage Vnc, the voltage supplied to the third node N3 maintains the voltage Vnc, and the light-emitting element OLED does not emit light.

As described above, in the period PWR, the data signal VDATA (in this case, the voltage VSIGH) is written to the pixel 180 (pixel circuit 181). The second node N2 and the third node N3 are initialized by the initialization voltage VINI1 (−1.5 V).

In the period PVH following the period PWR, similar to the configuration described in "4-2-1. First Example of Driving Method of Pixel Circuit 181C", the respective signals are driven and the respective transistors operate, the voltage supplied to the first node N1 gradually rises from the voltage Vnd toward the voltage VSIGH (voltage Vng, 3.5 V) to become the voltage Vng, and the voltage supplied to the second node N2 gradually rises from the voltage Vnc toward the initialization voltage VINI2 (0 V) and becomes the initialization voltage VINI2 (0 V). Since the voltage supplied to the second node N2 is directed to 0 V, the potential difference Vgs exceeds the threshold voltage VTH. As a result, the second transistor T2 is turned on, charging of the third node N3 begins, and the voltage supplied to the third node N3 gradually rises. The second transistor T2 is in the ON state, and the current flows from the drive power line PVDD to the third node N3, but the potential does not rise to the threshold voltage of the light-emitting element OLED, so that the light-emitting element OLED does not emit light.

In the period at the end of the period PVH, the respective signals are driven similar to the configuration described in "4-2-1. First Example of Driving Method of Pixel Circuit 181C", and the respective transistors operate similar to the configuration described in "2-2-2. Second Example of Driving Method of Pixel Circuit 181A". As a result, in the period at the end of the period PVH, the second transistor T2 is in the conductive state, and the drain current Ion flows from the drive power line PVDD to the reference voltage line PVSS. Therefore, the voltages of the first node N1 and the third node N3 rise to follow the rise in the voltage of the second node N2. Due to the rise in the voltage of the third node N3, the voltage of the first node N1 and the voltage of the second node N2 further rise.

As described above, in the period PVH, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS).

Further, in the light emission period PEM of the KthFRAME following the horizontal period HRP of the KthFRAME, each light-emitting element OLED emits light similar to the configuration described in "2-2-2. Second Example of Driving Method of Pixel Circuit 181A". For example, white light is emitted by three pixels using the pixel 180C emitting red light, the pixel 180C emitting blue light, and the pixel 180C emitting green light.

The second example of the driving method of the pixel circuit 181C including the configuration described above has similar advantageous effects as those described in "4-2-1. First Example of Driving Method of Pixel Circuit 181C".

[4-2-3. Third Example of Driving Method of Pixel Circuit 181C]

A third example of the driving method of the pixel circuit 181C will be described with reference to FIG. 48. The driving method shown in the third example of the driving method of the pixel circuit 181C includes displaying images of the same color (black) in consecutive frames as in the third example of the driving method of the self-luminous display device 10 according to the first embodiment. The same or similar configurations as those in FIG. 1 to FIG. 47 will be described as necessary.

Configurations of the image data signal SL(m), the first scan signal SC1(*n*), the third scan signal SC4(*n*−1), the fourth scan signal SC4(*n*), and the scan voltage power supply SIR(n) in the light emission period PEM of the K−1stFRAME to the light emission period PEM of the KthFRAME are similar to those described in "4-2-1. First Example of Driving Method of Pixel Circuit 181C". Further, the voltages (potentials) of the first node N1, the second node N2, and the third node N3 in the light emission period PEM of the K−1stFRAME, the operations of the transistors, and the like are similar to the configurations and operations described in "2-2-3. Third Example of Driving Method of Pixel Circuit 181A". Further, the voltages (potentials) of the first node N1, the second node N2, and the third node N3 in the initial period of the horizontal period HRP of the KthFRAME to the light emission period PEM of the KthFRAME, the operations of the transistors, and the like are similar to the configurations and operations described in "4-2-1. First Example of Driving Method of Pixel Circuit 181C". Configurations and the like similar to those described in "4-2-1. First Example of Driving Method of Pixel Circuit 181C" and "2-2-3. Third Example of Driving Method of Pixel Circuit 181A" will be described as necessary. In addition, the data signal VDATA of the voltage VSIGL corresponding to black is supplied to the image data signal SL(m) in the period PWR and the period PVH.

In the light emission period PEM of the K−1stFRAME, the light-emitting element OLED does not emit light and the pixel 180C is black similar to the configuration described in "2-2-3. Third Example of Driving Method of Pixel Circuit 181A".

In the period PIP of the KthFRAME following the light emission period PEM of the K−1stFRAME, similar to the configurations and operations described in "2-2-3. Third Example of Driving Method of Pixel Circuit 181A", the voltage supplied to the first node N1 gradually rises from the voltage Vnf toward the pre-charge voltage VPRC (voltage Vnd, 1.5 V) and becomes the voltage Vnd. The voltage supplied to the second node N2 gradually drops from the voltage Vnf toward the initialization voltage VINI1 (Vnc, −1.5 V). In addition, the voltage supplied to the third node N3 gradually drops from the voltage Vne toward the initialization voltage VINI1 (Vnc, −1.5 V). Further, the light-emitting element OLED does not emit light.

As described above, in the period PIP, the pre-charge voltage (intermediate potential) is supplied to the first node N1, the second node N2 is roughly initialized by the initialization voltage VINI1 (−1.5 V), and the third node N3 is initialized by the initialization voltage VINI1 (−1.5 V).

In the period PWR following the period PIP, the data signal VDATA (in the third example, the voltage VSIGL) is written to the pixel 180C similar to the configuration described in "4-2-1. First Example of Driving Method of Pixel Circuit 181C". Further, in the period PVH, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS).

Further, in the light emission period PEM of the KthFRAME, similar to the configuration described in "4-2-1. First Example of Driving Method of Pixel Circuit 181C", three pixels using the pixel 180C emitting red light, the pixel 180C emitting blue light, and the pixel 180C emitting green light become black.

The third example of the driving method of the pixel circuit 181C including the configuration described above has similar advantageous effects as those described in "4-2-1. First Example of Driving Method of Pixel Circuit 181C".

[4-2-4. Fourth Example of Driving Method of Pixel Circuit 181C]

A fourth example of the driving method of the pixel circuit 181C will be described with reference to FIG. 49. The driving method shown in the fourth example of the driving method of the pixel circuit 181C includes displaying images of different colors in consecutive frames similar to the fourth example of the driving method of the self-luminous display device according to the first embodiment. Configurations that are the same as or similar to those in FIG. 1 to FIG. 48 will be described as necessary.

The configurations of the image data signal SL(m), the first scan signal SC1(*n*), the third scan signal SC4(*n*−1), the fourth scan signal SC4(*n*), and the scan voltage power supply SIR(n) in the light emission period PEM of the K−1stFRAME to the light emission period PEM of the KthFRAME are similar to those described in "4-2-1. First Example of Driving Method of Pixel Circuit 181C". Further, the voltages (potentials) of the first node N1, the second node N2, and the third node N3 in the light emission period to the period PIP of the K−1stFRAME, the operations of the transistors, and the like are similar to the configurations and operations described in "4-2-3. Third Example of Driving Method of Pixel Circuit 181C". Further, the voltages (potentials) of the first node N1, the second node N2, and the third node N3 in the initial period of the horizontal period HRP of the KthFRAME to the light emission period PEM of the KthFRAME, the operations of the transistors, and the like are similar to the configurations and operations described in "4-2-2. Second Example of Driving Method of Pixel Circuit 181C". Configurations and the like described in "4-2-1. First Example of Driving Method of Pixel circuit 181C", "4-2-2. Second Example of Driving Method of Pixel Circuit 181C", and "4-2-3. Third Example of Driving Method of Pixel circuit 181C" will be described as necessary. In addition, the data signal VDATA of the voltage VSIGH corresponding to white is supplied to the image data signal SL(m) in the period PWR and the period PVH.

In the light emission period PEM of the K−1stFRAME, the pixel 180 (pixel circuit 181) is black similar to "4-2-3. Third Example of Driving Method of Pixel Circuit 181C".

In the period PIP, the pre-charge voltage (intermediate potential) is supplied to the first node N1, the second node N2 is roughly initialized by the initialization voltage VINI1 (−1.5 V), and the third node N3 is initialized by the initialization voltage VINI1 (−1.5 V).

In the period PWR, the data signal VDATA (in the fourth example, the voltage VSIGH) is written to the pixel 180C similar to "4-2-2. Second Example of Driving Method of Pixel Circuit 181C". Further, in the period PVH, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS).

Furthermore, in the light emission period PEM of the KthFRAME, similar to "4-2-2. Second Example of Driving Method of Pixel Circuit 181C", white light is emitted by three pixels using the pixel 180C emitting red light, the pixel 180C emitting blue light, and the pixel 180C emitting green light.

The fourth example of the driving method of the pixel circuit 181C including the configuration described above has similar advantageous effects as those described in "4-2-1. First Example of Driving Method of Pixel Circuit 181C".

[4-3. Setting Value of Initialization Voltages VINI1 and VINI2]

Setting values of the initialization voltages VINI1 and VINI2 will be described with reference to FIG. 50. FIG. 50 is a diagram for explaining the setting values of the initialization voltages VINI1 and VINI2 of the scan voltage power line SVIR to which the scan voltage power supply SIR(n) is supplied. Configurations that are the same as or similar to those in FIG. 1 to FIG. 49 will be described as necessary.

For example, as shown in FIG. 50, between the period PWR and the period PVH, according to the timing of the second scan signal SC2(*n*), the scan voltage power supply SIR(n) changes from the state in which the initialization voltage VINI1 is supplied to the state in which the initialization voltage VINI2 is supplied.

In the period PWR, in the pixel circuit 181C, the scan voltage power supply SIR(n) (initialization voltage VINI2) is supplied from the scan voltage power line SVIR to the second node N2 and the third node N3, and the second node N2 and the third node N3 are initialized. The pixel 180C including the pixel circuit 181C does not emit light in the period PWR. The condition that the light-emitting element OLED does not emit light is that the initialization voltage VINI1 supplied to the third node N3 is smaller than the threshold voltage VTHEL of the light-emitting element OLED. That is, the initialization voltage VINI1<the threshold voltage VTHEL.

Further, in the period PVH, the pixel circuit 181C corrects the threshold voltage VTH and holds the charge equivalent to the threshold voltage VTH. The pixel 180C including the pixel circuit 181C does not emit light in the period PVH. The condition that the light-emitting element OLED does not emit light is that the voltage Vne supplied to the third node N3 is smaller than the threshold voltage VTHEL of the light-emitting element OLED. That is, the voltage Vne<the threshold voltage VTHEL.

Further, for example, in the case where the pixel circuit 181C emits light based on the voltage VSIGH corresponding to white, the initialization voltage VINI2 is supplied to the second node N2 and the voltage Vne is supplied to the third node N3. The potential difference Vgs is a difference between the voltage supplied to the second node N2 and the voltage supplied to the third node N3, and the potential difference Vgs=the initializing voltage VINI2−the voltage Vne. In addition, since the potential difference Vgs is the threshold voltage VTH, the initialization voltage VINI2−the voltage Vne=the threshold voltage VTH.

As shown in FIG. 50, the condition of the initialization voltage VINI2 calculated using the above formula is the initialization voltage VINI2<the threshold voltage VTHEL+the threshold voltage VTH. The initialization voltage VINI1 is set such that the initialization voltage VINI1<the threshold voltage VTHEL.

5. Fifth Embodiment

Figure 51:
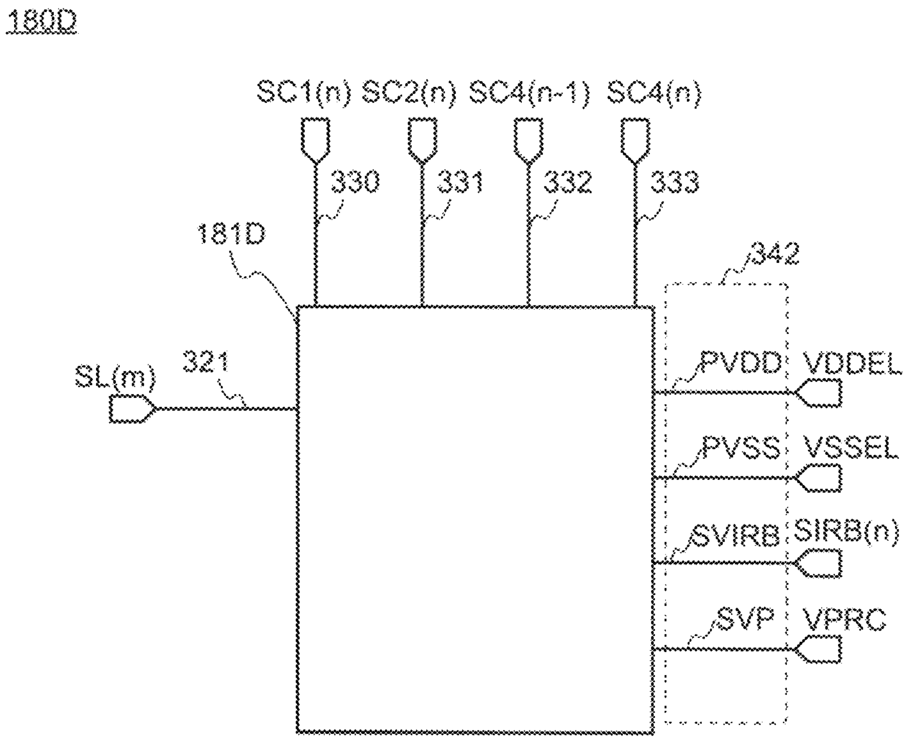
FIG. 51 is a schematic diagram showing an input signal to a pixel circuit according to the fifth embodiment of the present invention.
Figure 52:
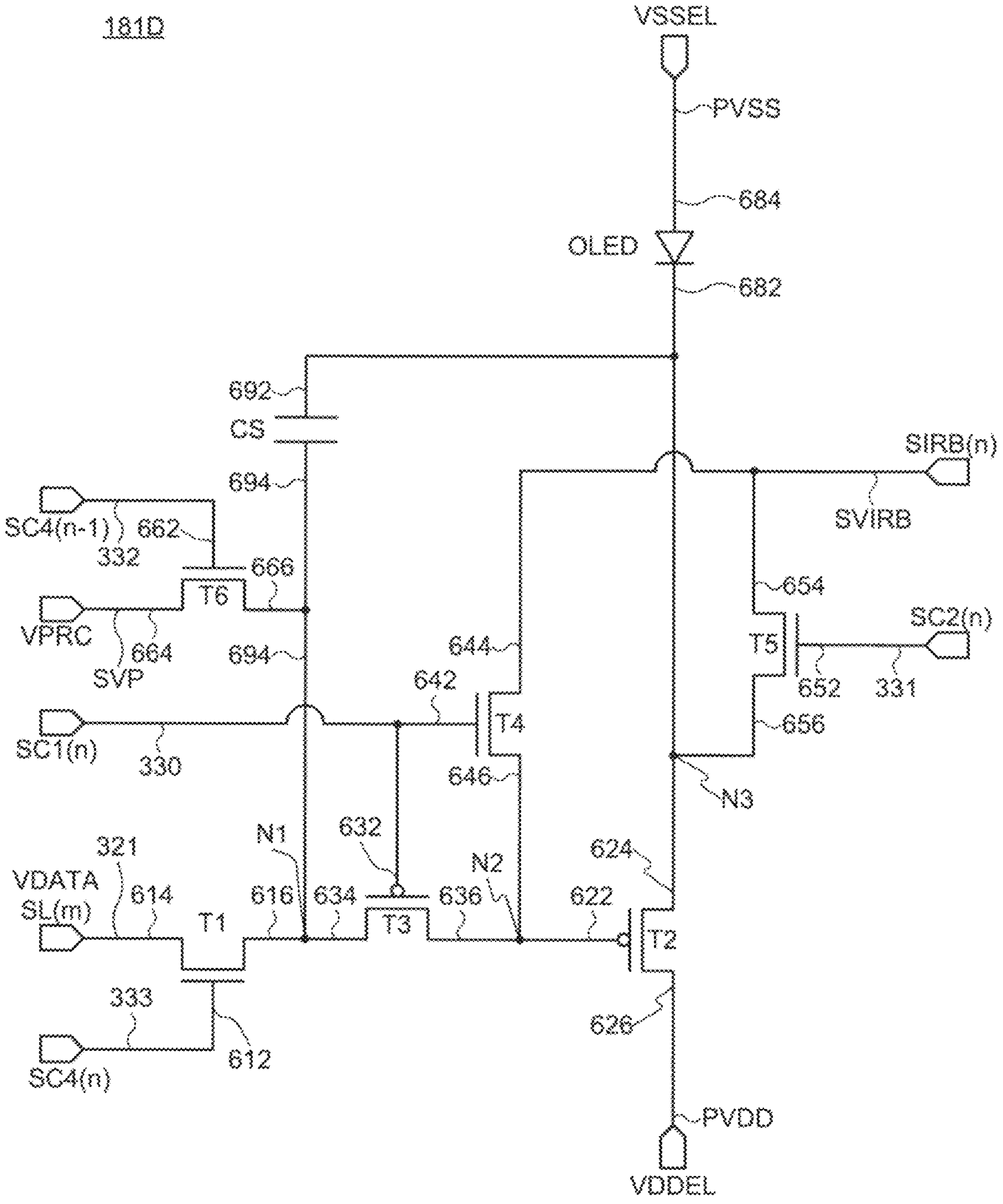
FIG. 52 is a circuit diagram showing a configuration of a pixel circuit according to the fifth embodiment of the present invention.

An overview of the self-luminous display device according to the fifth embodiment will be described with reference to FIG. 1, FIG. 6, and FIG. 51 to FIG. 57. FIG. 51 is a schematic diagram showing an input signal to a pixel 180D (pixel circuit 181D) according to the fifth embodiment of the present invention. FIG. 52 is a circuit diagram showing a configuration of the pixel circuit 181D. FIG. 53 to FIG. 56 are timing charts of the self-luminous display device according to the fifth embodiment of the present invention, and FIG. 57 is a diagram for explaining the setting of the input signal according to the fifth embodiment of the present invention.

In the self-luminous display device according to the fifth embodiment, the pixel 180C and the pixel circuit 181C of the self-luminous display device according to the fourth embodiment include the pixel 180D, the pixel 180D, and the pixel circuit 181D. The configurations of the pixel 180D and the pixel circuit 181D are different from the configuration of the pixel 1800 and the pixel circuit 181C of the self-luminous display device according to the third embodiment. The configurations of the pixel 180D and the pixel circuit 181D have the configurations and functions in which the scan voltage power supply SIR(n) related to the pixel 180C and the pixel circuit 181C are replaced with a scan voltage power supply SIRB(n) with the polarity inverted. Further, the pixel circuit 181D has configurations and functions in which the second transistor T2 of the n-channel field-effect transistor according to the pixel circuit 181C is replaced with the second transistor T2 of the p-channel field-effect transistor. Further, in the pixel circuit 181D, the second electrode 684 of the light-emitting element OLED is electrically connected to the reference voltage line PVSS, and the first electrode 682 of the light-emitting element OLED is electrically connected to the first electrode 624 of the second transistor T2, the third node N3, the second electrode 656 of the fifth transistor T5, and the first electrode 692 of the capacitive element CS. Other configurations and functions are similar to those of the self-luminous display device according to the fourth embodiment. Therefore, in describing the configuration and function of the fifth embodiment, similar configurations and functions as those of the self-luminous display device 10 to the self-luminous display device according to the fourth embodiment will be described as necessary. Configurations that are the same as or similar to those in FIG. 1 to FIG. 50 will be described as necessary.

[5-1. Configuration of Pixel 180D]

An overview of the pixel 180D and the pixel circuit 181D will be described with reference to FIG. 51 and FIG. 52.

As described above, the configuration of the pixel circuit 181D has a configuration in which the scan voltage power supply SIR(n) supplied to the pixel circuit 181C is replaced with the scan voltage power supply SIRB(n). In addition, similar to the scan voltage power supply SIRB(n), the polarities of the signals other than the scan voltage power supply SIRB(n) supplied to the pixel circuit 181D are also signals obtained by inverting the polarities of the signals other than the scan voltage power supply SIR(n) supplied to the pixel circuit 181C.

As shown in FIG. 51, the pixel circuit 181D is connected to a scan signal line SVIRB to which the scan voltage power supply SIRB(n) is supplied. In addition, as shown in FIG. 52, the pixel circuit 181D includes the second transistor T2 which is a p-channel field-effect transistor. Further, in the pixel circuit 181D, the second electrode 684 of the light-emitting element OLED is electrically connected to the reference voltage line PVSS, and the first electrode 682 of the light-emitting element OLED is electrically connected to the first electrode 624 of the second transistor T2, the third node N3, the first electrode 654 of the fifth transistor T5, and the first electrode 692 of the capacitive element CS. The first electrode 682 of the light-emitting element OLED is, for example, the cathode electrode, and the second electrode 684 of the light-emitting element OLED is, for example, the anode electrode.

The fourth transistor T4 has a function of conducting the second node N2 and the scan voltage power line SVIRB to supply the scan voltage power supply SIRB(n) (initialization voltage VINI1 or VINI2) to the second node N2 and initializing the second node N2.

The fifth transistor T5 has a function of conducting the third node N3 and the scan voltage power line SVIRB to supply the scan voltage power supply SIRB(n) (initialization voltage VINI2) to the third node N3 and initializing the third node N3.

The configurations and functions of the pixel circuit 181D other than the configurations and functions described in "5-1. Configuration of Pixel 180D" are similar to those of the pixel circuit 181C.

[5-2. Driving Method of Pixel Circuit 181D]

A driving method of the self-luminous display device according to the fifth embodiment will be described with reference to FIG. 53 to FIG. 56. Configurations that are the same as or similar to those in FIG. 1 to FIG. 52 will be described as necessary. Similar to the first embodiment and the second embodiment, the horizontal axis of the timing charts represents time (TIME).

For example, the driving method of the self-luminous display device according to the fifth embodiment has a configuration and function in which the operation related to the scan voltage power supply SIR(n) in the driving method of the self-luminous display device according to the fourth embodiment is replaced with the operation related to the scan voltage power supply SIRB(n) in which the polarity of the scan voltage power supply SIR(n) is reversed. Configurations and functions other than the operation related to the scan voltage power supply SIRB(n) are similar to those of the driving method of the self-luminous display device according to the fourth embodiment.

Further, for example, the driving method of the self-luminous display device according to the fifth embodiment is a driving method in which the polarity of each signal in the driving method of the self-luminous display device (pixel circuit 181C) according to the fourth embodiment is inverted, and is a driving method in which the polarity of the voltage (potential) supplied to each node in the driving method of the self-luminous display device according to the fourth embodiment is inverted.

The driving method of the self-luminous display device according to the fifth embodiment is different from the driving method of the self-luminous display device according to the first embodiment shown in FIG. 6 in that the period PVH is executed after the period PWR, and includes the same period as the respective periods of the driving method of the self-luminous display device according to the fourth embodiment.

In one horizontal period (horizontal period HRP) in the driving method of the self-luminous display device according to the fifth embodiment, the first scan signal SC1($n$), the third scan signal SC4($n$−1), the fourth scan signal SC4($n$), the image data signal SL(m) including the data signal VDATA, and the scan voltage power supply SIRB(n) are input to the pixel 180D (pixel circuit 181D). For example, the pixel 180D is selected according to the timings of the first scan signal SC1(*n*), the third scan signal SC4(*n*−1), and the fourth scan signal SC4(*n*). The image data signal SL(m) and the scan voltage power supply SIRB(n) are input to the selected pixel 180D according to the timings of the respective signals. Similar operations are performed on all the pixels 180D, and an image of the frame corresponding to 1FRAME is displayed on the display region 22 of the self-luminous display device 10 based on the image data signal SL(m) input to all the pixels 180D.

For example, the voltages (potentials) supplied to each signal and each node of each frame in the timing charts shown in FIG. 53 to FIG. 56 are shown in Table 9 and Table 10.

TABLE 9

| | PIP | PWR | PVH | PEM |
|---|---|---|---|---|
| SC1(n) | HI | HI | HI | LO |
| SC2(n) | HI | HI | LO | LO |
| SC4(n-1) | HI | LO | LO | LO |
| SC4(n) | LO | HI | HI | LO |
| SIR(n) | −1.5 [V] | −1.5 [V] | 0 [V] | 0 [V] |
| SL(m) | — | −3.5 [V](White) ~0.5 [V](Black) | −3.5 [V](White) ~0.5 [V] (Black) | — |
| N1 | −1.5 [V] (Intermediate potential) | −3.5 [V]~0.5 [V] | −3.5 [V]~0.5 [V] | Drop in conjunction with the drop of potential of N3 |
| N2 | 1.5 [V] | 1.5 [V] | 0 [V] | In conjunction with potential of N1 |
| N3 | 1.5 [V] | 1.5 [V] | 1 [V] (=VREF−VTHP) | Drop in conjunction with Ion with VGS |
| Vgs (= V(N2)-V(N3)) | 0 [V] | 0 [V] | 1 [V] | |
| Remarks | Initialize T2 and OLED Apply precharge potential (intermediate potential) to CS | Apply VDATA to CS | Acquiring and retaining VTH Potential of N3 = VREF-VTHP Potential of N1-Potential of N3 = VDATA-(VREF-VTHP) Non-light emitting below VTHEL | Light emitting VGS = VDATA-(VREF-VTHP) |

TABLE 10

| | Setting value [V] |
|---|---|
| VTHP | −1 |
| VTHEL | −0.7 |
| VSIGH(Black) | 0.5 |
| VSIGL(White) | −3.5 |
| HI | 3.5 |
| LO | −10 |
| VINI1 | 1.5 |
| VINI2 | 0 |
| VPRC | −1.5 |
| VDDEL | −8 |
| VSSEL | 0 |

As described above, the polarity of the signal supplied to the pixel circuit 181D is a signal obtained by inverting the polarity of the signal supplied to the pixel circuit 181C. For example, as shown in Table 9, Table 10, and FIG. 53 to FIG. 56, the voltage VSIGL of the data signal VDATA is −3.5 V, and the pixel 180 to which the voltage VSIGL is supplied emits light. For example, one pixel emits red light, one pixel emits green light, one pixel emits blue light, and white light is emitted by the three pixels. In addition, for example, the voltage VSIGH of the data signal VDATA is 0.5 V, and the pixel 180 to which the voltage VSIGH is supplied does not emit light and becomes black. Furthermore, for example, the voltage VL (LO) is −10 V, the voltage VNN is 5 V, the voltage VMN is −5 V, the initialization voltage VINI1 is 3.5 V, the initialization voltage VINI2 is 0 V, and the pre-charge voltage VPRC is −1.5 V. For example, the voltage VH (HI), the voltage VL (LO), the voltage VNN, the voltage VMN, the initialization voltage VINI1, and the initialization voltage VINI2 supplied to the pixel circuit 181D correspond to the voltages obtained by inverting the polarities (potentials) of the voltage VL (LO), the voltage VH (HI), the voltage VN, the voltage VM, the initialization voltage VINI2, and the initialization voltage VINI1 supplied to the pixel circuit 181C.

[5-2-1. First Example of Driving Method of Pixel Circuit 181D]

A first example of the driving method of the pixel circuit 181D, such as the conductive state and the non-conductive state of the transistors in the light emission period PEM of the K−1stFRAME in "4-2-1. First Example of Driving Method of Pixel Circuit 181C", will be described with reference to FIG. 52 and FIG. 53. The first example of the driving method of the pixel circuit 181D includes the pixel 180D displaying a white image based on the voltage VSIGL (−3.5 V) of the data signal VDATA in the previous frame (K−1stFRAME) of the current frame (KthFRAME), and then the pixel 180D displaying a black image based on the voltage VSIGH (0.5 V) of the data signal VDATA in the KthFRAME. In other words, the first example of the self-luminous display device 10 according to the fifth embodiment includes displaying images of different colors in consecutive frames.

As described above, the configurations and functions of each signal in the light emission period PEM of the K−1stFRAME to the light emission period PEM are similar to the configurations and functions of the signal in which the voltages (potentials) of the respective signals of the driving method of the self-luminous display device according to the fourth embodiment are inverted. Further, for example, the voltages (potentials) of the first node N1, the second node N2, and the third node N3 in the light emission period PEM of the K−1stFRAME to the light emission period PEM are voltages (potentials) obtained by inverting the polarities of the voltages (potentials) of each node of the driving method of the self-luminous display device according to the fourth embodiment.

For example, a voltage Vnan, a voltage Vnbn, a voltage Vncn, a voltage Vndn, a voltage Vnen, a voltage Vnfn, and a voltage Vngn are voltages (potentials) obtained by inverting the polarities of the voltage Vna, the voltage Vnb, the voltage Vnd, the voltage Vne, and the voltage Vnf. Referring to the voltages (potentials) in the driving method according to the fourth embodiment, the voltage Vnan is −7 V, the voltage Vnbn is −2.5 V, the voltage Vncn is 1.5 V, the voltage Vndn is −1.5 V, the voltage Vnen is −3.5 V, and the voltage Vngn is 2.5 V.

In the light emission period PEM of the K−1stFRAME, the pixel 180D emits light according to the potential difference Vgs of the second transistor T2 (voltage V(N2)−voltage V(N3)=voltage Vnan-voltage Vnbn). The potential difference Vgs is −4.5 V, the pixel 180B emits red light, and white light is emitted by three pixels using the pixel 180 emitting red light, the pixel 180 emitting blue light, and the pixel 180 emitting green light.

For example, in the initial period of the horizontal period HRP of the KthFRAME following the light emission period PEM of the K−1stFRAME, the voltage supplied to the first node N1 gradually rises from the voltage Vnan toward the pre-charge voltage VPRC (voltage Vndn), and the voltage supplied to the second node N2 gradually rises from the voltage Vnan toward the initialization voltage VINI1 (voltage Vncn).

For example, in the period PIP, the voltage supplied to the first node N1 gradually rises from the voltage Vnan toward the pre-charge voltage VPRC and becomes the voltage Vndn. The voltage supplied to the second node N2 gradually rises from the voltage Vnan toward the initialization voltage VINI1 (voltage Vncn, 1.5V). The voltage supplied to the second node N2 has not risen to the voltage Vncn, but the voltage Vgs is the voltage near a threshold voltage VTHP (−1 V), and the potential difference Vds is the voltage near-9.5 V (−8 V−(−1.5 V)). The second transistor T2 is in the OFF state and the light-emitting element OLED does not emit light.

As described above, in the period PIP, the pre-charge voltage (intermediate potential) is supplied to the first node N1, the second node N2 is roughly initialized by the initialization voltage VINI1 (1.5 V), and the third node N3 is initialized by the initialization voltage VINI1 (1.5 V).

In the initial period of the horizon period HRP of the KthFRAME following the period PIP, the data signal VDATA of the voltage VSIGH is supplied to the image data signal SL(m). The voltage supplied to the first node N1 maintains the voltage Vndn, the voltage supplied to the second node N2 rises to near the voltage Vncn, and the voltage supplied to the third node N3 maintains the voltage Vncn. In addition, similar to the period PIP, the light-emitting element OLED does not emit light.

In the period PWR following the initial period of the horizon period HRP, the image data signal SL(m) is maintained in the state in which the data signal VDATA of the voltage VSIGH is supplied. The voltage supplied to the first node N1 gradually rises from the voltage Vndn toward the voltage VSIGH (voltage Vnfn, 0.5 V) and becomes the voltage VSIGH (voltage Vnfn, 0.5 V), the voltage supplied to the second node N2 becomes the voltage Vncn, and the voltage supplied to the third node N3 maintains the voltage Vnc. In addition, similar to the period PIP, the light-emitting element OLED does not emit light.

As described above, in the period PWR, the data signal VDATA (in this case, the voltage VSIGH) is written to the pixel 180D. In addition, the second node N2 and the third node N3 are initialized by the initialization VINI1 (1.5 V).

In the period PVH following the period PWR, the image data signal SL(m) is maintained in the state in which the data signal VDATA of the voltage VSIGH is supplied. The voltage supplied to the first node N1 maintains the voltage Vnfn.

Immediately after the start of the period PVH, the potential difference Vgs is 0 V, the potential difference Vds is −9.5 V, and the second transistor T2 is in the OFF state. In addition, the fifth transistor T5 is also in the OFF state. On the other hand, since the fourth transistor T4 is in the ON state, the voltage supplied to the third node N3 gradually drops from the voltage Vncn toward the initialization voltage VINI2 (0 V). Since the voltage supplied to the second node N2 is directed to 0 V, the potential difference Vgs exceeds the threshold voltage VTHP. As a result, the second transistor T2 is turned on, discharging of the third node N3 begins, and the voltage of the third node N3 gradually drops.

Figure 53:
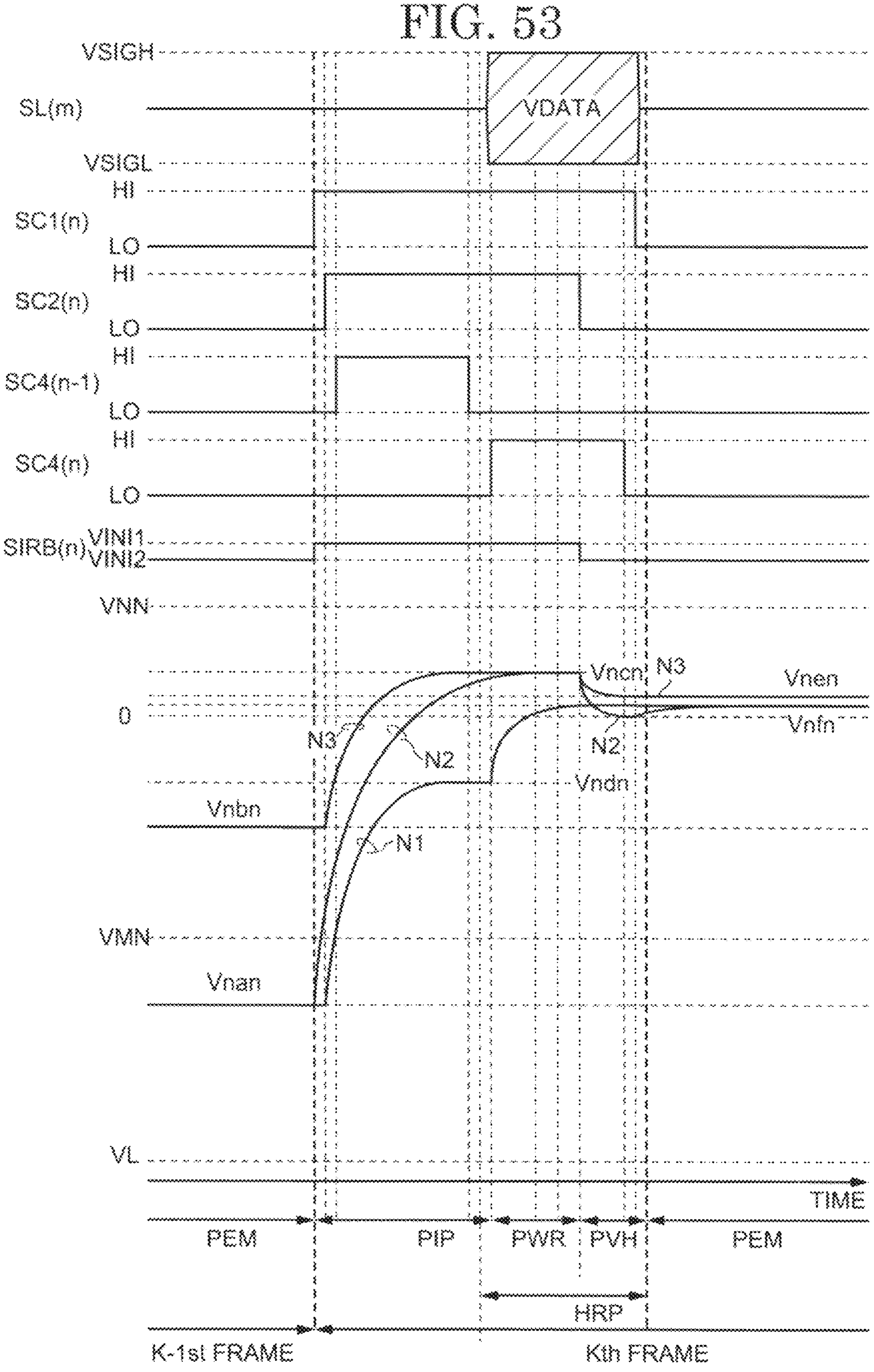
FIG. 53 is a timing chart of a self-luminous display device according to the fifth embodiment of the present invention.

When the potential difference Vgs between the voltage supplied to the second node N2 and the voltage supplied to the third node N3 becomes the threshold voltage VTHP, the voltage supplied to the second node N2 and the voltage supplied to the third node N3 maintain the respective voltages at that time. For example, as shown in FIG. 53, the voltage supplied to the second node N2 is the initialization voltage VINI2 (0 V), and the voltage supplied to the third node N3 is the voltage Vnen (1 V). Since the second transistor T2 is in the OFF state and no current flows from the drive power line PVDD to the reference voltage line PVSS, the light-emitting element OLED does not emit light.

When the potential difference Vgs becomes the threshold voltage VTHP, the second transistor T2 is turned from the ON state to the OFF state, and the drain current Ion does not flow. In this case, the voltage supplied to the third node N3 drops to the voltage Vnen (1 V), and the potential difference Vgs is the same as the threshold voltage VTHP (−1 V). Since the second transistor T2 is in the OFF state and no current flows from the drive power line PVDD to the reference voltage line PVSS, the light-emitting element OLED does not emit light.

As described above, in the period PVH, the threshold voltage VTHP of the second transistor T2 is obtained by the operation in which the potential difference Vgs of the second transistor T2 becomes the same as the threshold voltage VTHP, and the charge equivalent to the threshold voltage VTHP is held in the third node N3 (the first electrode 692 of the capacitive element CS).

In the light emission period PEM of the KthFRAME following the horizontal period HRP of the KthFRAME, data is not selected using the selection signal, and the data signal VDATA is switched to the data signal VDATA of the subsequent n+1st row of the n-th row. For example, since the pixel 180D emitting red light, the pixel 180D emitting blue light, and the pixel 180D emitting green light do not emit light, three pixels using the pixel 180D emitting red light, the pixel 180D emitting blue light, and the pixel 180D emitting green light become black.

The first example of the driving method of the pixel circuit 181D including the configuration described above has similar advantageous effects as those described in "4-2-1. First Example of Driving Method of Pixel Circuit 181C".

[5-2-2. Second Example of Driving Method of Pixel Circuit 181D]

A second example of the method for driving the pixel circuit 181D, such as the conductive state and the non-conductive state of the transistors in the light emission period PEM of the K−1stFRAME in “4-2-2. Second Example of Driving Method of Pixel Circuit 181C”, will be described with reference to FIG. 52 and FIG. 54. The driving method shown in the second example of the pixel circuit 181D includes the pixel 180D displaying a white image based on the voltage VSIGL (−3.5 V) of the data signal VDATA in the previous frame (K−1stFRAME) of the current frame (KthFRAME) and then the pixel 180D displaying a white image based on the voltage VSIGL (−3.5 V) of the data signal VDATA in the KthFRAME. In other words, the second example of the self-luminous display device driving method according to the fifth embodiment includes displaying images of the same color (white) in consecutive frames. Configurations that are the same as or similar to those in FIG. 1 to FIG. 53 will be described as necessary.

Configurations and functions of the respective signals in the light emission period PEM of the K−1stFRAME to the light emission period PEM are similar to those described in “5-2-1. First Example of Driving Method of Pixel Circuit 181D”.

A configuration of the light emission period PEM of the K−1stFRAME is similar to the configuration described in “5-2-1. First Example of Driving Method of Pixel Circuit 181D”, the pixel 180B emits red light and white light is emitted by three pixels using the pixel 180 emitting red light, the pixel 180 emitting blue light, and the pixel 180 emitting green light.

In the initial period of the horizontal period HRP of the KthFRAME following the light emission period PEM of the K−1stFRAME, similar to the configuration described in “5-2-1. First Example of Driving Method of Pixel Circuit 181D”, the voltage supplied to the first node N1 gradually rises from the voltage Vnan toward the pre-charge voltage VPRC (voltage Vndn), and the voltage supplied to the second node N2 gradually rises from the voltage Vnan toward the initialization voltage VINI1 (voltage Vncn).

In the period PIP, the voltage supplied to the first node N1 becomes the voltage Vndn, and the voltage supplied to the second node N2 gradually rises from the voltage Vnan toward the initialization voltage VINI1 (voltage Vncn, 1.5 V). Since the potential difference between the voltage supplied to the third node N3 and the reference voltage VSSEL is smaller than the threshold voltage VTHEL of the light-emitting element OLED, the light-emitting element OLED does not emit light.

As described above, in the period PIP, the pre-charge voltage (intermediate potential) is supplied to the first node N1, the second node N2 is roughly initialized by the initialization voltage VINI1 (1.5 V), and the third node N3 is initialized by the initialization voltage VINI1 (1.5 V).

In the first period of the horizontal period HRP of the KthFRAME following the period PIP, the data signal VDATA of the voltage VSIGL is supplied to the image data signal SL(m) similar to the configuration described in “5-2-1. Second Example of Driving Method of Pixel Circuit 181C”. The voltage supplied to the first node N1 maintains the voltage Vndn, the voltage supplied to the second node N2 rises to near the voltage Vncn, and the voltage supplied to the third node N3 maintains the voltage Vncn. In addition, similar to the period PIP, the light-emitting element OLED does not emit light.

In the period PWR following the initial period of the horizon period HRP, the image data signal SL(m) is maintained in the state in which the data signal VDATA of the voltage VSIGL is supplied. The voltage supplied to the first node N1 gradually drops from the voltage Vndn to the voltage VSIGL (voltage Vngn, −3.5 V), the voltage supplied to the second node N2 becomes the voltage Vncn, and the voltage supplied to the third node N3 maintains the voltage Vncn. In addition, similar to the period PIP, the light-emitting element OLED does not emit light.

As described above, in the period PWR, the data signal VDATA (in this case, the voltage VSIGL) is written to the pixel 180D. In addition, the second node N2 and the third node N3 are initialized by the initialization VINI1 (1.5 V).

In the period PVH following the period PWR, the image data signal SL(m) is maintained in the state in which the data signal VDATA of the voltage VSIGL is supplied. The voltage supplied to the first node N1 maintains the voltage Vngn.

Immediately after the start of the period PVH, the potential difference Vgs is 0 V, the potential difference Vds is 9.5 V, and the second transistor T2 is in the OFF state. In addition, the fifth transistor T5 is also in the OFF state. On the other hand, since the fourth transistor T4 is in the ON state, the voltage supplied to the second node N2 gradually drops from the voltage Vncn toward the initialization voltage VINI2 (0 V). Since the voltage supplied to the second node N2 is directed to 0 V, the potential difference Vgs exceeds the threshold voltage VTHP. As a result, the second transistor T2 is turned on, discharging of the third node N3 begins, and the third node N3 gradually drops.

Figure 54:
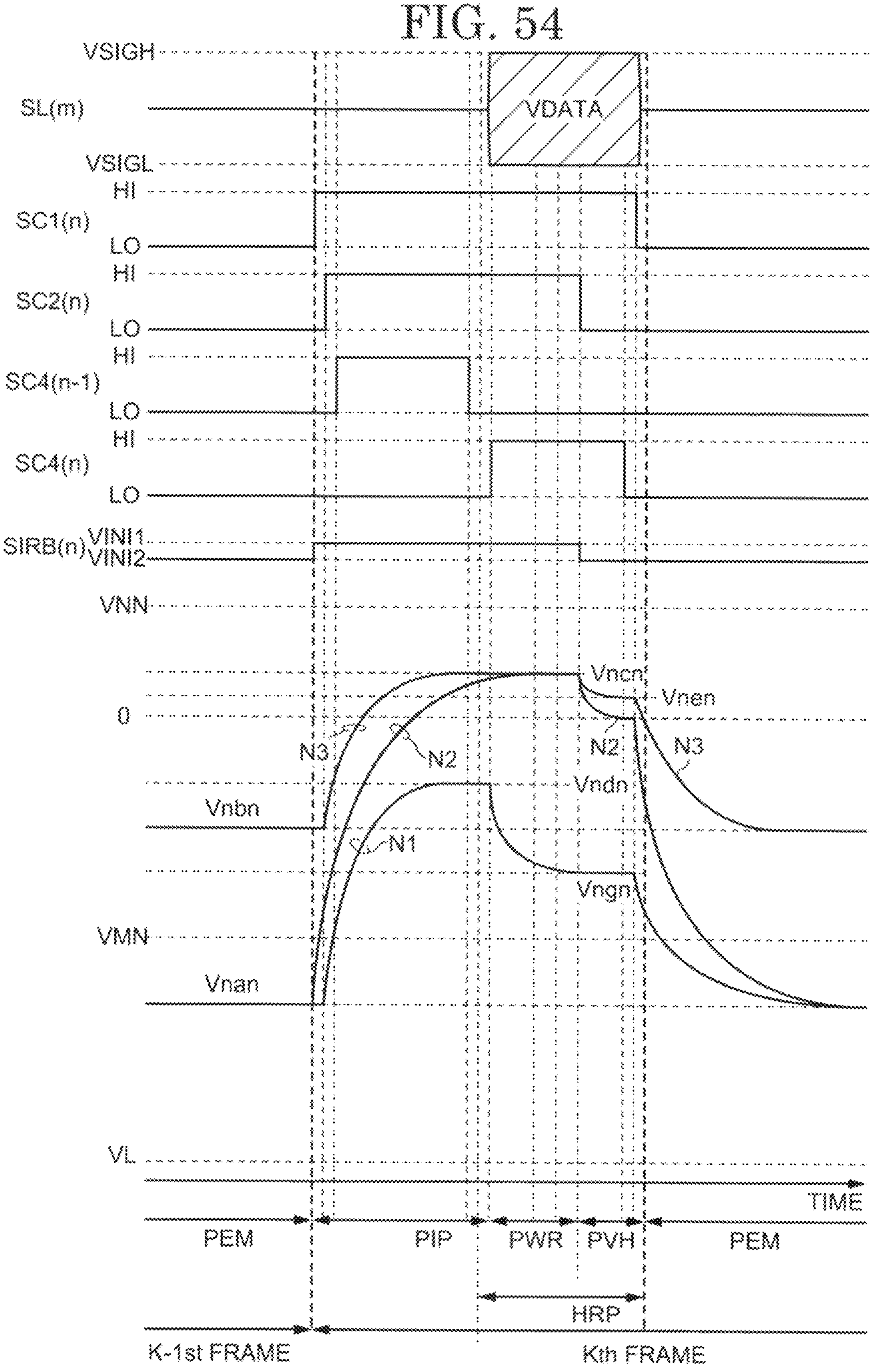
FIG. 54 is a timing chart of a self-luminous display device according to the fifth embodiment of the present invention.
Figure 55:
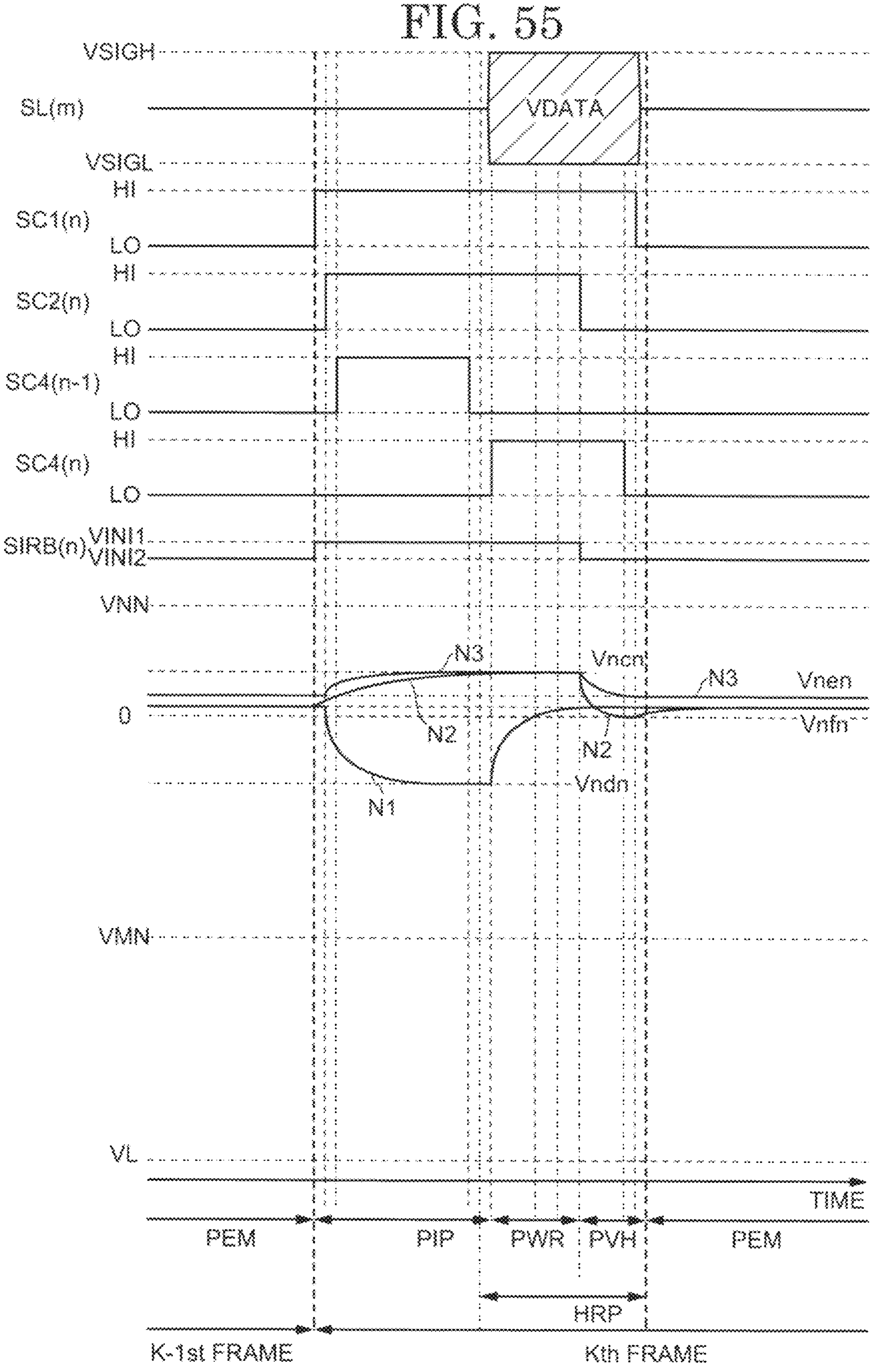
FIG. 55 is a timing chart of a self-luminous display device according to the fifth embodiment of the present invention.

When the potential difference Vgs between the voltage supplied to the second node N2 and the voltage supplied to the third node N3 becomes the threshold voltage VTHP, the voltage supplied to the second node N2 and the voltage supplied to the third node N3 maintain the respective voltages at that time. For example, as shown in FIG. 54, the voltage supplied to the second node N2 is the initialization voltage VINI2 (0 V), and the voltage supplied to the third node N3 is the voltage Vnen (1 V). Since the second transistor T2 is in the OFF state and no current flows from the reference voltage line PVSS to the drive power line PVDD, the light-emitting element OLED does not emit light.

When the potential difference Vgs becomes the threshold voltage VTHP, the second transistor T2 is turned from the ON state to the OFF state, and the drain current Ion does not flow. In this case, the voltage supplied to the third node N3 drops to the voltage Vnen (1 V), and the potential difference Vgs is the same as the threshold voltage VTHP (−1 V). Since the second transistor T2 is in the OFF state and no current flows from the reference voltage line PVSS to the drive power line PVDD, the light-emitting element OLED does not emit light.

In the period at the end of the period PVH, the first node N1 and the second node N2 are conductive, and the voltage of the first node N1 and the voltage of the second node N2 gradually drop. As a result, the second transistor T2 is in the conductive state, and the drain current Ion flows from the reference voltage line PVSS to the drive power line PVDD. Therefore, the voltages of the first node N1 and the third node N3 drop to follow the voltage drop of the second node N2. Due to the voltage drop of the third node N3, the voltages of the first node N1 and the second node N2 further drop.

As described above, in the period PVH, the threshold voltage VTHP of the second transistor T2 is obtained by the operation in which the potential difference Vgs of the second transistor T2 becomes the same as the threshold voltage VTHP, and the charge equivalent to the threshold voltage VTHP is held in the third node N3 (the first electrode 692 of the capacitive element CS).

In the light emission period PEM of the KthFRAME following the horizontal period HRP of the KthFRAME, data is not selected using the selection signal, and the data signal VDATA is switched to the data signal VDATA of the subsequent n+1st row of the n-th row. The voltage of the first node N1 and the voltage of the second node N2 drop to the voltage Vnan, and the voltage of the third node N3 drops to the voltage Vnbn. As a result, the potential difference Vgs is the voltage Vnan (−7 V)−voltage Vnbn (−2.5 V). That is, the potential difference Vgs becomes −4.5 V and is smaller than the threshold voltage VTHP (−1 V). Therefore, the second transistor T2 is in the ON state, and the drain current Ion flows from the reference voltage line PVSS to the drive power line PVDD, so that the light-emitting element OLED emits light. For example, the pixel 180 (pixel circuit 181) emits red light, and white light is emitted by three pixels using the pixel 180 emitting red light, the pixel 180 emitting blue light, and the pixel 180 emitting green light.

The second example of the driving method of the pixel circuit 181D including the configuration described above has similar advantageous effects as those described in "4-2-1. First Example of Driving Method of Pixel Circuit 181C".

[5-2-3. Third Example of Driving Method of Pixel Circuit 181D]

A third example of the driving method of the pixel circuit 181D, such as the conductive state and the non-conductive state of the transistors in the light emission period PEM of the K−1stFRAME in "4-2-3. Third Example of Driving Method of Pixel Circuit 181C", will be described with reference to FIG. 52 and FIG. 55. The driving method shown in the third example of the driving method of the pixel circuit 181D includes the pixel 180D displaying a black image in the previous frame (K−1stFRAME) of the current frame (KthFRAME) based on the voltage VSIGH included in the data signal VDATA and then the pixel 180D displaying a black image in the KthFRAME based on the voltage VSIGH included in the data signal VDATA. In other words, the method includes displaying images of the same color (black) in consecutive frames. Configurations that are the same as or similar to those in FIG. 1 to FIG. 54 will be described as necessary.

The configurations and functions of the respective signals in the light emission period PEM of the K−1stFRAME to the light emission period PEM are similar to those described in "5-2-1. First Example of Driving Method of Pixel Circuit 181D".

In the light emission period PEM of the K−1stFRAME, similar to the configuration obtained by inverting the polarity of the configuration described in "4-2-3. Third Example of Driving Method of Pixel Circuit 181C" and the voltage supplied to the first node N1 and the voltage supplied to the second node N2 are maintained in a state in which the voltage Vnfn (0.5 V) is supplied, and the voltage supplied to the third node N3 is maintained in a state in which the voltage Vnen (1 V) is supplied. As a result, the light-emitting element OLED does not emit light. For example, the pixel 180D becomes black.

In the period PIP of the KthFRAME following the light emission period PEM of the K−1stFRAME, similar to the configuration obtained by inverting the polarity of the configuration described in "4-2-3. Third Example of Driving Method of Pixel Circuit 181C", the voltage supplied to the first node N1 gradually drops from the voltage Vnfn toward the pre-charge voltage VPRC (voltage Vndn, −1.5 V) and becomes the voltage Vndn. The voltage supplied to the second node N2 gradually rises from the voltage Vnfn toward the initialization voltage VINI1 (Vnc, 1.5 V). Further, the voltage supplied to the third node N3 gradually rises from the voltage Vnen toward the initialization voltage VINI1 (Vnc, 1.5 V). In addition, the light-emitting element OLED does not emit light.

As described above, in the period PIP, the pre-charge voltage (intermediate potential) is supplied to the first node N1, the second node N2 is roughly initialized by the initialization voltage VINI1 (1.5 V), and the third node N3 is initialized by the initialization voltage VINI1 (1.5 V).

In the period PWR following the period PIP, the data signal VDATA (in the third example, the voltage VSIGH) is written to the pixel 180D similar to the configuration obtained by inverting the polarity of the configuration described in "4-2-3. Third Example of Driving Method of Pixel Circuit 181C". Further, in the period PVH, the threshold voltage VTHP of the second transistor T2 is obtained by the operation in which the potential difference Vgs of the second transistor T2 becomes the same as the threshold voltage VTHP, and the charge equivalent to the threshold voltage VTHP is held in the third node N3 (the first electrode 692 of the capacitive element CS).

Further, in the light emission period PEM of the KthFRAME, similar to the configuration obtained by inverting the polarity of the configuration described in "4-2-3. Third Example of Driving Method of Pixel Circuit 181C", three pixels using the pixel 180D emitting red light, the pixel 180D emitting blue light, and the pixel 180D emitting green light become black.

The third example of the driving method of the pixel 180D including the configuration described above has similar advantageous effects as those described in "4-2-1. First Example of Driving Method of Pixel Circuit 181C".

[5-2-4. Fourth Example of Driving Method of Pixel Circuit 181D]

A fourth example of the driving method of the pixel circuit 181D, such as the conductive state and the non-conductive state of the transistors in the light emission period PEM of the K−1stFRAME in "4-2-4. Fourth Example of Driving Method of Pixel Circuit 181C", will be described with reference to FIG. 52 and FIG. 56. The driving method shown in the fourth example of the driving method of the pixel circuit 181D includes the pixel 180D displaying a black image based on the voltage VSIGH of the data signal VDATA in the previous frame (K−1stFRAME) of the current frame (KthFRAME) and then the pixel 180 (pixel circuit 181) displaying a white image based on the voltage VSIGL of the data signal VDATA in the KthFRAME. In other words, the method includes displaying images of different colors in consecutive frames. Configurations that are the same as or similar to those in FIG. 1 to FIG. 55 will be described as necessary.

The configurations and functions of the respective signals in the light emission period PEM of the K−1stFRAME to the light emission period PEM are similar to those described in "5-2-1. First Example of Driving Method of Pixel Circuit 181D".

The voltages (potentials) of the first node N1, the second node N2, and the third node N3 in the light emission period PEM of the K−1stFRAME, the operations of the transistors, and the like are similar to the configurations described in "5-2-3. Third Example of Driving Method of Pixel Circuit 181D". That is, the pixel 180D does not emit light and becomes black.

The voltages (potentials) of the first node N1, the second node N2, and the third node N3 in the period PIP of the KthFRAME following the light emission period PEM of the K−1stFRAME, the operations of the transistors, and the like are similar to those described in "5-2-3. Third Example of Driving Method of Pixel Circuit 181D". That is, the voltage supplied to the first node N1 becomes the voltage Vndn, the voltage supplied to the second node N2 gradually rises from the voltage Vnfn toward the initialization voltage VINI1 (Vnc, 1.5 V), and the voltage supplied to the third node N3 gradually rises from the voltage Vnen toward the initialization voltage VINI1 (Vnc, 1.5 V). In addition, the light-emitting element OLED does not emit light.

As described above, in the period PIP, the pre-charge voltage (intermediate potential) is supplied to the first node N1, the second node N2 is roughly initialized by the initialization voltage VINI1 (1.5 V), and the third node N3 is initialized by the initialization voltage VINI1 (1.5 V).

The voltages (potentials) of the first node N1, the second node N2, and the third node N3 in the period PWR to the light emission period PEM, the operation of the transistors, and the like are similar to those described in "5-2-2. Second Example of Driving Method of Pixel Circuit 181D".

In other words, the data signal VDATA (voltage VSIGL in the fourth example) is written to the pixel 180D. Further, in the period PVH, the threshold voltage VTHP of the second transistor T2 is obtained by the operation in which the potential difference Vgs of the second transistor T2 becomes the same as the threshold voltage VTHP, and the charge equivalent to the threshold voltage VTHP is held in the third node N3 (the first electrode 692 of the capacitive element CS). Further, in the light emission period PEM of the KthFRAME, white light is emitted by three pixels using the pixel 180D emitting red light, the pixel 180D emitting blue light, and the pixel 180D emitting green light.

The third example of the driving method of the pixel 180D including the configuration described above has similar advantageous effects as those described in "4-2-1. First Example of Driving Method of Pixel Circuit 181C".

[5-3. Setting Values of Initialization Voltages VINI1 and VINI2]

The setting values of the initialization voltages VINI1 and VINI2 will be described with reference to FIG. 57. FIG. 57 is a diagram for explaining the setting values of the initialization voltages VINI1 and VINI2 of the scan voltage power line SVIRB to which the scan voltage power supply SIRB(n) is supplied. Configurations that are the same as or similar to those in FIG. 1 to FIG. 56 will be described as necessary.

Figure 56:
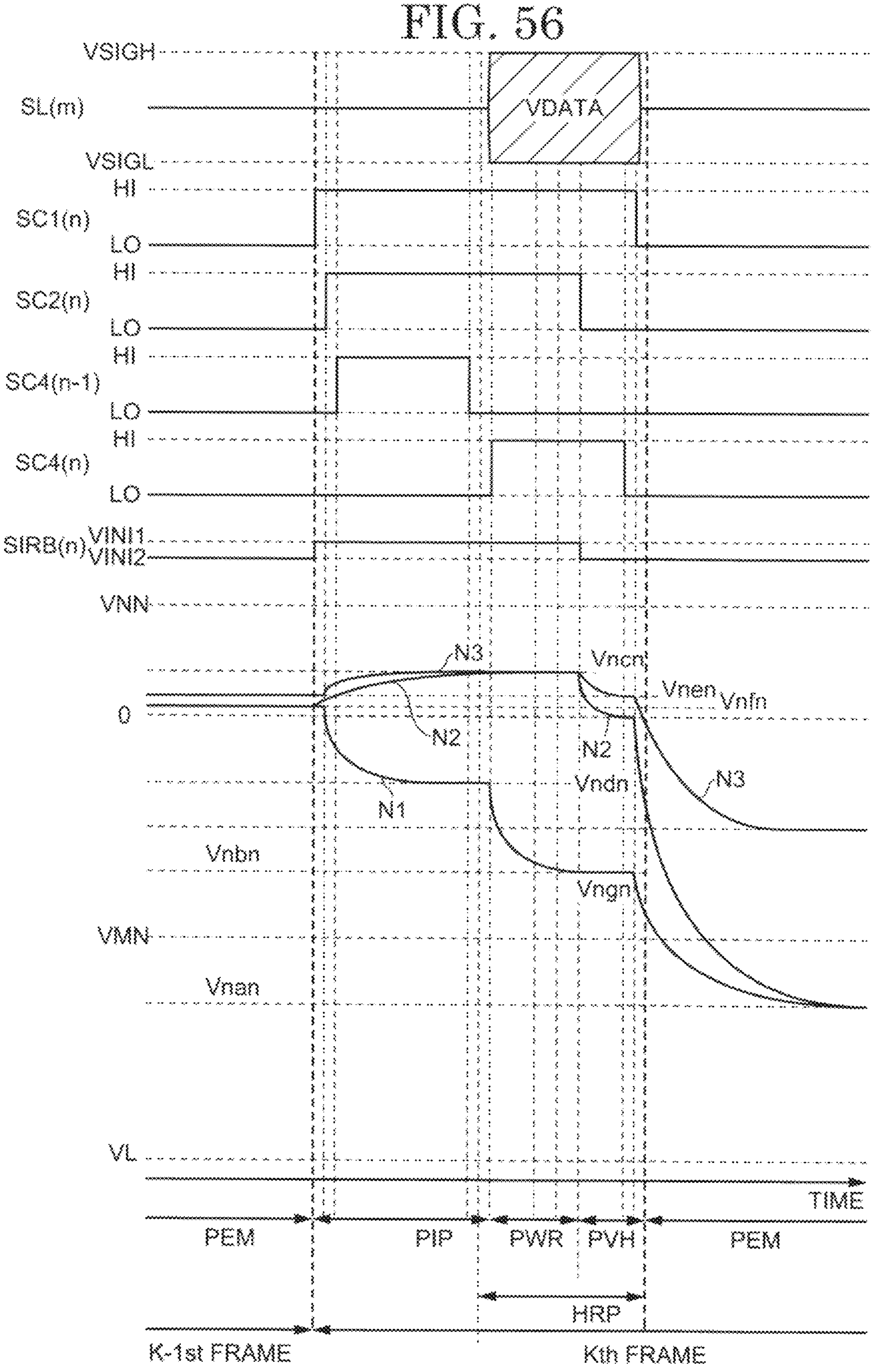
FIG. 56 is a timing chart of a self-luminous display device according to the fifth embodiment of the present invention.
Figure 57:
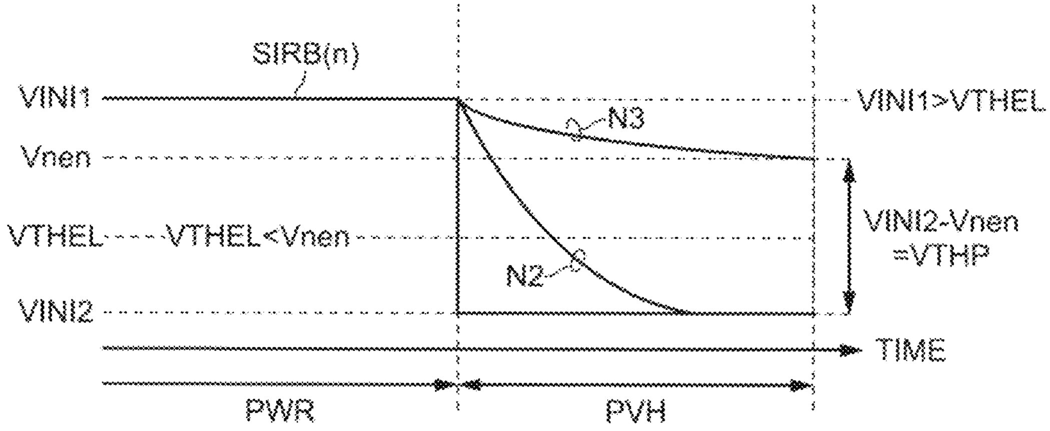
FIG. 57 is a diagram for explaining the setting of an input signal according to the fifth embodiment of the present invention.

For example, as shown in FIG. 56, between the period PWR and the period PVH, according to the timing of the second scan signal SC2(*n*), the scan voltage power supply SIRB(n) changes from the state in which the initialization voltage VINI1 is supplied to the state in which the initialization voltage VINI2 is supplied.

In the period PWR, in the pixel circuit 181D, the scan voltage power supply SIRB(n) (initialization voltage VINI1) is supplied from the scan voltage power line SVIRB to the second node N2 and the third node N3, and the second node N2 and the third node N3 are initialized. The pixel 180D including the pixel circuit 181D does not emit light in the period PWR. The condition that the light-emitting element OLED does not emit light is that the initialization voltage VINI1 supplied to the third node N3 is higher than the threshold voltage VTHEL of the light-emitting element OLED. That is, the initialization voltage VINI1>the threshold voltage VTHEL.

In addition, the pixel circuit 181D corrects the threshold voltage VTHP and holds the charge equivalent to the threshold voltage VTHP in the period PVH. The pixel 180D including the pixel circuit 181D does not emit light in the period PVH. The condition that the light-emitting element OLED does not emit light is that the voltage Vnen supplied to the third node N3 is higher than the threshold voltage VTHEL of the light-emitting element OLED. That is, the voltage Vnen>the threshold voltage VTHEL.

Further, for example, in the case where the pixel circuit 181D emits light based on the voltage VSIGL corresponding to white, the initialization voltage VINI2 is supplied to the second node N2 and the voltage Vnen is supplied to the third node N3. In this case, the potential difference Vgs is the difference between the voltage supplied to the second node N2 and the voltage supplied to the third node N3, and the potential difference Vgs=the initializing voltage VINI2−the voltage Vnen. In addition, the potential difference Vgs becomes the threshold voltage VTHP, and the initialization voltage VINI2−the voltage Vnen=the threshold voltage VTHP.

As shown in FIG. 57, the condition of the initialization voltage VINI2 calculated using the above formula is the initialization voltage VINI2>the threshold voltage VTHEL+the threshold voltage VTHP. In addition, the condition of the initialization voltage VINI1 is the initialization voltage VINI1>the threshold voltage VTHEL.

6. Sixth Embodiment

Figure 58:
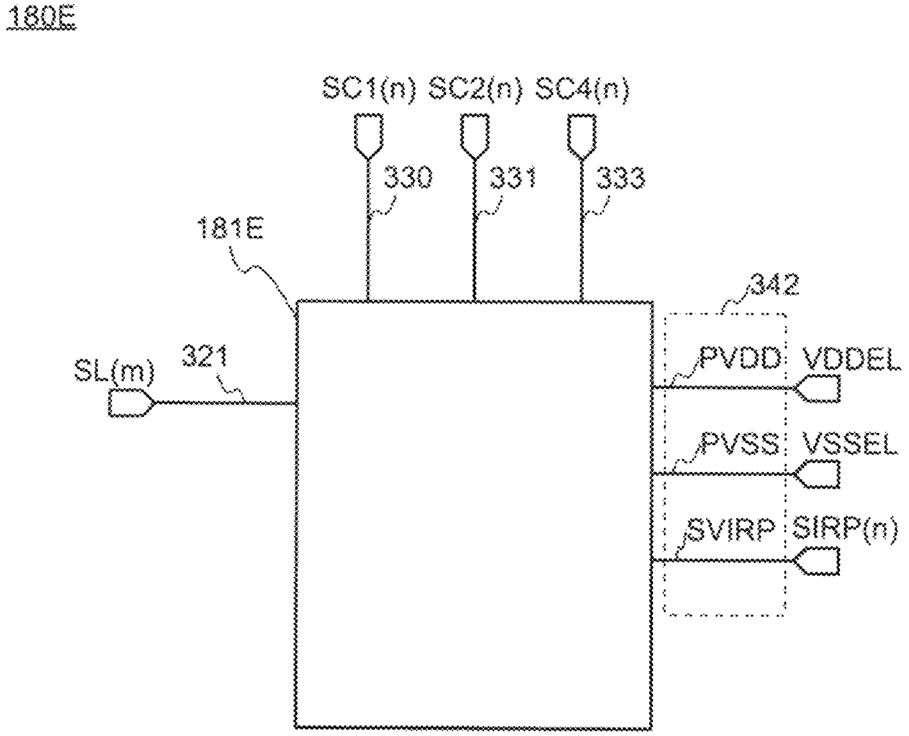
FIG. 58 is a schematic diagram showing an input signal to a pixel circuit according to the sixth embodiment of the present invention.
Figure 59:
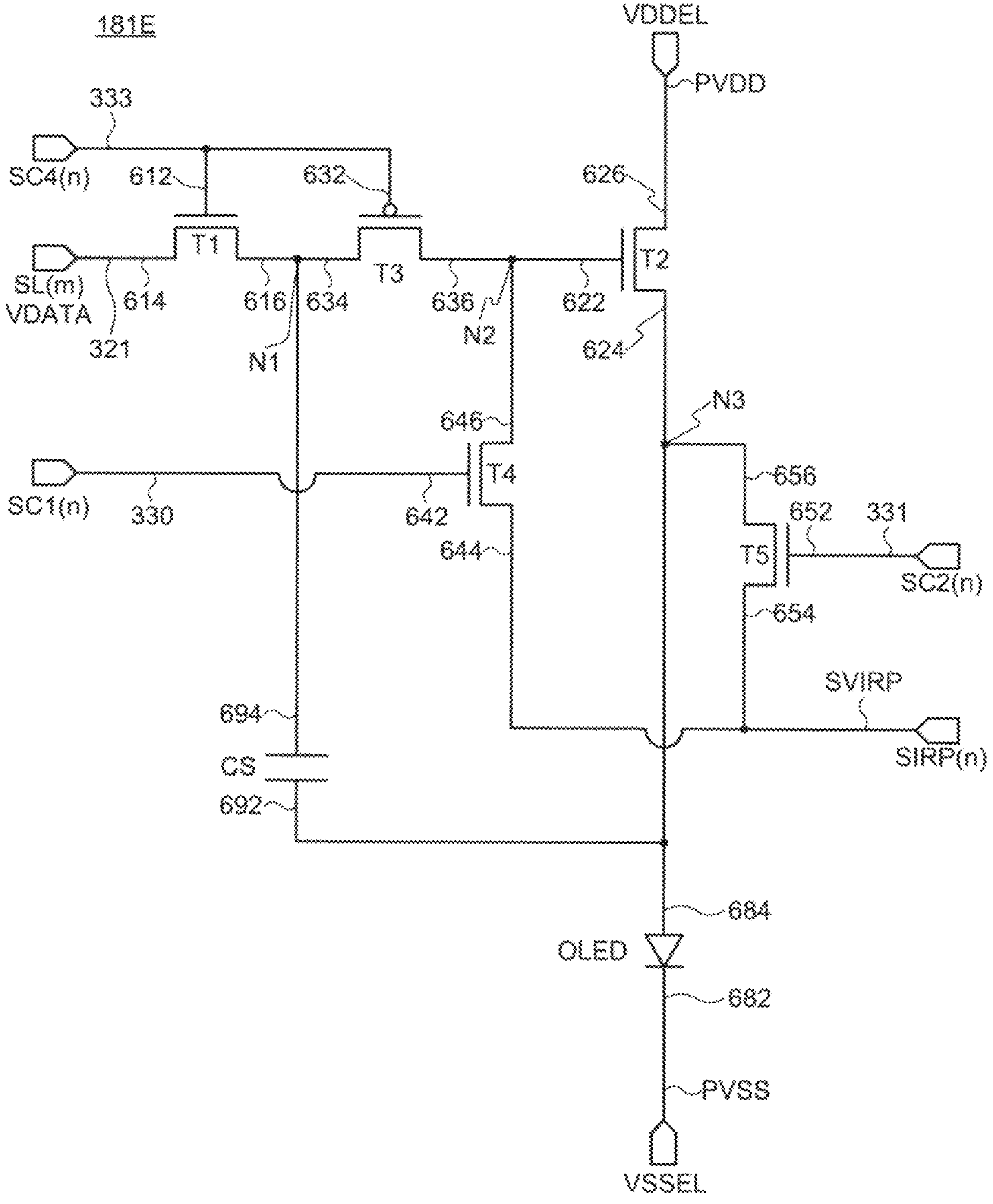
FIG. 59 is a circuit diagram showing a configuration of a pixel circuit according to the sixth embodiment of the present invention.

An overview of the self-luminous display device according to a sixth embodiment will be described with reference to FIG. 1, FIG. 6, and FIG. 58 to FIG. 63. FIG. 58 is a schematic diagram showing an input signal to a pixel 180E (pixel circuit 181E) according to the sixth embodiment, FIG. 59 is a circuit diagram showing the configuration of the pixel circuit 181E, and FIG. 60 to FIG. 63 are timing charts of the self-luminous display device according to the sixth embodiment.

The self-luminous display device according to the sixth embodiment includes the pixel 180E and a pixel circuit 181E. Configurations of the pixel 180E and the pixel circuit 181E are different from the configurations of the pixel 180A and the pixel circuit 181A of the self-luminous display device 10 according to the second embodiment. Specifically, the pixel 180E and the pixel circuit 181E have configurations and functions in which the third transistor T3 is not electrically connected to the first scan signal SC1(*n*) but is electrically connected to the fourth scan signal SC4(*n*). In addition, the pixel 180E and the pixel circuit 181E have configurations and functions in which the pre-charge voltage power line SVP and the scan voltage power supply SIR(n) supplied to the pixel circuit 181A are replaced with a scan voltage power supply SIRP(n) serving as both the pre-charge voltage power line SVP and the scan voltage power supply SIR(n). The scan voltage power supply SIRP(n) is a power supply in which the pre-charge voltage VPRC, the initialization voltage VINI1, and the initialization voltage VINI2 change with time. In addition, the self-luminous display device according to the sixth embodiment does not include the sixth transistor T6. Other configurations and functions are similar to those of the self-luminous display device according to the second embodiment. In describing the configurations and functions of the sixth embodiment, similar configurations and functions as those of the self-luminous display device according to the second embodiment will be described as necessary. In addition, configurations that are the same as or similar to those in FIG. 1 to FIG. 57 will be described as necessary.

[6-1. Configuration of Pixel 180E]

An overview of the pixel 180E and the pixel circuit 181E will be described with reference to FIG. 58 and FIG. 59.

The pixel circuit 181E is connected to a scan voltage power line SVIRP. The scan voltage power line SVIRP is a signal line serving as both the reference voltage power line SVR and the scan voltage power line SVIR supplied to the pixel 181A. In other words, the scan voltage power line SVIRP is a signal line that combines the reference voltage power line SVR and the scan voltage power line SVIR supplied to the pixel circuit 181A. The scan voltage power line SVIRP may be referred to as a third control signal line. In addition, the scan voltage power line SVIRP is a wiring that functions as a power supply, but is handled as a signal line because the voltage (potential) is changed and used.

The scan voltage power supply SIRP(n) is supplied to the scan voltage power line SVIRP. In the pixel circuit 181E, the first electrode 644 of the fourth transistor T4 and the first electrode 654 of the fifth transistor T5 are electrically connected to the scan voltage power line SVIRP.

For example, the scan voltage power line SVIRP is electrically connected to the connection wiring 342 of the connection wiring 342 (see FIG. 1 and FIG. 58) that is different from the drive power line PVDD and the reference voltage line PVSS. Further, for example, the scan voltage power line SVIRP may be one of the connection wirings 342.

For example, similar to the pre-charge voltage VPRC, the initialization voltage VINI1, and the initialization voltage VINI2, the scan voltage power supply SIRP(n) may be supplied from an external device to the IC chip 110 (see FIG. 1), and may be supplied from the IC chip 110 to the plurality of pixels 180E via the connection wiring 342 and the scan voltage power line SVIRP. Although not shown, similar to the pre-charge voltage VPRC, the initialization voltage VINI1, and the initialization voltage VINI2, the scan voltage power supply SIRP(n) may be connected to the scan voltage power line SVIR and may be supplied to the plurality of pixels 180E from the external device through the FPC 200, the terminal section 150, and the connection wiring 341 without passing through the IC chip 110 and the connection wiring 342.

The switching of the third transistor T3 is controlled using the fourth scan signal SC4(*n*). The switching of the conductive state (ON state) and the non-conductive state (OFF state) of the third transistor T3 is controlled by the fourth scan signal SC4(*n*). When the signal supplied to the fourth scan signal SC4(*n*) is LO, the third transistor T3 is in the conductive state. When the signal supplied to the fourth scan signal SC4(*n*) is HI, the third transistor T3 is in the non-conductive state. When the third transistor T3 is in the conductive state, the fourth transistor T4 is in the conductive state, and the third transistor T3 has a function of conducting the second node N2 and the first node N1 and is electrically connected to the fourth transistor T4 and the scan voltage power line SVIRP. As a result, the third transistor T3 has a function of supplying the pre-charge voltage VPRC (intermediate potential) to the second node N2 to supply the intermediate potential to the second node N2.

The fourth transistor T4 has a function of conducting the second node N2 and the scan voltage power line SVIRP to supply the initialization voltage VINI1 or VINI2 to the second node N2 and initializing the second node N2. For example, the initialization voltages VINI1 and VINI2 are constant voltages.

The fifth transistor T5 has a function of conducting the third node N3 and the scan voltage power line SVIRP to supply the initialization voltage VINI1 or VINI2 to the second node N2 and initializing the third node N3.

Configuration and functions of the pixel circuit 181E other than the configurations and functions described in "2-1. Configuration of Pixel 180E" are similar to those of the pixel circuit 181A.

[6-2. Driving Method of Pixel Circuit 181E]

A driving method of the self-luminous display device according to the sixth embodiment will be described with reference to FIG. 60 to FIG. 63. Configurations that are the same as or similar to those in FIG. 1 to FIG. 59 will be described as necessary. In addition, similar to the first embodiment, the horizontal axis of the timing charts represents time (TIME).

The driving method of the self-luminous display device according to the sixth embodiment has a configuration and function in which the operations related to the pre-charge voltage power line SVP (pre-charge voltage VPRC) and the scan voltage power line SVIR (initialization voltage VINI1 and initialization voltage VINI2) are replaced with the operation related to the scan voltage power supply SIRP(n) without including the sixth transistor T6 in the driving method of the self-luminous power source SIRP according to the second embodiment. Configurations and functions other than the operation related to the scan voltage power supply SIRP(n) without including the sixth transistor T6 are similar to those of the driving method of the self-luminous display device according to the second embodiment.

The driving method of the self-luminous display device according to the sixth embodiment is different from the driving method of the self-luminous display device 10 according to the first embodiment shown in FIG. 6 in that the period PVH is executed after the period PWR.

In the one horizontal period (horizontal period HRP) in the driving method of the self-luminous display device according to the sixth embodiment, the first scan signal SC1(*n*), the second scan signal SC2(*n*), the fourth scan signal SC4(*n*), the image data signal SL(m) including the data signal VDATA, and the scan voltage power supply SIRP(n) are input to the pixel 180E. For example, the pixel 180E is selected according to the timings of the first scan signal SC1(*n*), the second scan signal SC2(*n*), and the fourth scan signal SC4(*n*). The image data signal SL(m) and the scan voltage power supply SIRP(n) are input to the selected pixel 180E according to the timings of the respective signals. Similar operations are performed on all the pixels 180E, and an image of the frame corresponding to 1FRAME is displayed on the display region 22 of the self-luminous display device 10 based on the image data signal SL(m) input to all the pixels 180E.

For example, the voltages (potentials) supplied to each signal and each node of each frame in the timing charts shown in FIG. 60 to FIG. 63 are shown in Table 11 and Table 12.

TABLE 11

| | PIP | PWR | PVH | PEM |
|---|---|---|---|---|
| SC1(n) | HI | HI | HI | LO |
| SC2(n) | HI | HI | LO | LO |
| SC4(n) | LO | HI | HI | LO |
| SIRP(n) | −0 [V] | −3 [V] | −1.5 [V] | 0 [V] |
| SL(m) | — | −2 [V](Black) ~2 [V](White) | −2 [V](Black) ~2 [V](White) | — |
| N1 | 0 [V] (Intermediate potential) | −2 [V]~2 [V] | −2 [V]~2 [V] | Rise in conjunction with the rise of potential of N3 |
| N2 | 0 [V] | −3 [V] | −1.5 [V] | In conjunction with potential of N1 |
| N3 | 0 [V] | −3 [V] | −2.5 [V] (=VINI2−VTH) | Rise in conjunction with Ion with VGS |
| Vgs (= V(N2)-V(N3)) | 0 [V] | 0 [V] | 1 [V] | |
| Remarks | Initialize T2 and OLED Apply precharge potential (inter-mediate potential) to CS | Apply VDATA to CS | Acquiring and retaining VTH Potential of N3 = VINI2-VTH Potential of N1-Potential of N3 = VDATA-(VREF-VTH) Non-light emitting below VTHEL | Light emitting VGS = VDATA-(VREF-VTH) |

TABLE 12

| | Setting value [V] |
|---|---|
| VTH | 1 |
| VTHEL | 0.7 |
| VSIGL(Black) | −2 |
| VSIGH(White) | 2 |
| HI | 10 |
| LO | −5 |
| VINI1 | −3 |
| VINI2 | −1.5 |
| VPRC | 0 |
| VDDEL | 8 |
| VSSEL | 0 |

[6-2-1. First Example of Driving Method of Pixel Circuit 181E]

Figure 60:
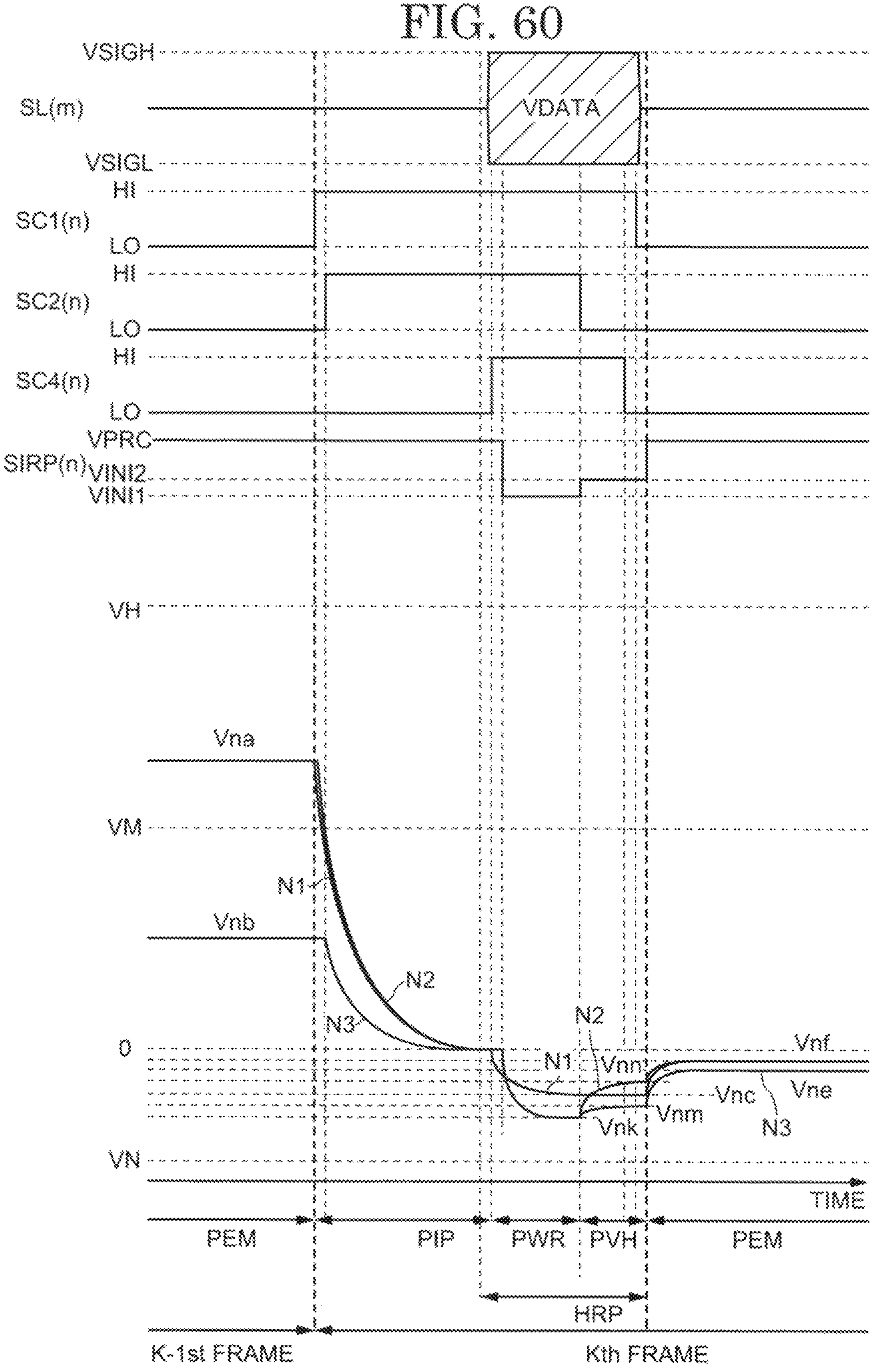
FIG. 60 is a timing chart of a self-luminous display device according to the sixth embodiment of the present invention.

A first example of the driving method of the pixel circuit 181E will be described with reference to FIG. 60. The first example of the driving method of the pixel circuit 181E includes displaying images of different colors in consecutive frames similar to the first example of the driving method of the self-luminous display device 10 according to the first embodiment.

The pre-charge voltage VPRC is supplied to the scan voltage power supply SIRP(n) in the light emission period PEM of the K−1stFRAME, the period PIP of the KthFRAME, a part of the period PWC of the KthFRAME, and the light emission period PEM of the KthFRAME, the initialization voltage VINI2 is supplied to the period PWR of the KthFRAME, and the initialization voltage VINI1 is supplied to the period PVH of the KthFRAME.

For example, as shown in Table 12, the voltage VSIGL corresponding to the non-light-emitting black is −2 V, the voltage VSIGH corresponding to the light emission is 2 V, the voltage VL (LO) is −5 V, the initialization voltage VINI2 is −1.5 V, the initialization voltage VINI1 is −3 V, and the pre-charge voltage VPRC is 0 V. Other setting values are the setting values shown in Table 4 described in "2-2. Driving Method of Pixel Circuit 181A".

The configurations of the image data signal SL(m), the first scan signal SC1(*n*), the second scan signal SC2(*n*), and the fourth scan signal SC4(*n*) in the light emission period PEM of the K−1stFRAME to the light emission period PEM of the KthFRAME are similar to those described in "2-2-1. First Example of Driving Method of Pixel Circuit 181A". Configurations and the like similar to those described in "2-2-1. First Example of Driving Method of Pixel Circuit 181A" will be described as necessary.

In the light emission period PEM of the K−1stFRAME, data is not selected using the selection signal, and the data signal VDATA of the previous n−1st row of the n-th row is applied to the data signal VDATA. The pre-charge voltage VPRC (0 V) is supplied to the scan voltage power supply SIRP(n). The first transistor T1, the fourth transistor T4, and the fifth transistor are in the OFF state, and the third transistor T3 is in the ON state. In addition, the voltage Vna supplied to the first node N1 and the second node N2 is 7 V, the voltage Vnb supplied to the third node N3 is 2.5 V, and the potential difference Vgs is 4.5 V. Therefore, the second transistor T2 is in the ON state and can flow the current Ion based on the potential difference Vgs and the potential difference Vds corresponding to the voltage VSIGH (2 V) input in the horizontal period HRP of the K−1stFRAME. In addition, the current Ion flows from the drive power line PVDD to the light-emitting element OLED and the reference voltage line PVSS, and the light-emitting element OLED emits light.

In the period PIP of the KthFRAME following the light emission period PEM of the K−1stFRAME, for example, the pixel 180E is in the state in which the image data signal SL(m) of the data signal VDATA of the previous n−1st row of the n-th row is input. The scan voltage power supply SIRP(n) is maintained in the state in which the pre-charge voltage VPRC (0 V) is supplied. The fourth transistor T4 and the fifth transistor are turned from the OFF state to the ON state, the third transistor T3 is maintained in the ON state, and the first transistor T1 is maintained in the OFF state. As a result, the voltage supplied to the first node N1 and the voltage supplied to the second node N2 gradually drop from the voltage Vna toward the pre-charge voltage VPRC (0 V) to become 0 V, and the voltage supplied to the third node N3 gradually drops from the voltage Vnb toward the pre-charge voltage VPRC (0 V) to become 0 V. Since the potential difference Vgs is 0 V and smaller than the threshold voltage VTH, the second transistor T2 is turned off. Therefore, since the drain current Ion does not flow from the drive power line PVDD to the initialization voltage power line SVI or the reference voltage line PVSS, the light-emitting element OLED does not emit light.

As described above, in the period PIP, the intermediate potential is supplied to the first node N1, the second node N2, and the third node N3 by the pre-charge voltage VPRC (0 V). Therefore, in the period PIP, the pre-charge voltage (intermediate potential) is supplied to the first node N1, and the second node N2 and the third node N3 are initialized by the pre-charge voltage VPRC (0 V).

In the period PWR of the horizontal period HRP of the KthFRAME following the period PIP of the KthFRAME, the data signal VDATA of the voltage VSIGL is supplied to the image data signal SL(m). When the fourth scan signal SC4(*n*) changes from the state in which LO is supplied to the state in which HI is supplied, the scan voltage power supply SIRP(n) changes from the state in which the pre-charge voltage VPRC (0 V) is supplied to the state in which the initialization voltage VINI1 (−3 V) is supplied. The first transistor T1 is turned from the OFF state to the ON state, the third transistor T3 is turned from the ON state to the OFF state, and the fourth transistor T4 and the fifth transistor T5 are maintained in the ON state. As a result, the voltage supplied to the first node N1 gradually drops from 0 V toward the voltage VSIGL (voltage Vnc, −2 V) to become the voltage VSIGL (voltage Vnc, −2 V), and the voltage supplied to the second node N2 and the voltage supplied to the third node N3 gradually drop from 0 V toward the initialization voltage VINI1 (voltage Vnk, −3 V). In addition, similar to the period PIP, the potential difference Vgs is 0 V, the second transistor T2 is in the OFF state, and the light-emitting element OLED does not emit light.

As described above, in the period PWR, the data signal VDATA is written to the pixel 180 (pixel circuit 181), and the voltage supplied to the second node N2 and the voltage supplied to the third node N3 become the initialization voltage VINI1 (voltage Vnk, −3 V).

In the period PVH of the KthFRAME following the period PWR of the horizontal period HRP of the KthFRAME, the image data signal SL(m) is maintained in the state in which the data signal VDATA of the voltage VSIGL is supplied. When the second scan signal SC2(*n*) changes from the state in which HI is supplied to the state in which LO is supplied, the scan voltage power supply SIRP(n) changes from the state in which the initialization voltage VINI1 (−3 V) is supplied to the state in which the initialization voltage VINI2 (−1.5 V) is supplied. The fifth transistor T5 is turned from the ON state to the OFF state, the third transistor T3 is maintained in the OFF state, and the first transistor T1 and the fourth transistor T4 are maintained in the ON state. As a result, the voltage supplied to the first node N1 maintains the voltage VSIGL (voltage Vnc, −2 V), and the voltage supplied to the second node N2 gradually rises from the voltage Vnk toward the initialization voltage VINI2 (voltage Vnn, −1.5 V) and becomes the initialization voltage VINI2 (voltage Vnn, −1.5 V).

Immediately after the start of the period PVH, the potential difference Vgs is 0 V, the potential difference Vds is 11 V, and the second transistor T2 is in the OFF state. In addition, the fifth transistor T5 is also in the OFF state. On the other hand, the fourth transistor T4 is in the ON state, and the voltage supplied to the second node N2 rises from the voltage Vnk toward the initialization voltage VINI2 (voltage Vnn, −1.5 V). Since the voltage supplied to the second node N2 is directed to −1.5 V, the potential difference Vgs exceeds the threshold voltage VTH. As a result, the second transistor T2 is turned on, charging of the third node N3 begins, and the voltage of the third node N3 gradually rises.

When the potential difference Vgs between the voltage supplied to the second node N2 and the voltage supplied to the third node N3 becomes the threshold voltage VTH, the voltage supplied to the second node N2 and the voltage supplied to the third node N3 maintain the respective voltages at that time. For example, as shown in FIG. 27 and FIG. 60, the voltage supplied to the second node N2 is the initialization voltage VINI2 (voltage Vnn, −1.5 V), and the voltage supplied to the third node N3 is a voltage Vnm (−2.5 V). In this case, since the potential difference Vgs is 1 V, the potential difference Vds is 10.5 V, and the potential difference Vgs is the same as the threshold voltage VTH, the second transistor T2 is in the OFF state and no current flows from the drive power line PVDD to the reference voltage line PVSS, the light-emitting element OLED does not emit light.

In the period at the end of the period PVH, the image data signal SL(m) is maintained in the state in which the data signal VDATA of the voltage VSIGL is supplied. When the fourth scan signal SC4(*n*) changes from the state in which HI is supplied to the state in which LO is supplied, the first scan signal SC1(*n*) changes from the state in which HI is supplied to the state in which LO is supplied. The scan voltage power supply SIRP(n) is maintained in the state in which the initialization voltage VINI2 (−1.5 V) is supplied. The first transistor T1 and the fourth transistor T4 are turned from the ON state to the OFF state, the third transistor T3 is turned from the OFF state to the ON state, and the fifth transistor T5 is maintained in the OFF state.

As described above, in the period PVH, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS).

In the light emission period PEM of the KthFRAME following the horizontal period HRP of the KthFRAME, data is not selected using the selection signal, and the data signal VDATA is switched to the data signal VDATA of the subsequent row(n+1) of the n-th row. When the first scan signal SC1(*n*) changes from the state in which HI is supplied to the state in which LO is supplied, the scan voltage power supply SIRP(n) changes from the state in which the initialization voltage VINI2 (−1.5 V) is supplied to the state in which the pre-charge voltage VPRC (0 V) is supplied. The third transistor T3 is maintained in the ON state, and the first transistor T1, the fourth transistor T4, and the fifth transistor T5 are maintained in the OFF state. The voltage supplied to the third node N3 rises slightly from Vnm due to capacitive coupling and becomes the voltage Vne (−1 V). The rise in the voltage supplied to the third node N3 causes the voltage supplied to the first node N1 and the voltage supplied to the second node N2 to gradually rise toward the voltage Vnf and become the voltage Vnf (−0.5 V). Therefore, since the potential difference Vgs is −0.5 V, the second transistor T2 is in the OFF state, and no current flows from the drive power line PVDD to the reference voltage line PVSS, the light-emitting element OLED does not emit light. As a result, in the light emission period PEM of the KthFRAME, three pixels using the pixel 180E emitting red light, the pixel 180E emitting blue light, and the pixel 180E emitting green light become black.

The first example of the driving method of the pixel circuit 181E including the above-described configuration has similar advantageous effects as the method for driving the self-luminous display device 10 according to the first embodiment.

In addition, the pixel circuit 181E has configurations and functions in which the pre-charge voltage power line SVP and the scan voltage power supply SIR(n) supplied to the pixel circuit 181A are replaced with the scan voltage power supply SIRP(n) serving as both the pre-charge voltage power line SVP and the scan voltage power supply SIR(n). Further, the pixel circuit 181E does not include the sixth transistor T6. Therefore, since the pixel circuit 181E has a configuration capable of reducing the number of signal lines and a configuration capable of reducing the number of transistors, the self-luminous display device including the pixel circuit 181E can reduce the size of the pixel. As a result, the self-luminous display device including the pixel circuit 181E can increase the number of pixels and achieve high definition and a large screen.

[6-2-2. Second Example of Driving Method of Pixel Circuit 181E]

Figure 61:
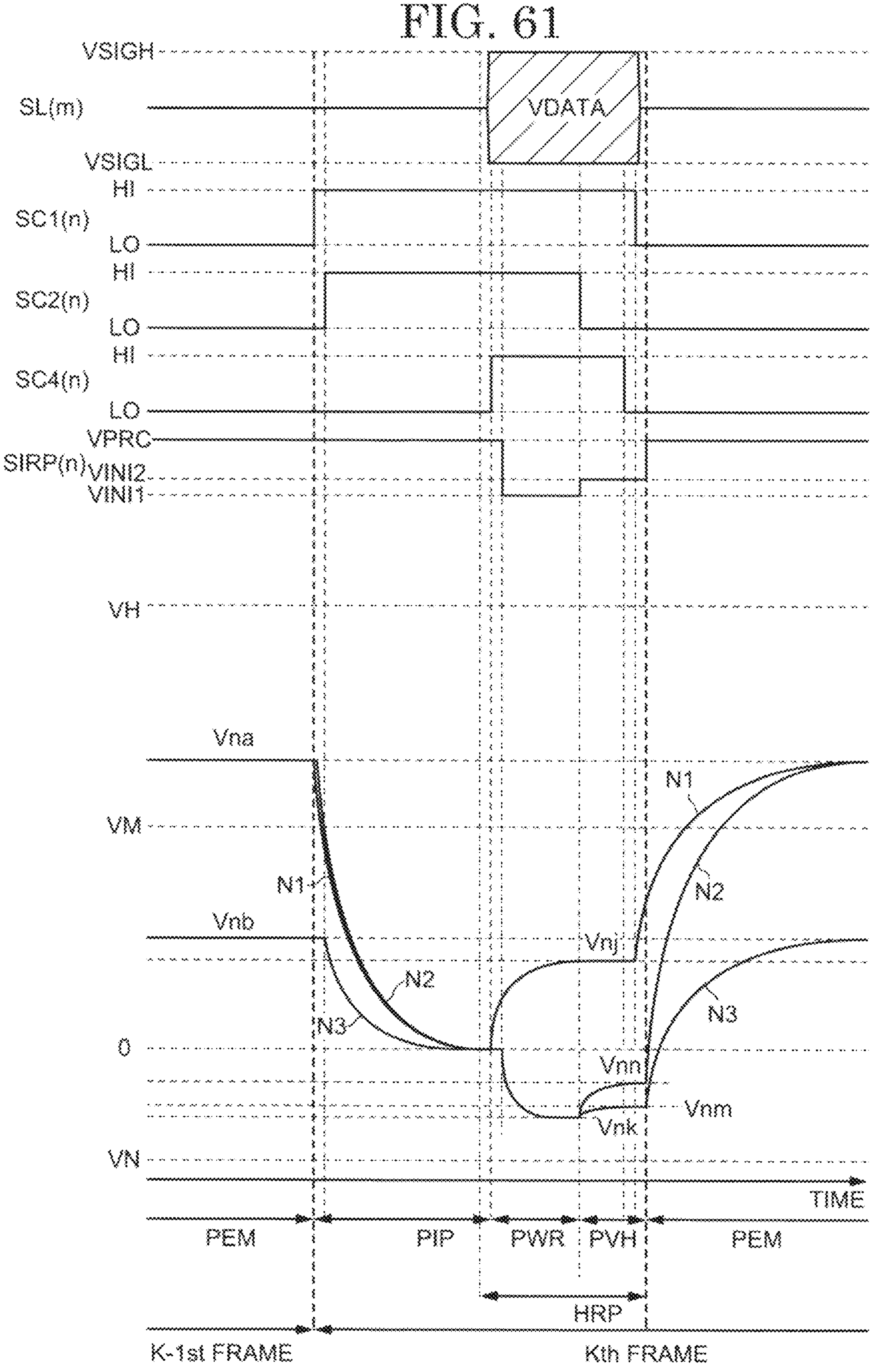
FIG. 61 is a timing chart of a self-luminous display device according to the sixth embodiment of the present invention.

A second example of the driving method of the pixel circuit 181E will be described with reference to FIG. 61. Similar to the second example of the driving method of the self-luminous display device 10 according to the first embodiment, the driving method shown in the second example of the pixel circuit 181E includes displaying images of the same color (white) in consecutive frames. Configurations that are the same as or similar to those in FIG. 1 to FIG. 60 will be described as necessary.

Configurations of the image data signal SL(m), the first scan signal SC1(*n*), the second scan signal SC2(*n*), the fourth scan signal SC4(*n*), and the scan voltage power supply SIRP(n) in the light emission period PEM of the K−1stFRAME to the light emission period PEM of the KthFRAME are similar to the configurations described in "6-2-1. First Example of Driving Method of Pixel Circuit 181E". Further, the voltages (potentials) of the respective nodes and the respective transistors in the light emission period PEM of the K−1stFRAME and the period PIP of the KthFRAME, and the operations of the respective transistors are similar to the configurations described in "6-2-1. First Example of Driving Method of Pixel Circuit 181E". Configurations and the like similar to those described in "6-2-1. First Example of Driving Method of Pixel Circuit 181E" will be described as necessary. In addition, the data signal VDATA including the VSIGH (2 V) corresponding to white is supplied to the image data signal SL(m) in the period between the light emission period PEM of the K−1stFRAME and the light emission period PEM of the KthFRAME.

In the light emission period PEM of the K−1stFRAME, the light-emitting element OLED emits light similar to the configuration described in "6-2-1. First Example of Driving Method of Pixel Circuit 181E".

In the period PIP of the KthFRAME following the light emission period PEM of the K−1stFRAME, similar to the configuration described in "6-2-1. First Example of Driving Method of Pixel Circuit 181E", the first node N1, the second node N2, and the third node N3 are in the state in which the intermediate potential is supplied due to the pre-charge voltage VPRC (0 V). Therefore, in the period PIP, the pre-charge voltage (intermediate potential) is supplied to the first node N1, and the second node N2 and the third node N3 are initialized by the pre-charge voltage VPRC (0 V). In addition, the potential difference Vgs is 0 V, the second transistor T2 is in the OFF state, and the light-emitting element OLED does not emit light.

In the period PWR of the horizontal period HRP of the KthFRAME following the period PIP of the KthFRAME, the image data signal SL(m) is maintained in the state in which the data signal VDATA of the voltage VSIGH is supplied. The voltage supplied to the first node N1 gradually rises from 0 V toward the voltage VSIGH (voltage Vnj, 2 V) to become the voltage VSIGH (voltage Vnj, 2 V), and the voltage supplied to the second node N2 and the voltage supplied to the third node N3 gradually drop from 0 V toward the initialization voltage VINI1 (voltage Vnk, −3 V). In addition, similar to the period PIP, the potential difference Vgs is 0 V, the second transistor T2 is in the OFF state, and the light-emitting element OLED does not emit light.

As described above, in the period PWR, the data signal VDATA is written to the pixel 180 (pixel circuit 181), and the voltage supplied to the second node N2 and the voltage supplied to the third node N3 become the initialization voltage VINI1 (voltage Vnk, −3 V).

In the period PVH of the KthFRAME following the period PWR of the horizontal period HRP of the KthFRAME, the image data signal SL(m) is maintained in the state in which the data signal VDATA including the voltage VSIGH is supplied. The voltage supplied to the first node N1 maintains the voltage VSIGH (voltage Vnj, 2 V), and the voltage supplied to the second node N2 gradually rises from the voltage Vnk toward the initialization voltage VINI2 (voltage Vnn, −1.5 V) to become the initialization voltage VINI2 (voltage Vnn, −1.5 V).

Immediately after the start of the period PVH, the potential difference Vgs is 0 V, the potential difference Vds is 11 V, and the second transistor T2 is in the OFF state. In addition, the fifth transistor T5 is also in the OFF state. On the other hand, the fourth transistor T4 is in the ON state, and the voltage supplied to the second node N2 rises from the voltage Vnk toward the initialization voltage VINI2 (voltage Vnn, −1.5 V). Since the voltage supplied to the second node N2 is directed to −1.5 V, the potential difference Vgs exceeds the threshold voltage VTH. As a result, the second transistor T2 is turned on, charging of the third node N3 begins, and the third node N3 gradually rises.

When the potential difference Vgs between the voltage supplied to the second node N2 and the voltage supplied to the third node N3 becomes the threshold voltage VTH, the voltage supplied to the second node N2 and the voltage supplied to the third node N3 maintain the respective voltages at that time. For example, as shown in FIG. 61, the voltage supplied to the second node N2 is the initialization voltage VINI2 (voltage Vnn, −1.5 V), and the voltage supplied to the third node N3 is the voltage Vnm (−2.5 V). In this case, the potential difference Vgs is 1 V, the potential difference Vds is 10.5 V, and the potential difference Vgs is the same as the threshold voltage VTH, so that the second transistor T2 is in the OFF state and no current flows from the drive power line PVDD to the reference voltage line PVSS, and the light-emitting element OLED does not emit light.

In the period at the end of the period PVH, the image data signal SL(m) is maintained in the state in which the data signal VDATA of the voltage VSIGH is supplied. The first node N1 and the second node N2 are conductive, and the voltage supplied to the second node N2 rises due to the voltage Vnj supplied to the first node N1. The second transistor T2 is turned on, and the voltage supplied to the third node N3 rises due to the drain current Ion. Due to the increase in the voltage of the third node N3, the voltage of the first node N1 and the voltage of the second node N2 further rise and toward the voltage Vna.

As described above, in the period PVH, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS).

In the light emission period PEM of the KthFRAME following the horizontal period HRP of the KthFRAME, data is not selected using the selection signal, and the data signal VDATA is switched to the data signal VDATA of the subsequent n+1st row of the n-th row. The voltage supplied to the first node N1 and the voltage supplied to the second node N2 gradually rise toward the voltage Vna to become the voltage Vna (7 V), and the voltage supplied to the third node N3 becomes the voltage Vnb (2.5 V). When the voltages of the first node N1 and the second node N2 gradually rise from the voltage Vnm in response to an increase in the voltage supplied to the third node N3 and the potential difference Vgs exceeds the threshold voltage VTH, the second transistor T2 is in the conductive state. As a result, the drain current Ion flows from the drive power line PVDD toward the reference voltage line PVSS, and the light-emitting element OLED emits light. As a result, in the light emission period PEM of the KthFRAME, white light is emitted by three pixels using the pixel 180E emitting red light, the pixel 180E emitting blue light, and the pixel 180E emitting green light.

The second example of the driving method of the pixel circuit 181E including the configuration described above has similar advantageous effects as those described in "6-2-1. First Example of Driving Method of Pixel Circuit 181E".

[6-2-3. Third Example of Driving Method of Pixel Circuit 181E]

Figure 62:
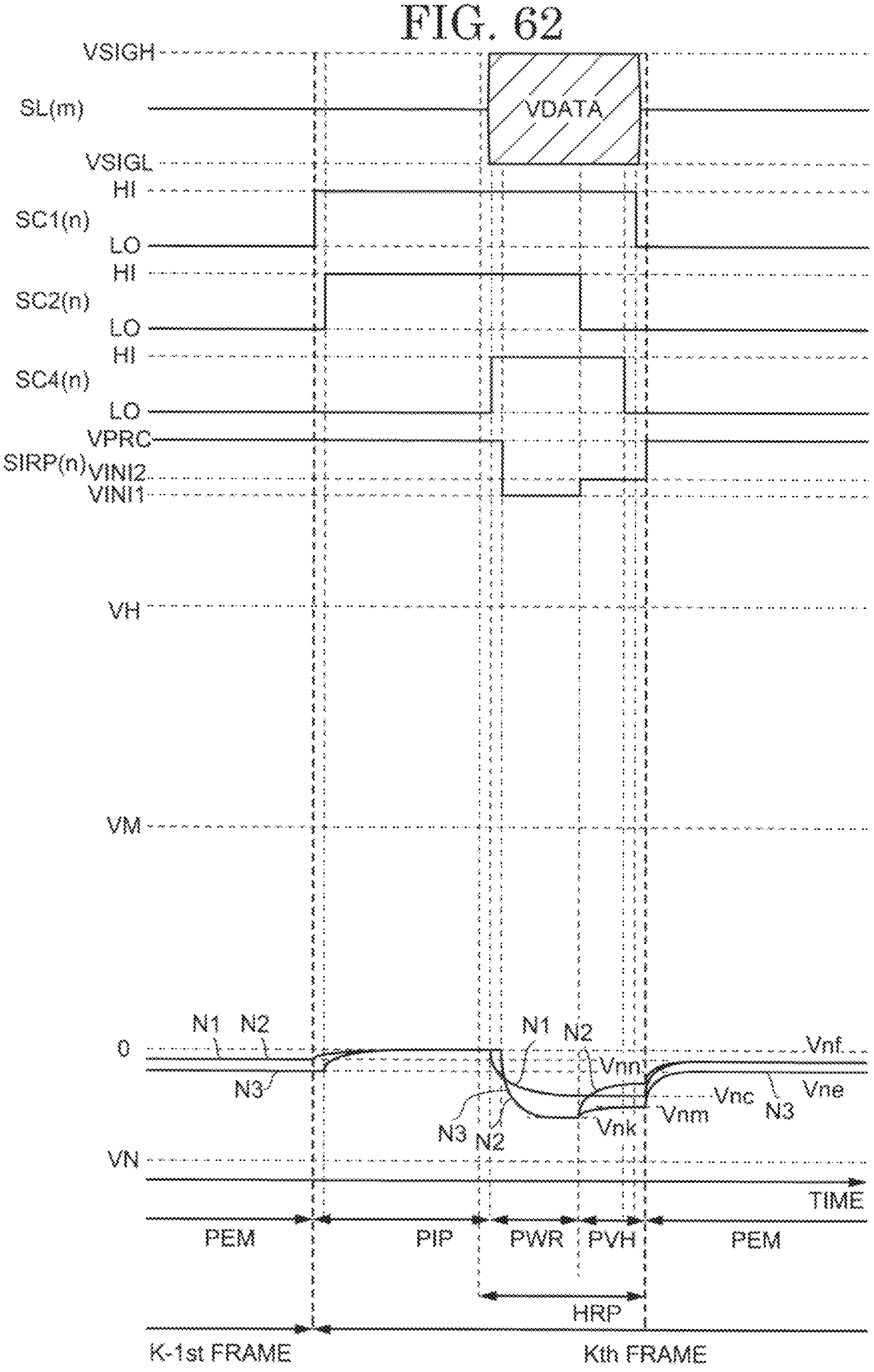
FIG. 62 is a timing chart of a self-luminous display device according to the sixth embodiment of the present invention.

A third example of the driving method of the pixel circuit 181E will be described with reference to FIG. 62. The driving method shown in the third example of the driving method of the pixel circuit 181E includes displaying images of the same color (black) in consecutive frames similar to the third example of the driving method of the self-luminous display device 10 according to the first embodiment. Configurations that are the same as or similar to those in FIG. 1 to FIG. 61 will be described as necessary.

Configurations of the image data signal SL(m), the first scan signal SC1(*n*), the second scan signal SC2(*n*), the fourth scan signal SC4(*n*), and the scan voltage power supply SIRP(n) in the light emission period PEM of the K−1stFRAME to the light emission period PEM of the KthFRAME are similar to those described in "6-2-1. First Example of Driving Method of Pixel Circuit 181E". Further, the operations of the transistors in the light emission period PEM of the K−1stFRAME to the light emission period PEM of the KthFRAME are similar to the configurations described in "6-2-1. First Example of Driving Method of Pixel Circuit 181E". Configurations and the like similar to those described in "6-2-1. First Example of Driving Method of Pixel Circuit 181E" will be described as necessary. In addition, the data signal VDATA including the VSIGL (−2 V) corresponding to black is supplied to the image data signal SL(m) in the period between the light emission period PEM of the K−1stFRAME and the light emission period PEM of the KthFRAME.

In the light emission period PEM of the K−1stFRAME, data is not selected using the selection signal, and the data signal VDATA of the previous n−1st row of the n-th row is applied to the data signal VDATA. The voltage Vnf supplied to the first node N1 and the second node N2 is −0.5 V, the voltage Vne supplied to the third node N3 is −1 V, and the potential difference Vgs is 0.5 V. Therefore, the second transistor T2 is in the OFF state, and based on the potential difference Vgs and the potential difference Vds corresponding to the voltage VSIGL (−2 V) input in the horizontal period HRP of the K−1stFRAME, the current Ion does not flow from the drive power line PVDD to the light-emitting element OLED and the reference voltage line PVSS. Therefore, the light-emitting element OLED does not emit light.

In the period PIP of the KthFRAME following the light emission period PEM of the K−1stFRAME, for example, the image data signal SL(m) based on the data signal VDATA of the previous n−1st row of the n-th row is input to the pixel 180E. The voltage supplied to the first node N1 and the voltage supplied to the second node N2 gradually rise from the voltage Vnf toward the pre-charge voltage VPRC (0 V) to become 0 V, and the voltage supplied to the third node N3 gradually rises from the voltage Vne toward the pre-charge voltage VPRC (0 V) to become 0 V. Since the potential difference Vgs is 0 V and smaller than the threshold voltage VTH, the second transistor T2 is maintained in the OFF state. Therefore, since the drain current Ion does not flow from the drive power line PVDD to the initialization voltage power line SVI or the reference voltage line PVSS, the light-emitting element OLED does not emit light.

As described above, in the period PIP, the intermediate potential is supplied to the first node N1, the second node N2, and the third node N3 by the pre-charge voltage VPRC (0 V). Therefore, in the period PIP, the pre-charge voltage (intermediate potential) is supplied to the first node N1, and the second node N2 and the third node N3 are initialized by the pre-charge voltage VPRC (0 V).

The voltages (potentials) of the first node N1, the second node N2, and the third node N3 in the period PWR in the horizontal period HRP of the KthFRAME to the light emission period PEM of the KthFRAME following the period PIP of the KthFRAME, the operations of the transistors, and the like are similar to those described in "6-2-1. First Example of Driving Method of Pixel Circuit 181E".

Therefore, in the period PWR, the data signal VDATA is written to the pixel 180 (pixel circuit 181), and the voltage supplied to the second node N2 and the voltage supplied to the third node N3 become the initialization voltage VINI1 (voltage Vnk, −3 V).

Further, in the period PVH, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS).

Further, in the light emission period PEM of the KthFRAME, three pixels using the pixel 180E emitting red light, the pixel 180E emitting blue light, and the pixel 180E emitting green light become black.

The third example of the driving method of the pixel circuit 181E including the configuration described above has similar advantageous effects as those described in "6-2-1. First Example of Driving Method of Pixel Circuit 181E".

[6-2-4. Fourth Example of Driving Method of Pixel Circuit 181E]

Figure 63:
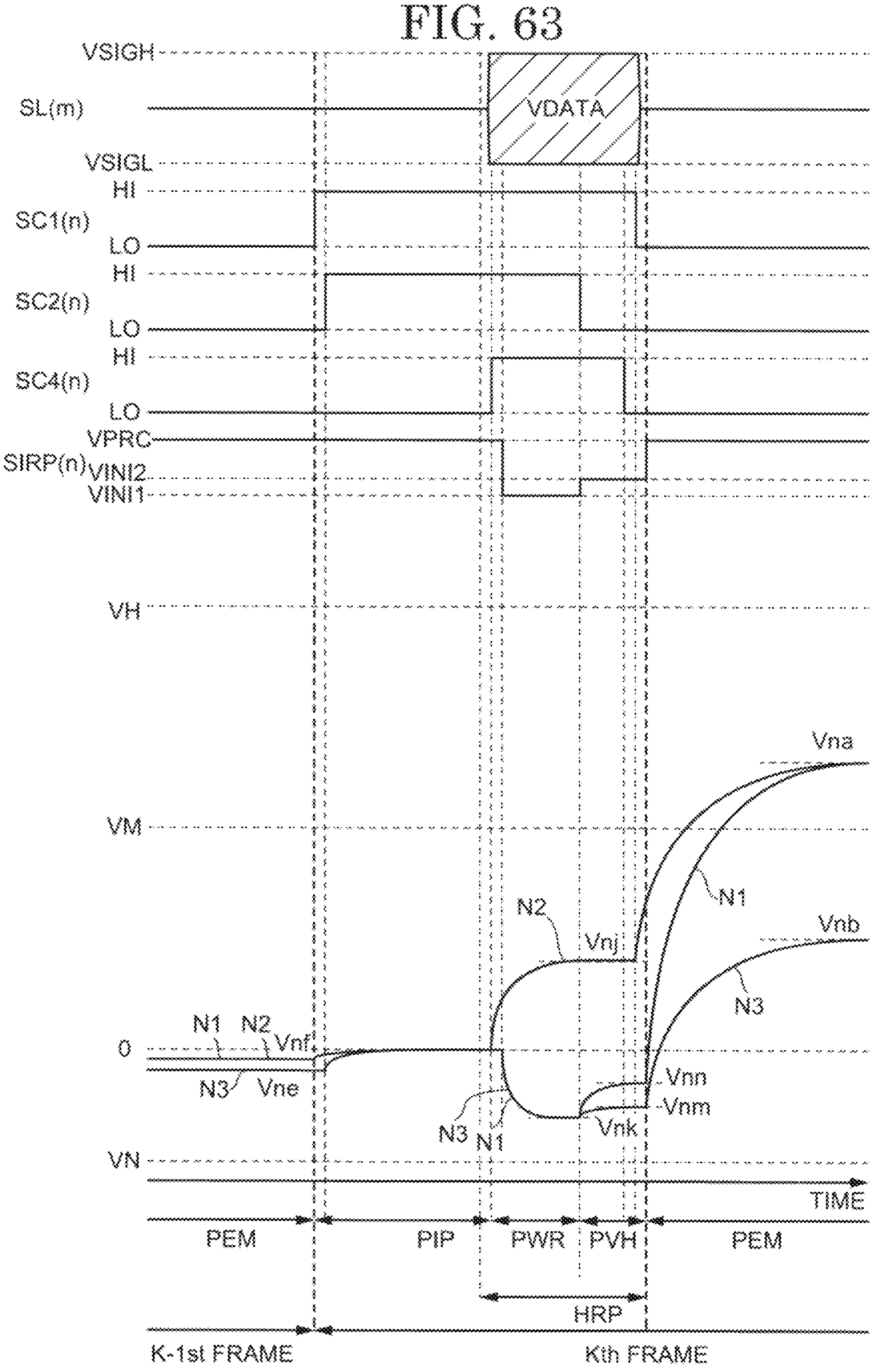
FIG. 63 is a timing chart of a self-luminous display device according to the sixth embodiment of the present invention.

A fourth example of the driving method of the pixel circuit 181E will be described with reference to FIG. 63. The driving method shown in the fourth example of the driving method of the pixel circuit 181E includes displaying images of different colors in consecutive frames similar to the fourth example of the driving method of the self-luminous display device 10 according to the first embodiment. Configurations that are the same as or similar to those in FIG. 1 to FIG. 62 will be described as necessary.

Configurations of the image data signal SL(m), the first scan signal SC1(*n*), the second scan signal SC2(*n*), the fourth scan signal SC4(*n*), and the scan voltage power supply SIRP(n) in the light emission period PEM of the K−1stFRAME to the light emission period PEM of the KthFRAME are similar to those described in "6-2-1. First Example of Driving Method of Pixel Circuit 181E". Further, the voltages (potentials) of the respective nodes and the respective transistors in the light emission period PEM of the K−1stFRAME and the period PIP of the KthFRAME, and the operations of the respective transistors are similar to those described in "6-2-3. Third Example of Driving Method of Pixel Circuit 181E". Further, the voltages (potentials) of the respective nodes and the respective transistors in the period PWR of the KthFRAME to the light emission period PEM of the KthFRAME and the operations of the respective transistors are similar to those described in "6-2-2. Second Example of Driving Method of Pixel Circuit 181E". Configurations and the like similar to those described in "6-2-1. First Example of Driving Method of Pixel Circuit 181E", "6-2-2. Second Example of Driving Method of Pixel Circuit 181E", and "6-2-3. Third Example of Driving Method of Pixel Circuit 181E" will be described as necessary. In addition, the data signal VDATA of VSIGH (2 V) corresponding to white is supplied to the image data signal SL(m) in the period PWR and the period PVH.

In the light emission period PEM of the K−1stFRAME, the pixel 180 (pixel circuit 181) is black similar to "6-2-3. Third Example of Driving Method of Pixel Circuit 181E".

In the period PIP, similar to "6-2-3. Third Example of Driving Method of Pixel Circuit 181E", the pre-charge voltage (intermediate potential) is supplied to the first node N1, and the second node N2 and the third node N3 are initialized by the pre-charge voltage VPRC (0 V).

In the period PWR, the data signal VDATA (in the fourth example, the voltage VSIGH) is written to the pixel 180E similar to "6-2-2. Second Example of Driving Method of Pixel Circuit 181E". Further, the voltage supplied to the second node N2 and the voltage supplied to the third node N3 become the initialization voltage VINI1 (voltage Vnk, −3 V).

In the period PVH, the threshold voltage VTH of the second transistor T2 is obtained by the operation in which the potential difference Vgs of the second transistor T2 becomes the same as the threshold voltage VTH, and the charge equivalent to the threshold voltage VTH is held in the third node N3 (the first electrode 692 of the capacitive element CS).

Further, in the light emission period PEM of the KthFRAME, similar to "6-2-2. Second Example of Driving Method of Pixel Circuit 181E", the pixel 180 emitting red light, the pixel 180 emitting blue light, and the pixel 180 emitting green light emit light, and white light is emitted by three pixels using the pixel 180 emitting red light, the pixel 180 emitting blue light, and the pixel 180 emitting green light.

The fourth example of the driving method of the pixel circuit 181E including the configuration described above has similar advantageous effects as those described in "6-2-1. First Example of Driving Method of Pixel Circuit 181E".

7. Seventh Embodiment

Figure 64:
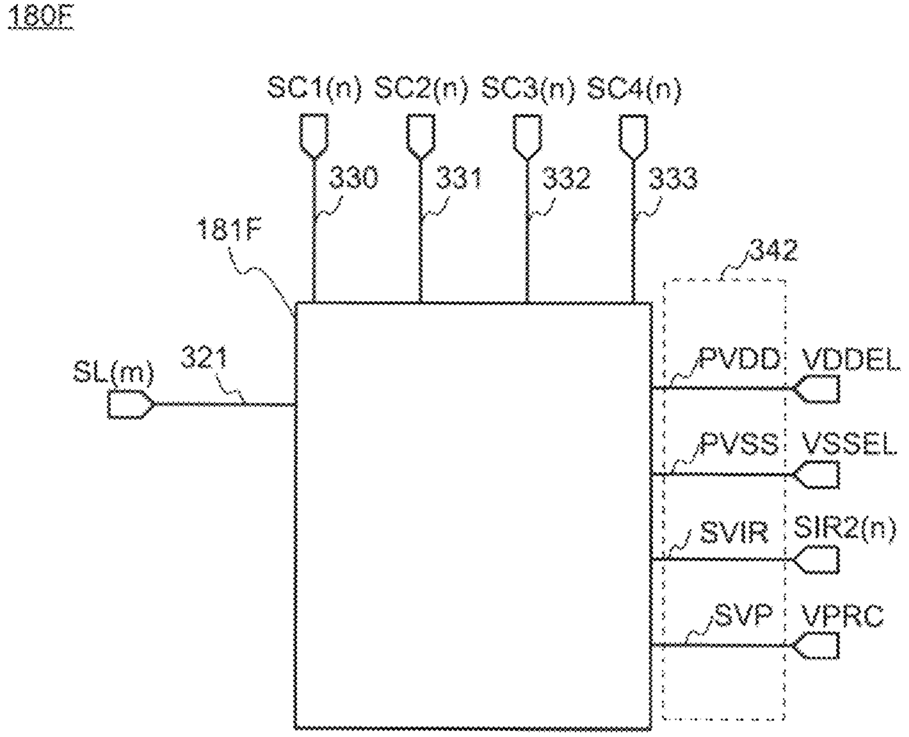
FIG. 64 is a schematic diagram showing an input signal to a pixel circuit according to the seventh embodiment of the present invention.
Figure 65:
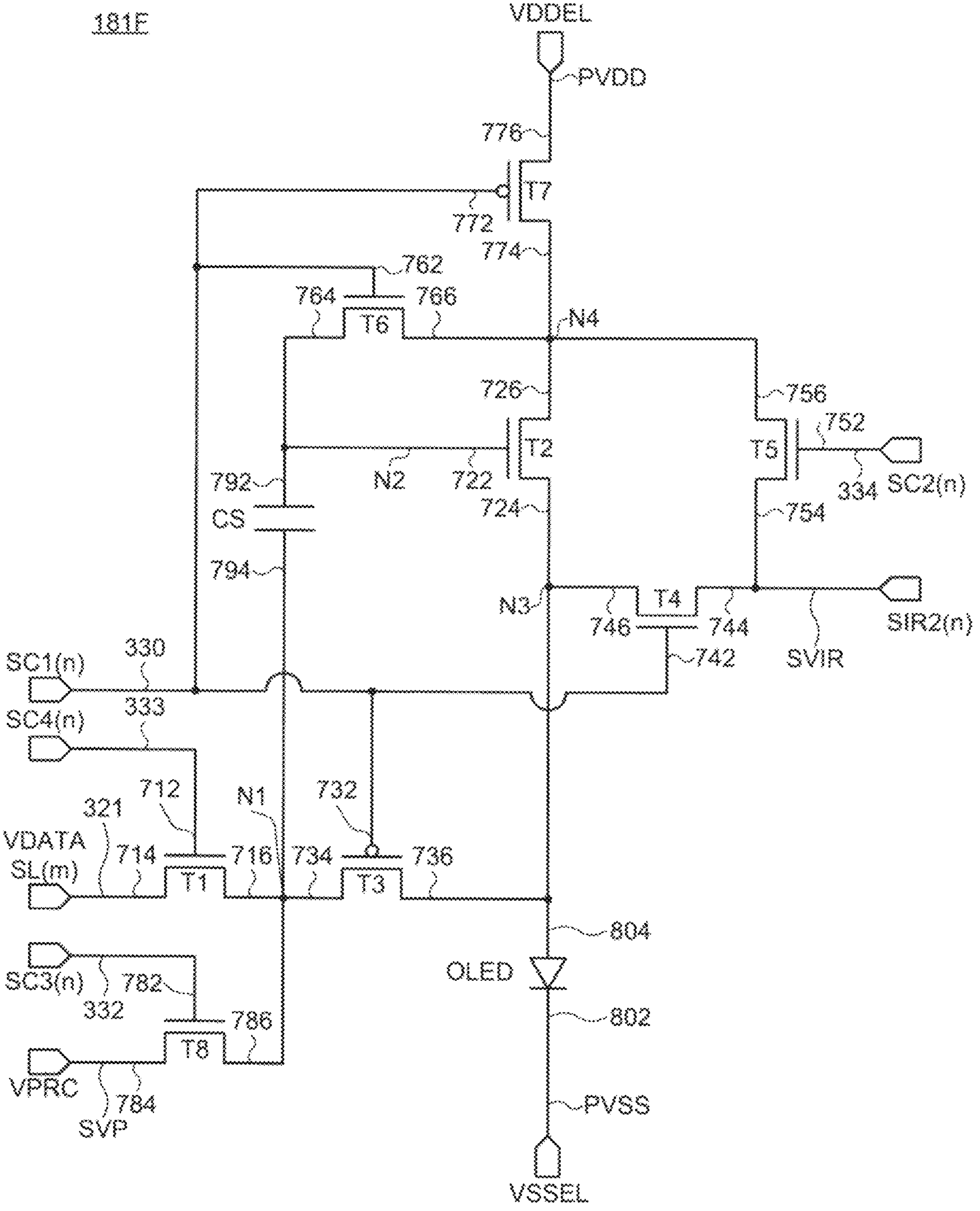
FIG. 65 is a circuit diagram showing a configuration of a pixel circuit according to the seventh embodiment of the present invention.

An overview of the self-luminous display device according to the seventh embodiment will be described with reference to FIG. 1, FIG. 6, and FIG. 64 to FIG. 69. FIG. 64 is a schematic diagram showing an input signal to a pixel 180F (pixel circuit 181F) according to the seventh embodiment of the present invention. FIG. 65 is a circuit diagram showing a configuration of the pixel circuit 181F. FIG. 66 to FIG. 69 are timing charts of the self-luminous display device according to the seventh embodiment of the present invention.

The self-luminous display device according to the seventh embodiment includes the pixel 180F and a pixel circuit 181F. The configurations of the pixel 180F and the pixel circuit 181F are different from the configurations of the pixel 180C and the pixel circuit 181C of the self-luminous display device according to the fourth embodiment. Specifically, the circuit configuration of the pixel circuit 181F is different from the circuit configuration of the pixel circuit 181C. In addition, the pixel circuit 181F has a configuration and function in which the third scan signal SC4(*n*−1) and the scan voltage power supply SIR(n) supplied to the pixel circuit 181C are replaced with the third scan signal SC3(*n*) and a scan voltage power supply SIR2(*n*). In describing the configuration and function of the seventh embodiment, configurations and functions similar to those of the self-luminous display device 10 according to the first embodiment to the self-luminous display device according to the sixth embodiment will be described as necessary. Configurations that are the same as or similar to those in FIG. 1 to FIG. 63 will be described as necessary.

[7-1. Configuration of Pixel 180F]

An overview of the pixel 180F and the pixel circuit 181F will be described with reference to FIG. 64 and FIG. 65.

As shown in FIG. 64, the pixel circuit 181F is connected to the scan signal line 332 to which the third scan signal SC3(*n*) is supplied, and the scan voltage power line SVIR to which the scan voltage power supply SIR2(*n*) is supplied. For example, each of the scan voltage power line SVIR, the drive voltage VDDEL, and the reference voltage VSSEL is electrically connected to the different connection wirings 342. In addition, for example, each of the scan voltage power line SVIR, the drive voltage VDDEL, and the reference voltage VSSEL may each be different connection wirings 342.

As shown in FIG. 65, the pixel circuit 181F includes the first transistor T1, the second transistor T2, the third transistor T3, the fourth transistor T4, the fifth transistor T5, the sixth transistor T6, a seventh transistor T7, an eighth transistor T8, the capacitive element CS, and the light-emitting element OLED. Each of these transistors includes a gate electrode and a pair of electrodes (a source electrode and a drain electrode) consisting of the first electrode and the second electrode. Each of the capacitive element CS and the light-emitting element OLED has a pair of electrodes consisting of the first electrode and the second electrode.

For example, the first transistor T1 is the select transistor. The first transistor T1 has a function of supplying the image data signal SL(m) to the first node N1.

For example, the second transistor T2 is a drive transistor. The threshold voltage VTH of the second transistor T2 is corrected based on the initialization voltage VINI1 and the initialization voltage VINI2. In addition, the second transistor T2 controls connection and disconnection between the third node N3 (a first electrode 724, a second electrode 736, a second electrode 746, and a second electrode 804) and a fourth node N4 (a second electrode 726, a second electrode 756, a second electrode 766, and a first electrode 774) based on the corrected threshold voltage VTH and the input image data signal SL(m).

The third transistor T3 has a function of conducting the first node N1 and the third node N3.

The fourth transistor T4 has a function of conducting the third node N3 (the first electrode 724, the second electrode 736, the second electrode 746, and the second electrode 804) and the scan voltage power line SVIR (a first electrode 744 and a first electrode 754) to supply the scan voltage power supply SIR4(*n*) to the third node N3 and initializing the third node N3.

The fifth transistor T5 has a function of conducting the fourth node N4 (the second electrode 726, the second electrode 756, the second electrode 766, and the first electrode 774) and the scan voltage power line SVIR to supply the scan voltage power supply SIR4(*n*) to the fourth node N4 (the second electrode 726, the second electrode 756, the second electrode 766, and the first electrode 774) and initializing the fourth node N4 (the second electrode 726, the second electrode 756, the second electrode 766, and the first electrode 774).

The sixth transistor T6 has a function of conducting the second node N2 (a gate electrode 722, a first electrode 792, the first electrode 774) and the fourth node N4 (the second electrode 726, the second electrode 756, the second electrode 766, the first electrode 774).

The seventh transistor T7 has a function of conducting the drive power line PVDD (a second electrode 776) and the fourth node N4 (the second electrode 726, the second electrode 756, the second electrode 766, and the first electrode 774).

The eighth transistor T8 has a function of conducting the pre-charge voltage power line SVP (a first electrode 784) and the first node N1 (a second electrode 716, a first electrode 734, a second electrode 794, and a second electrode 786).

For example, the capacitive element CS has a function of holding the charge equivalent to the voltage supplied to the second node N2 and a function of holding the charge equivalent to the data voltage included in the image data signal SL(m) supplied to the first node N1.

The light-emitting element OLED has diode characteristics and has a function of emitting light based on a current flowing through the light-emitting element OLED (that is, the drain current Ion of the second transistor T2).

The first transistor T1 includes a gate electrode 712, a first electrode 714, and the second electrode 716. The gate electrode 712 is electrically connected to the scan signal line 333. The first electrode 714 is electrically connected to the image data signal line 321. The second electrode 716 is electrically connected to the first node N1, the first electrode 734 of the third transistor T3, and the second electrode 794 of the capacitive element CS. The switching of the first transistor T1 is controlled using the fourth scan signal SC4(*n*). In other words, the conductive state and the non-conductive state of the first transistor T1 are controlled by the fourth scan signal SC4(*n*). When the signal supplied to the fourth scan signal SC4(*n*) is LO, the first transistor T1 is in the non-conductive state. When the signal supplied to the fourth scan signal SC4(*n*) is HI, the first transistor T1 is in the conductive state.

The second transistor T2 includes the gate electrode 722, the first electrode 724, and the second electrode 726. The gate electrode 722 is electrically connected to the second node N2, a first electrode 764 of the sixth transistor T6, and the first electrode 792 of the capacitive element CS. The first electrode 724 is electrically connected to the third node N3, the second electrode 736 of the third transistor T3, the second electrode 746 of the fourth transistor T4, and the second electrode 804 of the light-emitting element OLED. The second electrode 726 is electrically connected to the second electrode 756 of the fifth transistor T5, the second electrode 766 of the sixth transistor T6, and the first electrode 774 of the seventh transistor T7. The threshold voltage of the second transistor T2 is the threshold voltage VTH. In the second transistor T2, the conductive state and the non-conductive state are controlled according to the potential difference Vgs between the voltage supplied to the second node N2 and the voltage supplied to the third node N3, the potential difference Vds between the second electrode 726 and the first electrode 724, and the threshold voltage VTH.

The third transistor T3 includes a gate electrode 732, the first electrode 734, and the second electrode 736. The switching of the third transistor T3 is controlled using the first scan signal SC1(*n*). In other words, the conductive state and the non-conductive state of the third transistor T3 are controlled by the first scan signal SC1(*n*). When the signal supplied to the first scan signal SC1(*n*) is LO, the third transistor T3 is in the conductive state. When the signal supplied to the first scan signal SC1(*n*) is HI, the third transistor T3 is in the non-conductive state.

The scan signal line 330 is electrically connected to a gate electrode 742 of the fourth transistor T4, a gate electrode 762 of the sixth transistor T6, and a gate electrode 772 of the seventh transistor T7, in addition to the gate electrode 732 of the third transistor T3.

The fourth transistor T4 includes the gate electrode 742, the first electrode 744, and the second electrode 746. The first electrode 744 is electrically connected to the scan voltage power line SVIR. The switching of the fourth transistor T4 is controlled using the first scan signal SC1(*n*). In other words, the conductive state and the non-conductive state of the fourth transistor T4 are controlled by the first scan signal SC1(*n*). When the first scan signal SC1(*n*) is LO, the fourth transistor T4 is in the non-conductive state. When the first scan signal SC1(*n*) is HI, the fourth transistor T4 is in the conductive state.

The fifth transistor T5 includes a gate electrode 752, the first electrode 754, and the second electrode 756. The gate electrode 752 is electrically connected to a scan signal line 334. The first electrode 754 is electrically connected to the scan voltage power line SVIR. The switching of the fifth transistor T5 is controlled using the second scan signal SC2(*n*). In other words, the conductive state and the non-conductive state of the fifth transistor T5 are controlled by the second scan signal SC2(*n*). When the signal supplied to the second scan signal SC2(*n*) is LO, the fifth transistor T5 is in the non-conductive state, and when the signal supplied to the second scan signal SC2(*n*) is HI, the fifth transistor T5 is in the conductive state.

The sixth transistor T6 includes the gate electrode 762, the first electrode 764, and the second electrode 766. The gate electrode 762 is electrically connected to the scan signal line 330. The switching of the sixth transistor T6 is controlled using the first scan signal SC1(*n*). In other words, the conductive state and the non-conductive state of the sixth transistor T6 are controlled by the first scan signal SC1(*n*). When the signal supplied to the first scan signal SC1(*n*) is LO, the sixth transistor T6 is in the non-conductive state, and when the signal supplied to the first scan signal SC(n) is HI, the sixth transistor T6 is in the conductive state.

The seventh transistor T7 includes the gate electrode 772, the first electrode 774, and the second electrode 776. The gate electrode 772 is electrically connected to the scan signal line 330. The second electrode 776 is electrically connected to the drive power line PVDD. The switching of the seventh transistor T7 is controlled using the first scan signal SC1(*n*). In other words, the conductive state and the non-conductive state of the seventh transistor T7 are controlled by the first scan signal SC1(*n*). When the signal supplied to the first scan signal SC1(*n*) is LO, the seventh transistor T7 is in the conductive state, and when the signal supplied to the first scan signal SC1(*n*) is HI, the seventh transistor T7 is in the non-conductive state.

The eighth transistor T8 includes a gate electrode 782, the first electrode 784, and the second electrode 786. The gate electrode 782 is electrically connected to the scan signal line 332. The second electrode 786 is electrically connected to the first node N1, the second electrode 716, the first electrode 734, and the second electrode 794. The switching of the eighth transistor T8 is controlled using the third scan signal SC3(*n*). In other words, the conductive state and the non-conductive state of the eighth transistor T8 are controlled by the third scan signal SC3(*n*). When the signal supplied to the third scan signal SC3(*n*) is HI, the eighth transistor T8 is in the conductive state, and when the signal supplied to the third scan signal SC3(*n*) is LO, the eighth transistor T8 is in the non-conductive state.

The first electrode 802 of the light-emitting element OLED is electrically connected to the reference voltage line PVSS. As described above, the reference voltage VSSEL is supplied to the reference voltage line PVSS. The first electrode 802 of the light-emitting element OLED is, for example, the cathode electrode, and the second electrode 804 of the light-emitting element OLED is, for example, the anode electrode.

Each transistor included in the pixel circuit 181F may have a configuration similar to each transistor included in the pixel circuit 181. For example, the channel region of the transistors may contain low-temperature polysilicon (LTPS), and the n-channel transistor may be formed using the metal oxide with semiconductor properties.

In the seventh embodiment, the first transistor T1, the second transistor T2, the fourth transistor T4, the fifth transistor T5, the sixth transistor T6, and the eighth transistor T8 are n-channel field effect transistors, and the third transistor T3 and the seventh transistor T7 are p-channel field effect transistors. In addition, as an example, the channel region of each of the second transistor T2, the third transistor T3, the fifth transistor T5, and the seventh transistor T7 has crystalline silicon, and the channel region of each of the first transistor T1, the fourth transistor T4, the sixth transistor T6, and the eighth transistor T8 has an oxide semiconductor.

[7-2. Driving Method of Pixel Circuit 181F]

A driving method of the self-luminous display device 10 according to the seventh embodiment will be described with reference to FIG. 65 to FIG. 69. Configurations that are the same as or similar to those in FIG. 1 to FIG. 65 will be described as necessary. In addition, similar to the first embodiment, the horizontal axis of the timing charts represents time (TIME).

The driving method of the self-luminous display device according to the seventh embodiment is different from the driving method of the self-luminous display device 10 according to the first embodiment shown in FIG. 6 in that the period PVH is executed after the period PWR.

Next, referring to FIG. 65 to FIG. 69, one horizontal period (horizontal period HRP) in the driving method of the pixel 180F according to the seventh embodiment will be described.

In the horizontal period HRP in the driving method of the self-luminous display device according to the seventh embodiment, the first scan signal SC1(*n*), the second scan signal SC2(*n*), the third scan signal SC3(*n*), the fourth scan signal SC4(*n*), the image data signal SL(m) including the data signal VDATA, and the scan voltage power supply SIR2(*n*) are input to the pixel 180F. For example, the pixel 180F is selected according to the timings of the first scan signal SC1(*n*), the second scan signal SC2(*n*), the third scan signal SC3(*n*), and the fourth scan signal SC4(*n*). The image data signal SL(m) and the scan voltage power supply SIR2(*n*) are input to the selected pixel 180F according to the timings of the respective signals. Similar operations are performed on all the pixels 180F, and an image of the frame corresponding to 1FRAME is displayed on the display region 22 of the self-luminous display device 10 based on the image data signal SL(m) input to all the pixels 180F.

For example, the voltages (potentials) supplied to each signal and each node of each frame in the timing charts shown in FIG. 66 to FIG. 69 are shown in Table 13 and Table 14.

TABLE 13

| | PIP | PWR | PVH | PEM |
|---|---|---|---|---|
| SC1(n) | HI | HI | HI | LO |
| SC2(n) | HI | HI | LO | LO |
| SC3(n) | HI | LO | LO | LO |
| SC4(n) | LO | HI | HI | LO |
| SIR2(n) | 0.5 [V] | | −1 [V] | 0.5 [V] |
| SL(m) | — | −4.5 [V](White) ~−0.5 [V](Black) | −4.5 [V](White) ~−0.5 [V](Black) | — |
| N1 | −2.5 [V] (Intermediate potential) | −4.5 [V] ~−0.5 [V] | −4.5 [V] ~−0.5 [V] | In conjunction with potential of N3 |
| N2 | 0.5 [V] | 0.5 [V] | −0 [V] | Rise in conjunction with the rise of potential of N1 |

TABLE 13-continued

| | PIP | PWR | PVH | PEM |
|---|---|---|---|---|
| N3 | 0.5 [V] | 0.5 [V] | −1 [V] | Rise in conjunction with Ion with VGS |
| Vgs (= V(N2)-V(N3)) | 0 [V] | 0 [V] | 1 [V] | |
| Remarks | Initialize T2 and OLED Apply precharge potential (intermediate potential) to CS | Apply VDATA to CS | Acquiring and retaining VTH Potential of N2 = VINI2+VTH Potential of N2-Potential of N1 = (VINI2-VTH)-VDATA Non-light emitting below VTHEL | Light emitting VGS = (VINI2-VTH)-VDATA |

TABLE 14

| | Setting value [V] |
|---|---|
| VTH | 1 |
| VTHEL | 0.7 |
| VSIGL(White) | −4.5 |
| VSIGH(Black) | −0.5 |
| HI | 10 |
| LO | −6.5 |
| VINI1 | 0.5 |
| VINI2 | −1 |
| VPRC | −2.5 |
| VDDEL | 8 |
| VSSEL | 0 |

[7-2-1. First Example of Driving Method of Pixel Circuit 181F]

Figure 66:
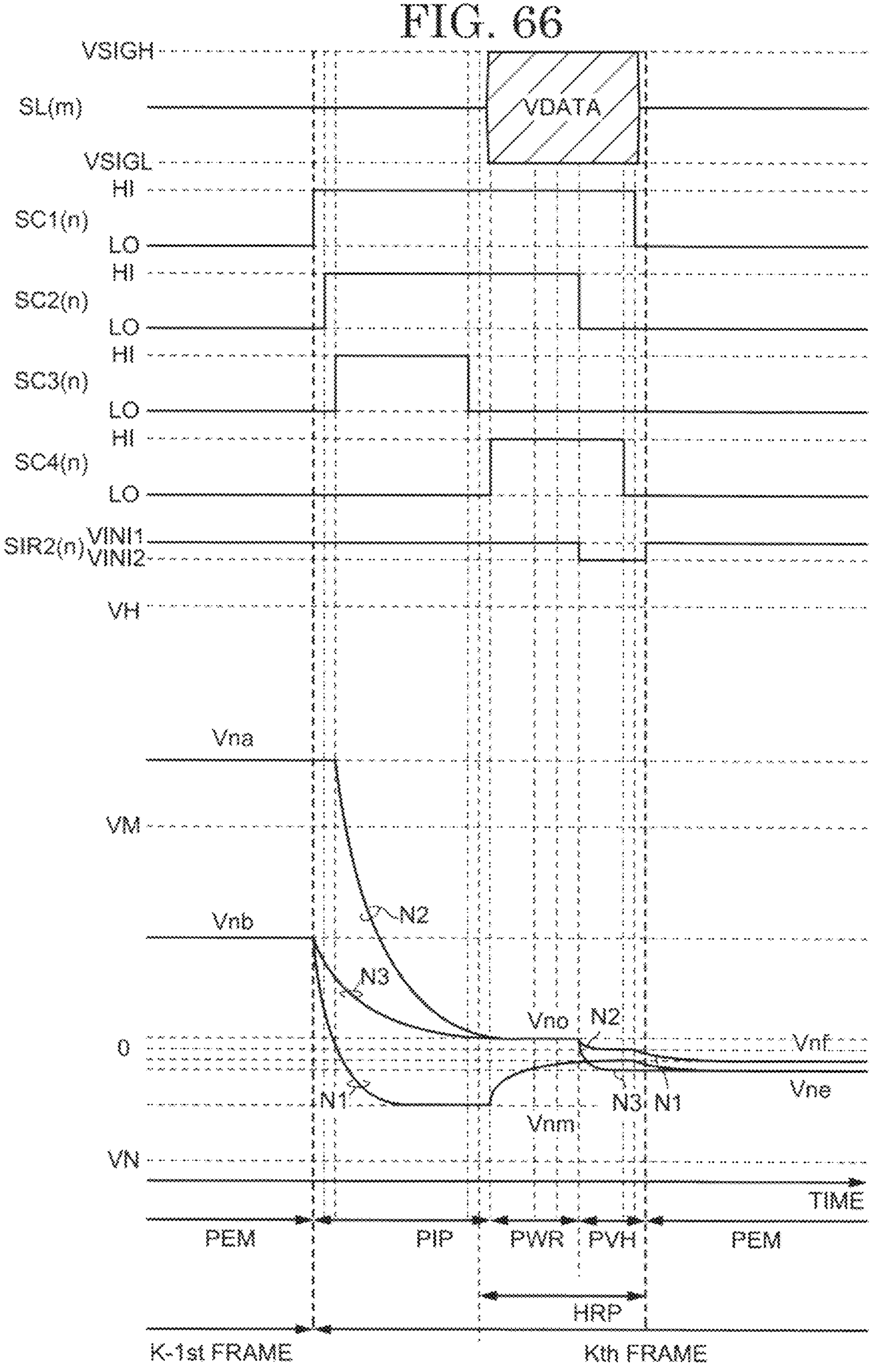
FIG. 66 is a timing chart of a self-luminous display device according to the seventh embodiment of the present invention.

A first example of the driving method of the pixel circuit 181F will be described with reference to FIG. 66. Similar to the first example of the driving method of the self-luminous display device 10 according to the fourth embodiment, the first example of the driving method of the pixel circuit 181F includes displaying images of different colors in consecutive frames.

The timings at which the image data signal SL(m), the first scan signal SL(n), the second scan signal SC2(*n*), the third scan signal SC3(*n*), and the fourth scan signal SC4(*n*) are supplied to the pixel circuit 181F in the light emission period PEM of the K−1stFRAME, the horizontal period HRP and the light emission period PEM of the KthFRAME are similar to the timings at which the image data signal SL(m), the first scan signal SL(n), the second scan signal SC2(*n*), the third scan signal SC3(*n*), and the fourth scan signal SC4(*n*) are supplied to the pixel circuit 181C according to the fourth embodiment.

As shown in Table 13 and Table 14, the image data signal SL(m) including the data signal VDATA supplied to the pixel circuit 181F according to each horizontal period is equal to or higher than-4.5 V and equal to or lower than-0.5 V. For example, the voltage VSIGL is −4.5 V, and the pixel 180 to which the voltage VSIGL is supplied emits light and emits various colors. In addition, for example, the voltage VSIGH is −0.5 V, and the pixel 180 to which the voltage VSIGH is supplied does not emit light and becomes black. For example, the initialization voltage VINI2 is −1 V, the initialization voltage VINI1 is 0.5 V, the pre-charge voltage VPRC is −2.5 V, the voltage VH (HI) is 10 V, the voltage VL (LO) is 5 V, and the voltage VN is −5 V.

The scan voltage power supply SIR2(*n*) is supplied with the initialization voltage VINI1 in the light emission period PEM of the K−1stFRAME to the period PWR of the KthFRAME and the light emission period PEM of the KthFRAME, and is supplied with the initialization voltage VINI2 in the period PVH of the KthFRAME. When the second scan signal SC2(*n*) changes from the state in which HI is supplied to the state in which LO is supplied, the scan voltage power supply SIR2(*n*) changes from the state in which the initialization voltage VINI1 is supplied to the state in which the initialization voltage VINI2 is supplied. In addition, when the first scan signal SC1(*n*) changes from the state in which HI is supplied to the state in which LO is supplied, the scan voltage power supply SIR2(*n*) changes from the state in which the initialization voltage VINI2 is supplied to the state in which the initialization voltage VINI1 is supplied.

In the light emission period PEM of the K−1stFRAME, LO is supplied to the first scan signal SC1(*n*) to the fourth scan signal SC4(*n*). The first transistor T1, the fourth transistor T4, the fifth transistor T5, the sixth transistor T6, and the eighth transistor T8 are in the non-conductive state, and the third transistor T3 and the seventh transistor T7 are in the conductive state. For example, the voltage Vna supplied to the second node N2 is 7 V, the voltage Vnb supplied to the first node N1 and the third node N3 is 2.5 V, the potential difference Vgs is 4.5 V, and the second transistor is in the conductive state. Therefore, the second transistor T2 can flow the current Ion based on the potential difference Vgs and the potential difference Vds according to the voltage VSIGH input in the horizontal period HRP of the K−1stFRAME. The seventh transistor T7 is in the conductive state, the current Ion flows from the drive power line PVDD to the light-emitting element OLED and the reference voltage line PVSS, and the light-emitting element OLED emits light. For example, white light is emitted by three pixels using the pixel 180F emitting red light, the pixel 180F emitting blue light, and the pixel 180F emitting green light.

In the period PIP in the horizontal period HRP of the KthFRAME following the light emission period PEM of the K−1stFRAME, for example, the pixel 180F is in a state in which the image data signal SL(m) based on the data signal VDATA of the previous n−1st row of the n-th row is input. When the first scan signal SC1(*n*) changes from the state in which LO is supplied to the state in which HI is supplied, the second scan signal SC2(*n*) changes from the state in which LO is supplied to the state in which HI is supplied. When the second scan signal SC2(*n*) changes from the state in which LO is supplied to the state in which HI is supplied, the third scan signal SC3(*n*) changes from the state in which LO is supplied to the state in which HI is supplied. The fourth scan signal SC4(*n*) maintains the state in which LO is supplied. The fourth transistor T4, the fifth transistor T5, the sixth transistor T6, and the eighth transistor T8 are turned from the non-conductive state to the conductive state, the third transistor T3 and the seventh transistor T7 are turned from the conductive state to the non-conductive state, and the first transistor T1 is maintained in the non-conductive state. As a result, the voltage supplied to the first node N1 drops from the voltage Vnb toward the pre-charge voltage VPRC (voltage Vnm, −2.5 V) and becomes the voltage Vnm. The voltage supplied to the second node N2 drops from the voltage Vna toward the initialization voltage VINI1 (voltage Vno, 0.5 V). The voltage supplied to the third node N3 drops from the voltage Vnb toward the initialization voltage VINI1 (voltage Vno, 0.5 V).

Further, in the period at the end of the period PIP, the image data signal SL(m) is in the state in which the data signal VDATA of the voltage VSIGL is supplied, the first scan signal SC1(*n*) and the second scan signal SC2(*n*) are maintained in the state in which HI is supplied, the fourth scan signal SC4(*n*) is maintained in the state in which LO is supplied, and the scan voltage power supply SIR2(*n*) is maintained in the state in which the initialization voltage VINI1 is supplied. In addition, the third scan signal SC3(*n*) changes from the state in which HI is supplied to the state in which LO is supplied. Therefore, the eighth transistor T8 is turned from the conductive state to the non-conductive state. The fourth transistor T4, the fifth transistor T5, and the sixth transistor T6 are maintained in the conductive state, and the first transistor T1, the third transistor T3, and the seventh transistor T7 are maintained in the non-conductive state.

As a result, the voltage supplied to the first node N1 maintains the voltage Vnm, and the voltage supplied to the second node N2 and the voltage supplied to the third node N3 become the initialization voltage VINI1 (voltage Vno, 0.5 V). Therefore, the potential difference Vgs and the potential difference Vds become 0 V. As a result, since the potential difference Vgs is smaller than the threshold voltage VTH (1 V), the second transistor T2 is in the non-conductive state. Therefore, since the drain current Ion does not flow from the second electrode 726 of the second transistor T2 to the first electrode 724, the light-emitting element OLED does not emit light.

As described above, in the period PIP, the pre-charge voltage (intermediate potential) is supplied to the first node N1, and the second node N2 and the third node N3 are initialized by the initialization voltage VINI1.

In the period PWR following the period PIP in the horizontal period HRP of the KthFRAME, the image data signal SL(m) maintains the state in which the data signal VDATA of the voltage VSIGL is supplied, the first scan signal SC1(*n*) and the second scan signal SC2(*n*) are maintained in the state in which HI is supplied, the third scan signal SC3(*n*) is maintained in the state in which LO is supplied, and the scan voltage power supply SIR2(*n*) is maintained in the state in which the initialization voltage VINI1 is supplied. The fourth scan signal SC4(*n*) changes from the state in which LO is supplied to the state in which HI is supplied. Therefore, the first transistor T1 is turned from the non-conductive state to the conductive state, the fourth transistor T4, the fifth transistor T5, and the sixth transistor T6 are maintained in the conductive state, and the third transistor T3, the seventh transistor T7, and the eighth transistor T8 are maintained in the non-conductive state.

As a result, the voltage supplied to the first node N1 gradually rises from the voltage Vnm toward the voltage VSIGL (voltage Vnf, −0.5 V) and becomes the voltage Vnf (−0.5 V). The voltage supplied to the second node N2 and the voltage supplied to the third node N3 maintain the voltage Vno (0.5 V). Therefore, the potential difference Vgs becomes 0 V. As a result, since the potential difference Vgs is smaller than the threshold voltage VTH (1 V), the second transistor T2 is in the non-conductive state. Therefore, since the drain current Ion does not flow from the second electrode 726 of the second transistor T2 to the first electrode 724, the light-emitting element OLED does not emit light.

As described above, in the period PWR, the data signal VDATA (in this case, the voltage VSIGL) is written to the pixel 180F. In addition, the second node N2 and the third node N3 maintain the initialization voltage VINI1 (voltage Vno, 0.5 V).

In the period PVH following the period PWR in the horizontal period HRP of the KthFRAME, the image data signal SL(m) maintains the state in which the data signal VDATA including the voltage VSIGL is supplied, the first scan signal SC1(*n*) maintains the state in which HI is supplied, and the third scan signal SC3(*n*) maintains the state in which HI is supplied. The second scan signal SC2(*n*) changes from the state in which HI is supplied to the state in which LO is supplied. When the second scan signal SC2(*n*) changes from the state in which HI is supplied to the state in which LO is supplied, the scan voltage power supply SIR2(*n*) changes from the state in which the initialization voltage VINI1 is supplied to the state in which the initialization voltage VINI2 is supplied. The fourth scan signal SC4(*n*) changes from the state in which HI is supplied to the state in which LO is supplied. Therefore, the first transistor T1 and the fifth transistor T5 are turned from the conductive state to the non-conductive state. The fourth transistor T4 and the sixth transistor T6 are maintained in the conductive state, and the third transistor T3, the seventh transistor T7, and the eighth transistor T8 are maintained in the non-conductive state.

As a result, the voltage supplied to the first node N1 maintains the voltage Vnf (−0.5 V). The voltage supplied to the third node N3 gradually drops from the voltage Vno (0.5 V) toward the initialization voltage VINI2 (−1 V) and becomes the initialization voltage VINI2 (−1 V). Since the voltage supplied to the third node N3 is directed to −1 V, the potential difference Vgs exceeds the threshold voltage VTH. As a result, the second transistor T2 is turned on, discharging of the second node N2 begins, and the voltage of the second node N2 drops from the voltage Vno (0.5 V) to 0 V.

When the potential difference Vgs between the voltage supplied to the second node N2 and the voltage supplied to the third node N3 becomes the threshold voltage VTH, the voltage supplied to the second node N2 and the voltage supplied to the third node N3 maintain the respective voltages at that time. For example, as shown in FIG. 66, the voltage supplied to the second node N2 is 0 V, and the voltage supplied to the third node N3 is the voltage Vne (−1 V). Since the second transistor T2 is in the OFF state and no current flows from the drive power line PVDD to the reference voltage line PVSS, the light-emitting element OLED does not emit light.

As described above, in the period PVH, the threshold voltage Vgs of the second transistor T2 is obtained by the operation in which the potential difference Vgs of the second transistor T2 becomes the same as the threshold voltage VTH. In addition, the charge equivalent to the threshold voltage VTH is held in the second node N2 (the gate electrode 722 of the second transistor T2).

In the light emission period PEM of the KthFRAME following the horizontal period HRP of the KthFRAME, data is not selected using the selection signal, and the data signal VDATA is switched to the data signal VDATA of the subsequent n+1st row of the n-th row. Further, the first scan signal SC1(*n*) changes from the state in which HI is supplied to the state in which LO is supplied, the second scan signal SC2(*n*) to the fourth scan signal SC4(*n*) are maintained in the state in which LO is supplied, and the scan voltage power supply SIR2(*n*) changes from the state in which the initialization voltage VINI2 is supplied to the state in which the initialization voltage VINI1 is supplied.

Therefore, the fourth transistor T4 and the sixth transistor T6 are turned from the conductive state to the non-conductive state, the third transistor T3 is turned from the non-conductive state to the conductive state, and the first transistor T1, the fifth transistor T5, and the eighth transistor T8 are maintained in the non-conductive state. When the third transistor T3 is in the conductive state, the first node N1 and the third node N3 are conductive, and the voltage supplied to the first node N1 becomes voltage Vne (−1 V). Since the first node N1 and the third node N3 are conductive and then the voltage supplied to the first node N1 gradually drops toward-1 V, the voltage supplied to the second node N2 gradually drops from 0 V due to the capacitive coupling between the second node N2 (the gate electrode 722 of the second transistor T2, the first electrode 792 of the capacitive element CS) and the first node N1. For example, the voltage supplied to the second node N2 becomes the voltage Vnf (−0.5 V).

Therefore, the potential difference Vgs is −0.5 V in the light emission period PEM of the KthFRAME. Since the potential difference Vgs is smaller than the threshold voltage VTH, the second transistor T2 is in the non-conductive state, and no current flows from the drive power line PVDD to the reference voltage line PVSS, the light-emitting element OLED generally does not emit light. As a result, for example, since the pixel 180F emitting red light, the pixel 180F emitting blue light, and the pixel 180F emitting green light do not emit light, three pixels using the pixel 180F emitting red light, the pixel 180F emitting blue light, and the pixel 180F emitting green light become black.

[7-2-2. Second Example of Driving Method of Pixel Circuit 181F]

Figure 67:
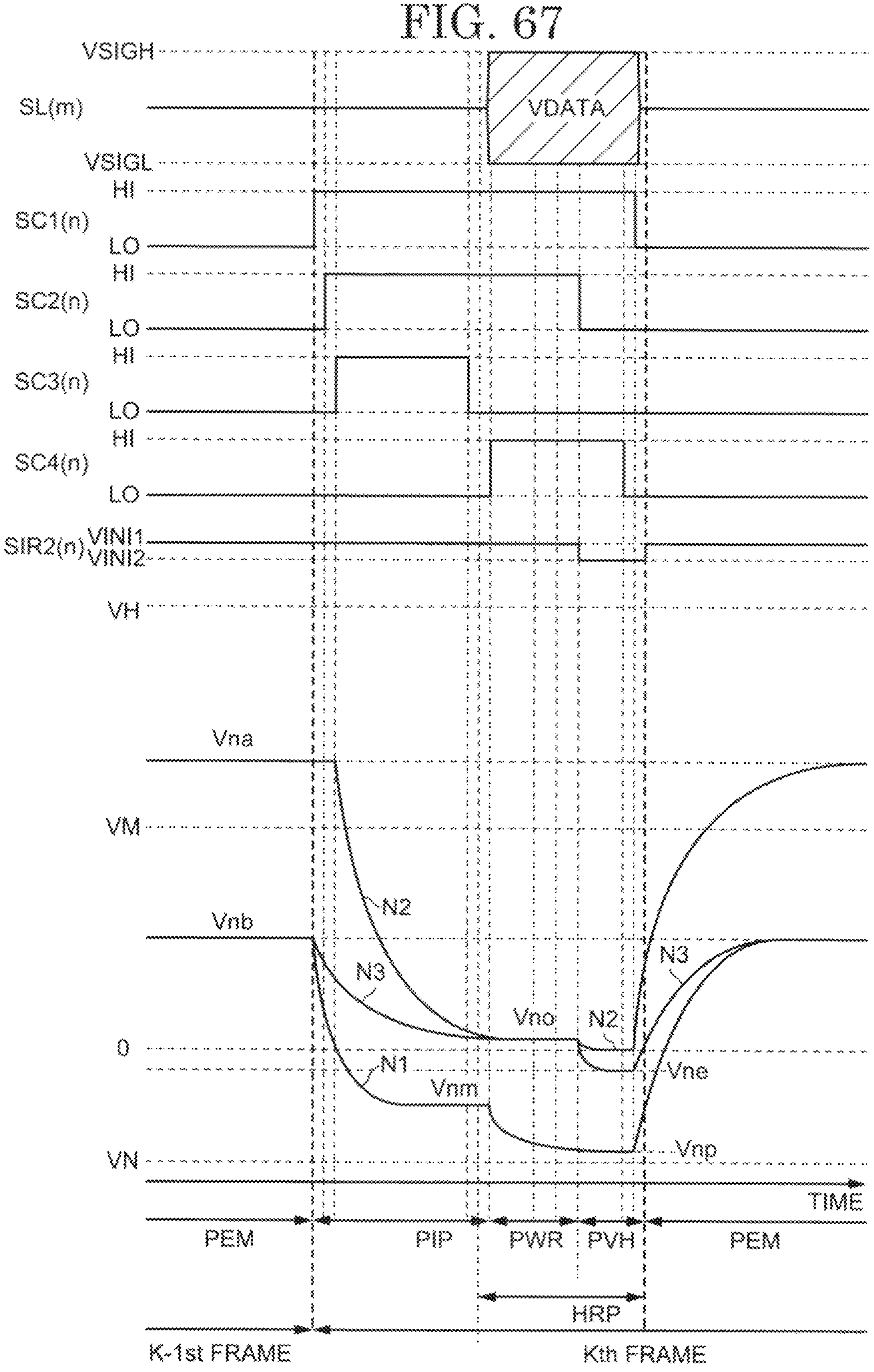
FIG. 67 is a timing chart of a self-luminous display device according to the seventh embodiment of the present invention.

A second example of the driving method of the pixel circuit 181F will be described with reference to FIG. 67. The driving method shown in the second example of the pixel circuit 181F includes displaying images of the same color (white) in consecutive frames similar to the second example of the driving method of the self-luminous display device 10 according to the first embodiment. Configurations that are the same as or similar to those in FIG. 1 to FIG. 66 will be described as necessary.

The timings at which the first scan signal SC1(*n*), the second scan signal SC2(*n*), the third scan signal SC3(*n*), the fourth scan signal SC4(*n*), and the scan signal SIR2(*n*) are supplied to the pixel circuit 181F in the light emission period PEM of the K−1stFRAME to the light emission period PEM of the KthFRAME are similar to the configuration described in "7-2-1. First Example of Driving Method of Pixel Circuit 181F". In addition, the image data signal SL(m) including the data signal VDATA including the voltage VSIGL (−4.5 V) corresponding to the light emission is input to the pixel 180F in the period PWR and the period PVH.

Further, the voltage (potential) of the first node N1 in the light emission period PEM of the K−1stFRAME and the period PIP of the KthFRAME, the voltages (potentials) of the second node N2 and the third node N3 in the light emission period PEM of the K−1stFRAME and the horizontal period HRP of the KthFRAME, the operations of the transistors, and the like are similar to the configuration described in "7-2-1. First Example of Driving Method of Pixel Circuit 181F". Configurations and the like similar to those described in "7-2-1. First Example of Driving Method of Pixel Circuit 181F" will be described as necessary.

In the light emission period PEM of the K−1stFRAME in the second example of the driving method of the pixel circuit 181F, similar to the content described in "7-2-1. First Example of Driving Method of Pixel Circuit 181F". the current Ion flows from the drive power line PVDD to the light-emitting element OLED and the reference voltage line PVSS, and the light-emitting element OLED emits light. For example, white light is emitted by three pixels using the pixel 180F emitting red light, the pixel 180F emitting blue light, and the pixel 180F emitting green light.

In the period PIP in the horizontal period HRP of the KthFRAME following the light emission period PEM of the K−1stFRAME, similar to the content described in "7-2-1. First Example of Driving Method of Pixel Circuit 181F", the voltage supplied to the first node N1 is maintained at the voltage Vnm, and the voltage supplied to the second node N2 and the voltage supplied to the third node N3 are the initialization voltage VINI1 (voltage Vno, 0.5 V). The potential difference Vgs and the potential difference Vds are 0 V, and the second transistor T2 is in the non-conductive state. Since the drain current Ion does not flow from the second electrode 726 of the second transistor T2 to the first electrode 724, the light-emitting element OLED does not emit light. The pre-charge voltage (intermediate potential) is supplied to the first node N1, and the second node N2 and the third node N3 are initialized by the initialization voltage VINI1.

In the period PWR following the period PIP in the horizontal period HRP of the KthFRAME, the voltage supplied to the second node N2 and the voltage supplied to the third node N3 maintain the voltage Vno (0.5 V). The data signal VDATA of the voltage VSIGL (−4.5 V) corresponding to the light emission is supplied to the image data signal SL(m). The voltage supplied to the first node N1 gradually drops from the voltage Vnm toward the voltage VSIGL (voltage Vnp, −4.5 V) and becomes the voltage Vnp (−4.5 V). Therefore, the potential difference Vgs is 0 V and the second transistor T2 is in the non-conductive state. Since the drain current Ion does not flow from the second electrode 726 of the second transistor T2 to the first electrode 724, the light-emitting element OLED does not emit light. As a result, the data signal VDATA (in this case, the voltage VSIGL) is written to the pixel 180F. In addition, the second node N2 and the third node N3 maintain the initialization voltage VINI1 (voltage Vno, 0.5 V).

In the period PVH following the period PWR in the horizontal period HRP of the KthFRAME, the voltage supplied to the third node N3 gradually drops from the voltage Vno (0.5 V) toward the voltage Vne (initialization voltage VINI2, −1 V) and becomes the initialization voltage VINI2 (−1 V). The voltage of the second node N2 drops from the voltage Vno (0.5 V) to 0 V in response to the drop in the voltage supplied to the third node N3. The image data signal SL(m) maintains the state in which the data signal VDATA including the voltage VSIGL is supplied, and the voltage supplied to the first node N1 maintains the voltage Vnp (−4.5 V).

Similar to the content described in "7-2-1. First Example of Driving Method of Pixel Circuit 181F", when the potential difference Vgs between the voltage supplied to the second node N2 and the voltage supplied to the third node N3 becomes the threshold voltage VTH, the voltage supplied to the second node N2 and the voltage supplied to the third node N3 maintain the respective voltages at that time. For example, as shown in FIG. 67, the voltage supplied to the second node N2 is 0 V, and the voltage supplied to the third node N3 is voltage Vne (−1 V). Since the second transistor T2 is in the OFF state and no current flows from the drive power line PVDD to the reference voltage line PVSS, the light-emitting element OLED does not emit light.

As described above, in the period PVH in the second example of the driving method of the pixel circuit 181F, similar to the content described in "7-2-1. First Example of Driving Method of Pixel Circuit 181F", the threshold voltage VTH of the second transistor T2 is obtained by the operation in which the potential difference Vgs of the second transistor T2 becomes the same as the threshold voltage VTH. In addition, the charge equivalent to the threshold voltage VTH is held in the second node N2 (the gate electrode 722 of the second transistor T2).

In the light emission period PEM of the KthFRAME following the horizontal period HRP of the KthFRAME, when the third transistor T3 is in the conductive state, the first node N1 and the third node N3 are conductive and then the voltage supplied to the third node N3 instantaneously drops to the voltage Vnp (−4.5 V) (not shown). As a result, the potential difference Vgs exceeds the threshold voltage VTH, and the second transistor T2 is turned on. When the drain current Ion flows, the potential of the third node N3 rises instantaneously, and accordingly, the potential of the first node N1 also rises, and the potential of the third node N3 and the potential of the first node N1 are directed to 2.5 V. The potential of the second node N2 also rises to the voltage Vna (7 V) due to the capacitive coupling between the second node N2 (the gate electrode 722 of the second transistor T2 and the first electrode 792 of the capacitive element CS) and the first node N1 (voltage holding function by the capacitive element CS).

Therefore, the potential difference Vgs becomes 4.5 V in the light emission period PEM of the KthFRAME. The potential difference Vgs is greater than the threshold voltage VTH, the second transistor T2 is in the conductive state, a current flows from the drive power line PVDD to the reference voltage line PVSS, and the light-emitting element OLED emits light. For example, the pixel 180F emitting red light, the pixel 180F emitting blue light, and the pixel 180F emitting green light emit light, and white light is emitted by three pixels using the pixel 180F emitting red light, the pixel 180F emitting blue light, and the pixel 180F emitting green light.

[7-2-3. Third Example of Driving Method of Pixel Circuit 181F]

Figure 68:
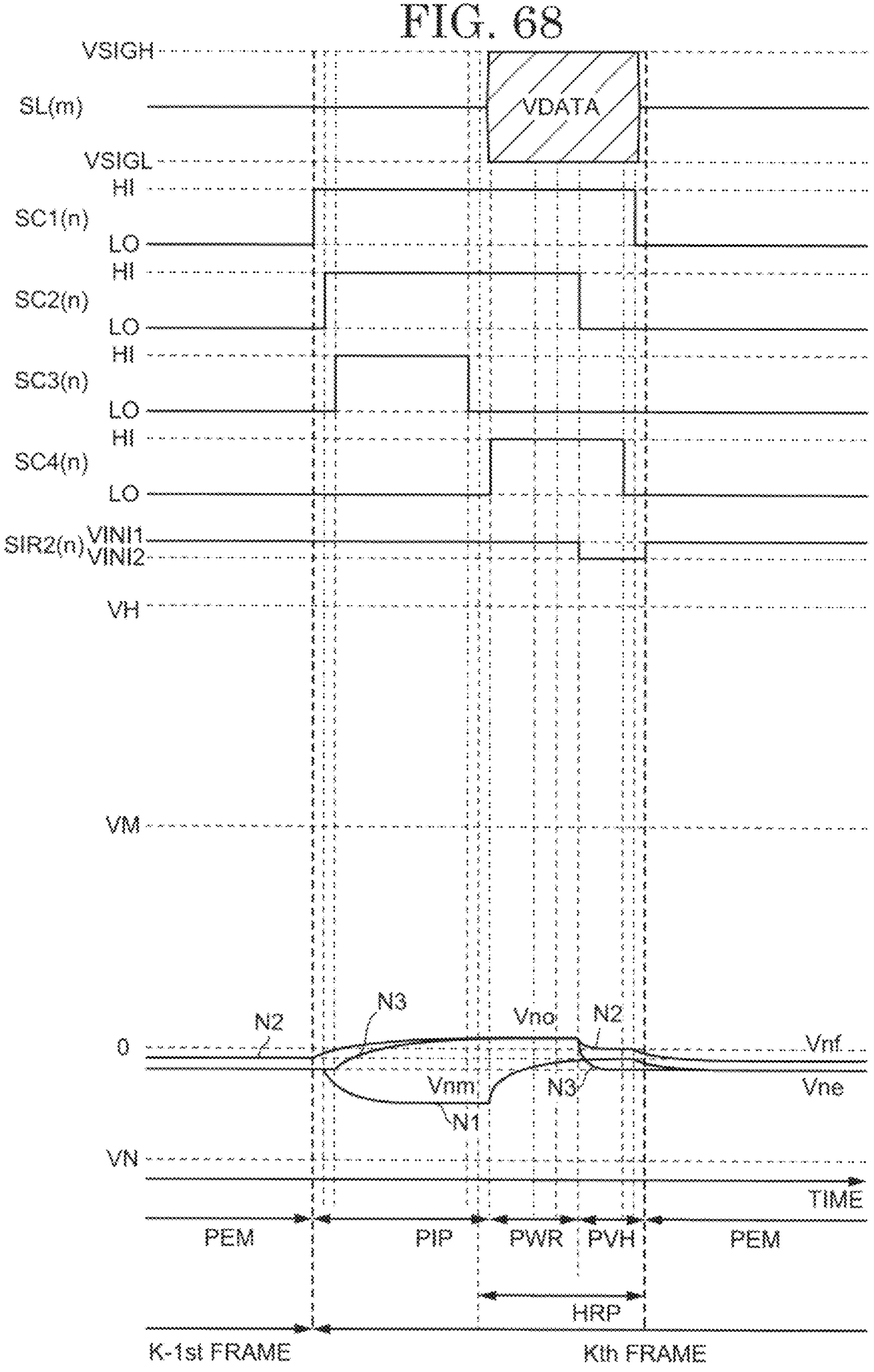
FIG. 68 is a timing chart of a self-luminous display device according to the seventh embodiment of the present invention.

A third example of the driving method of the pixel circuit 181F will be described with reference to FIG. 68. The driving method shown in the third example of the driving method of the pixel circuit 181F includes displaying images of the same color (black) in consecutive frames similar to the third example of the driving method of the self-luminous display device 10 according to the first embodiment. Configurations that are the same as or similar to those in FIG. 1 to FIG. 67 will be described as necessary.

The timings at which the first scan signal SC1(*n*), the second scan signal SC2(*n*), the third scan signal SC3(*n*), the fourth scan signal SC4(*n*), and the scan signal SIR2(*n*) are supplied to the pixel circuit 181F in the light emission period PEM of the K−1stFRAME to the light emission period PEM of the KthFRAME are similar to the configuration described in "7-2-1. First Example of Driving Method of Pixel Circuit 181F". In addition, the image data signal SL(m) including the data signal VDATA of the voltage VSIGH (−0.5 V) corresponding to the light emission is input to the pixel 180F in the period PWR and the period PVH.

Further, the voltages (potentials) of the first node N1, the second node N2, and the third node N3 in the period PWR of the KthFRAME to the light emission period PEM, the operations of the transistors, and the like are similar to the configuration described in "7-2-1. First Example of Driving Method of Pixel Circuit 181F". Configurations and the like similar to those described in "7-2-1. First Example of Driving Method of Pixel Circuit 181F" will be described as necessary.

In the light emission period PEM of the K−1stFRAME, the voltage Vne (−1 V) is supplied to the first node N1 and the third node N3, and the voltage Vnf (−0.5 V) is supplied to the second node N2. The potential difference Vgs is 0.5 V and the potential difference Vgs is smaller than the threshold voltage VTH (1 V, see Table 14) of the second transistor T2. Since the second transistor T2 is in the non-conductive state and no current flows from the drive power line PVDD to the reference voltage line PVSS, the light-emitting element OLED does not emit light. As a result, three pixels using the pixel 180F emitting red light, the pixel 180F emitting blue light, and the pixel 180F emitting green light become black.

In the period PIP following the light emission period PEM of the K−1stFRAME, the voltage supplied to the first node N1 gradually drops from the voltage Vne (−1 V) to the pre-charge voltage (voltage Vnm, −2.5 V), the voltage supplied to the second node N2 gradually rises from the voltage Vnf (−0.5 V) to the initialization voltage VINI1 (voltage Vno (0.5 V), and the voltage supplied to the third node N3 gradually rises from the voltage Vne (−1 V) to the initialization voltage VINI1 (voltage Vno, 0.5 V). The first node N1 is supplied with −2.5 V, and the second node N2 and the third node N3 are supplied with 0.5 V. In the period PWR, the data signal VDATA of the voltage VSIGH (−0.5 V) is supplied (written) to the first node N1, and the second node N2 and the third node N3 are initialized by the initialization voltage VINI1.

In the period PVH following the period PWR, similar to the content described in "7-2-1. First Example of Driving Method of Pixel Circuit 181F" in the period PVH, the threshold voltage VTH of the second transistor T2 is obtained by the operation in which the potential difference Vgs of the second transistor T2 becomes the same as the threshold voltage VTH. In addition, the charge equivalent to the threshold voltage VTH is held in the second node N2 (the gate electrode 722 of the second transistor T2).

In the light emission period PEM of the KthFRAME following the horizontal period HRP of the KthFRAME, similar to the content described in "7-2-1. First Example of Driving Method of Pixel Circuit 181F", the pixel 180F emitting red light does not emit light, and three pixels using the pixel 180F emitting red light, the pixel 180F emitting blue light, and the pixel 180F emitting green light become black.

[7-2-4. Fourth Example of Driving Method of Pixel Circuit 181F]

Figure 69:
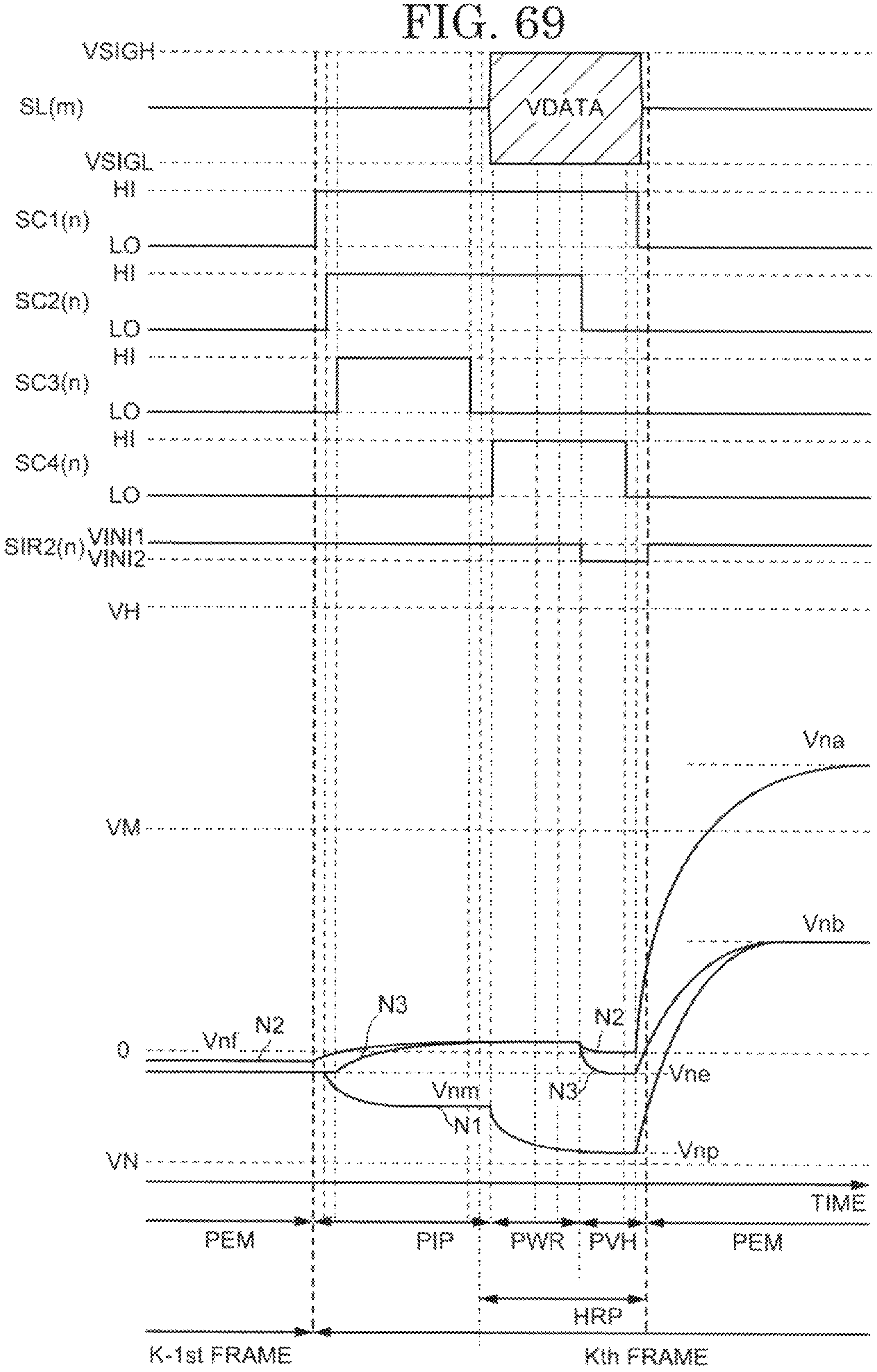
FIG. 69 is a timing chart of a self-luminous display device according to the seventh embodiment of the present invention.

A fourth example of the driving method of the pixel circuit 181F will be described with reference to FIG. 69. The driving method shown in the fourth example of the driving method of the pixel circuit 181F includes displaying images of different colors in consecutive frames similar to the fourth example of the driving method of the self-luminous display device 10 according to the first embodiment. Configurations that are the same as or similar to those in FIG. 1 to FIG. 68 will be described as necessary.

The timings at which the image data signal SL(m), the first scan signal SC1(*n*), the second scan signal SC2(*n*), the third scan signal SC3(*n*), the fourth scan signal SC4(*n*), and the scan signal SIR2(*n*) are supplied to the pixel circuit 181F in the light emission period PEM of the K−1stFRAME to the light emission period PEM if the KthFRAME are similar to the configuration described in "7-2-1. First Example of Driving Method the Pixel Circuit 181F". In addition, the image data signal SL(m) including the data signal VDATA including the voltage VSIGL (−4.5 V) corresponding to the light emission is input to the pixel 180F in the period PWR and the period PVH.

Further, the voltages (potentials) of the first node N1, the second node N2, and the third node N3 in the light emission period PEM of the K−1stFRAME to the period PIP of the KthFRAME, the operations of the transistors, and the like are similar to the configuration described in "7-2-3. Third Example of Driving Method of Pixel Circuit 181F". The voltages (potentials) of the first node N1, the second node N2, and the third node N3 in the period PWR of the KthFRAME to the light emission period PEM, the operations of the transistors, and the like are similar to the configuration described in "7-2-2. Second Example of Driving Method of Pixel Circuit 181F". Configurations and the like similar to those described in "7-2-1. First Example of Driving Method of Pixel Circuit 181F", "7-2-2. Second Example of Driving Method of Pixel Circuit 181F", and "7-2-3. Third Example of Driving Method of Pixel Circuit 181F" will be described as necessary.

In the light emission period PEM of the K−1stFRAME, similar to the configuration described in "7-2-3. Third Example of Driving Method of Pixel Circuit 181F", three pixels using the pixel 180F emitting red light, the pixel 180F emitting blue light, and the pixel 180F emitting green light become black.

In the period PIP of the KthFRAME, similar to the configuration described in "7-2-3. Third Example of Driving Method of Pixel Circuit 181F", the pre-charge voltage (intermediate potential) is supplied to the first node N1, and the second node N2 and the third node N3 are initialized by the initialization voltage VINI1.

In the period PWR of the KthFRAME, similar to the configuration described in "7-2-2. Second Example of Driving Method of Pixel Circuit 181F", the data signal VDATA (in this case, the voltage VSIGL) is written to the pixel 180F. In addition, the second node N2 and the third node N3 are maintained at the initialization voltage VINI1.

In the period PVH of the KthFRAME, similar to the configuration described in "7-2-2. Second Example of Driving Method of Pixel Circuit 181F", the threshold voltage VTH of the second transistor T2 is obtained by the operation in which the potential difference Vgs of the second transistor T2 becomes the same as the threshold voltage VTH. In addition, the charge equivalent to the threshold voltage VTH is held in the second node N2 (the gate electrode 722 of the second transistor T2).

In the light emission period PEM of the KthFRAME, similar to the configuration described in "7-2-2. Second Example of Driving Method of Pixel Circuit 181F", the pixel 180F emits red light, and white light is emitted by three pixels using the pixel 180F emitting red light, the pixel 180F emitting blue light, and the pixel 180F emitting green light.

As described above, similar to the self-luminous display device according to the fourth embodiment, the driving method of the self-luminous display device according to the seventh embodiment (the driving method of the pixel circuit 181F) includes supplying the intermediate potential to the first node VDATA and then supplying the data signal VDATA, and executing the period PVH after the period PWR. Therefore, the driving method of the self-luminous display device according to the seventh embodiment (the driving method of the pixel circuit 181F) has similar advantageous effects as those of the self-luminous display device according to the fourth embodiment.

Furthermore, each of the embodiments described above as an embodiment of the present invention can be appropriately combined and implemented as long as no contradiction is caused.

It is understood that, even if the effect is different from those provided by each of the above-described embodiments, the effect obvious from the description in the specification or easily predicted by persons ordinarily skilled in the art is apparently derived from the present invention.

What is claimed is:

1. A display device comprising:

a first transistor electrically connected between an image data signal line and a first node, the switching of the first transistor is controlled by a first control signal, and a data voltage is supplied to the image data signal line;

a third transistor electrically connected between the first node and a second node, the switching of the third transistor is controlled by a second control signal, and the second control signal is different from the first control signal;

a second transistor including a gate electrode electrically connected to the second node and electrically connected between a power line and a third node, and a constant voltage is supplied to the power line;

a fourth transistor electrically connected between a reference voltage power line and the second node, the switching of the fourth transistor is controlled by the second control signal, and a reference voltage is supplied to the reference voltage power line;

a fifth transistor electrically connected between an initialization voltage power line and the third node, the switching of the fifth transistor is controlled by a third control signal, the third control signal is different from the first control signal and the second control signal, and an initialization voltage is supplied to the initialization voltage power line;

a sixth transistor electrically connected between a pre-charge voltage power line and the first node, the switching of the sixth transistor is controlled by a fourth control signal, the fourth control signal is different from the first control signal and the second control signal, and a pre-charge voltage is supplied to the pre-charge voltage power line;

a light-emitting element electrically connected to the third node; and a capacitive element electrically connected between the first node and the third node.

2. The display device according to claim 1, further comprising:

a fifth control signal line, wherein the fifth control signal line serves as both the reference voltage power line and the initialization voltage power line.

3. The display device according to claim 1, further comprising:

a sixth control signal line, wherein the sixth control signal line serves as both a third control signal line and a fourth control signal line, the third control signal is supplied to the third control signal line, and the fourth control signal is supplied to the fourth control signal line.

4. The display device according to claim 1, wherein the third control signal is a signal obtained by shifting the fourth control signal.

5. The display device according to claim 1, further comprising:

a control circuit outputting the first control signal, the second control signal, the third control signal, and the fourth control signal, wherein the control circuit includes a first period and a second period after the first period, the control circuit is configured to control outputting a high-level voltage as the fourth control signal, turning on the sixth transistor, outputting a high-level voltage as the first control signal, and the sixth transistor to supply the pre-charge voltage to the first node in the first period, and the control circuit is configured to control turning on the first transistor, and the first transistor to supply the data voltage to the first node.

6. The display device according to claim 1, wherein the first transistor, the second transistor, the fourth transistor, the fifth transistor, and the sixth transistor are n-channel type field effect transistors, and the third transistor is a p-channel type field effect transistor.

7. The display device according to claim 1, wherein the first transistor, the fourth transistor, the fifth transistor, and the sixth transistor are n-channel type field effect transistors, and the second transistor and the third transistor are p-channel type field effect transistors.

8. The display device according to claim 1, wherein a channel length of the second transistor is longer than a channel length of the first transistor, a channel length of the third transistor, a channel length of the fourth transistor, a channel length of the fifth transistor, and a channel length of the sixth transistor.

9. The display device according to claim 1, wherein channel regions of the second transistor, the third transistor, and the fifth transistor each are comprised of crystalline silicon, channel regions of the first transistor, the fourth transistor, and the sixth transistor each are comprised of an oxide semiconductor, and the crystalline silicon of the third transistor overlaps the oxide semiconductor of the fourth transistor in a plan view.

10. The display device according to claim 1, further comprising:

a first conductive layer, and a second conductive layer different from the first conductive layer;

wherein each of the reference voltage power line, the initialization voltage power line, and the pre-charge voltage power line includes the first conductive layer and the second conductive layer different from each other, the first conductive layer and the second conductive layer included in the reference voltage power line overlap, the first conductive layer and the second conductive layer included in the initialization voltage power line overlap, and the first conductive layer and the second conductive layer included in the pre-charge voltage power line overlap, in a plan view.

11. The display device according to claim 1, wherein the gate electrode overlaps the capacitive element, in a plan view.

12. A display device comprising:

a first transistor electrically connected between an image data signal line and a first node, the switching of the first transistor is controlled by a first control signal, and a data voltage is supplied to the image data signal line;

a third transistor electrically connected between the first node and a second node, the switching of the third transistor is controlled using the first control signal;

a second transistor including a gate electrode electrically connected to the second node and electrically connected between a power line and a third node, and a constant voltage is supplied to the power line;

a fourth transistor electrically connected between the second node and a third control signal line, the switching of the fourth transistor is controlled by a second control signal, the second control signal is different from the first control signal, the third control signal line is supplied with a third control signal, the third control signal includes a pre-charge voltage, a first initialization voltage and a second initialization voltage, the first initialization voltage is different from a pre-charge voltage, and the second initialization voltage is different from a pre-charge voltage and the first initialization voltage;

a fifth transistor electrically connected between the third control signal line and the third node, the switching of the fifth transistor is controlled by the second control signal and a fourth control signal, and the fourth control signal is different from the first control signal;

a light-emitting element electrically connected to the third node; and a capacitive element electrically connected between the first node and the third node.

13. The display device according to claim 12, further comprising: a control circuit outputting the first control signal, the second control signal, the third control signal, and the fourth control signal, wherein the control circuit includes a first period and a second period after the first period, the control circuit is configured to control outputting a low-level voltage as the first control signal, turning the first transistor off and to turn the third transistor on, supplying a high-level voltage to the second control signal, turning the fourth transistor on, and the fourth transistor to supply the pre-charge voltage to the second node in the first period, and the control circuit is configured to control outputting a high-level voltage as the first control signal, turning the first transistor on and turning the third transistor off, and the first transistor to supply the data voltage to the first node in the second period.

14. The display device according to claim 12, wherein the first transistor, the second transistor, the fourth transistor, and the fifth transistor are n-channel type field effect transistors, and the third transistor is a p-channel type field effect transistor.

15. The display device according to claim 12, further comprising:

channel regions of the second transistor, the third transistor and the fifth transistor each are comprised of crystalline silicon, and channel regions of the first transistor and the fourth transistor each are comprised of an oxide semiconductor.

16. A display device comprising:

a first transistor electrically connected between an image data signal and a first node, the switching of the first transistor is controlled by a first control signal, and a data voltage is supplied to the image data signal line;

a third transistor electrically connected between the first node and a third node, the switching of the third transistor is controlled by a second control signal, and the second control signal is different from the first control signal;

a second transistor including a gate electrode electrically connected to the second node and electrically connected between the third node and a fourth node;

a fourth transistor electrically connected between the third node and a third control signal, the switching of the fourth transistor is controlled by the second control signal, a third control signal is supplied to the third control signal line, the third control signal includes a first initialization voltage and a second initialization voltage, the second initialization voltage is different from the first initialization voltage, and the first initialization voltage is supplied to the third control signal line;

a fifth transistor electrically connected between the third control signal line and the fourth node, the switching of the fifth transistor is controlled by a fourth control signal, and the fourth control signal is different from the first control signal, the second control signal and the third control signal;

a sixth transistor electrically connected between the second node and the fourth node, the switching of the sixth transistor is controlled by using the second control signal;

a seventh transistor electrically connected between a voltage line and the fourth node, the switching of the seventh transistor is controlled by the second control signal, and a constant voltage is supplied to the voltage line;

an eighth transistor electrically connected between a pre-charge voltage power line and the first node, the switching of the eighth transistor is controlled by a fifth control signal, the fifth control signal is different from the first control signal, the second control signal, the third control signal and the fourth control signal, and a pre-charge voltage is supplied to the pre-charge voltage power line;

a light-emitting element electrically connected to the third node; and a capacitive element electrically connected between the first node and the second node.

17. The display device according to claim 16, further comprising:

a control circuit outputting the first control signal, the second control signal, the third control signal, the fourth control signal, and the fifth control signal, wherein the control circuit includes a first period and a second period after the first period, the control circuit is configured to control supplying a low-level voltage to the first control signal, turning off the first transistor, supplying a high-level voltage to the second control signal, turning off the third transistor, supplying a high-level voltage to the fifth control signal, turning on the eighth transistor, and supplying the data voltage to the first node in the first period, and the control circuit is configured to control supplying a high-level voltage to the first control signal, turning on the first transistor, supplying a high-level voltage to the second control signal, maintaining the third transistor in the off state, supplying a low-level voltage to the fifth control signal, turning off the eighth transistor, and the first transistor to supply the data voltage to the first node.

18. The display device according to claim 16, wherein the first transistor, the second transistor, the fourth transistor, the fifth transistor, the sixth transistor, and the eighth transistor are n-channel type field effect transistors, and the third transistor and the seventh transistor are p-channel type field effect transistors.

19. The display device according to claim 18, wherein channel regions of the second transistor, the third transistor, the fifth transistor, and the seventh transistor each are comprised of crystalline silicon, and the channel regions of the first transistor, the fourth transistor, the sixth transistor, and the eighth transistor each are comprised of an oxide semiconductor.

* * * * *